(12) United States Patent
Tadi et al.

(10) Patent No.: US 11,991,344 B2
(45) Date of Patent: May 21, 2024

(54) SYSTEMS, METHODS AND APPARATUSES FOR STEREO VISION AND TRACKING

(71) Applicant: MINDMAZE HOLDING SA, Lausanne (CH)

(72) Inventors: Tej Tadi, Lausanne (CH); Leandre Bolomey, Lausanne (CH); Nicolas Fremaux, Lausanne (CH); Jose Rubio, Lausanne (CH); Jonas Ostlund, Lausanne (CH); Sylvain Cardin, Lausanne (CH); Flavio Roth, Lausanne (CH); Renaud Ott, Lausanne (CH); Frederic Condolo, Lausanne (CH); Nicolas Bourdaud, Lausanne (CH); Flavio Levi Capitao Cantante, Lausanne (CH); Corentin Barbier, Lausanne (CH); Ieltxu Gomez Lorenzo, Lausanne (CH)

(73) Assignee: MINDMAZE GROUP SA, Lausanne (CH)

( * ) Notice: Subject to any disclaimer, the term of this patent is extended or adjusted under 35 U.S.C. 154(b) by 0 days.

(21) Appl. No.: 17/474,078

(22) Filed: Sep. 14, 2021

(65) Prior Publication Data

US 2022/0182598 A1 Jun. 9, 2022

Related U.S. Application Data

(63) Continuation of application No. 16/532,604, filed on Aug. 6, 2019, now abandoned, which is a
(Continued)

(51) Int. Cl.
*H04N 13/383* (2018.01)
*G02B 27/01* (2006.01)

(52) U.S. Cl.
CPC ....... *H04N 13/383* (2018.05); *G02B 27/0172* (2013.01); *G02B 2027/0138* (2013.01)

(58) Field of Classification Search
CPC .. H04N 13/204; H04N 13/246; H04N 13/257; H04N 13/271; H04N 13/366; H04N 13/383; G02B 27/0172; G02B 2027/0138
See application file for complete search history.

(56) References Cited

U.S. PATENT DOCUMENTS

| 4,248,244 A | 2/1981 | Charnitski |
| 4,856,891 A | 8/1989 | Pflibsen |
(Continued)

FOREIGN PATENT DOCUMENTS

| CN | 101579238 | 11/2009 |
| CN | 102436662 | 5/2012 |
(Continued)

OTHER PUBLICATIONS

Merriam Webster Online Dictionary; "synchonize"; obtained Apr. 22, 2023; available at https://www.merriam-webster.com/dictionary/synchronize (Year: 2023).*

(Continued)

*Primary Examiner* — Jeremiah C Hallenbeck-Huber
(74) *Attorney, Agent, or Firm* — GRAESER ASSOCIATES INTERNATIONAL INC; D'Vorah Graeser

(57) ABSTRACT

A system, method and apparatus for stereo vision and tracking with a plurality of coupled cameras and optional sensors.

23 Claims, 102 Drawing Sheets

Related U.S. Application Data continuation-in-part of application No. PCT/IB2018/000386, filed on Feb. 7, 2018.

(60) Provisional application No. 62/598,487, filed on Dec. 14, 2017, provisional application No. 62/553,953, filed on Sep. 4, 2017, provisional application No. 62/456,050, filed on Feb. 7, 2017.

(56) References Cited

U.S. PATENT DOCUMENTS

| | | | |
|---|---|---|---|
| 4,876,541 | A | 10/1989 | Storer |
| 5,767,941 | A | 6/1998 | Ferguson |
| 5,771,238 | A | 6/1998 | Sutton |
| 6,078,361 | A | 6/2000 | Reddy |
| 6,233,017 | B1 | 5/2001 | Chaddha |
| 6,266,930 | B1 | 7/2001 | Kitabatake |
| 6,404,817 | B1 | 6/2002 | Saha |
| 6,409,602 | B1 | 6/2002 | Wiltshire |
| 6,434,695 | B1 | 8/2002 | Esfahani |
| 6,785,574 | B2 | 8/2004 | Kajitani |
| 6,929,549 | B1 | 8/2005 | Yamada |
| 7,274,368 | B1 | 9/2007 | Keslin |
| 7,554,549 | B2 | 6/2009 | Sagar |
| 8,130,225 | B2 | 3/2012 | Sullivan |
| 8,132,826 | B2 | 3/2012 | Schindzielorz |
| 8,144,153 | B1 | 3/2012 | Sullivan |
| 8,194,632 | B2 | 6/2012 | Lin |
| 8,493,286 | B1 | 7/2013 | Agrama |
| 8,908,960 | B2 | 12/2014 | Sullivan |
| 9,037,530 | B2 | 5/2015 | Tan |
| 9,155,487 | B2 | 10/2015 | Linderman |
| 9,191,643 | B2 * | 11/2015 | Sweeney ............... G06V 10/28 |
| 9,275,487 | B1 | 3/2016 | Van Gelder |
| 9,314,692 | B2 | 4/2016 | Konoplev |
| 9,351,658 | B2 | 5/2016 | Lee |
| 9,389,694 | B2 | 7/2016 | Ataee |
| 9,552,510 | B2 | 1/2017 | Li |
| 9,622,703 | B2 | 4/2017 | Badower |
| 9,817,498 | B2 | 11/2017 | Song |
| 9,928,633 | B2 | 3/2018 | Cotter |
| 9,968,264 | B2 | 5/2018 | Tzvieli |
| 10,013,605 | B1 | 7/2018 | Oakes, III |
| 10,120,413 | B2 | 11/2018 | Aimone |
| 10,154,810 | B2 | 12/2018 | Tzvieli |
| 10,156,949 | B2 | 12/2018 | Lee |
| 10,235,807 | B2 | 3/2019 | Thomas |
| 10,485,471 | B2 | 11/2019 | Ray |
| 10,515,474 | B2 | 12/2019 | Tadi |
| 10,521,014 | B2 | 12/2019 | Tadi |
| 10,835,167 | B2 | 11/2020 | Voss |
| 10,943,100 | B2 | 3/2021 | Tadi |
| 11,000,669 | B2 | 5/2021 | Derungs |
| 11,105,696 | B2 | 8/2021 | Mariani |
| 11,195,316 | B2 | 12/2021 | Tadi |
| 11,295,470 | B2 | 4/2022 | Condolo |
| 11,328,533 | B1 | 5/2022 | Tadi |
| 11,367,198 | B2 | 6/2022 | Tadi |
| 11,464,449 | B2 | 10/2022 | Koivumaa |
| 11,495,053 | B2 | 11/2022 | Tadi |
| 11,709,548 | B2 | 7/2023 | Tadi |
| 2002/0097678 | A1 * | 7/2002 | Bisher, Jr. ........ H04N 21/23805 370/235 |
| 2003/0109306 | A1 | 6/2003 | Karmarkar |
| 2003/0117651 | A1 | 6/2003 | Matraszek |
| 2003/0167019 | A1 | 9/2003 | Viertio-Oja |
| 2004/0061902 | A1 | 4/2004 | Tang |
| 2004/0117513 | A1 | 6/2004 | Scott |
| 2004/0229685 | A1 | 11/2004 | Smith |
| 2005/0180613 | A1 | 8/2005 | Bronstein |
| 2006/0071934 | A1 | 4/2006 | Sagar |
| 2006/0235318 | A1 | 10/2006 | Ordonez Smith |
| 2007/0179396 | A1 | 8/2007 | Le |
| 2008/0058668 | A1 | 3/2008 | Seyed Momen |
| 2008/0065468 | A1 | 3/2008 | Berg |
| 2008/0075394 | A1 * | 3/2008 | Huang ................. H04N 23/843 382/300 |
| 2008/0181507 | A1 | 7/2008 | Gope |
| 2008/0218472 | A1 | 9/2008 | Breen |
| 2008/0292147 | A1 | 11/2008 | Bronstein |
| 2009/0326406 | A1 | 12/2009 | Tan |
| 2010/0156935 | A1 | 6/2010 | Lim |
| 2010/0211397 | A1 | 8/2010 | Park |
| 2010/0315524 | A1 | 12/2010 | Gordon |
| 2011/0181601 | A1 | 7/2011 | Mumbauer |
| 2011/0243380 | A1 | 10/2011 | Forutanpour |
| 2012/0130266 | A1 | 5/2012 | Mathan |
| 2012/0134548 | A1 | 5/2012 | Rhoads |
| 2012/0172682 | A1 | 7/2012 | Linderman |
| 2012/0274798 | A1 | 11/2012 | Takahashi |
| 2013/0021447 | A1 * | 1/2013 | Brisedoux ............ H04N 5/217 348/241 |
| 2013/0279577 | A1 * | 10/2013 | Schwarz ............ H04N 19/184 375/240.12 |
| 2013/0314401 | A1 | 11/2013 | Engle |
| 2014/0043434 | A1 * | 2/2014 | Asano ................. H04N 17/002 348/42 |
| 2014/0118582 | A1 * | 5/2014 | Artyomov .......... H04N 9/04557 348/242 |
| 2014/0153816 | A1 * | 6/2014 | Cohen ..................... G01S 17/86 382/154 |
| 2014/0164056 | A1 | 6/2014 | Johnson |
| 2014/0249397 | A1 | 9/2014 | Lake |
| 2014/0267413 | A1 | 9/2014 | Du |
| 2014/0267544 | A1 | 9/2014 | Li |
| 2014/0323148 | A1 | 10/2014 | Schmalstieg |
| 2014/0364703 | A1 | 12/2014 | Kim |
| 2015/0178988 | A1 | 6/2015 | Montserrat Mora |
| 2015/0192950 | A1 | 7/2015 | Tubbs |
| 2015/0213646 | A1 | 7/2015 | Ma |
| 2015/0304789 | A1 | 10/2015 | Babayoff |
| 2015/0310262 | A1 | 10/2015 | Do |
| 2015/0310263 | A1 | 10/2015 | Zhang |
| 2015/0313498 | A1 | 11/2015 | Coleman |
| 2015/0325004 | A1 | 11/2015 | Utsunomiya |
| 2016/0042548 | A1 | 2/2016 | Du |
| 2016/0077547 | A1 | 3/2016 | Aimone |
| 2016/0119541 | A1 * | 4/2016 | Alvarado-Moya .. H04N 5/2256 348/38 |
| 2016/0191887 | A1 | 6/2016 | Casas |
| 2016/0193732 | A1 | 7/2016 | Breazeal |
| 2016/0235324 | A1 | 8/2016 | Mershin |
| 2016/0300252 | A1 | 10/2016 | Frank |
| 2016/0317058 | A1 | 11/2016 | Kaminski |
| 2016/0323565 | A1 | 11/2016 | Van Baarsen |
| 2016/0328875 | A1 | 11/2016 | Fang |
| 2016/0350979 | A1 | 12/2016 | Zeng |
| 2016/0360970 | A1 | 12/2016 | Tzvieli |
| 2017/0039750 | A1 | 2/2017 | Tong |
| 2017/0060256 | A1 | 3/2017 | Heck |
| 2017/0069094 | A1 * | 3/2017 | Kim ..................... G06V 10/764 |
| 2017/0109864 | A1 * | 4/2017 | Ohba ................. H04N 9/04515 |
| 2017/0140578 | A1 | 5/2017 | Xiao |
| 2017/0205903 | A1 * | 7/2017 | Miller ..................... G06T 7/174 |
| 2017/0231490 | A1 * | 8/2017 | Toth ..................... A61B 3/0033 600/558 |
| 2017/0347908 | A1 | 12/2017 | Watanabe |
| 2017/0352183 | A1 | 12/2017 | Katz |
| 2017/0364374 | A1 | 12/2017 | Maiden |
| 2017/0367590 | A1 | 12/2017 | Sebe |
| 2018/0027222 | A1 * | 1/2018 | Ogasawara ............ G06V 20/64 348/175 |
| 2018/0107275 | A1 | 4/2018 | Chen |
| 2018/0120936 | A1 * | 5/2018 | Keller ................ G02B 27/0172 |
| 2018/0139431 | A1 * | 5/2018 | Simek ................. H04N 13/254 |
| 2018/0204356 | A1 * | 7/2018 | Xia ......................... A61B 6/032 |
| 2018/0211102 | A1 | 7/2018 | Alsmadi |
| 2018/0211398 | A1 * | 7/2018 | Schmidt ................ G01S 7/4873 |
| 2018/0225866 | A1 * | 8/2018 | Zhang ..................... G06T 7/593 |
| 2018/0239956 | A1 | 8/2018 | Tadi |
| 2018/0240261 | A1 | 8/2018 | Tadi |
| 2018/0262744 | A1 * | 9/2018 | Tadi ..................... H04N 13/271 |
| 2018/0325447 | A1 | 11/2018 | Hriso |

(56) References Cited

U.S. PATENT DOCUMENTS

| | | | |
|---|---|---|---|
| 2018/0335930 A1 | 11/2018 | Scapel | |
| 2019/0001129 A1 | 1/2019 | Rosenbluth | |
| 2019/0004639 A1 | 1/2019 | Faulkner | |
| 2019/0025919 A1 | 1/2019 | Tadi | |
| 2019/0029528 A1 | 1/2019 | Tzvieli | |
| 2019/0082990 A1 | 3/2019 | Poltorak | |
| 2019/0138096 A1 | 5/2019 | Lee | |
| 2019/0150777 A1 | 5/2019 | Guo | |
| 2019/0155386 A1 | 5/2019 | Tadi | |
| 2019/0188281 A1 | 6/2019 | Bivens | |
| 2019/0200888 A1 | 7/2019 | Poltorak | |
| 2019/0212752 A1 | 7/2019 | Fong | |
| 2019/0343457 A1 | 11/2019 | Rahmani | |
| 2019/0369727 A1 | 12/2019 | Li | |
| 2020/0069941 A1 | 3/2020 | Campean | |
| 2020/0129855 A1 | 4/2020 | Ambinder | |
| 2020/0129856 A1 | 4/2020 | Bond | |
| 2020/0162719 A1* | 5/2020 | Tadi | G06T 5/50 |
| 2020/0177870 A1* | 6/2020 | Tadi | G02B 27/0172 |
| 2020/0193614 A1 | 6/2020 | Tadi | |
| 2020/0254613 A1 | 8/2020 | Condolo | |
| 2020/0319710 A1 | 10/2020 | Tadi | |
| 2020/0320765 A1 | 10/2020 | Tadi | |
| 2020/0410702 A1 | 12/2020 | Zhang | |
| 2021/0145302 A1 | 5/2021 | Kaminski | |
| 2021/0174071 A1 | 6/2021 | Tadi | |
| 2021/0217419 A1 | 7/2021 | Chen | |
| 2022/0011864 A1 | 1/2022 | Tadi | |
| 2022/0160296 A1 | 5/2022 | Rahmani | |
| 2022/0171960 A1 | 6/2022 | Nelson | |
| 2022/0172710 A1 | 6/2022 | Brady | |
| 2022/0208194 A1 | 6/2022 | Rameau | |
| 2023/0020138 A1 | 1/2023 | Bouton | |
| 2023/0078978 A1 | 3/2023 | Tadi | |
| 2023/0333635 A1 | 10/2023 | Tadi | |
| 2023/0367389 A9 | 11/2023 | Tadi | |
| 2023/0398356 A1 | 12/2023 | Poltorak | |
| 2023/0418380 A1 | 12/2023 | Tadi | |

FOREIGN PATENT DOCUMENTS

| | | |
|---|---|---|
| CN | 102892008 | 1/2013 |
| CN | 103810463 | 5/2014 |
| CN | 104460955 | 3/2015 |
| CN | 104504366 | 4/2015 |
| CN | 104834917 | 8/2015 |
| CN | 106095101 | 11/2016 |
| CN | 106569591 | 4/2017 |
| DE | 102011052836 | 2/2012 |
| EP | 1032872 | 9/2000 |
| EP | 1433118 | 6/2004 |
| EP | 2118757 | 11/2009 |
| EP | 2453658 | 5/2012 |
| EP | 2808760 | 12/2014 |
| EP | 3064130 A1 | 9/2016 |
| EP | 3155560 | 4/2017 |
| JP | 2016126500 | 7/2016 |
| KR | 20120094857 | 8/2012 |
| KR | 101307046 | 7/2013 |
| KR | 20150057424 | 5/2015 |
| KR | 20150099129 | 8/2015 |
| KR | 101585561 | 1/2016 |
| KR | 20160053749 | 5/2016 |
| WO | 2008108965 | 9/2008 |
| WO | 2015025251 | 2/2015 |
| WO | 2015192117 | 12/2015 |
| WO | 2016034008 | 3/2016 |
| WO | 2016083826 | 6/2016 |
| WO | 2016165052 | 10/2016 |
| WO | 2017015949 | 2/2017 |
| WO | 2018146546 A1 | 8/2018 |

OTHER PUBLICATIONS

Ahsan, R., Md., et.al., EMG Signal Classification for Human Computer Interaction: A Review, European Journal of Scientific Research vol. 33, No. 3 (2009) pp. 1-23 of pdf.

AlZoubi, O. et.al. Classification of EEG for Affect Recognition: An Adaptive Approach, Conference Paper, Dec. 2009, pp. 1-11 pdf.

AlZoubi, O., et al., Classification of EEG for Affect Recognition: An Adaptive Approach, Conference Paper, Dec. 2009, pp. 52-61.

Angkoon P., et at., The Relationship between Anthro-pometric Variables and Features of Electromyography Signal for Human-Computer Interface. Dr. Ganesh Naik. Applications, Challenges, and Advancements in Electromyography Signal Processing, IGI Global, 2014, 9781466660908, pp. 1-28.

Barreto, A. B. PhD., A practical EMG-based human-computer interface for users with motor disabilities, Journal of Rehabilitation Research and Development, vol. 37, No. 1 Jan./Feb. 2000, pp. 53-64.

Bartlett, M., et al., Automatic Analysis of Spontaneous Facial Behavior: A Final Project Report, Jan. 2001, pp. 1-40.

Cristhian Manuel Duran Acevedo et.al., Development of an Embedded System for Classification of EMG Signals, 2014, pp. 1-5 of pdf.

Dr Jan et al, "Fusion of Terrestrial LiDAR Point Clouds with Color Imagery", (Mar. 16, 2013), URL: http://www.cis.rit.edu/DocumentLibrary/admin/uploads/CIS000202.PDF, XP055284936.

Dubuisson, S., et al., A solution for facial expression representation and recognition, Signal Processing Image Communication 17 (2002) pp. 657-673.

Gillies, M., et.al., Semi-Autonomous Avatars: A New Direction for Expressive User Embodiment, https://doi.org/10.1075/aicr.74.17gil, Published online: Nov. 27, 2008, pp. 1-20.

Giuseppina, Carla Gini, et al., New Results on Classifying EMG Signals for Interfacing Patients and Mechanical Devices, New Trends in Medical and Service Robots, Mechanisms and Machines Science, vol. 20, (2014), pp. 1-16pdf.

Gruebler, A., et al., Design of a Wearable Device for Reading Positive Expressions from Facial EMG Signals, IEEE Transactions on Affective Computing, vol. 5, No. 3, Jul.-Sep. 2014, pp. 1-11 of pdf.

Hamedi, M., et.al. Time-Frequency Facial Gestures EMG Analysis using Bilinear Distribution, Conference Paper Nov. 2015, pp. 1-6 of pdf.

Hema, C.R. et al., Classification of Human Emotional States using Facial Electromyogram signals, Conference: International Post Graduate Research Conference ENGGPOS 2015 At: Karpagam University, Coimbatore, Mar. 2015, pp. 1-7.

Hsieh, C., et al., Effective Semantic features for facial expressions recognition using SVM, International Journal of Multimedia Tools and Applications, Mar. 2015, pp. 1-23pdf.

Huang, C., The Review of Applications and Measurements in Facial Electromyography, Journal of Medical and Biological Engineering vol. 25, No. 1 (2005), pp. 15-20.

Krepki, R., et al., Berlin Brain-Computer Interface (BBCI) towards a new communication channel for online control multimedia, Jan. 2003, pp. 1-30 pdf.

Lopez, N., Hybrid Human-Machine Interface to Mouse Control for Severely Disabled People, International Journal of Engineering and Innovative Technology, vol. 4 Iss. May 11, 2015, pp. 1-9 of pdf.

Mantoro, T., Distributed Support for Intelligent Environments, Apr. 2006, pp. 1-204.

Martisius, I., Design of a Neural Interface Based System for Control of Robotic Devices, Communications in Computer and Information Science, Sep. 2012, pp. 297-311.

Mohammad-Rezazadeh, I., et al., A novel human-machine interface based on multi-channel facial bioelectric signals, Australasian Physical & Engineering Sciences in Medicine vol. 34, No. 4, (2011) pp. 497-513.

Mohd-Yasin, F., et al., Techniques of EMG signal analysis: Detection, processing, classification and applications, Biological Procedures Online, February 1997-2006, pp. 1-22, www.biologicalprocedures.com.

(56) References Cited

OTHER PUBLICATIONS

Notice of Allowance dated Aug. 3, 2021 for U.S. Appl. No. 16/678,182 (pp. 1-10).
Notice of Allowance dated Aug. 8, 2019 for U.S. Appl. No. 16/261,693 (pp. 1-9).
Notice of Allowance dated May 7, 2020 for U.S. Appl. No. 15/875,227 (pp. 1-11).
Novak, D., et al., A survey of methods for data fusion and system adaptation using autonomic nervous system responses in physiological computing, Interacting with Computers vol. 24 (2012) 154-172.
Office Action dated Apr. 24, 2019 for U.S. Appl. No. 15/875,382 (pp. 1-23).
Office Action dated Apr. 30, 2019 for U.S. Appl. No. 16/261,693 (pp. 1-15).
Office Action dated Aug. 16, 2019 for U.S. Appl. No. 15/875,227 (pp. 1-12).
Office Action dated Jan. 11, 2018 for U.S. Appl. No. 15/875,306 (pp. 1-22).
Office Action dated Jan. 22, 2021 for U.S. Appl. No. 16/678,182 (pp. 1-6).
Office Action dated Jul. 31, 2020 for U.S. Appl. No. 16/678,163 (pp. 1-10).
Office Action dated Jul. 9, 2020 for U.S. Appl. No. 16/678,182 (pp. 1-8).
Podrug, E., et al., Surface EMG pattern recognition by using DWT feature extraction and SVM classifier, First Conference of Medical and Biological Engineering in Bosnia and Herzegovina, CMBEBIH 2015, pp. 1-4 pdf.
Putze, F., et.al. Online Recognition of Facial Actions for Natural EEG-Based BCI Applications, Conference Paper Jan. 2011, pp. 1-11 of pdf.
Quan, W., et al., Facial Expression Biometrics Using Statistical Shape Models, Journal on Advances in Signal Processing, vol. 2009, Article ID 261542, pp. 1-18.
Rechy-Ramirez, E.J., et al., Bio-signal based control in assistive robots: a survey, Digital Communications and Networks vol. 1 (2015) 1-18 pdf.
Sheikh, M., Robust Recognition of Facial Expressions on Noise Degraded Facial Images, Thesis, Feb. 2011, pp. 1-129.
Sorci, M., et al., Fisher's Discriminant and Relevant Component Analysis for Static Facial Expression Classification, 15th European Signal Processing Conference (EUSIPCO 2007) pp. 115-119.
Surendran, N.K., et al., Towards Real-Time Facial Expression Recognition, Jan. 2006, pp. 1-9 pdf.
Zhang, X., et al. A real-time, practical sensor fault-tolerant module for robust EMG pattern recognition, Journal of NeuroEngineering and Rehabilitation (2015) pp. 1-16 pdf.
Notice of Allowance dated Mar. 8, 2022 for U.S. Appl. No. 16/243,186 (pp. 1-9).
Office Action (Final Rejection) dated Aug. 1, 2022 for U.S. Appl. No. 17/163,327 (pp. 1-12).
Office Action (Non-Final Rejection) dated Mar. 30, 2022 for U.S. Appl. No. 17/163,327 (pp. 1-10).
Office Action (Non-Final Rejection) dated Sep. 27, 2022 for U.S. Appl. No. 17/163,327 (pp. 1-12).
Office Action (Non-Final Rejection) dated Dec. 21, 2021 for U.S. Appl. No. 17/000,671 (pp. 1-14).
Office Action (Notice of Allowance and Fees Due (PTOL-85)) dated Aug. 17, 2022 for U.S. Appl. No. 17/000,671 (pp. 1-9).
Office Action (Notice of Allowance and Fees Due (PTOL-85)) dated Nov. 26, 2021 for U.S. Appl. No. 16/582,675 (pp. 1-6).
Office Action dated Oct. 18, 2021 for U.S. Appl. No. 16/243,186 (pp. 1-6).
Patel "Human Computer Interaction Based HEMD Using Hand Gesture" SSRN Electronic Journal (May 1, 2017) pp. 1-5.
Sun et al. "Intelligent Human Computer Interaction Based on non redundant EMG Signal" Alexandria Engineering Journal ( Nov. 14, 2019) pp. 1-9.

Ye Mao et al, "Real-Time Simultaneous Pose and Shape Estimation for Articulated Objects Using a Single Depth Camera", IEEE Transactions on Pattern Analysis and Machine Intelligence, IEEE Computer Society, USA, vol. 38, No. 8, doi:10.1109/TPAMI.2016. 2557783, ISSN 0162-8828, (Aug. 1, 2016), pp. 1517-1532, (Jun. 30, 2016), XP011615574.
Ye Minxiang et al, "A Depth Camera Motion Analysis Framework for Tele-rehabilitation: Motion Capture and Person-Centric Kinematics Analysis", IEEE Journal of Selected Topics in Signal Processing, IEEE, US, vol. 10, No. 5, doi:10.1109/JSTSP.2016. 2559446, ISSN 1932-4553, (Aug. 1, 2016), pp. 877-887, (Jul. 25, 2016), XP011617833.
Ye Minxiang et al, "Gait analysis using a single depth camera", 2015 IEEE Global Conference on Signal and Information Processing (GlobalSIP), IEEE, (Dec. 14, 2015), doi:10.1109/GLOBALSIP. 2015.7418202, pp. 285-289, XP032871663.
Notice of Allowance dated Feb. 16, 2023 for U.S. Appl. No. 17/940,163 (pp. 1-11).
Office Action (Notice of Allowance and Fees Due (PTOL-85)) dated Feb. 15, 2023 for U.S. Appl. No. 17/163,327 (pp. 1-8).
Office Action (Notice of Allowance and Fees Due (PTOL-85)) dated Jun. 13, 2023 for U.S. Appl. No. 17/163,327 (pp. 1-7).
Office Action (Notice of Allowance and Fees Due (PTOL-85)) dated Jun. 14, 2023 for U.S. Appl. No. 17/940,163 (pp. 1-2).
Poynton, Charles, Digital Video and HD Algorithms and Interfaces, 2nd Edition, Published by Morgan Kaufmann Waltham, MA 2012. ISBN 978-0-12-391926-7. 46 pages.
Poynton, Charles, Digital Video and HDTV Algorithms and Interfaces, Published by Morgan Kaufmann Waltham, MA 2003. ISBN-13: 978-1-55860-792-7. 112 pages.
Poynton, Charles, Merging Computing with Studio Video; Converting between R'G'B and 4:2:2, Copyright Mar. 19, 2004, Discreet Logic, www.discreet.com. 8 pages.
Random House Webster's College Dictionary, 2nd Edition, Published by Random House 1997. p. 1260. ISBN-0-679-45570-1. 3 pages.
Random House Webster's College Dictionary, 2nd Edition, Published by Random House 1997. p. 343. ISBN-0-679-45570-1. 3 pages.
Rechy-Ramirez, Ericka Janet, and Huosheng Hu. "Stages for Developing Control Systems using EMG and EEG signals: A survey." School of computer science and electronic engineering, University of Essex (2011): 1744-8050.
Schmidt, Brian, et al., The Interactive Performance of SLIM: a stateless, thin-client architecture, Dec. 12-15, 1999, 17th ACM Symposium on Operating Systems Principles (SOSP'99), Kiawah Island Resort, Charleston, SC., 20 pages, ACM ISBN: 1-58113-140-2.
Shelly, et al., Discovering Computers Fundamentals, 4th Edition. Thomson Course Technology, Boston, MA, 2008. ISBN 10-1-4239-1209-8. 37 pages.
*Sony Interactive Entertainment LLC v. Intellectual Pixels Limited*, IPR 2020-01248, U.S. Pat. No. 8,667,093, Oct. 15, 2021, Demonstratives Final Exhibit. 44 pages.
*Sony Interactive Entertainment LLC v. Intellectual Pixels Limited*, IPR 2021-00237, U.S. Pat. No. 10,681,109, patent Owner's Sur-Reply, dated Jan. 14, 2022. 33 pages.
*Sony Interactive Entertainment LLC v. Intellectual Pixels Limited*, IPR 2021-00237, U.S. Pat. No. 8,667,093, Petitioner's Demonstrative Exhibits for Oral Hearing, Oct. 7, 2021. 85 pages.
*Sony Interactive Entertainment LLC v. Intellectual Pixels Limited*, IPR 2021-00237, U.S. Pat. No. 8,667,093, Petitioner's Supplemental Reply, Aug. 26, 2021. 5 pages.
SOSP.org, The AMC Symposium on Operating Systems Principles (SOSP) List of Conferences held around the world from 1967 thru 2019 includes the Proceedings/Website for each conference. 2 pages.
*Storer v. Hayes Microcomputer Products, Inc.* 960 F.Supp. 498 (1997). Civil Action No. 96-10602-WGY. Mar. 25, 1997. Westlaw. 17 pages.
Syed, Ahamed, V. et al., Digital Subscriber Line (HDSL and ADSL) Capacity of the Outside Loop Plant, IEEE Journal on Selected Areas in Communications, vol. 13, No. 9, Dec. 1995. 10 pages.

(56) References Cited

OTHER PUBLICATIONS

The Authoritative Dictionary of IEEE Standards Terms, 7th Edition, Published by Standards Information Network IEEE Press 2000, ISBN 0-7381-2601-2. 4 pages.
The IEEE Standard Dictionary of Electrical and Electronics Terms, Sixth Edition, IEEE Std 100-1996. 5 pages. ISBN 1-55937-833-6.
The Way Back Machine: https://web.archive.org/web/20001209203600/http://www.webartz.com/fourcc/fccyuv.htm printed on Apr. 13, 2021. FOURCC Definition List (YUV Formats). 9 pages.
The Way Back Machine: https://web.archive.org/web/20001214035600/http:/webartz.com/fourcc/fcccodec.htm printed on Apr. 13, 2021. Compressed Formats. 7 pages.
The Way Back Machine: https://web.archive.org/web/20001214063500/http:/webartz.com/fourcc/fccintro.htm printed on Apr. 13, 2021. The Almost Definitive FOURCC Definition List. 3 pages.
The Way Back Machine: https://web.archive.org/web/20001206225500/http://www.microsoft.com/hwdev/devdes/fourcc.htm printed on Apr. 13, 2021. FOURCC for Video Compression. 5 pages.
Tolly, Kevin, the Great Networking Correction: Frames Reaffirmed, Published IEEE 1997, doi 1089-7801/97. 8 pages.
Understand the concept of bpp and Mbps to define your compressed data rate! Accessed Mar. 31, 2021. https://www.intopix.com/blogs/post/How-to-define-the-compression-rate-according-to-bpp-or-bps 7 pages.
Wang, Zhenyu, et al., Task Driven Computing, School of Computer Science, Carnegie Mellon University, Pittsburg, PA, May 2000, CMU-CS-00-154, 22 Pages.
Webster's New World Dictionary of Computer Terms, 5th Edition, Published by MacMillian 1994, ISBN: 0-671-89993-7. 3 pages.
Ye Mao et al: "Real-Time Simultaneous Pose and Shape Estimation for Articulated Objects Using a Single Depth Camera", IEEE Transactions on Pattern Analysis and Machine Intelligence, IEEE Computer Society, USA, vol. 38, No. 8, Aug. 1, 2016 (Aug. 1, 2016), pp. 1517-1532, XP011615574, ISSN: 0162-8828, DOI: 10.1109/TPAMI.2016.2557783 [retrieved on Jun. 30, 2016].
Ye, Minxiang, et al. "A depth camera motion analysis framework for tele-rehabilitation: Motion capture and person-centric kinematics analysis." IEEE Journal of Selected Topics in Signal Processing 10.5 (2016): 877-887.
Ye, Minxiang, et al. "Gait analysis using a single depth camera." 2015 IEEE Global Conference on Signal and Information Processing (GlobalSIP). IEEE, 2015.
17th ACM Symposium on Operating Systems Principles, Final Program of the event. Dec. 12-15, 1999. 5 pages.
17th ACM Symposium on Operating Systems Principles, Invitation to submit papers to the event. Dec. 12-15, 1999. 2 pages.
ACM History, copyright 2020, ACM, Inc. 7 pages. https://www.acm.org/about-acm/acm-history.
Alzoubi, Omar, Sidney K. D'Mello, and Rafael A. Calvo. "Detecting naturalistic expressions of nonbasic affect using physiological signals." IEEE Transactions on affective computing 3.3 (2012): 298-310.
Bishop, Gary, et al., Frameless Rendering: Double Buffering Considered Harmful, Department of Computer Science, UNC Chapel Hill. 2 pages.
CCITT The International Telegraph and Telephone Consultative Committee, Series H: Audiovisual and Multimedia Systems coding of moving video. Published in Blue Book, Fascicle III.Nov. 6, 1988. 14 pages.
Chen, Walter Y., The Development and Standardization of Asymmetrical Digital Subscriber Line, IEEE Communications Magazine, May 1999, vol. 37, No. 5, pp. 68-72, www.comsoc.org.
Chinese Office Action issued in App. No. CN201880018740, dated Mar. 30, 2023, 14 pages.
Chinese Office Action issued in App. No. CN201880023942.8, dated Jan. 18, 2023, 21 pages.
Chroma Subsampling, https://www.haivision.com, copyright 2021. 4 pages.
Communication pursuant to Rule 164(2)(b) and Article 94(3) issued in App. No. EP18733666, dated Dec. 9, 2022, 10 pages.

CU Amiga Magazine, Mar. 1998, Quake Amiga article pp. 38-42, 8 pages.
Danciu, Ioana M., et al., Fractal Color Compression in the L*a*b* Uniform color Space*, School of EECS Washington State University, Pullman WA. 1 page.
Encyclopedia of Computer Science, 4th Edition, Nature Publishing Group, NY, NY 2000. ISBN 0-333-77879-0. 29 pages.
Endo, Yasuhiro. 2000. Improving Interactive System Performance using TIPME. Harvard Computer Science Group Technical Report TR-12-99. 120 pages.
EP Examination Report issued in App. No. EP18715953, 5 pages.
Exhibit: Sony 1024, *Sony* v. *IPL*, IPR2021-00237, Picture of tables shown at Hart Deposition.
FCC Record, vol. 15., No. 27, pp. 17132 to 17922, Sep. 5-Sep. 15, 2000. 149 pages.
Foley, et al., Computer Graphics Principles and Practice, 2nd Edition in C, The Systems programming Series, Addison-Wesley Publishing, 1992, 1993 and 1995. ISBN 0-201-84840-6. 32 pages.
Fuchs, Henry, Beyond the Desktop Metaphor: Toward More Effective Display, Interaction, and Telecollaboration in the Office of the Future via a Multitude of Sensors and Displays. Department of Computer Science University of North Carolina at Chapel Hill. AMCP'98, Lncs 1554, pp. 30-43, 1999. 14 pages.
Gormish, Michael, et al., Proceedings of SPIE—Lossless And Nearly Lossless Compression For High-Quality Images, Proc. SPIE 3025, Very High Resolution and Quality Imaging , (Apr. 4, 1997); doi: 10.1117/12/270058. 10 pages.
IEEE 802.3-1998—IEEE Standards for Information technology—Telecommunications and information exchange between systems—Local and metropolitan area networks—Specific requirements—Part 3: Carrier Sense Multiple Access with Collision Detection (CSMA/CD) Access Method and Physical Layer Specifications. Published Sep. 28, 1998. 2 pages.
IEEE Compcon 97, San Jose California, Feb. 23-26, 1997, IEEE Computer Society Press Los Alamitos, CA, 1997. 20 pages. ISBN 0-8186-7804-6.
IEEE Standards for Local Area Networks: Carrier Sense Multiple Access with Collision Detection (CSMA/CD) Access Method and Physical Layer Specifications, Published by The Institute of Electrical and Electronics Engineers, Inc., Jun. 24, 1983, 145 pages. ISBN 0-471-82749-5.
IEEE Std. 802.3 1998 Edition, Part 3: Carrier Sense Multiple Access with Collision Detection (CSMA/CD) Access Method and Physical Layer Specifications, ISBN 0-7381-0330-6, 263 pages. Part 2 of 3.
IEEE Std. 802.3 1998 Edition, Part 3: Carrier Sense Multiple Access with Collision Detection (CSMA/CD) Access Method and Physical Layer Specifications, ISBN 0-7381-0330-6, 499 pages. Part 2 of 3.
IEEE Std. 802.3 1998 Edition, Part 3: Carrier Sense Multiple Access with Collision Detection (CSMA/CD) Access Method and Physical Layer Specifications, ISBN 0-7381-0330-6, 500 pages. Part 1 of 3.
Indian Examination Report issued in App. No. IN201927035579, dated Jan. 11, 2022, 7 pages.
Indian Examination Report issued in App. No. IN201927035792, dated Apr. 20, 2023, 6 pages.
*Intellectual Pixels Limited* v. *Sony Interactive Entertainment LLC*, Case SACV 19-01432 JVS (KES), Document 104, Page ID #4160, Filed May 12, 2020, Order Regarding Claim Constructions. 22 pages.
*Intellectual Pixels Limited* v. *Sony Interactive Entertainment LLC*, Case SACV 19-01432 JVS (KES), Document 112, Page ID #4301, Filed Jul. 2, 2020, Order Regarding Motion for Clarification or in the Alternative, Reconsideration. 6 pages.
International Telecommunication Union, Transmission of Non-Telephone Signals; Information Technology—Generic Coding Of Moving Pictures And Associated Audio Information: Video. ITU-T Rec. H.262 Jul. 1995. 211 pages.
ITU/SMPTE Tutorial Digital Terrestrial Television Broadcasting (DTTB), Published by: The Society of Motion Picture and Television Engineers, White Plains, NY, 1994. ISBN 0-940690-24-1. 13 Pages.
Jasperneite, Jurgen, et al. How to Guarantee Realtime Behavior using Ethernet, Copyright IFAC Information Control Problems in Manufacturing, Salvador, Brazil, 2004. 6 pages.

(56) References Cited

OTHER PUBLICATIONS

Kompatsiaris, Ioannis, Using Asymmetric Digital Subscriber Line (ADSL) for Fast Internet and Multimedia Services. Published IEEE 2000, doi 0-7803-6301-9. 2 pages.
Lamothe, Andre, Tricks of the Windows Game Programming Gurus, Fundamentals of 2D and 3D Game Programming, Published by Sams, Indianapolis, IN, Oct. 1999, ISBN 0-672-31361-8, 40 pages.
Levoy, Mare. Polygon-Assisted JPEG and MPEG Compressoin of Synthetic Images, Computer Science Department Stanford University. ACM 0-89791-701-4/95/008, 8 Pages.
McDonough, Jerome P., Preservation-Worthy Digital Video, or How to Drive Your Library into Chapter 11, Presented at the Electronic Media Group Annual Meeting of the American Institute for Conservation of Historic and Artistic Works, Portland, OR, Jun. 13, 2004. 12 pages.
McVeigh, Jeff, et al., A Software-Based Real-Time MPEG-2 Video Encoder, IEEE Transactions on Circuites and Systems for Video Technology, vol. 10, No. 7, Oct. 2000. Doi: 1051-8215/00. 7 pages.
Microsoft Computer Dictionary, 5th Edition, Copyright 2002, ISBN 0-7356-1495-4, p. 150 and p. 538. 4 pages.
Microsoft Computer Dictionary, 5th Edition, Copyright 2002, ISBN 0-7356-1495-4, p. 224. 3 pages.
Microsoft Computer Dictionary, Fifth Edition, Published by Microsoft, Redmond, Washington, 2002. ISBN 0-7356-1495-4, 8 pages.
MPEG-2 Video, https://mpeg.chiariglione.org/standards/mpeg-2/video accessed Aug. 31, 2021, 4 pages.
Network Basics: Ethernet Protocol, https://www.dummies.com/programming/netorking/network-basics-ethernet-protocol/ Oct. 19, 2020. 2 pages.
Office Action (Notice of Allowance and Fees Due (PTOL-85)) dated Sep. 27, 2023 for U.S. Appl. No. 17/163,327 (pp. 1-7).
PC Magazine, Apr. 23, 1996, vol. 15, No. 8, 12 pages.
PC Magazine, Results for: Search PCMag Encyclopedia for "chroma subsampling", www.pcmag.com. 8 pages.
PC Magazine, Results for: Search PCMag Encyclopedia for "Windows CE", www.pcmag.com. 5 pages.
PC Magazine, vol. 18, No. 16, Sep. 21, 1999. 20 pages. www.pcmag.com.
Pokorny, Pavel, Lossy Compression in the Chroma Subsampling Process, WSEAS Transactions on Comuters, E-ISSN: 2224-2872, vol. 15, 2016. 7 pages.
Office Action dated Nov. 22, 2023 for U.S. Appl. No. 18/317,058 (pp. 1-11).
Office Action (Notice of Allowance and Fees Due (PTOL-85)) dated Jan. 4, 2024 for U.S. Appl. No. 17/163,327 (pp. 1-8).

\* cited by examiner

State diagram to detect defective pixels.

Edge treatment example. In circles are highlighted the muxs generating *int2_2_2*, *int2_2_3*, *int2_2_4* signals, which are replication of moving window cells.

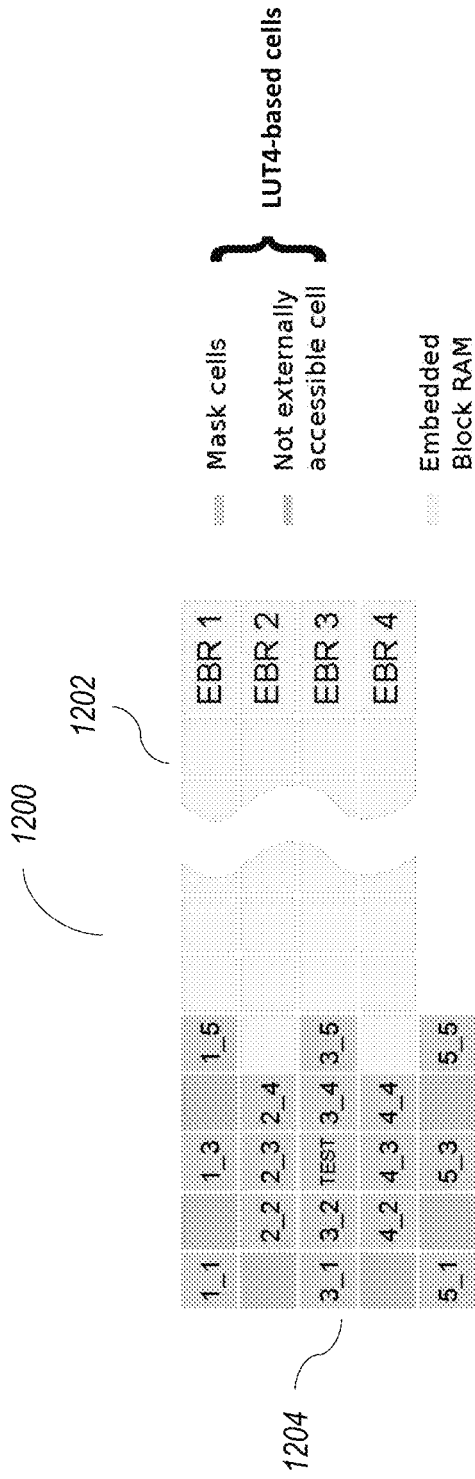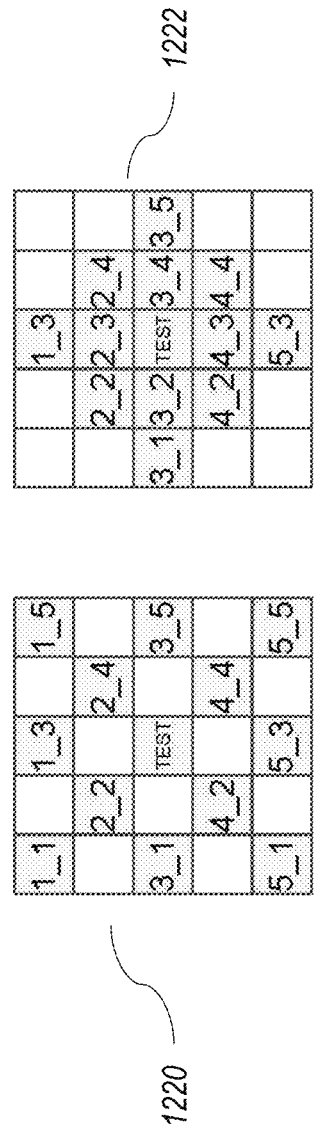
Figure 12A
Figure 12B
Figure 12C
Internal buffer cells arrangement: Fig. 12A) global structure, Fig. 12B) mask_1 for defective pixel detection, Fig. 12C) mas_2 for demosic task

| 1_5 G | 2_5 R | 3_5 G | 4_5 R | 5_5 G |
| 1_4 B | 2_4 G | 3_4 GE B | 4_4 G | 5_4 B |
| 1_3 G | 2_3 GN R | TEST G | 4_3 GS R | 5_3 B |
| 1_2 B | 2_2 G | 3_2 GW B | 4_2 G | 5_2 B |
| 1_1 G | 2_1 R | 3_1 G | 4_1 R | 5_1 G |

Figure 13B

| 1_5 R | 2_5 G | 3_5 R | 4_5 G | 5_5 R |
| 1_4 G | 2_4 GNE B | 3_4 G | 4_4 GSE B | 5_4 G |
| 1_3 R | 2_3 G | TEST R | 4_3 G | 5_3 R |
| 1_2 G | 2_2 GNW B | 3_2 G | 4_2 GSW B | 5_2 G |
| 1_1 R | 2_1 G | 3_1 R | 4_1 G | 5_1 R |

Figure 13A

Figure 13D $$A = \begin{bmatrix} 0 & 0 & -0.125 & 0 & 0 \\ 0 & 0 & 0.25 & 0 & 0 \\ -0.125 & 0.25 & 0.5 & 0.25 & -0.125 \\ 0 & 0 & 0.25 & 0 & 0 \\ 0 & 0 & -0.125 & 0 & 0 \end{bmatrix}$$

Matrix A $$B1 = \begin{bmatrix} 0 & 0 & 0 & 0 & 0 \\ 0 & -0.125 & 0 & -0.125 & 0 \\ -0.125 & 0.5 & 0.75 & 0.5 & -0.125 \\ 0 & -0.125 & 0 & -0.125 & 0 \\ 0 & 0 & 0 & 0 & 0 \end{bmatrix}$$

Matrix B1

$$B2 = \begin{bmatrix} 0 & 0 & -0.125 & 0 & 0 \\ 0 & -0.125 & 0.5 & -0.125 & 0 \\ 0 & 0 & 0.75 & 0 & 0 \\ 0 & -0.125 & 0.5 & -0.125 & 0 \\ 0 & 0 & -0.125 & 0 & 0 \end{bmatrix}$$

Matrix B2

$$C = \begin{bmatrix} 0 & 0 & 0 & 0 & 0 \\ 0 & 0.25 & -0.25 & 0.25 & 0 \\ 0 & -0.25 & 0 & -0.25 & 0 \\ 0 & 0.25 & -0.25 & 0.25 & 0 \\ 0 & 0 & 0 & 0 & 0 \end{bmatrix}$$

Matrix C

State machine time diagram for coefficient updating in white balance module.

Figure 17D

| $m_0$ | $m_1$ | $m_2$ | $m_3$ |
|---|---|---|---|
| $p_1$ | $p_2$ | $p_3$ | $p_4$ |
| $p_5$ | $p_6$ | $p_7$ | $p_8$ |
| $p_9$ | $p_{10}$ | $p_{11}$ | $p_{12}$ |
| $p_{13}$ | $p_{14}$ | $p_{15}$ | $p_{16}$ |
| $p_{17}$ | $p_{18}$ | $p_{19}$ | $p_{20}$ |
| $p_{21}$ | $p_{22}$ | $p_{23}$ | $p_{24}$ |
| $p_{25}$ | $p_{26}$ | $p_{27}$ | $p_{28}$ |
| $p_{29}$ | $p_{30}$ | | |

Algorithm 1 "W-means" algorithmic description

1: function WMEANS_UNIT(*inputImage*)
2:   for $i = [3, 5, ..., \text{height}(inputImage) - 3]$ do   ▷ For all 4-color pixels,
3:     for $j = [3, 5, ..., \text{width}(inputImage) - 3]$ do   ▷ excluding borders
4:       $U_{i,j} \leftarrow inputImage[i:i+2, j:j+2]$   ▷ Extract the 4-color center pixel
5:       $V_{i,j} \leftarrow 0$   ▷ Init output pixel
6:       $C_{i,j} \leftarrow 0$   ▷ Init sum of weights
7:       for $k = i + [-2 * f, -2 * f + 2, ..., 2 * f]$ do   ▷ For all 4-color neighbors
8:         for $l = j + [-2 * f, -2 * f + 2, ..., 2 * f]$ do
9:           $U_{k,l} \leftarrow inputImage[k:k+2, l:l+2]$   ▷ Extract the 4-color neighbor
10:           $d \leftarrow \text{sqrt}(\text{sum}((U_{i,j} - U_{k,l})^2)/4)$   ▷ Compute the color Euclidean distance
11:           $w \leftarrow \exp(-(\max(d - 2\sigma, 0))/h)$   ▷ Compute weight
12:           $V_{i,j} \leftarrow V_{i,j} + U_{k,l} * w$   ▷ Weighted accumulation for output pixel
13:           $C_{i,j} \leftarrow C_{i,j} + w$   ▷ Accumulate weights
14:         end for
15:       end for
16:       $outputImage[i:i+2, j:j+2] \leftarrow V_{i,j}/C_{i,j}$   ▷ Output the 4-color pixel
17:     end for
18:   end for
19:   return *outputImage*
20: end function

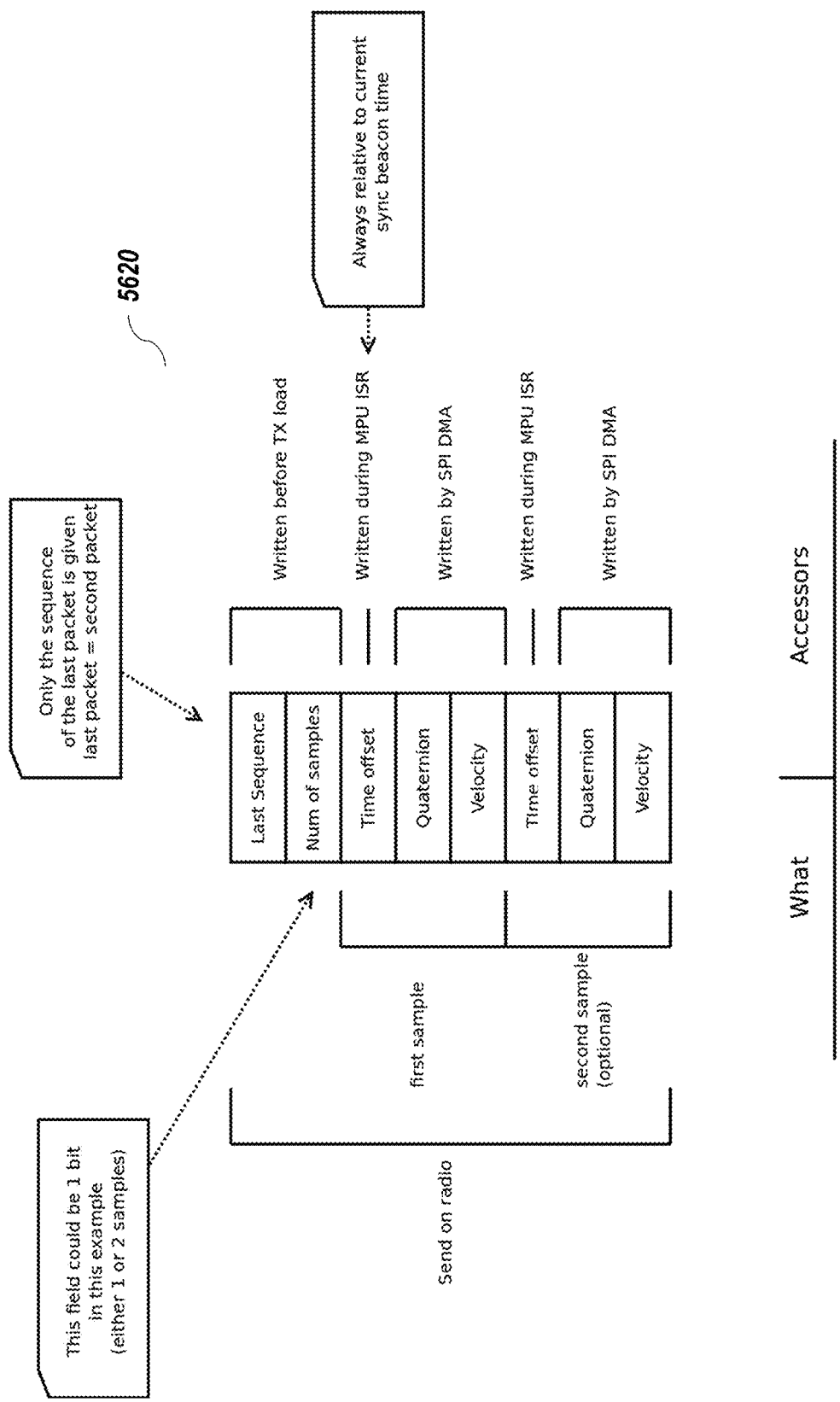
Figure 56C1

Figure 56C2
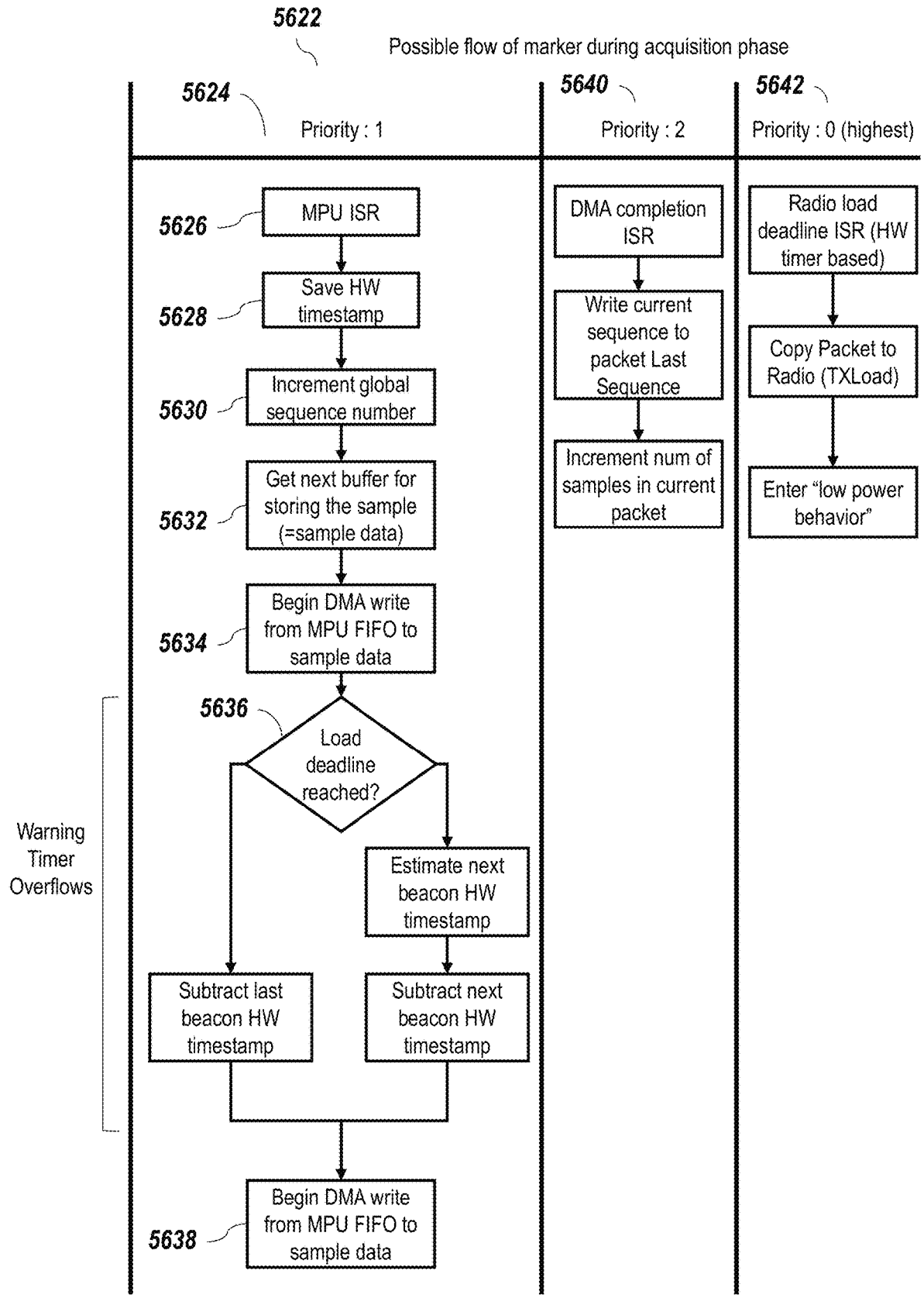

SYSTEMS, METHODS AND APPARATUSES FOR STEREO VISION AND TRACKING

FIELD OF THE DISCLOSURE

The present disclosure is directed to systems, methods and apparatuses for stereo vision and tracking, and in particular, to systems, methods and apparatuses for stereo vision which include a plurality of image sensors (e.g., cameras), as well as (in some embodiments) additional sensors that also includes tracking of at least part of a user.

BACKGROUND OF THE DISCLOSURE

Stereoscopic cameras provide a stereo view and are well known. For example, International Patent Publication no. WO2014154839 is understood to describe a camera system for capturing stereo data using two RGB cameras combined with a depth sensor for tracking the motion of an object (e.g., a person). The computations of the system are performed by a separate computer, which can lead to lag. Other examples include:

The Persee product of Orbbec 3D (also known as Shenzhen Orbbec Co., Ltd.; https://orbbec3d.com/) combines camera functions with an ARM processor in a single apparatus. The apparatus includes a single RGB camera, a depth sensor, an infrared receiving port and a laser projector to provide stereo camera information;

International Patent Publication no. WO2016192437, describes a system in which infrared sensor data is combined with RGB data to create a 3D image; and The Zed product of Stereolabs Inc (https://www.stereolabs.com/zed/specs/) provides a 3D camera with tracking capabilities.

BRIEF SUMMARY OF THE DISCLOSURE

Embodiments of the present disclosure are directed to systems, methods and apparatuses for stereo vision which include tracking, and in particular, to systems, methods and apparatuses for stereo vision which include a plurality of image sensors (e.g., cameras), as well as (in some embodiments) additional sensors.

According to at least some embodiments there is provided a stereo vision procurement apparatus for obtaining stereo visual data, comprising: a stereo RGB camera; a depth sensor; and an RGB-D fusion module, wherein: each of said stereo RGB camera and said depth sensor are configured to provide pixel data corresponding to a plurality of pixels, said RGB-D fusion module is configured to combine RGB pixel data from said stereo RGB camera and depth information pixel data from said depth sensor to form stereo visual pixel data (SVPD), and said RGB-D fusion module is implemented in an FPGA field-programmable gate array).

Optionally the apparatus further comprises a de-mosaicing module configured to perform a method comprising: averaging the RGB pixel data associated with a plurality of green pixels surrounding red and blue sites for R(B) at B-G(R-G) sites or R(B) at R-G(B-G) sites, and reducing a number of green pixel values from the RGB pixel data to fit a predetermined pixel array (e.g., a 5×5 window) for R(B) at B(R) sites.

Optionally said stereo RGB camera comprises a first camera and a second camera, each of said first and second cameras being associated with a clock on said FPGA, and said FPGA including a double clock sampler for synchronizing said clocks of said first and right cameras.

Optionally the apparatus further comprises a histogram module comprising a luminance calculator for determining a luminance level of at least said RGB pixel data; and a classifier for classifying said RGB pixel data according to said luminance level, wherein said luminance level is transmitted to said stereo RGB camera as feedback.

Optionally the apparatus further comprises a white balance module configured to apply a smoothed GW (gray world) algorithm to said RGB pixel data.

Optionally the apparatus further comprises a processor; and a biological sensor configured to provide biological data, wherein: said biological sensor is selected from the group consisting of: an EEG sensor, a heartrate sensor, an oxygen saturation sensor, an EKG sensor, or EMG sensor, and a combination thereof, the processor is configured to process the biological data to form a plurality of sub-features, said sub-features are combined by the FPGA to form a feature.

Optionally said FPGA is implemented as a field-programmable gate array (FPGA) comprising a system on a chip (SoC), including an operating system as a SOM (system on module).

Optionally the apparatus further comprises a CPU SOM for performing overflow operations from said FPGA.

Optionally the apparatus further comprises a processor; and a plurality of tracking devices to track movement of a subject, wherein: the processor is configured to process data from the tracking devices to form a plurality of sub-features, and said sub-features are combined by said FPGA to form a feature to track movements of the subject.

Optionally the tracking devices comprise a plurality of wearable sensors.

Optionally the apparatus further comprises a processor; and a multi-modal interaction device in communication with a subject, said multi-modal interaction device comprising said plurality of tracking devices and at least one haptic feedback device, wherein: the processor is configured to process data from the tracking devices to form a plurality of tracking sub-features, and said sub-features are combined by said FPGA to form a feature to track movements of the subject and to provide feedback through said at least one haptic feedback device.

Optionally the apparatus further comprises a processor configured to perform a defined set of operations in response to receiving a corresponding instruction selected from an instruction set of codes; and a memory; wherein: said defined set of operations including: a first set of codes for operating said RGB-D fusion module to synchronize RGB pixel data and depth pixel data, and for creating a disparity map; and a second set of codes for creating a point cloud from said disparity map and said depth pixel data.

Optionally said point cloud comprises a colorized point cloud.

Optionally the apparatus further comprises a memory; and a processor configured to perform a defined set of operations for performing any of the functionality as described herein in response to receiving a corresponding instruction selected from an instruction set of codes.

Optionally said processor is configured to operate according to a set of codes selected from the instruction set for a de-noising process for a CFA (color filter array) image according to a W-means process.

Optionally said computational device comprises a second set of codes selected from the instruction set for operating a bad pixel removal process.

According to at least some embodiments there is provided a system comprising the apparatus as described herein, further comprising a display for displaying stereo visual data.

Optionally the system further comprises an object attached to a body of a user; and an inertial sensor, wherein said object comprises an active marker, input from said object is processed to form a plurality of sub-features, and said sub-features are combined by the FPGA to form a feature.

Optionally the system further comprises a processor for operating a user application, wherein said RGB-D fusion module is further configured to output a colorized point cloud to said user application.

Optionally said processor is configured to transfer SVPD to said display without being passed to said user application, and said user application is additionally configured to provide additional information for said display that is combined by said FPGA with said SVPD for output to said display.

Optionally said biological sensor is configured to output data via radio-frequency (RF), and wherein: the system further comprises an RF receiver for receiving the data from said biological sensor, and said feature from said FPGA is transmitted to said user application.

Optionally the system further comprises at least one of a haptic or tactile feedback device, the device configured to provide at least one of haptic or tactile feedback, respectively, according to information provided by said user application.

According to at least some embodiments there is provided a stereo vision procurement system comprising: a first multi-modal interaction platform configurable to be in communication with one or more additional second multi-modal interaction platforms; a depth camera; a stereo RGB camera; and an RGB-D fusion chip; wherein: each of said stereo RGB camera and said depth camera are configured to provide pixel data corresponding to a plurality of pixels, the RGB-D fusion chip comprises a processor operative to execute a plurality of instructions to cause the chip to fuse said RGB pixel data and depth pixel data to form stereo visual pixel data.

Optionally the depth camera is configured to provide depth pixel data according to TOF (time of flight).

Optionally the stereo camera is configured to provide SVPD from at least one first and at least one second sensor.

Optionally the RGB-D fusion chip is configured to preprocess at least one of SVPD and depth pixel data so as to form a 3D point cloud with RGB pixel data associated therewith.

Optionally the fusion chip is further configured to form the 3D point cloud for tracking at least a portion of a body by at least the first multi-model interaction platform.

Optionally the system further comprises at least one of a display and a wearable haptic device, wherein at least the first multi-modal interaction platform is configured to output data to at least one of the display and the haptic device.

Optionally the system further comprises one or more interactive objects or tools configured to perform at least one of giving feedback, receiving feedback, and receiving instructions from at least one of the multi-modal interaction platforms.

Optionally the system further comprises one or more sensors configured to communicate with at least one of the multi-modal interaction platforms.

Optionally the one or more sensors include at least one of: a stereo vision AR (augmented reality) component configured to display an AR environment according to at least one of tracking data of a user and data received from the first multi-modal interaction platform, and a second additional multi-modal interaction platform; an object tracking sensor; a facial detection sensor configured to detect a human face, or emotions thereof, and a markerless tracking sensor in which an object is tracked without additional specific markers placed on it.

According to at least some embodiments there is provided a multi-model interaction platform system comprising: a multi-modal interaction platform; a plurality of wearable sensors each comprising an active marker configured to provide an active signal for being detected; an inertial sensor configured to provide an inertial signal comprising position and orientation information; at least one of a heart rate and oxygen saturation sensor, or a combination thereof; an EEG sensor; and at least one wearable haptic devices, including one or more of a tactile feedback device and a force feedback device.

According to at least some embodiments there is provided a method for processing image information comprising: receiving SVPD from a stereo camera; performing RGB preprocessing on the input pixel data to produce preprocessed RGB image pixel data; using the RGB preprocessed image pixel data in the operation of the stereo camera with respect to at least one of an autogain and an autoexposure algorithm; rectifying the SVPD so as to control artifacts caused by the lens of the camera; and calibrating the SVPD so as to prevent distortion of the stereo pixel input data by the lens of the stereo camera.

Optionally the method further comprises colorizing the preprocessed RGB image pixel data, and creating a disparity map based on the colorized, preprocessed RGB image pixel data.

Optionally calibration comprises matching the RGB pixel image data with depth pixel data.

Optionally the disparity map is created by: obtaining depth pixel data from at least one of the stereo pixel input data, the preprocessed RGB image pixel data, and depth pixel data from a depth sensor, and checking differences between stereo images.

Optionally said disparity map, plus depth pixel data from the depth sensor in the form of a calibrated depth map, is combined for the point cloud computation.

According to at least some embodiments there is provided an image depth processing method for depth processing of one or more images comprising: receiving TOF (time-of-flight) image data of an image from a TOF camera; creating at least one of a depth map or a level of illumination for each pixel from the TOF data; feeding the level of illumination into a low confidence pixel removal process comprising: comparing a distance that each pixel is reporting; correlating said distance of said each pixel to the illumination provided by said each pixel, removing any pixel upon the illumination provided by the pixel being outside a predetermined acceptable range such that the distance cannot be accurately determined; processing depth information to remove motion blur of the image, wherein motion blur is removed by removing artifacts at edges of moving objects in depth of the image; and applying at least one of temporal or spatial filters to the image data.

According to at least some embodiments there is provided a stereo image processing method comprising: receiving first data flow of at least one image from a first RGB camera and second data flow of at least one image from a second RGB camera; sending the first and second data flows to a frame synchronizer; and synchronizing, using the frame synchronizer, a first image frame from the first data flow and a second image frame from the second data flow such that time shift between the first image and frame and the second image frame is substantially eliminated.

Optionally sampling, before sending the first and second data flows to the frame synchronizer, the first and second data flows such that each of the first and second data flows are synchronized with a single clock; and detecting which data flow is advanced of the other, and directing the advanced data flow to a First Input First Output (FIFO), such that the data from the advanced flow is retained by the frame synchronizer until the other data flow reaches the frame synchronizer.

Optionally the method further comprises serializing frame data of the first and second data flows as a sequence of bytes.

Optionally the method further comprises detecting non-usable pixels.

Optionally the method further comprises constructing a set of color data from each of the first and second data flows.

Optionally the method further comprises color correcting each of the first and second data flows.

Optionally the method further comprises corresponding the first and second data flows into a CFA (color filter array) color image data; applying a denoising process for the CFA image data, the process comprising: grouping four (4) CFA colors to make a 4-color pixel for each pixel of the image data; comparing each 4-color pixel to neighboring 4-color pixels; attributing a weight to each neighbor pixel depending on its difference with the center 4-color pixel; and for each color, computing a weighted mean to generate the output 4-color pixel.

Optionally said denoising process further comprises performing a distance computation according to a Manhattan distance, computed between each color group neighbor and the center color group.

Optionally the method further comprises applying a bad pixel removal algorithm before said denoising process.

Optionally the apparatus as described herein is able to obtain SVPD and to track a user, wherein the apparatus further comprises: a body model; and one or more processors having computer instructions operating thereon configured to cause the processor to: fit data points from the depth sensor to the body model according to a probabilistic fitting algorithm, said probabilistic fitting algorithm being constrained according to at least one constraint defined according to human anatomy, identifying a plurality of data points as super points and assigning each of said super points an additional weight; wherein: a plurality of said data points are identified with joints of the anatomy, said super points are defined according to one or more objects attached to a body, each of said stereo RGB camera and said depth sensor are configured to provide data as a plurality of pixels, said RGB-D fusion module is configured to combine RGB data from said stereo RGB camera and depth information from said depth sensor to SVPD, and the depth sensor provides data to determine a three-dimensional location of a body in space according to a distance of the body from the depth sensor.

Optionally said one or more objects attached to the body comprise one or more of at least one active marker configured to provide a detectable signal and a passive object.

Optionally said data points identified with joints of the human body are identified according to a previously determined position as an estimate.

Optionally the body model comprises a template, said template including a standard model of a skeleton according to a hierarchy of joints as vertices and skinning, and a first determination of a position of at least one of the joints of the hierarchy of joints according to said template.

According to at least some embodiments there is provided a system comprising an apparatus as described herein, optionally comprising a characteristic of a system as described herein, further comprising a display for displaying SVPD.

Optionally the system further comprises one or more objects attached to the user; and an inertial sensor, wherein said one or more objects comprises an active marker, the computer instructions are configured to cause the processor to form a plurality of sub-features from input from said one or more objects and combining said sub-features into a feature.

Optionally the system further comprises at least one of a haptic feedback device and a tactile feedback device configured to provide at least one of haptic and tactile feedback according to information provided by said user application.

Optionally computer instructions include instructions which cause the processor to perform as a tracking engine.

Optionally the tracking engine is configured to track at least one of the position of the user's body and the position of one or more body parts of the user, including but not limited, to one or more of an arm, a leg, a hand, a foot, and a head.

Optionally the tracking engine is configured to decompose signals representing physical actions made by the user into data representing a series of gestures.

Optionally the tracking engine is configured to decompose signals representing physical actions into data representing a series of gestures via classifier functionality.

Optionally the system further comprises a plurality of templates, wherein the computer instructions are further configured to cause the processor to initialize a template of the plurality of templates Optionally the template features a model of a human body configured only as a plurality of parameters, only as a plurality of features, or both.

Optionally the plurality of parameters and/or features include a skeleton, and one or more joints.

Optionally the computer instructions are additionally configured to cause the processor to utilize the plurality of parameters and/or features to assist in tracking of the user's movements.

Optionally the computer instructions are configured to map the sensor data onto a GMM (Gaussian mixture model).

Optionally the body model includes a sparse-skin representation.

Optionally the computer instructions are additionally configured to cause the processor to suppress corresponding Gaussians.

Optionally data is mapped to a GMM.

Optionally said data is mapped to said GMM by a classifier.

Optionally the tracking engine includes a template engine configured to read a template from a template database, and the computer instructions are additionally configured to: cause the processor to operate as a GMM mapper, and send the template into the GMM mapper.

Optionally the computer instructions are additionally configured to cause the processor to operate as a point cloud decomposer, and the GMM mapper is configured to receive point cloud information from the point cloud decomposer.

Unless otherwise defined, all technical and scientific terms used herein have the same meaning as commonly understood by one of ordinary skill in the art to which this disclosure belongs. The materials, systems, apparatuses, methods, and examples provided herein are illustrative only and not intended to be limiting.

Implementation of the embodiments of the present disclosure include performing or completing tasks, steps, and functions, manually, automatically, or a combination thereof. Specifically, steps can be implemented by hardware or by software on an operating system, of a firmware, and/or a combination thereof. For example, as hardware, steps of at least some embodiments of the disclosure can be implemented as a chip or circuit (e.g., ASIC). As software, steps of at least some embodiments of the disclosure can be implemented as a number of software instructions being executed by a computer (e.g., a processor) using an operating system. Thus, in any case, selected steps of methods of at least some embodiments of the disclosure can be performed by a processor for executing a plurality of instructions.

Software (e.g., an application, computer instructions, code) which is configured to perform (or cause to be performed) certain functionality of some of the disclosed embodiments may also be referred to as a "module" for performing that functionality, and also may be referred to a "processor" for performing such functionality. Thus, processor, according to some embodiments, may be a hardware component, or, according to some embodiments, a software component.

Further to this end, in some embodiments, a processor may also be referred to as a module, and, in some embodiments, a processor may comprise one more modules. In some embodiments, a module may comprise computer instructions—which can be a set of instructions, an application, software, which are operable on a computational device (e.g., a processor) to cause the computational device to conduct and/or achieve one or more specific functionality. Furthermore, the phrase "abstraction layer" or "abstraction interface", as used with some embodiments, can refer to computer instructions (which can be a set of instructions, an application, software) which are operable on a computational device (as noted, e.g., a processor) to cause the computational device to conduct and/or achieve one or more specific functionality. The abstraction layer may also be a circuit (e.g., an ASIC see above) to conduct and/or achieve one or more specific functionality. Thus, for some embodiments, and claims which correspond to such embodiments, the noted feature/functionality can be described/claimed in a number of ways (e.g., abstraction layer, computational device, processor, module, software, application, computer instructions, and the like).

Some embodiments are described with regard to a "computer", a "computer network," and/or a "computer operational on a computer network," it is noted that any device featuring a processor (which may be referred to as "data processor"; "pre-processor" may also be referred to as "processor") and the ability to execute one or more instructions may be described as a computer, a computational device, and a processor (e.g., see above), including but not limited to a personal computer (PC), a server, a cellular telephone, an IP telephone, a smart phone, a PDA (personal digital assistant), a thin client, a mobile communication device, a smart watch, head mounted display or other wearable that is able to communicate externally, a virtual or cloud based processor, a pager, and/or a similar device. Two or more of such devices in communication with each other may be a "computer network."

BRIEF DESCRIPTION OF THE DRAWINGS

Embodiments of the present disclosure are herein described, by way of example only, with reference to the accompanying drawings. With specific reference now to the drawings in detail, it is stressed that the particulars shown are by way of example and for purposes of illustrative discussion of the preferred embodiments of inventions disclosed herein, and are presented in order to provide what is believed to be the most useful and readily understood description of the principles and conceptual aspects of various embodiments of the inventions disclosed herein.

FIGS. 12A-12D show a non-limiting example of an internal buffer cells arrangement: FIG. 12A shows a global structure, FIG. 12B shows a mask for defective pixel detection and FIG. 12C shows a mask for de-mosaic task. FIG. 12D, which shows exemplary state machines;

FIGS. 13A-13H show a non-limiting example of a method for de-mosaic according to at least some embodiments of the present disclosure;

FIG. 17D shows a non-limiting example of an image;

FIG. 17E shows the memory filling scheme for this image;

FIG. 19D shows the W-means algorithm, in a non-limiting example;

FIG. 21A shows required ports of the filter to be added in the image pipeline, while

FIG. 22A shows a schematic of the Bailey and Jimmy method, while

FIG. 29A shows an exemplary, illustrative non-limiting format output component diagram for "W-means" algorithm, while

FIG. 56C1 relates to an exemplary wireless marker packet structure;

FIG. 56C2 shows an exemplary wireless marker protocol for acquisition;

DETAILED DESCRIPTION OF AT LEAST SOME EMBODIMENTS

Figure 1:
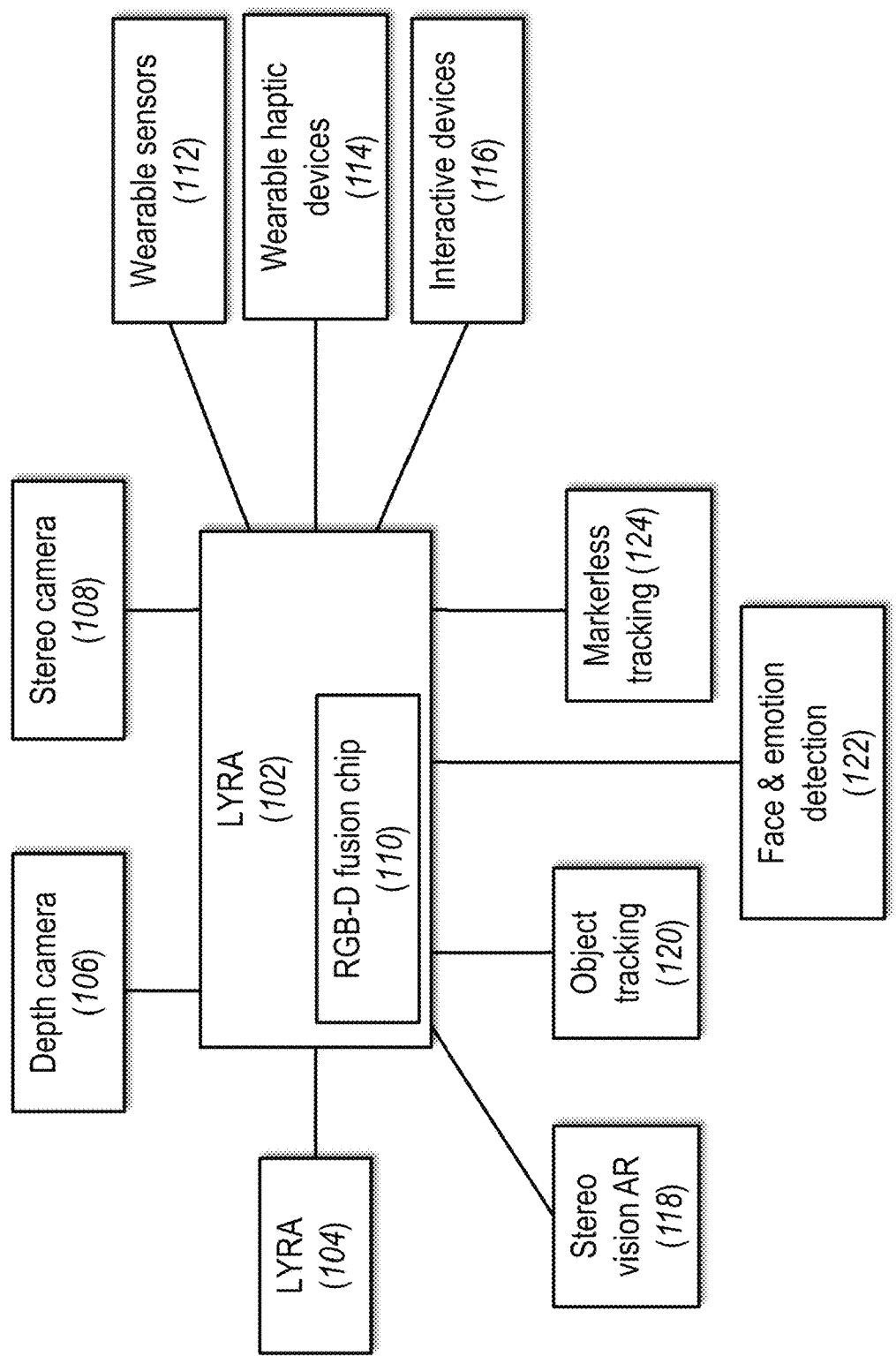
FIG. 1 shows a non-limiting example of a system according to at least some embodiments of the present disclosure.

FIG. 1 shows a non-limiting example of a system according to at least some embodiments of the present disclosure. As shown, a system 100 features a multi-modal interaction platform 102, which can be chained to one or more additional multi-modal interaction platforms 104 as shown. Multi-modal interaction platform 102 can in turn be in communication with a depth sensor (e.g., camera) 106, a stereo sensor (e.g., camera) 108, and an RGB-D fusion chip 110. Depth camera 106 is configured to provide depth sensor data, which may be pixel data, for example, according to TOF (time of flight) relative to each pixel. Stereo camera 108 is configured to provide stereo camera data (pixel data) from left (first) and right (second) camera sensors (not shown). The functions of RGB-D fusion chip 110 are described in greater detail with regard to FIG. 3, but preferably include preprocessing of stereo camera data and depth data, to form a 3D point cloud with RGB data associated with it. The formation of the point cloud enables its use for tracking a body or a portion thereof, for example (or for other types of processing), by multi-modal interaction platform 102. Multi-modal interaction platform 102 can then output data to a visual display (not shown) or a wearable haptic device 114, for example to provide haptic feedback. One or more interactive objects or tools 116 may be provided to give or receive feedback or instructions from multi-modal interaction platform 102, or both.

A plurality of additional functions may be provided through the components described herein, alone or in combination, with one or more additional sensors, provided through outputs from multi-modal interaction platform 102. For example, a stereo vision AR (augmented reality) component 118 can be provided to display an AR environment according to tracking data of the subject and other information received from multi-modal interaction platform 102. Such object tracking can be enabled by an object tracking output 120. Detection of a human face, optionally with detection of emotion, may be provided through such an output 122. Markerless tracking 124, in which an object is tracked without additional specific markers placed on it, may also be provided. Other applications are also possible.

Figure 2A:
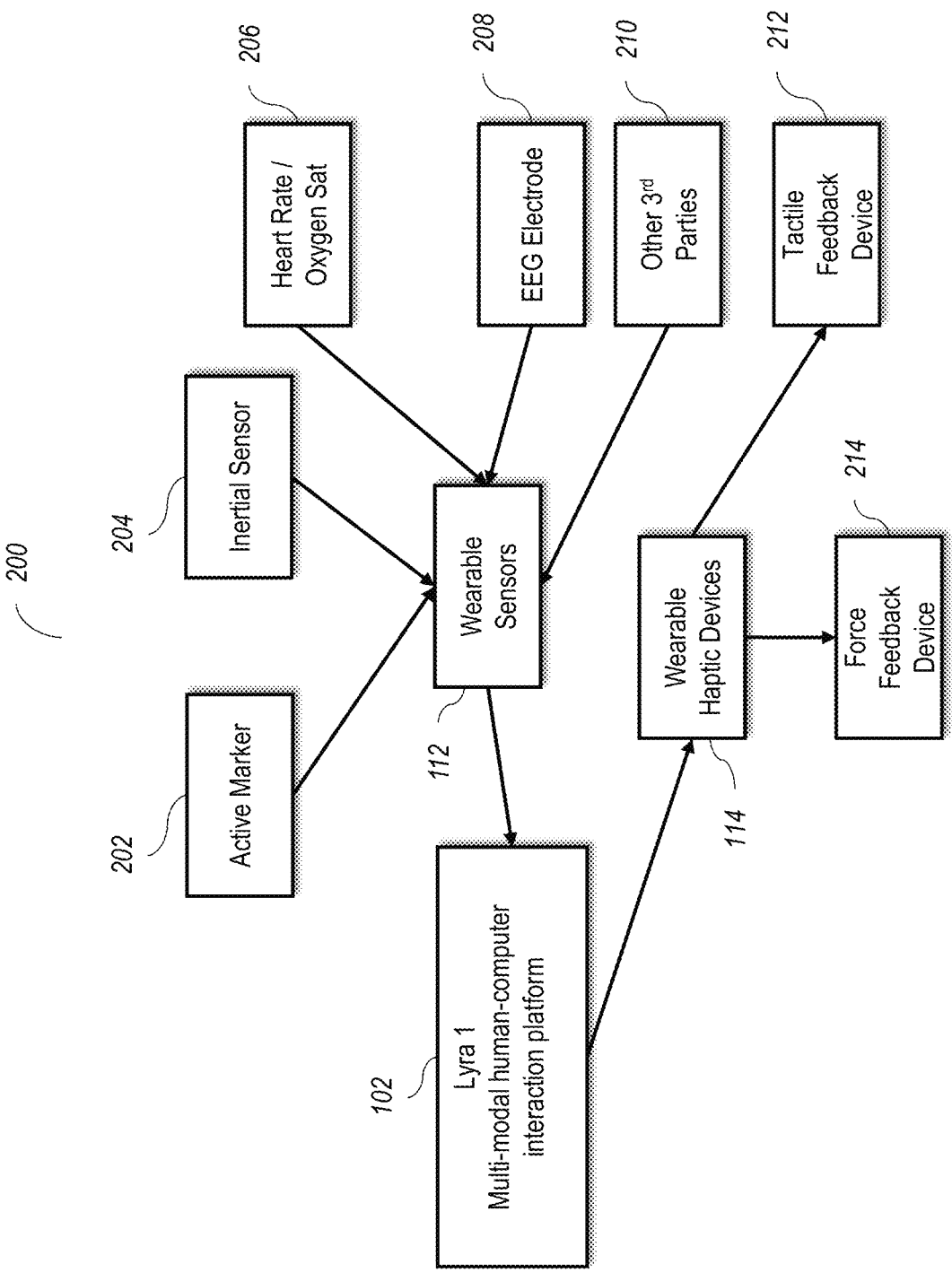
FIGS. 2A, 2B and 2C show additional details and embodiments of the system of FIG. 1.

FIG. 2A shows a detail of the system of FIG. 1, shown as a system 200. In this figure, multi-modal interaction platform 102 is shown as connected to a plurality of different wearable sensors 112, including, but not limited to, an active marker 202, which can, for example, provide an active signal for being detected, such as an optical signal (for example) which would be detected by the stereo camera; an inertial sensor 204, for providing an inertial signal that includes position and orientation information; a heart rate/oxygen saturation sensor 206; EEG electrodes 208; and/or one or more additional sensors 210. Operation of some wearable sensors 112 in conjunction with multi-modal interaction platform 102 is described in greater detail below.

Multi-modal interaction platform 102 is also shown as connected to a plurality of different wearable haptic devices 114, including one or more of a tactile feedback device 212 and a force feedback device 214. For example and without limitation, such wearable haptic devices 114 could include a glove with small motors on the tips of the fingers to provide tactile feedback or such a motor connected to an active marker. Without wishing to be limited to a single benefit or to a closed list, connecting such sensors/feedback devices on a hardware platform enables better data synchronization, for example with timing provided by the same hardware clock signal, which can be useful for analysis.

Figure 2B:
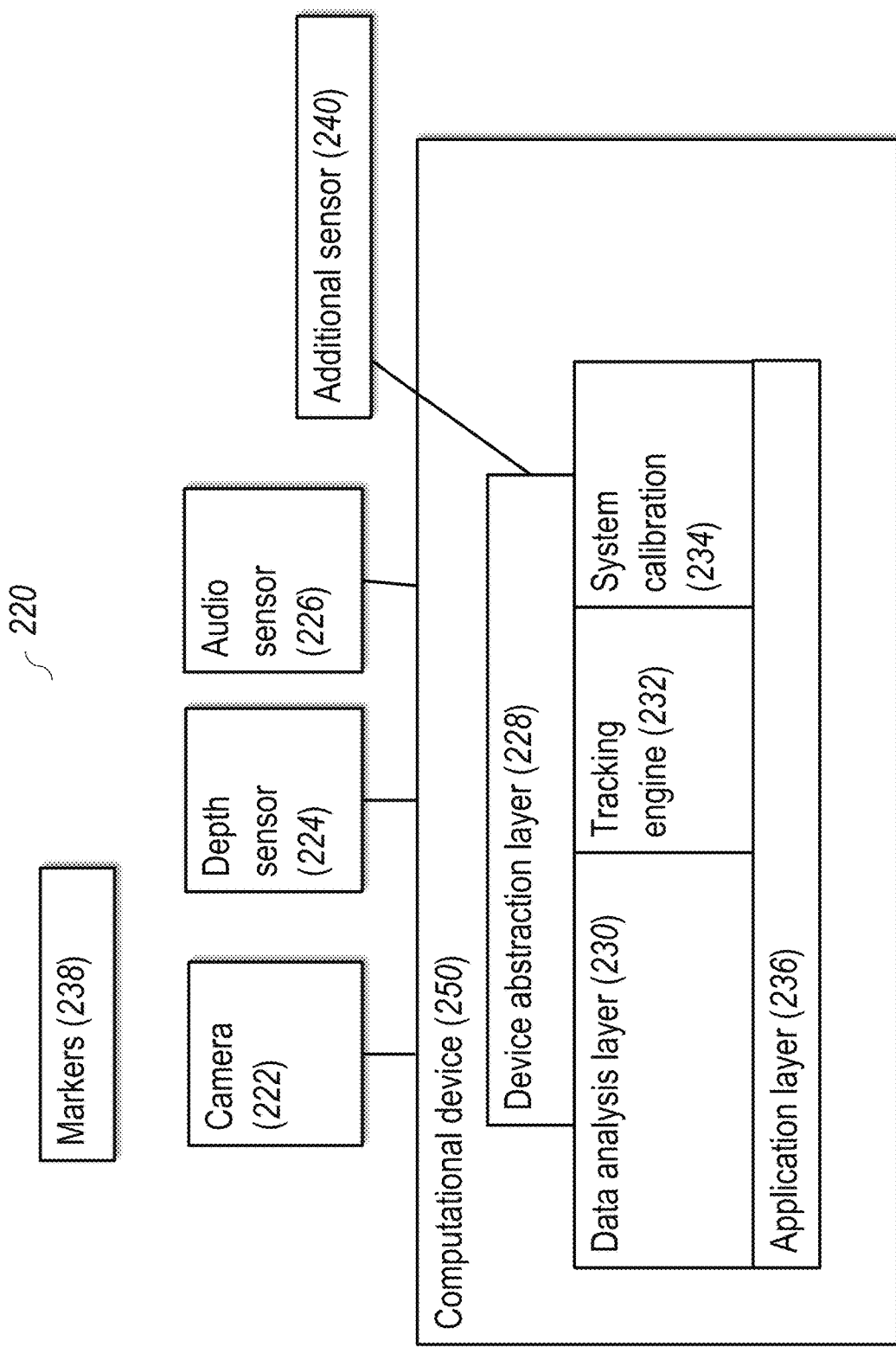

FIG. 2B shows a non-limiting example of a system according to at least some embodiments of the present disclosure. As shown, a system 220 features a camera 222, a depth sensor 224 and optionally an audio sensor 226. Optionally an additional sensor 240 is also included. Optionally camera 222 and depth sensor 224 are combined in a single product (e.g., Kinect® product of Microsoft®, and/or as described in U.S. Pat. No. 8,379,101). FIG. 1B shows an exemplary implementation for camera 222 and depth sensor 224. Optionally, camera 222 and depth sensor 224 can be implemented with the LYRA camera of Mindmaze SA. The integrated product (i.e., camera 222 and depth sensor 224) enables, according to some embodiments, the orientation of camera 222 to be determined with respect to a canonical reference frame. Optionally, three or all four sensors (e.g., a plurality of sensors) are combined in a single product.

The sensor data, in some embodiments, relates to physical actions of a user (not shown), which are accessible to the sensors. For example, camera 222 can collect video data of one or more movements of the user, while depth sensor 224 may provide data to determine the three dimensional location of the user in space according to the distance of the user from depth sensor 224 (or more specifically, the plurality of distances that represent the three dimensional volume of the user in space). Depth sensor 224 can provide TOF (time of flight) data regarding the position of the user, which, when combined with video data from camera 222, allows a three dimensional map of the user in the environment to be determined. As described in greater detail below, such a map enables the physical actions of the user to be accurately determined, for example, with regard to gestures made by the user. Audio sensor 226 preferably collects audio data regarding any sounds made by the user, optionally including, but not limited to, speech. Additional sensor 240 can collect biological signals about the user and/or may collect additional information to assist the depth sensor 224.

Sensor data is collected by a device abstraction layer 228, which preferably converts the sensor signals into data which is sensor-agnostic. Device abstraction layer 228 preferably handles the necessary preprocessing such that, if different sensors are substituted, only changes to device abstraction layer 228 would be required; the remainder of system 220 can continue functioning without changes (or, in some embodiments, at least without substantive changes). Device abstraction layer 228 preferably also cleans signals, for example, to remove or at least reduce noise as necessary, and can also be used to normalize the signals. Device abstraction layer 228 may be operated by a computational device 250, and any method steps may be performed by a computational device (note—modules and interfaces disclosed herein are assumed to incorporate, or to be operated by, a computational device, even if not shown).

The preprocessed signal data from the sensors can then be passed to a data analysis layer 230, which preferably performs data analysis on the sensor data for consumption by an application layer 236 (according to some embodiments, "application," means any type of interaction with a user). Preferably, such analysis includes tracking analysis, performed by a tracking engine 232, which can track the position of the user's body and also can track the position of one or more body parts of the user, including but not limited, to one or more of arms, legs, hands, feet, head and so forth. Tracking engine 232 can decompose physical actions made by the user into a series of gestures. A "gesture" in this case may include an action taken by a plurality of body parts of the user, such as taking a step while swinging an arm, lifting an arm while bending forward, moving both arms, and so forth. Such decomposition and gesture recognition can also be done separately, for example, by a classifier trained on information provided by tracking engine 232 with regard to tracking the various body parts. Tracking engine 232 may be adjusted according to a presence or absence of each limb of the user. For example, if the user is an amputee who is missing a leg, tracking engine 232 can be calibrated to take such a loss into account. Such calibration may take place automatically or may occur as part of a user directed calibration process at the start of a session with a particular user.

It is noted that while the term "classifier" is used throughout, this term is also intended to encompass "regressor". For machine learning, the difference between the two terms is that for classifiers, the output or target variable takes class labels (that is, is categorical). For regressors, the output variable assumes continuous variables (see for example http://scottge.net/2015/06/14/ml101-regression-vs-classification-vs-clustering-problems/).

The tracking of the user's body and/or body parts, optionally decomposed to a series of gestures, can then be provided to application layer 236, which translates the actions of the user into a type of reaction and/or analyzes these actions to determine one or more action parameters. For example, and without limitation, a physical action taken by the user to lift an arm is a gesture which could translate to application layer 236 as lifting a virtual object. Alternatively or additionally, such a physical action could be analyzed by application layer 236 to determine the user's range of motion or ability to perform the action.

To assist in the tracking process, optionally, one or more markers 238 can be placed on the body of the user. Markers 238 optionally feature a characteristic that can be detected by one or more of the sensors, such as by camera 222, depth sensor 224, audio sensor 226 or additional sensor 240. Markers 238 can be detectable by camera 222, for example, as optical markers. While such optical markers may be passive or active, preferably, markers 238 are active optical markers, for example featuring an LED light. More preferably, each of markers 238, or alternatively each pair of markers 238, can comprise an LED light of a specific color which is then placed on a specific location of the body of the user. The different colors of the LED lights, placed at a specific location, convey a significant amount of information to the system through camera 222; as described in greater detail below, such information can be used to make the tracking process efficient and accurate. Additionally, or alternatively, one or more inertial sensors can be added to the hands of the user as a type of marker 238, which can be enabled as Bluetooth or other wireless communication, such that the information would be sent to device abstraction layer 228. The inertial sensors can also be integrated with an optical component in at least markers 238 related to the hands, or even for more such markers 238. The information can then optionally be integrated to the tracking process, for example, to provide an estimate of orientation and location for a particular body part, for example as a prior restraint.

Data analysis layer 230, in some embodiments, includes a system calibration module 234. As described in greater detail below, system calibration module 234 is configured to calibrate the system with respect to the position of the user, in order for the system to track the user effectively. System calibration module 234 can perform calibration of the sensors with respect to the requirements of the operation of application layer 236 (although, in some embodiments—which can include this embodiment—device abstraction layer 228 is configured to perform sensor specific calibration). Optionally, the sensors may be packaged in a device (e.g., Microsoft® Kinect), which performs its own sensor specific calibration.

Figure 2C:
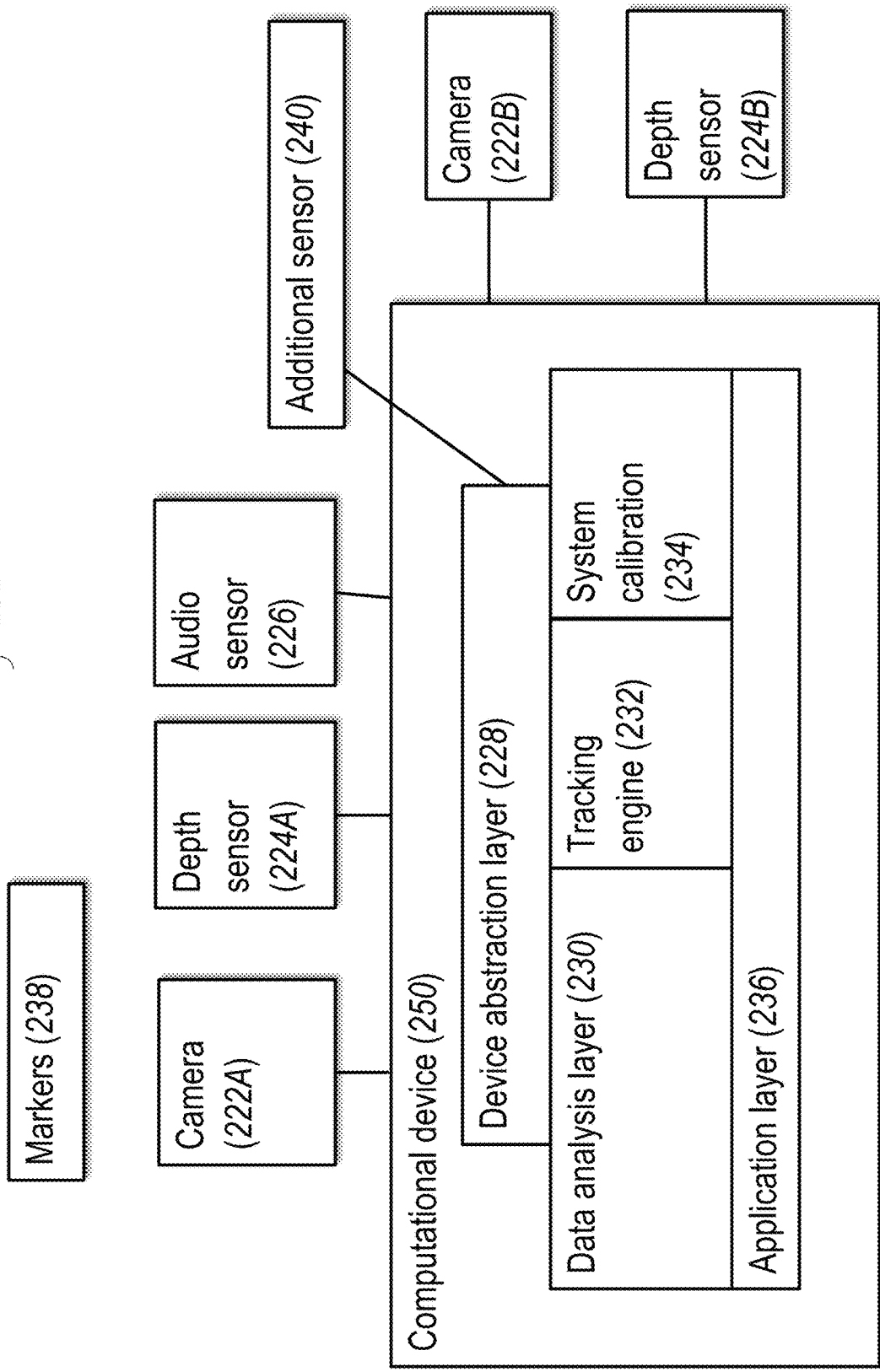

FIG. 2C shows a non-limiting example of a system according to at least some embodiments of the present disclosure. As shown, a system 252 includes the components of the system of FIG. 2B, and additionally features a second camera 222B and a second depth sensor 224B. As a non-limiting example of a use for system 252, it could be used to provide additional information about the movements of a user. For example, camera 222B and depth sensor 224B could be attached to the user, for example and without limitation to headgear worn by the user. Camera 222A and depth sensor 224A would be placed external to the user, for example at a short distance from the user. Such a configuration would enable the hands of the user to be tracked separately from the body of the user.

For this implementation, one of camera 222A and camera 222B, and one of depth sensor 224A and depth sensor 224B, is preferably selected as the master while the other is the slave device. For example, preferably camera 222B and depth sensor 224B would be the master devices, such that control would be provided according to the movements of the user. Optionally only one of camera 222B and depth sensor 224B is provided; if so, then preferably at least depth sensor 224B is provided.

Another non-limiting implementation would use system 252 to extend the range of operation. Each of camera 222A,B and depth sensor 224A,B has a trade off between field of view and resolution: the greater the field of view, the lower the angular resolution is, and vice versa. In order for the range of operation to be extended to 10 meters, for example, it would be necessary to provide a plurality of cameras 222 and a plurality of depth sensors 224, stationed at various points along this range. The data would therefore have the necessary resolution and field of view.

Figure 3:
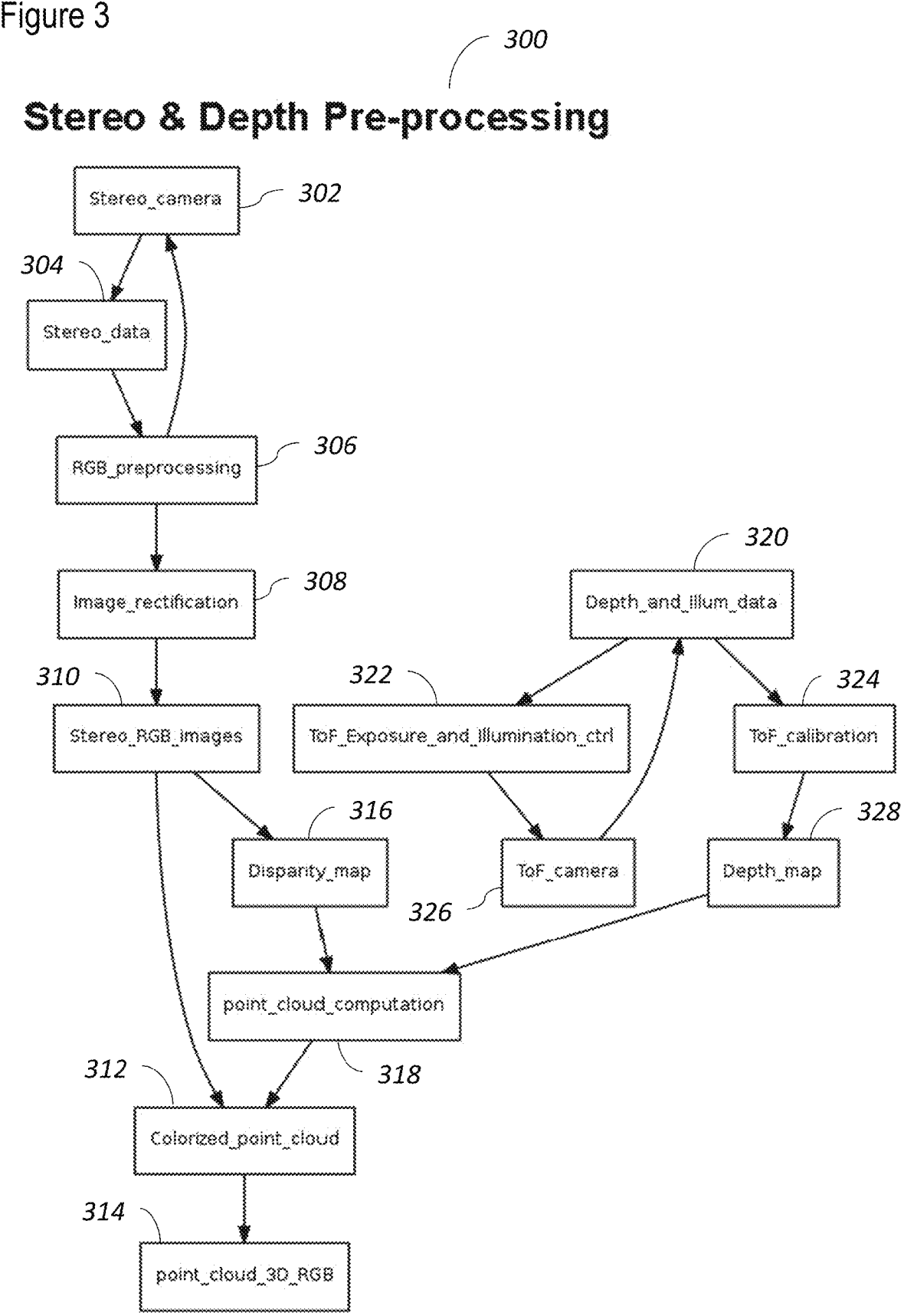
FIG. 3 shows a non-limiting example of a method for preprocessing according to at least some embodiments of the present disclosure.

FIG. 3 shows a non-limiting example of a method for preprocessing according to at least some embodiments of the present disclosure. As shown, preprocessing starts at 302 with input from the stereo camera, provided as stereo data 304. Stereo data 304 undergoes RGB preprocessing 306, which in turn feeds back to the operation of stereo camera 302, for example, with regard to the autogain and autoexposure algorithm, described in greater below. In 308, image rectification is performed, to control artifacts caused by the lens of the camera. In some embodiments, a calibration process can be performed to prevent distortion of the image data by the lens, whether at the time of manufacture or at the time of use.

Optionally, the camera calibration process is performed as follows. To perform all these steps, intrinsic and extrinsic parameters of the cameras are needed to know how they are positioned one to each other, to know their distortion, their focal length and so on. These parameters are often obtained from a calibration step. This calibration step optionally comprises taking several pictures of a chessboard pattern with the cameras and then computing the parameters by finding the pattern (of known size) inside the images.

From the intrinsic calibration process, the intrinsic parameters of each camera are extracted and may comprise the following:

Focal length: in pixels, (fx, fy);
Principal point: in pixels, (cx, cy);
Skew coefficient: defines the angle between the horizontal and vertical pixels axes, $\alpha_c$;
Distortion coefficients: radial ($k_1$, $k_2$, $k_3$, $k_4$, $k_5$, $k_6$) and tangential ($p_1$, $p_2$) distortion coefficients.

Then, from the extrinsic calibration process, the position of one camera to the other can be extracted by having a 3×3 rotation matrix r and a 3×1 translation vector t.

In 310, stereo RGB images that have been preprocessed may then be processed for colorization and for creating a disparity map, such may then be fed to a colorized point cloud formation process 312. The process in 312 may be performed, for example, as described in the paper "Fusion of Terrestrial LiDAR Point Clouds with Color Imagery", by Colin Axel, 2013, available from http://www.cis.rit.edu/DocumentLibrary/admin/uploads/CIS00202.PDF. However, optionally, determination of the sensor position and orientation may be dropped, since the stereo camera and depth sensor can both be calibrated, with their position and orientation known before processing begins. In addition, pixels from the RGB camera can be matched with pixels from the depth sensor, providing an additional layer of calibration. The colorized point cloud can then be output as the 3D point cloud with RGB data in 314.

Turning back to 310, the disparity map is created in 312 by obtaining the depth information from the stereo RGB images and then checking the differences between stereo images. The disparity map, plus depth information from the depth sensor in the form of a calibrated depth map (as described in greater detail below), is combined for the point cloud computation in 318, for a more robust data set.

Depth information from the depth sensor can be obtained as follows. Depth and illumination data is obtained in 320, from TOF (time of flight) camera 326. The depth and illumination data may then be processed along two paths, a first path for TOF control 322, which in turn feeds back to TOF camera 326 to control illumination and exposure time according to the illumination data. A second path for TOF calibration 324 can then be used to correct the TOF image, by applying the factory calibration, which in turn feeds corrected TOF depth data into the depth map 328. Calibration of the TOF function may be required to be certain that the depth sensor data is correct, relative to the function of the depth sensor itself. Such calibration increases the accuracy of depth map 328. Depth map 328 can then be fed into 318, as described above, to increase the accuracy of creating the colorized point cloud.

Figure 4A:
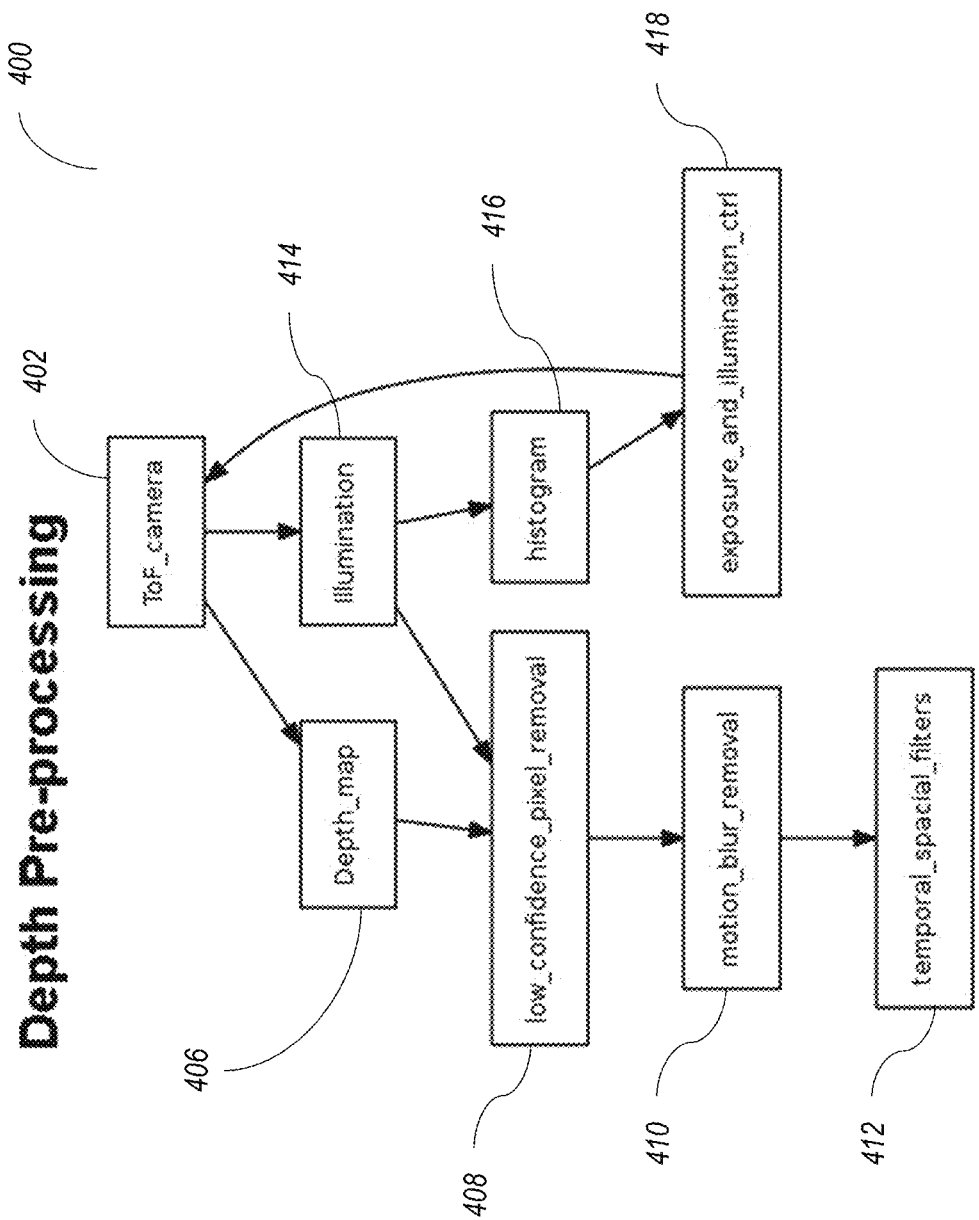
FIGS. 4A and 4B shows a non-limiting example of a method for depth preprocessing according to at least some embodiments of the present disclosure.
Figure 4B:
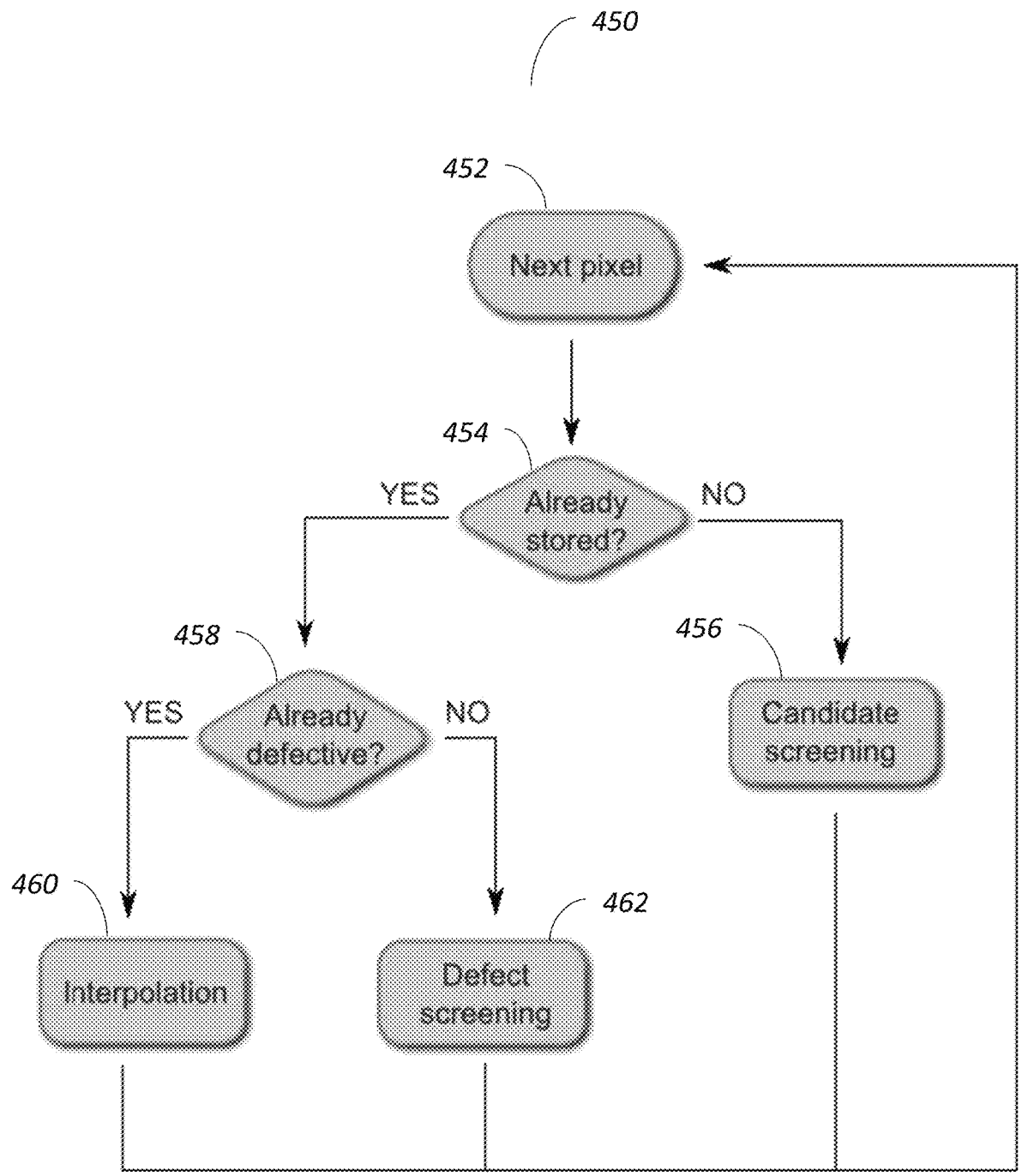

FIGS. 4A and 4B show a non-limiting example of a method for depth preprocessing according to at least some embodiments of the present disclosure, which shows the depth processing method of FIG. 3 in more detail. Accordingly, as shown in FIG. 4A, a depth preprocessing process 400 starts with image (e.g., pixel) data being obtained from a TOF camera in 402, which may be used to create a depth map in 406, but may also may be used to determine a level of illumination in 414 for each pixel. The level of illumination can then be fed into a low confidence pixel removal process 408. This process compares the distance that a pixel in the image is reporting and correlates this reported distance to the illumination provided by that pixel. The settings for process 408 can be decided in advance, according to the acceptable noise level, which may for example be influenced by the application using or consuming the data. The lower the acceptable noise level, the lower the amount of data which is available. If the illumination is outside of a predetermined acceptable range, the distance cannot be accurately determined. Preferably, if this situation occurs, the pixel is removed.

A histogram process 416, which enables autoexposure and autogain adjustments, is described in greater detail below.

Figure 47:
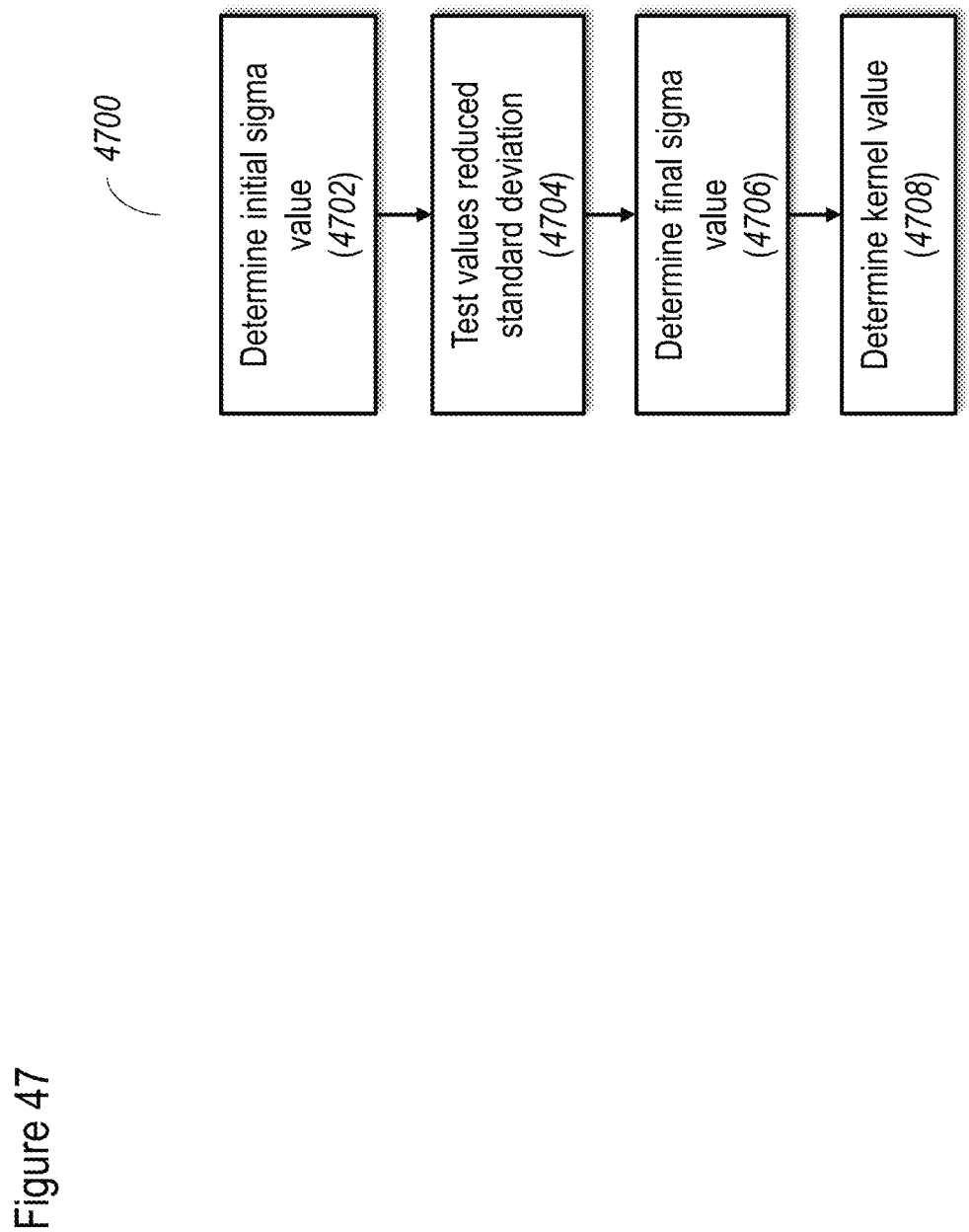
FIG. 47 relates to another non-limiting example of a denoising method, using a bilateral filter with Gaussian blur filtering.

After removal of low confidence pixels in 408, the depth processing can continue with motion blur removal in 410, which can remove artifacts at edges of moving objects in depth (i.e., removing the pixels involved). The application of temporal and spatial filters may be performed in 412, which are used to remove noise from the depth (spatial) and average data over time to remove noise (temporal). Spatial filters attenuate noise by reducing the variance among the neighborhood of a pixel, resulting in a smoother surface, but potentially at the cost of reduced contrast. Such a spatial filter may be implemented as a Gaussian filter for example, which uses a Gaussian weighting function, G(p−p') to average the pixels, p', within a square neighborhood, w, centered about the pixel, p. FIG. 47 relates to another non-limiting example of a denoising method, using a bilateral filter with Gaussian blur filtering.

Turning back to histogram process 416, the information obtained therefrom may also be passed to an exposure and illumination control process 418 as previously described, which is used to adjust the function of TOF camera 402. FIG. 4B shows an exemplary illustrative non-limiting method for detecting defective pixels according to at least some embodiments of the present disclosure, which can be used for example with the method of FIG. 4A, for example to remove low confidence pixels as previously described. The process 450 can be divided into three steps: interpolation, defect screening, candidate screening (for example).

While each incoming pixel (452) reaches the center of the moving window obtained in the buffer of the FPGA (field-programmable gate array), it is checked to determine if it was previously stored (in memory) as being defective (454). If not previously stored, the module proceeds to perform the candidate screening process (456) where the value of the pixel under test is compared toward surrounding neighbors average. If a certain threshold, TH_NEIGH, is exceeded, the inspected pixel is suspected to be defective, hence its data (value, position, neighbor average) are stored for further analysis.

A stored pixel is checked to determine whether it was previously labeled as defective (458), which leads to interpolation (460). If not previously labeled as defective, the pixel undergoes defect screening (462) by comparing its actual and previous values. A higher difference between these values as compared to the threshold TH_DIFF (to cancel effects of noise) corresponds to the pixel changing regularly, such that the pixel is no longer suspected as being defective. A time constant is incremented for each period of time that the pixel remains under suspicion of being defective. Another threshold, TH_FRAME, is defined and used to compare the value of the time constant. Once a pixel value (excluding noise) remains unchanged for a certain number of frames, such that the value of the time constant is equal to the second threshold of TH_FRAME, the pixel is determined to be defective. Now the interpolation step becomes active, so that defective pixel is corrected before it slides toward first mask_2 memory cell. Interpolation may be performed by substituting investigated pixel value by average of its surrounding pixel. The average can be calculated among those pixels having the same filter color as the one in the center of the mask. An example of such a process is demonstrated in following pseudo-code form:

```
for pixel=1 to endFrame do
    if pixel already stored then
        if pixel already defective then
            Interpolate pixel
        else if|pixel-previousPixelValue|≤TH_DIFF
            then if timeConst=TH_FRAME then
                Add pixel to defects list
            else
                Increment timeConst
            end
        else
            Remove pixel from candidate list
        end
    else if memory not full then
        if pixel-neighborsAverage   TH_NEIGH then
        |                       |≥
            Add pixel to candidate list
        end
    end
end
```

Figure 5A:
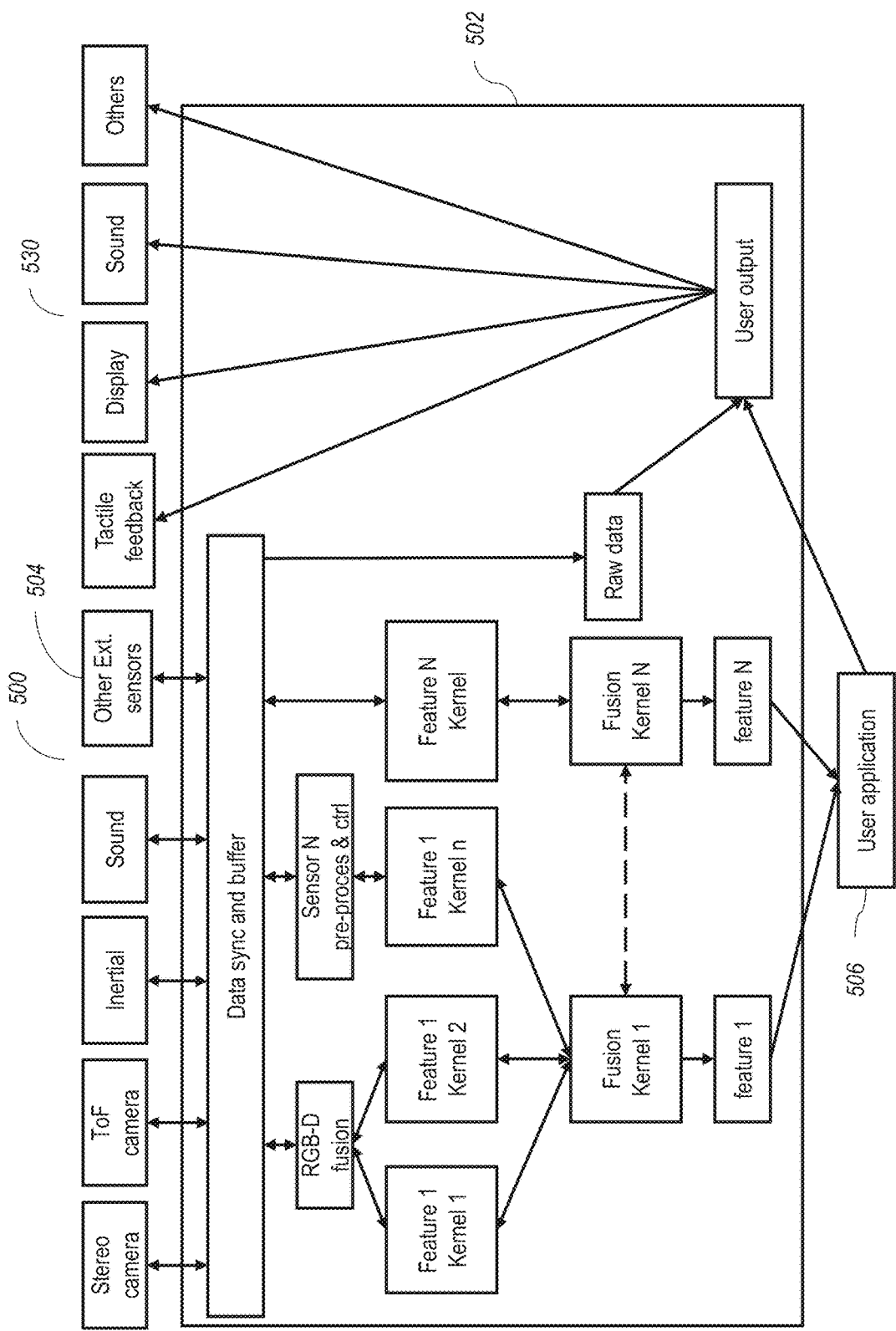
FIGS. 5A-5D show a non-limiting example of a data processing flow for the FPGA (field-programmable gate array) according to at least some embodiments of the present disclosure.

FIGS. 5A-5D show a non-limiting example of a data processing flow for the FPGA according to at least some embodiments of the present disclosure. FIG. 5A shows the overall flow 500, which includes input from one or more sensors 504, and output to one or more output devices 530. Input from sensors 504 can be processed through FPGA process 502 and then sent to a user application 506. User application 506 may then return output to output devices 530.

Figure 5B:
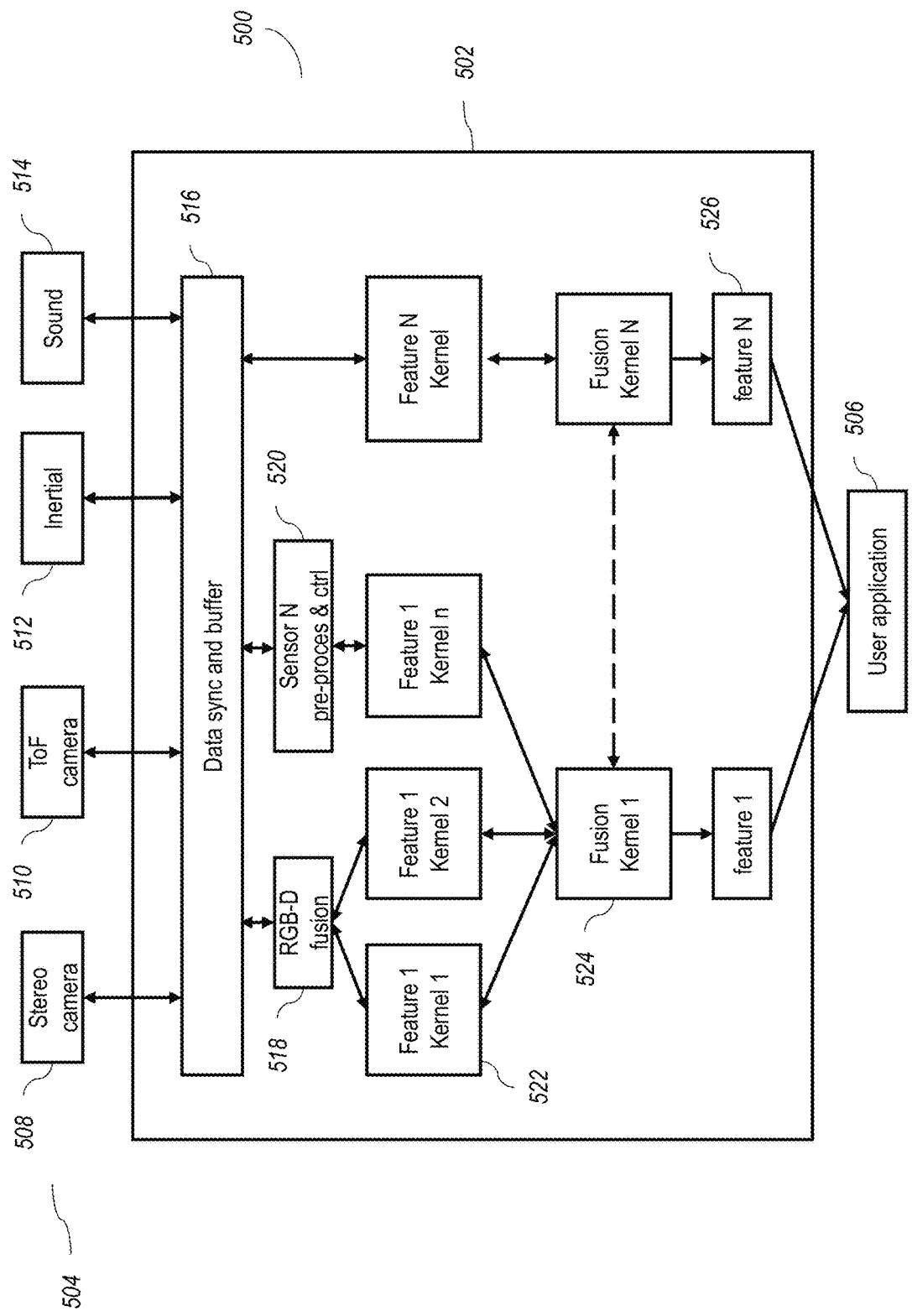

FIG. 5B describes the detailed flow for some exemplary input sensors 504. Thus, and for example, as shown, exemplary input sensors 504 include one or more of a stereo camera 508, a ToF camera 510, an inertial sensor 512 and a sound input device 514. A non-limiting example of sound input device 514 could include a microphone for example. Input from input sensors 504 may be received by a data sync and buffer 516, which operates as described in greater detail below, to synchronize various data streams (including without limitation between inputs of stereo camera 508, and between stereo camera 508 and ToF camera 510) according to a plurality of clocks. Data sync and buffer 516 can also buffer data as described in greater detail below. In terms of buffering functions, the buffer part of data sync and buffer 516 is configured to provide a moving window. This allows data processing to be performed on a portion of a frame when data are serially sent.

Optionally one or more input sensors 504 are asynchronous sensors. As a non-limiting example, an asynchronous sensor implementation for a camera does not send data at a fixed frame rate. Instead, such a sensor would only send data when a change had been detected, thereby only sending the change data.

Data may then pass to an RGB-D fusion chip process 518, the operation of which was described with regard to FIG. 3, and which preprocesses the data for depth and RGB processing. Data can also pass to a sensor specific preprocess and control 520 for sensors other than stereo camera 508 and ToF camera 510, to prepare the sensor data for further use (for example, in regard to calibration of the data).

Next, data may pass to a layer of feature specific kernels 520, which receive data from RGB-D fusion chip process 518, and sensor specific preprocess and control 520. Feature specific kernels 520 may be operated according to the OPENCL standard, which supports communication between the FPGA and the CPU of the computational device operating user application 506 (not shown). Feature specific kernels 520 may also receive data directly from data sync and buffer 516, for example, to control the sensor acquisition and to provide feedback to data sync and buffer 516, to feed back to sensors 504.

Feature specific kernels 520, according to some embodiments, take data related to particular features of interest to be calculated, such as the previously described point cloud of 3D and RGB data, and calculate sub-features related to the feature. Non-limiting examples of such features may also include portions of processes as described herein, such as the de-mosaic process, color correction, white balance and the like. Each feature specific kernel 520 may have an associated buffer (not shown), which is preferably designed in order to provide a moving window. This allows data processing to be performed on a portion of a frame when data is serially sent.

Next, the sub-features can be passed to a plurality of fusion kernels 522, to fuse the sub-features into the actual features, such as the previously described point cloud of 3D and RGB data. Specific feature specific kernels 520 and fusion kernels 522 processes are described in greater detail below. Fusion kernel 522 can also report that a particular feature specific kernel 520 is missing information to the feature specific kernel that reports any missing information to sensors 504 through data sync and buffer 516. These features 526 may then be passed to user application 506 which may request specific features 526, for example, by enable specific fusion kernels 522, as needed for operation.

Among the advantages of calculation by feature specific kernels 520 and fusion kernels 522 according to some embodiments, is that both are implemented in the FPGA (field programmable array), and hence may be calculated very quickly. Both feature specific kernels 522 and fusion kernels 524 may be calculated by dedicated elements in the FPGA which can be specifically created or adjusted to operate very efficiently for these specific calculations. Even though features 526 may require intensive calculations, shifting such calculations, away from a computational device that operates user application 506 (not shown) and to the FPGA process 502, significantly increases the speed and efficiency of performing such calculations.

Optionally the layer of feature specific kernels 520 and/or the layer of fusion kernels 522 may be augmented or replaced by one or more neural networks. Such neural network(s) could be trained on sensor data and/or on the feature data from the layer of feature specific kernels 520.

Figure 5C:
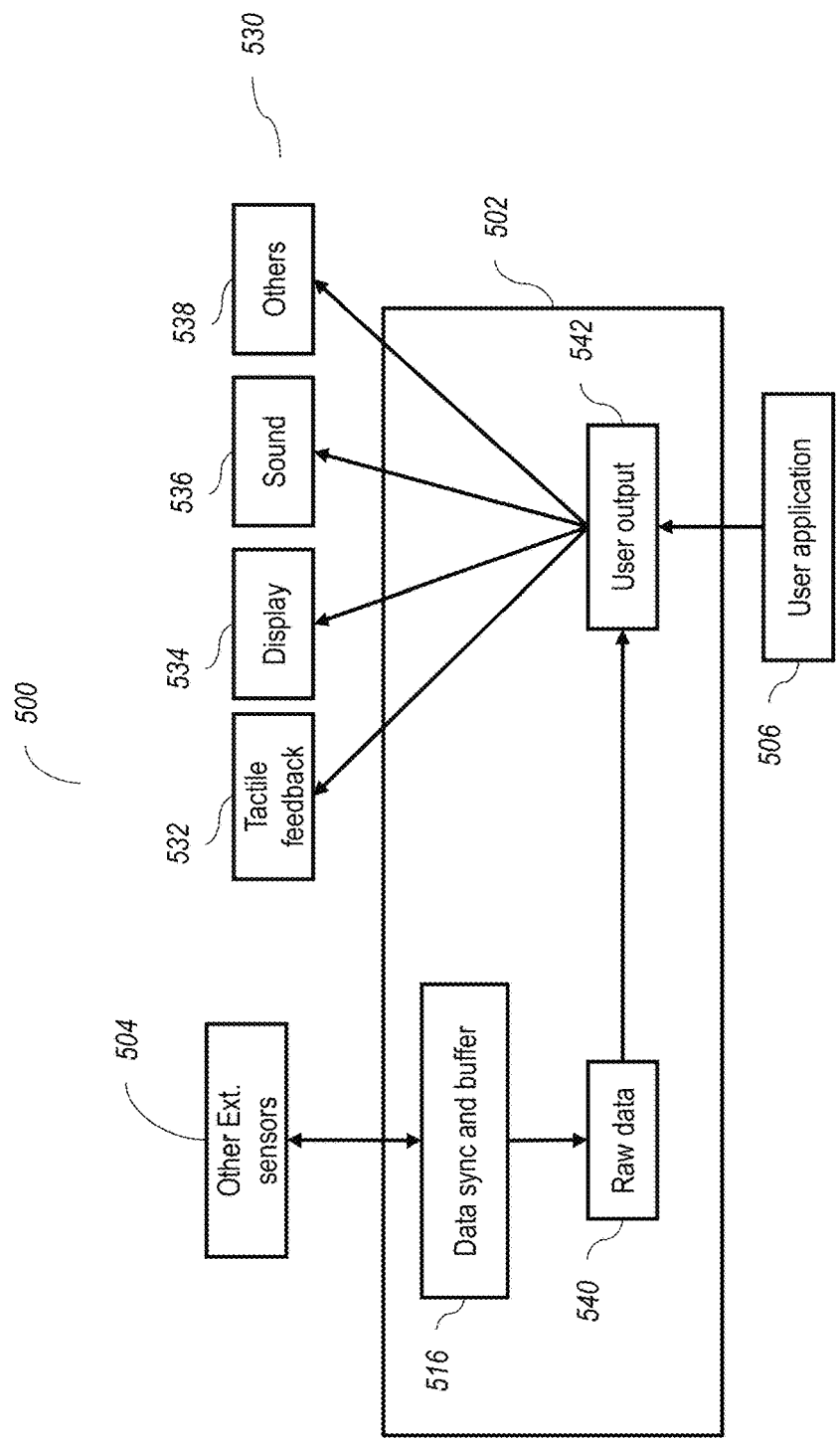

FIG. 5C shows the operation of the process 500 as it relates to additional external sensors 504 and output devices 530. Input from additional external sensors 504 may be transmitted to data sync and buffer 516, and then to a raw data processor 540, for example, for the display or other output device 530, that requires a raw pipe of data, optionally with minor modifications, to avoid sending all of the data to user application 506, which is operated by a slower computational device (thereby avoiding delay). Raw processor 540 could also optionally receive data from stereo camera 508 (not shown) as a raw feed. From raw data processor 540, the sensor input data can be sent to a user output controller 542 for being output to the user.

Output from user application 506 can also be sent to user output controller 542, and then to output devices 530. Non-limiting examples of output devices 530 include a tactile feedback device 532, a display 534, a sound output device 536 and optionally other output devices 538. Display 534 can display visual information to the user, for example, as part of a head mounted device, for example for VR (virtual reality) and AR (augmented reality) applications. Similarly, other output devices 530 could provide feedback to the user, such as tactile feedback by tactile feedback device 532, as part of VR or AR applications.

Figure 5D:
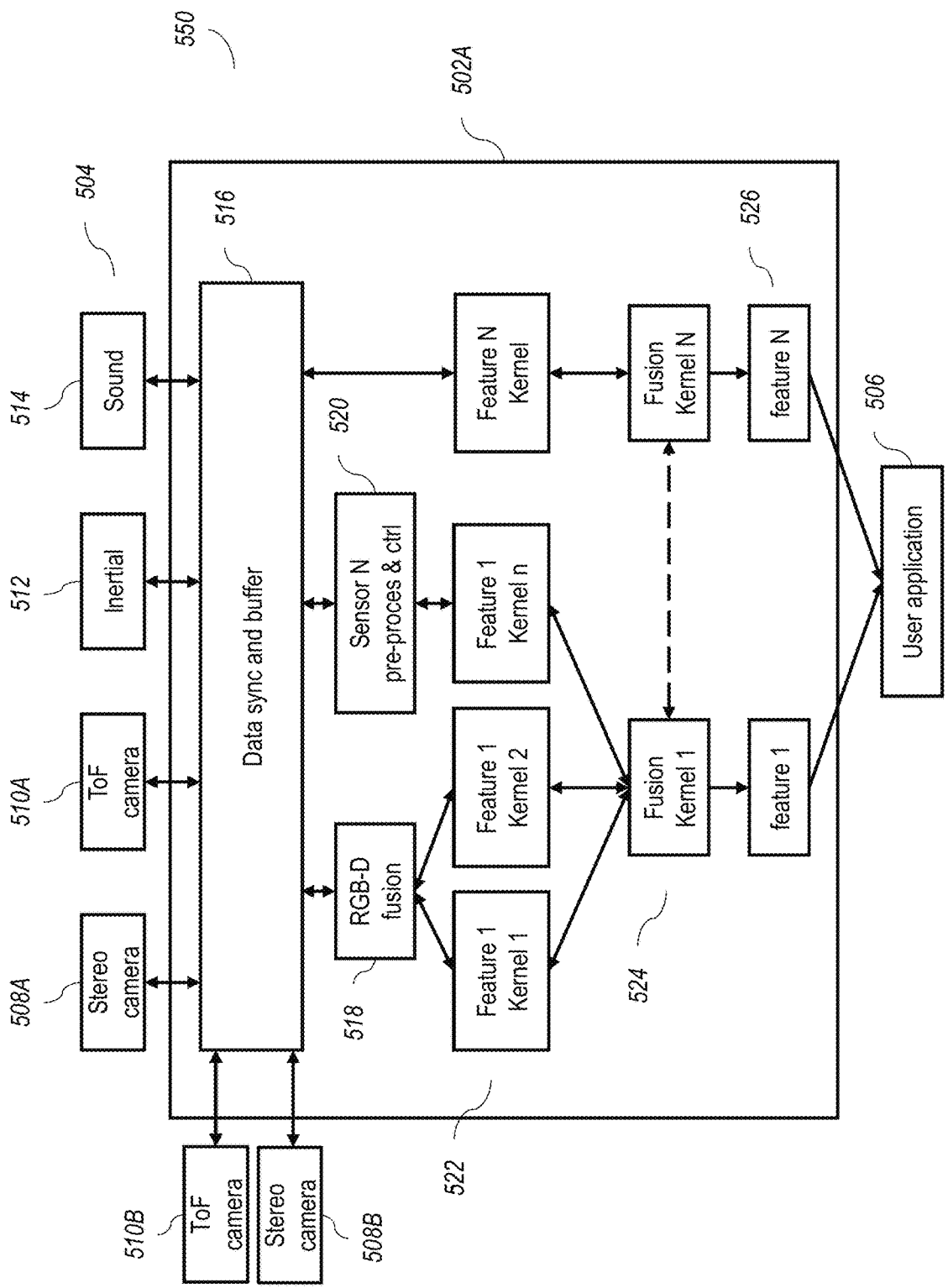

FIG. 5D shows the operation of a process 550 which features an additional stereo camera 508B and an additional ToF camera 510B. Stereo camera 508B and ToF camera 510B may be mounted on the head of the user as previously described. For this implementation, stereo camera 508B and ToF camera 510B would be the master devices, while stereo camera 508A and ToF camera 510A would be the slave devices. All of the devices would send their data to data sync and buffer 516; the process would then proceed as previously described. Again optionally only one of stereo camera 508B and ToF camera 510B is present, in which case preferably ToF camera 510B is present.

Figure 6A:
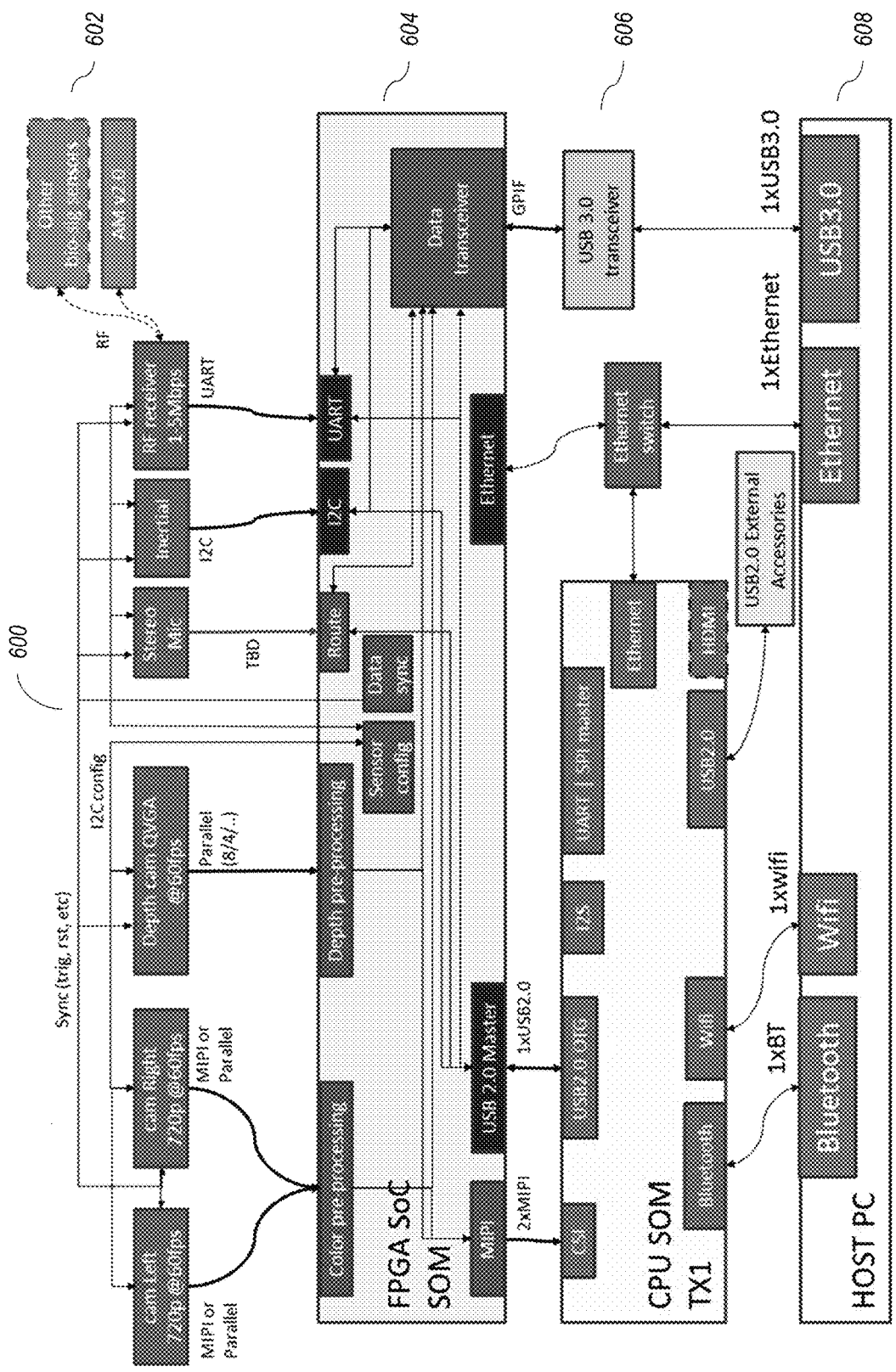
FIGS. 6A-6E shows a non-limiting example of a hardware system for the camera according to at least some embodiments of the present disclosure.
Figure 6B:
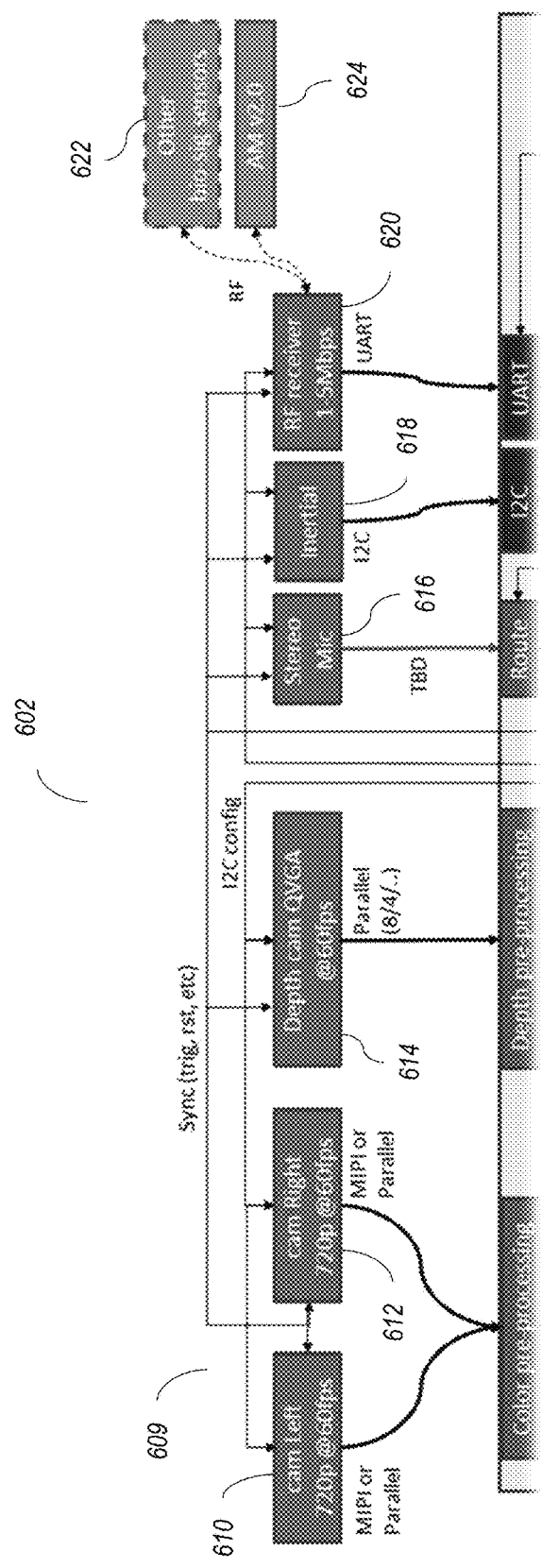

FIGS. 6A-6E show an exemplary, illustrative, non-limiting hardware system for the camera according to at least some embodiments of the present disclosure. FIG. 6A shows the overall hardware system 600, featuring a plurality of layers 602, 604, 606 and 608. Layer 602 features a plurality of inputs. Layer 604 features FPGA hardware, which may optionally function as described with regard to FIG. 5. Layer 606 relates to CPU hardware and associated accessories. Layer 608 relates to a host computer. FIG. 6B shows layer 602 in more detail, including various inputs such as a stereo camera 609, featuring a left camera 610 and a right camera 612, which in this non-limiting example, feature 720 pixels and 60 fps (frames per second). Each of left camera 610 and right camera 612 may communicate with the FPGA (shown in the next layer) according to a standard such as MIPI (Mobile Industry Processor Interface) or parallel communication.

A depth sensor 614 is shown as a ToF camera, in this non-limiting example implemented as a QVGA (Quarter Video Graphics Array) camera operating at 60 fps, which communicates with the FPGA according to parallel communication. Audio input may be obtained from a stereo microphone 616 as shown. An inertial sensor 618 may be used to obtain position and orientation data. A radio-frequency (RF) receiver 620 may be used to collect data from other external sensors, which may be worn by the user for example, such as a bio sensor 622 and an AM (active marker) sensor 624, as previously described.

Figure 6C:
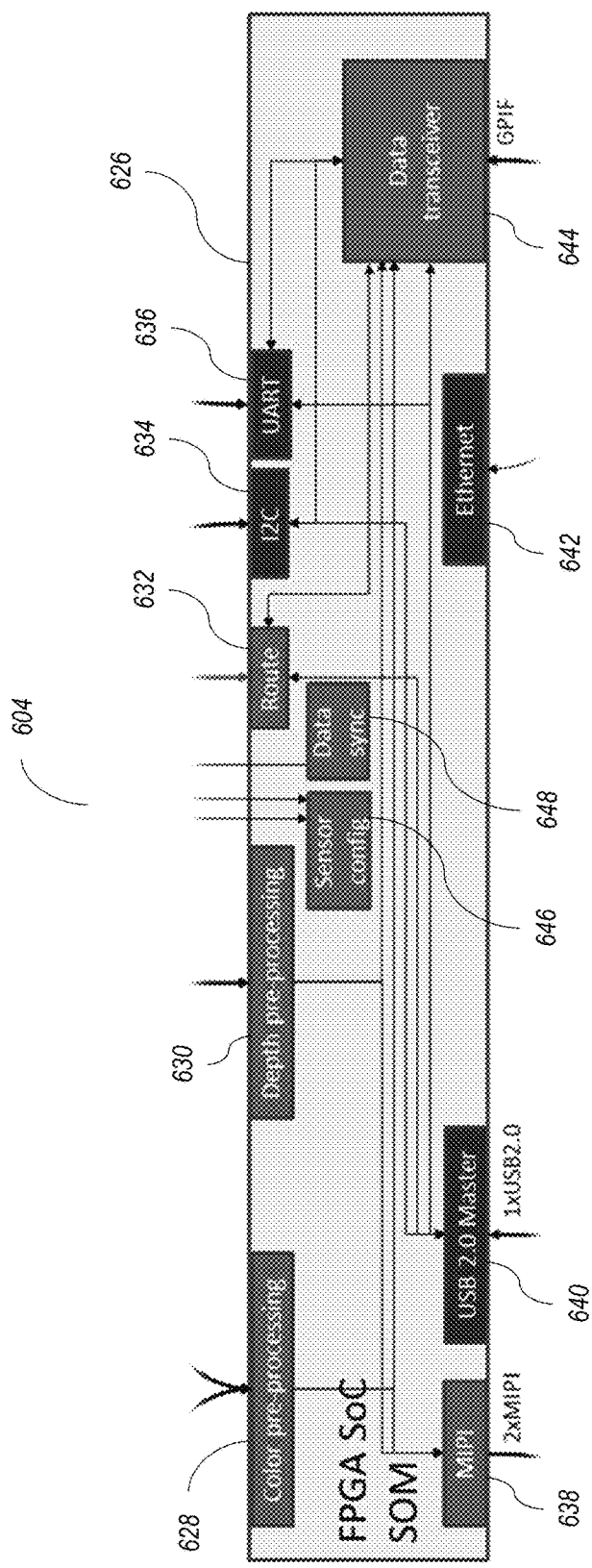

FIG. 6C shows layer 604, which includes a FPGA 626, which may operate as described with regard to FIG. 5. FPGA 626 may be implemented as an FPGA SoC SOM, which is a field-programmable gate array (FPGA) which features an entire system on a chip (SoC), including an operating system (so it is a "computer on a chip" or SOM—system on module). FPGA 626 includes a color preprocessing unit 628 which receives data from stereo camera 609, and which preprocesses the data as previously described, for example with regard to FIG. 3. A depth preprocessing unit 630 receives depth data from depth sensor 614, and preprocesses the data as previously described, for example with regard to FIGS. 3 and 4.

A sensor config 646 optionally receives configuration information from stereo camera 609 and depth sensor 614, for example, to perform the previously described synchronization and calibration of FIG. 3. Similarly, sensor config 646 optionally receives configuration information from the remaining sensors of layer 602, again to perform synchronization and calibration of the data, and also the state and settings of the sensors. Synchronization is controlled by a data sync module 648, which instructs all sensors as to when to capture and transmit data, and which also provides a timestamp for the data that is acquired. A route module 632 can receive input from stereo microphone 616, to convert data for output to USB 640 or data transceiver 644.

Inertial sensor 618 may communicate with FPGA 626 according to the I2C (Inter Integrated Circuit) protocol, so FPGA 626 includes an I2C port 634. Similarly, RF receiver 620 may communicate with FPGA 626 according to the UART (universal asynchronous receiver/transmitter) protocol, so FPGA 626 features a UART port 636. For outputs, FPGA 626 can include one and/or another of a MIPI port 638, a USB port 640, an Ethernet port 642 and a data transceiver 644.

Figure 6D:
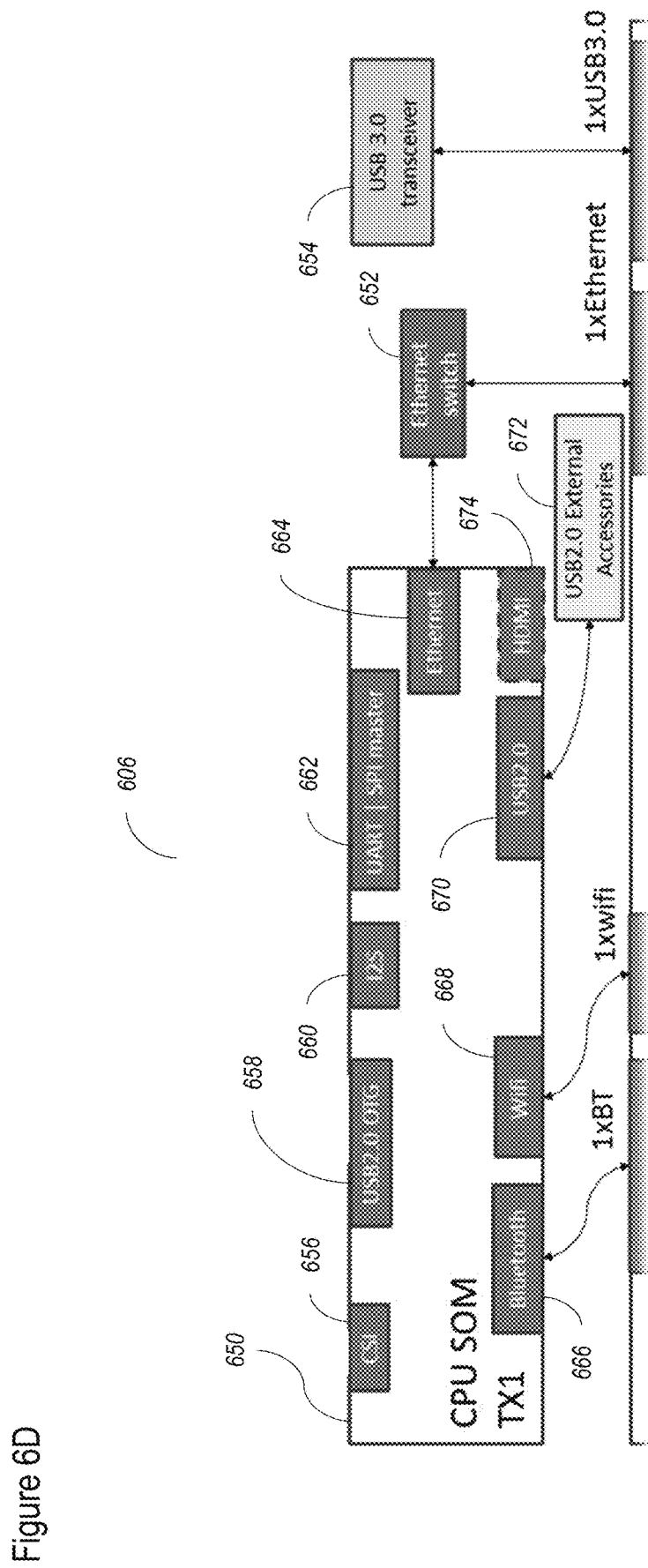

Turning now to FIG. 6D, the elements of layer 606 are shown, which can include one and/or another of a CPU 650, an Ethernet switch 652, and a USB transceiver 654. CPU 650 may handle calculations otherwise handled by FPGA 626 if the latter is temporarily unable to process further calculations, or to perform other functions, such as functions to assist the more efficient operation of a user application (which would be run by the host computer of layer 608). CPU 650 may be implemented as a SOM. Inputs to CPU 650 optionally include a CSI port 656 (for communicating with MIPI port 638 of FPGA 626); a USB port 658 (for communicating with USB port 640 of FPGA 626); an I2S 660 for transferring sound from the microphone; and UART/SPI master 662 for providing the RF receiver data to the CPU processors.

Figure 6E:
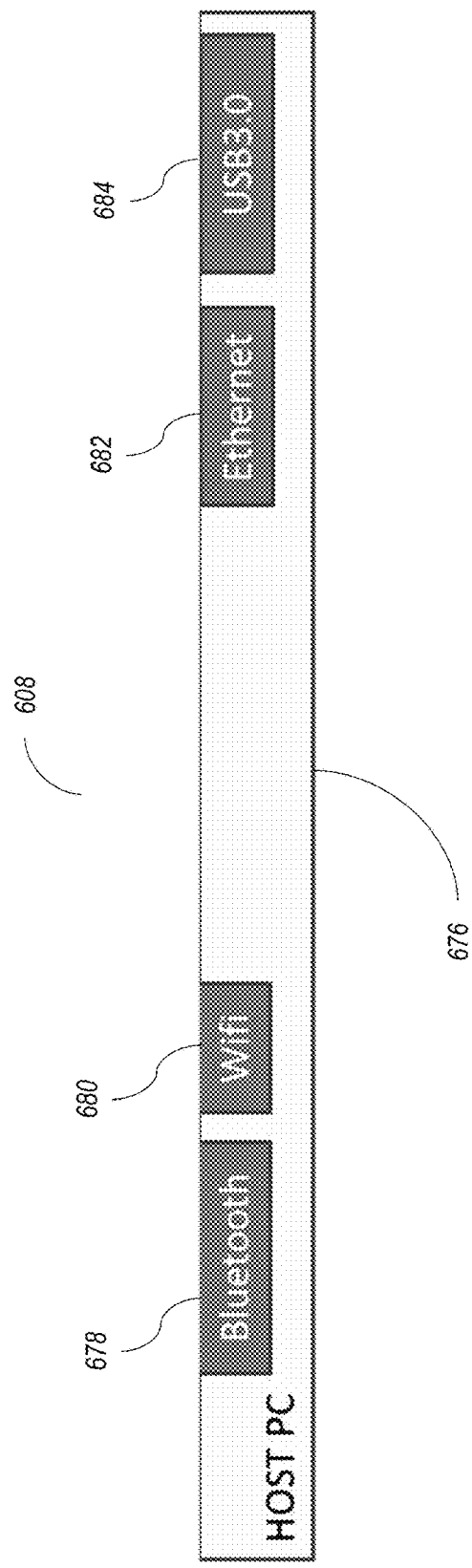

Also shown in FIG. 6D, a Bluetooth output 666 may be used to communicate with a Bluetooth port 678 of host computer 676 (shown in layer 608, FIG. 6E). Similarly, a WiFi output 668 may be used to communicate with a WiFi port 680 of host computer 676. USB port 670 may be used to communicate with external accessories through their ports 672. HDMI 674 can also be available for display connection. Ethernet switch 652 may be configured to handle communication from any one or more of Ethernet port 642 of FPGA 626, Ethernet port 664 of CPU 650, and also Ethernet port 682, of host computer 676 (shown in layer 608, FIG. 6E). Such communication may be bidirectional in these cases. Similarly USB transceiver 654 handles communication from data transceiver 644 of FPGA 626, as well as from USB port 684 of host computer 676 (shown in layer 608, FIG. 6E). Such communication may be bidirectional in both cases. FIG. 6E shows layer 608, the functions of which were previously described.

Figure 7:
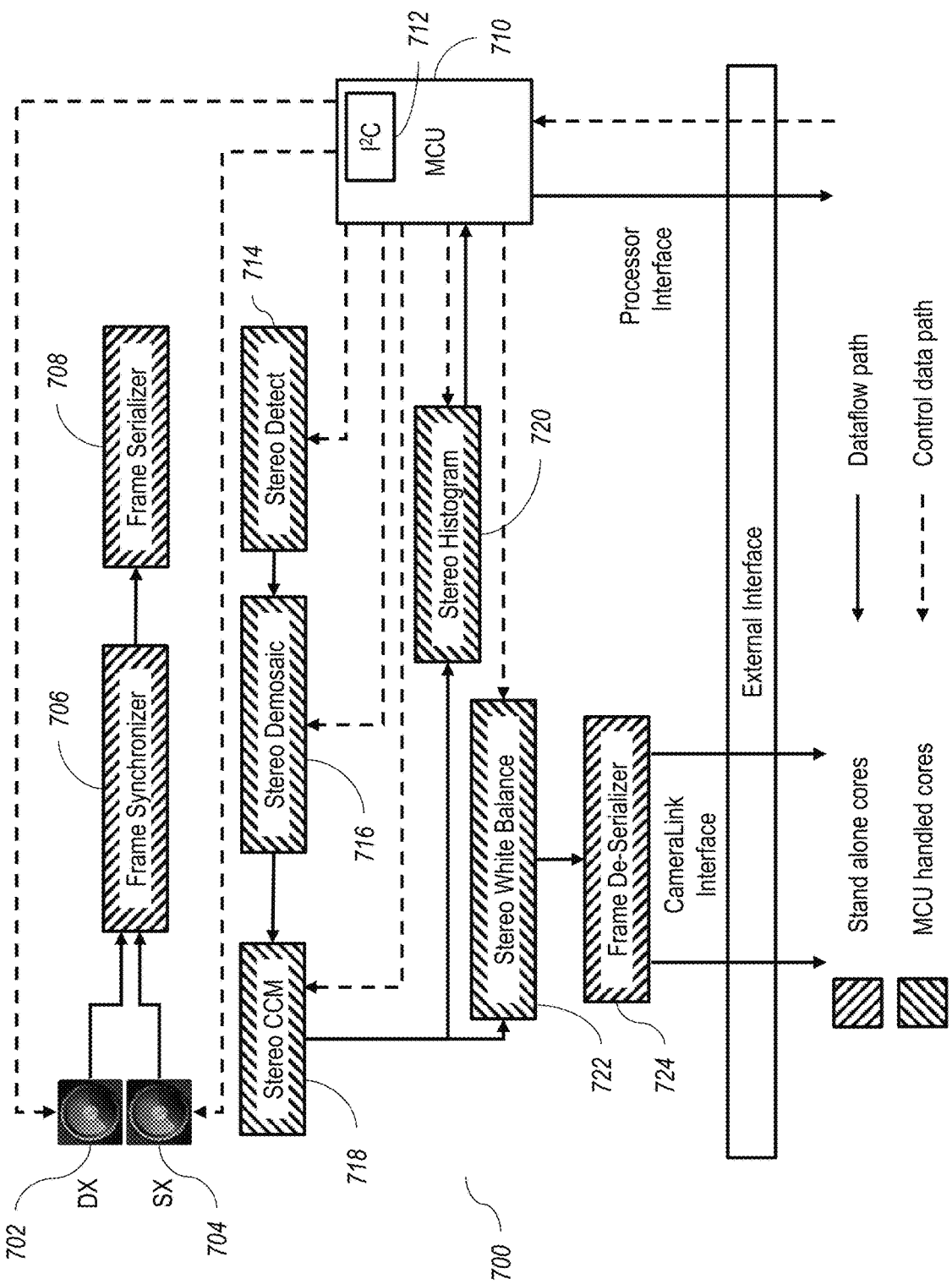
FIG. 7 shows a non-limiting example of a method for stereo processing according to at least some embodiments of the present disclosure.

FIG. 7 shows a non-limiting example of a method for stereo processing according to at least some embodiments of the present disclosure, the functionality of which may be contained within the FPGA of FIG. 6. As shown, a process 700 can start with input from left RGB camera 702 and right RGB camera 704, of RGB data as previously described. Such input may be sent to a frame synchronizer 706, which synchronizes frames between the two cameras to eliminate time shift. This task may be performed in two stages. In a first stage, the input flows are sampled in such a way that they are synchronized with the same clock. In a second stage, a state machine detects which flow is in advance with respect to the other one so that it directs this flow toward a First Input First Output (FIFO). In this way, the first flow reaching frame synchronizer 706 is delayed until the other data flow reaches frame synchronizer 706 as well. Additional details are provided below.

A frame serializer 708 serializes the frame data as a sequence of bytes and the serialized data is passed to a stereo detect module 710, which performs the previously described "bad" or non-usable pixel detection. The data then undergoes a de-mosaic process 716, which is described in greater detail below and which involves constructing a complete set of color data from the incomplete color samples obtained previously. Thereafter, the data may then pass to a CCM (color correction matrix) process 718, described in greater detail below, which corrects deficiencies in the color data. Thereafter, the data may be adjusted for white balance in a white balance process 722, also described in greater detail below, and thereafter, can undergo a frame deserialization process 724 to restore the frame structure of the data.

Data from CCM process 718 can then be passed to a histogram process 720, which enables autoexposure and/or autogain adjustments (see below). Histogram data may be sent to an MCU 710, which performs any necessary adjustments to histogram process 720. MCU 710 also sends feedback to left RGB camera 702 and right RGB camera 704, to adjust their function according to the histogram data.

As shown in FIG. 7, I2C 712 can be configured to control the register of the camera. An I2C is a multi-master, multi-slave, packet switched, single-ended, serial computer bus which is well known in the art.

Figure 8:
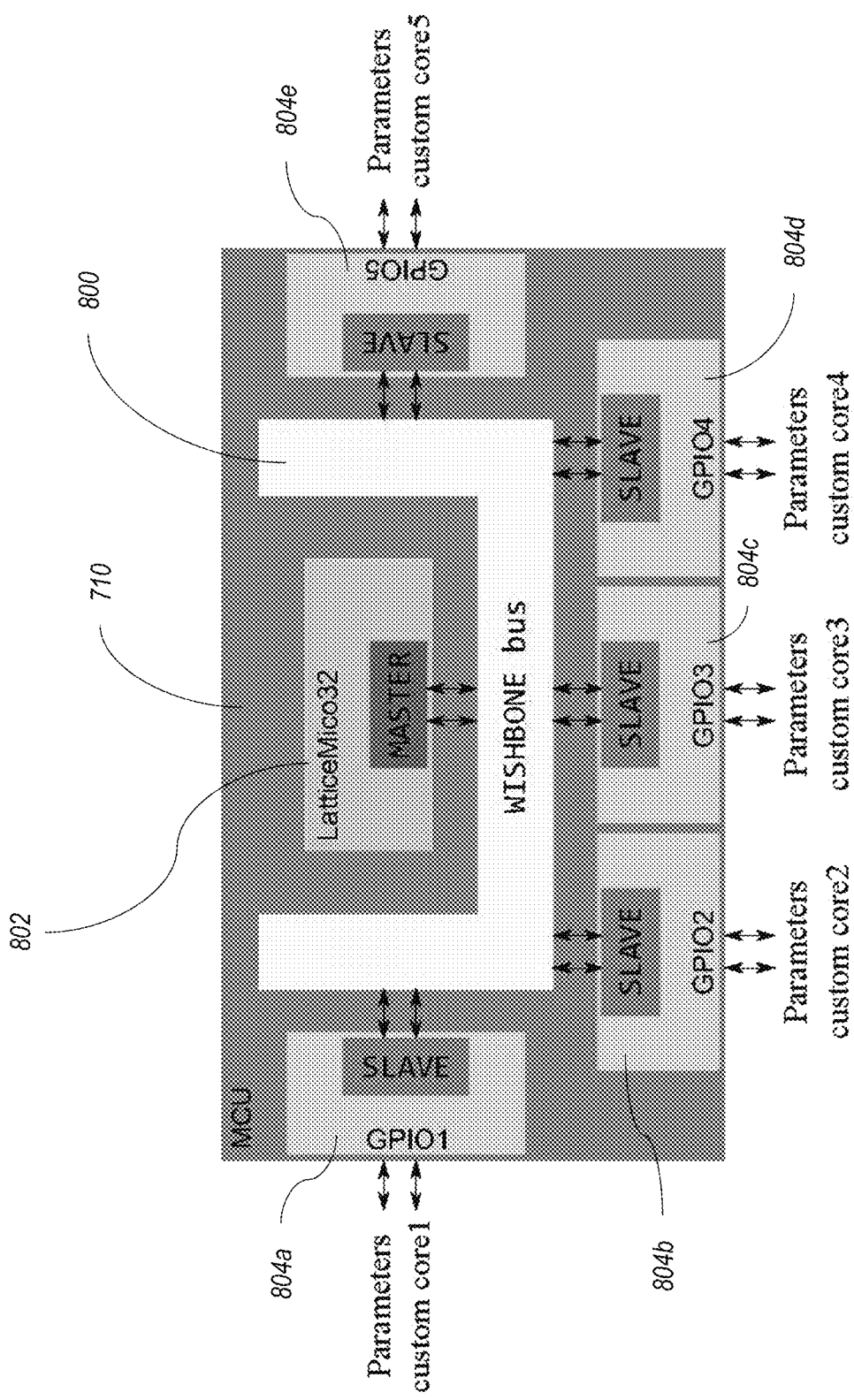
FIG. 8 shows a non-limiting example of a MCU configuration according to at least some embodiments of the present disclosure.

FIG. 8 shows a non-limiting example of a MCU (microcontroller, i.e., a processor) configuration according to at least some embodiments of the present disclosure. Optionally, a similar configuration could be used for a CPU structure (additionally or alternatively). As shown, MCU 710, which may for example be implemented with the process of FIG. 7, features a bus 800, which is connected to a master 802 and a plurality of slave units 804, shown as slave units 804a to 804e, which handle custom parameters to communicate with custom cores. The custom cores can, for example, be used for RGB preprocessing, to configure and control the various components and functions of the RGB preprocessing (as previously described). MCU 710 can also be configured to control each kernel as previously described with regard to FIG. 5.

Master 802 may be implemented by using, for example, the Lattice Semiconductors™ product, in which case the GPIO (General Purpose Input Output) core is implemented for slave units 804. Bus 800 may be implemented according to the Wishbone protocol, which is an open source interconnect architecture maintained by OpenCores organization (https://opencores.org/opencores.wishbone).

Configurable parameters can be sent to custom cores by means of the hardware implemented processor, e.g., LatticeMico32™ as master 802, which is based on a 32-bit Harvard RISC architecture and the open bus WISHBONE. For communication within MCU 710, such communication always occurs between a MASTER interface and a SLAVE interface. In some embodiments, only MASTER unit 802 can begin communications. Master unit 802 performs a handshake with slave 804 through bus 800, after which communication can occur.

Figure 9:
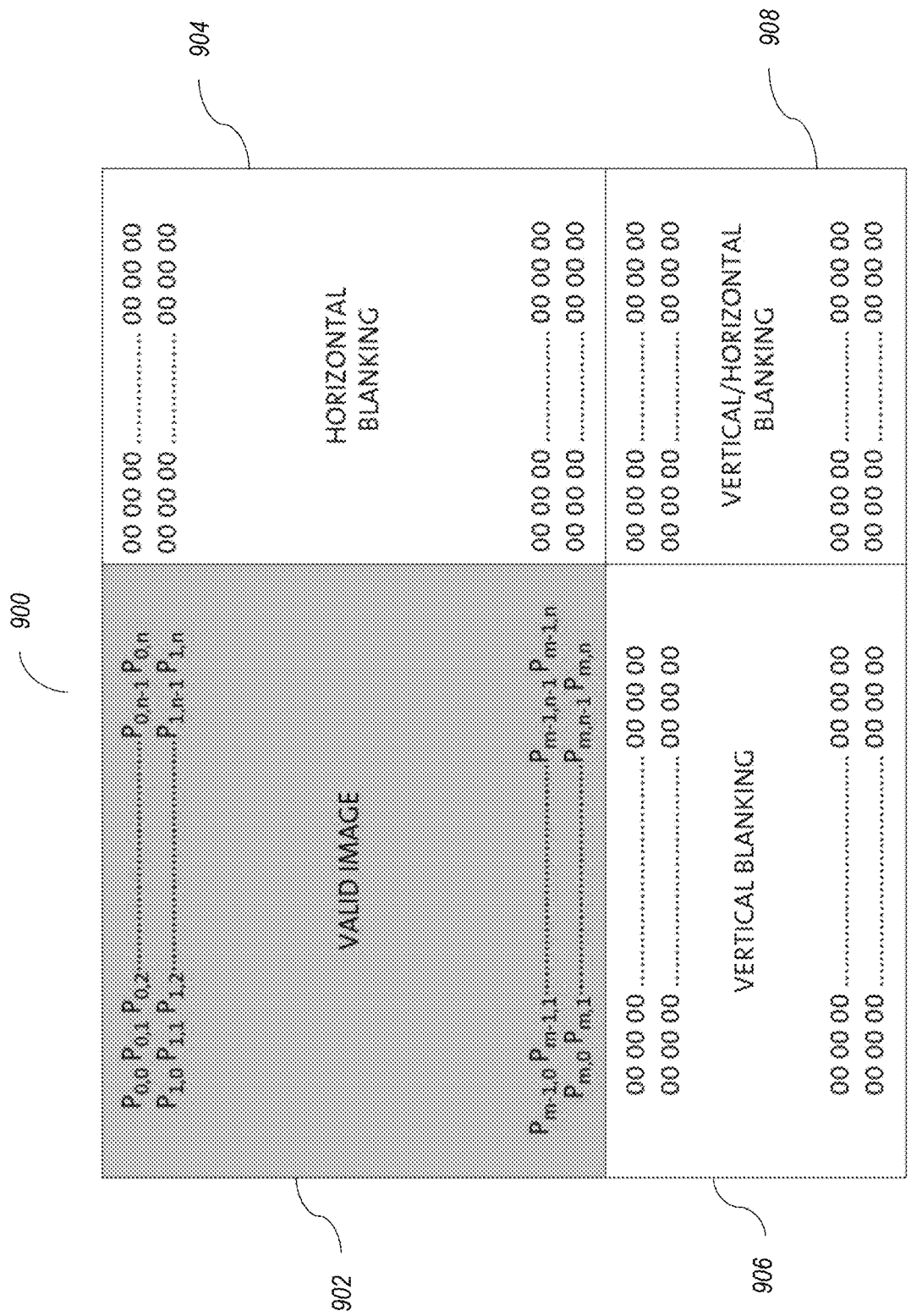
FIG. 9 shows a non-limiting example of a camera according to at least some embodiments of the present disclosure.

FIG. 9 shows illustrative aspects of an example of a camera according to at least some embodiments of the present disclosure, including a camera readout schematic 900, a frame active area 902, horizontal blanking 904, vertical blanking 906 and horizontal/vertical blanking 908.

Figure 10:
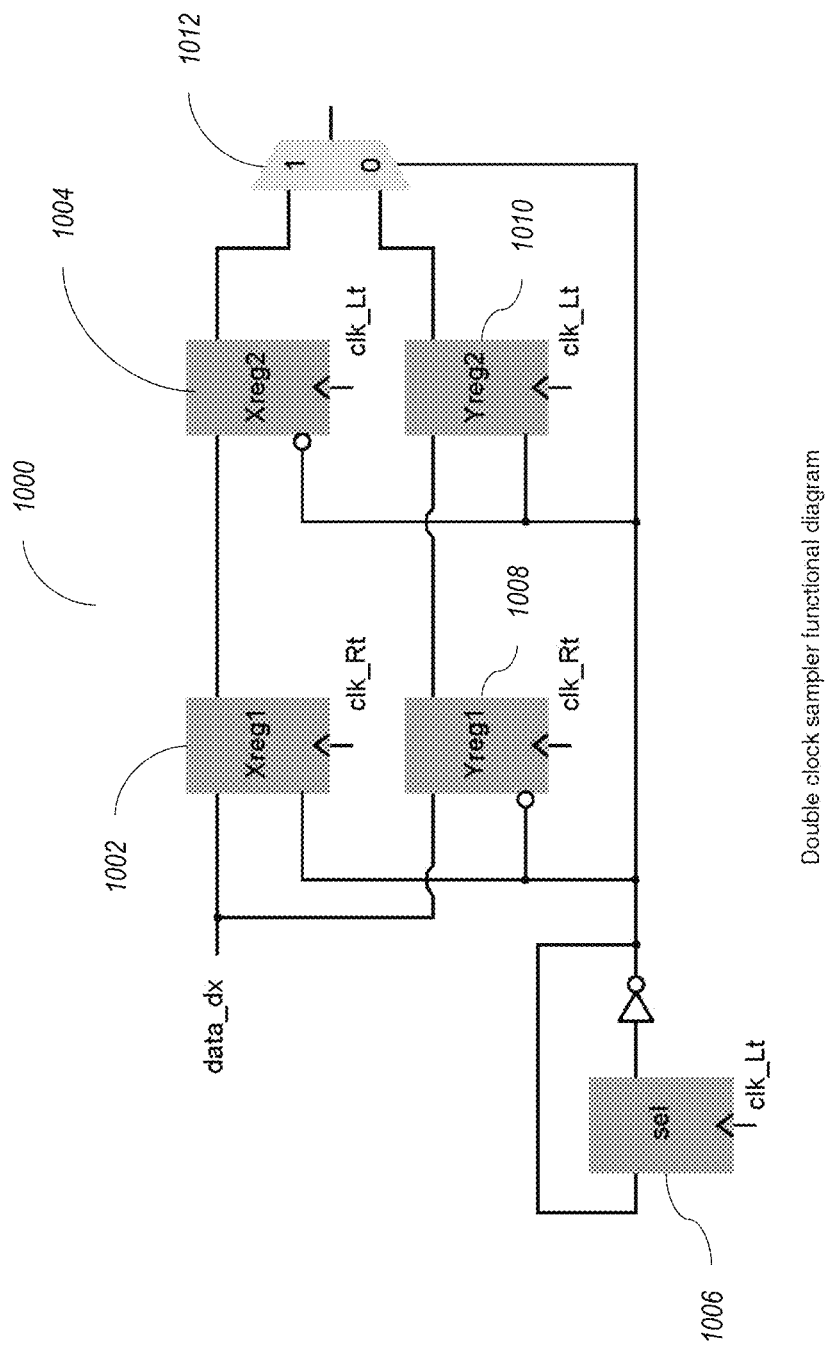
FIG. 10 shows a non-limiting example of a configuration for double clock sampler functions according to at least some embodiments of the present disclosure.

FIG. 10 shows a non-limiting example of a configuration for double clock sampler functions according to at least some embodiments of the present disclosure. Such functions are desirable because of the need to synchronize different clocks, for example between the right and left cameras as described herein. In order to perform clock synchronization, a double clock module 1000 is provided in which a first layer of registers (Xreg1 (1002) and Yreg1 (1008)) sample data from the right camera (not shown) using its own clock signal (clk_Rt), while second layer of registers (Xreg2 (1004) and Yreg2 (1010)) sample data from the left camera (not shown) using left clock instead (clk_Lt). The left clock can be used as the overall module clock for double clock module 1000. Signal sel (1006) alternatively activates a pair of registers Xreg1-Yreg2 or Yreg1-Xreg2. In this way, data has time to reach stable state in first layer before to be sampled by second one. Finally data can be synchronized to the first left camera clock when outputted from multiplexer, which selector is connected to the sel signal from 1006.

Figure 11A:
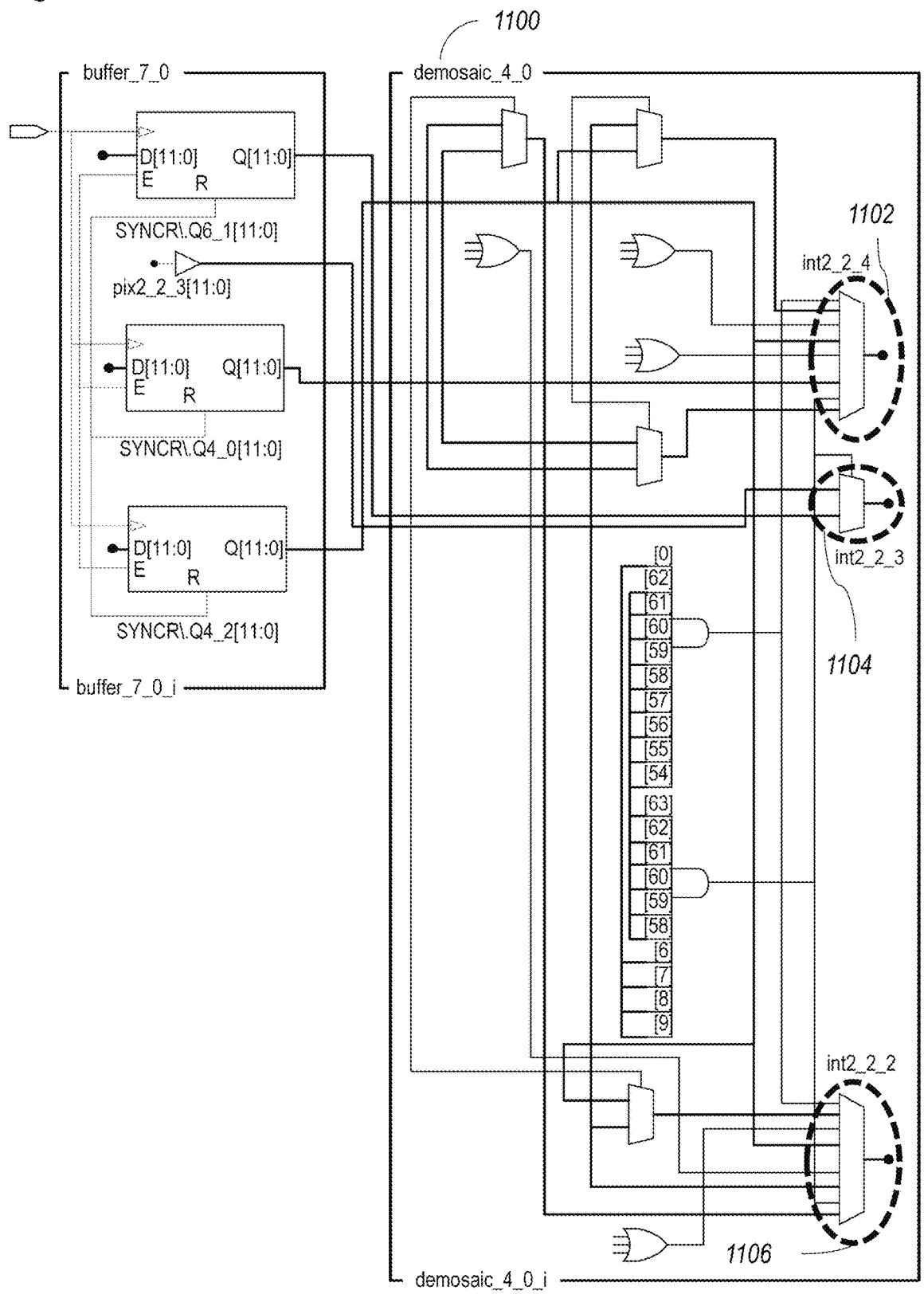
FIGS. 11A and 11B show a non-limiting example of a buffer configuration according to at least some embodiments of the present disclosure.
Figure 11B:
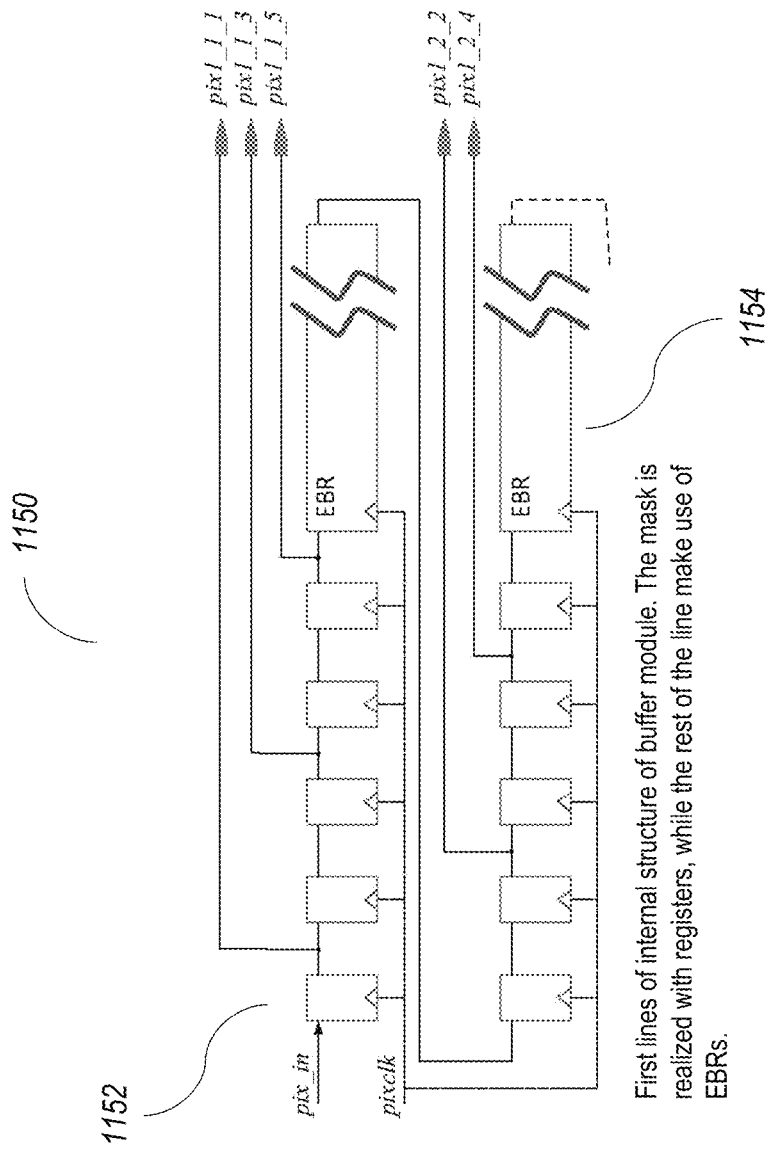

FIGS. 11A and 11B show non-limiting buffer configurations according to at least some embodiments of the present disclosure, which for example may be used to fulfill the buffer requirements of the FPGA and/or optionally of various modules as described herein. FIG. 11A shows an exemplary buffer configuration 1100, featuring muxs, highlighted in circles, generating int2_2_2 (1102), int2_2_3 (1104), and int2_2_4 (1106) signals, which are replications of moving window cells. When a moving window has its center placed on the edge of a frame, outside corner information may be missing from the frame. For this reason, the replication of the last 2 rings can be chosen as the strategy to avoid data loss. Replication includes providing the same information to more than one cell of a moving window a plurality of times, which can be accomplished by using muxs, as shown in FIG. 11A. Such a buffering system is used for example for the de-mosaic and detect modules.

FIG. 11B shows a portion of the internal structure of the buffer module 1150—the first lines of the internal structure of buffer module. The mask is realized with registers 1152, while the rest of the line makes use of EBRs 1154.

The moving windows can comprise data registers 1152, which allows moving mask to have all cells accessible at same time. The remaining part of each line may be realized with EBRs 1154, which behave as FIFO registers. Each EBR 1154 preferably comprise 18 Kbit RAM. According to available memory configuration, this buffer is capable of handling a frame having maximum width of 2053 pixels (2 EBRs 1154 per line are adopted in configuration 1024×18). In order to maintain original synchronization, FV and LV signals entering in the buffer have to be properly delayed at output. In some embodiments, the first entering pixel through pix_in input comes out from pix_TEST after about 2 frame lines (see FIG. 12). FV and LV time shift is achieved by using EBRs 1154 and a control state machine. The control state machine could be implemented for example as shown in FIG. 11A; and may be configured to control a counter connected to read/write address input of EBRs 1154.

FIGS. 12A-C show non-limiting examples of an internal buffer cells arrangement. FIG. 12A shows a global structure 1200 in which the previously described EBRs are implemented as embedded block RAM 1202. A general mask 1204 is shown as implemented in LUT4 based cells including mask cells (gray) and cells that are not externally accessible (blue). The specific details of the mask cells vary according to the functions of the mask. For example, FIG. 12B shows a non-limiting mask 1220 for defective pixel detection, which is performed as previously described. FIG. 12C shows a non-limiting mask 1222 for the de-mosaic task, which is performed as previously described and also as described below.

Figure 12D:
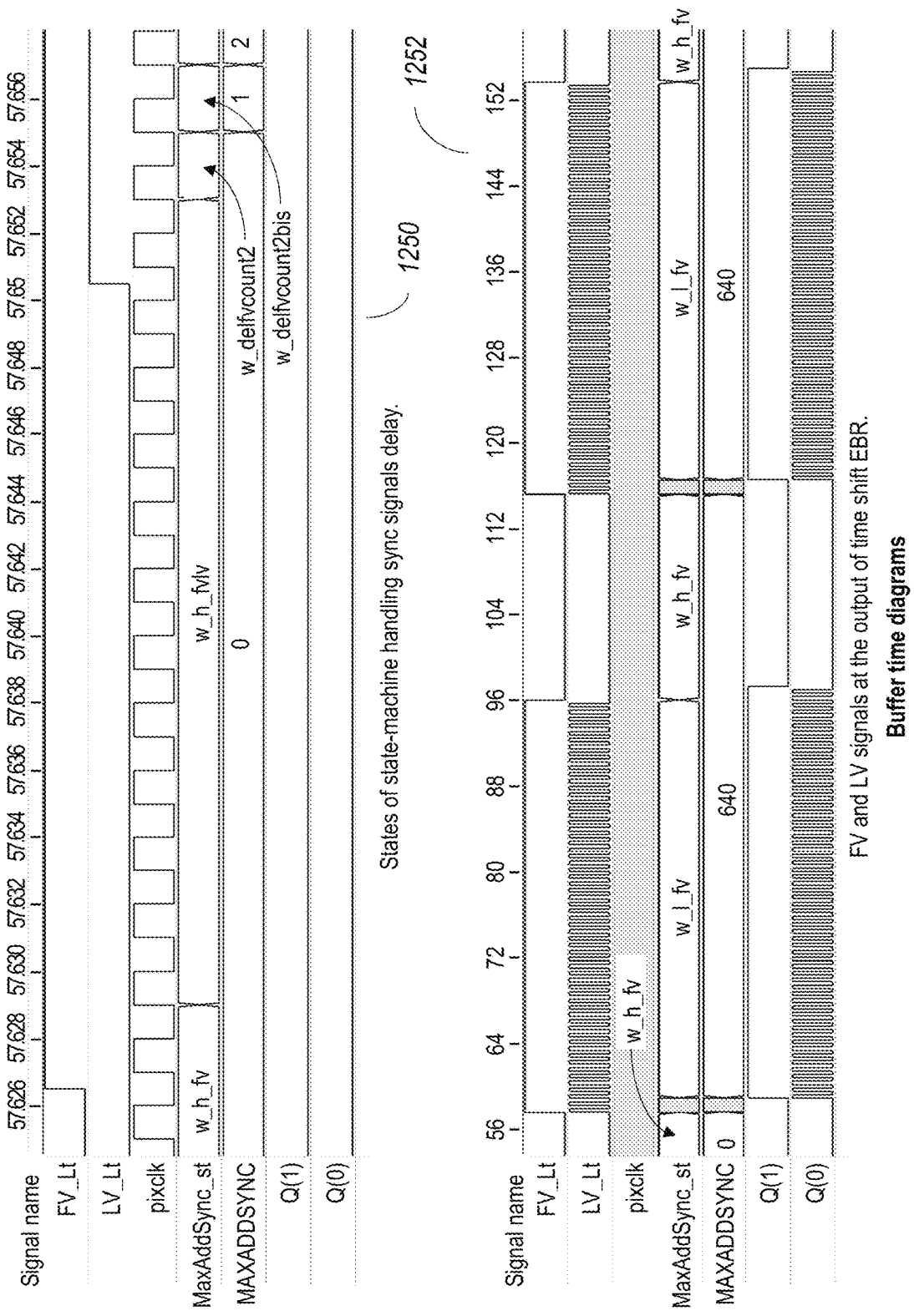

FIG. 12D shows exemplary state machines of the output synchronization signals, according to some embodiments. Diagrams of state machines 1250 and 1252 show the waveforms of sync signals and logic state of the controller. State machine 1250 relates to states of state-machine handling sync signals delay, while state machine 1252 relates to FV and LV signals at the output of time shift EBR. Each state machine starts in W_H_FV, waiting for FV being asserted. Once this occurs, the state changes to W_H_FVLV, to wait for both FV and LV being asserted. When FV and LV are in high state, a counter is started keeping track of how many clocks are needed to delay signals of 2 frame lines. This can be achieved by alternatively jumping between W_DelFV-Count2 and W_DelFVCount2bis (which increments the counter). The counter stops when two entire rows (horizontal blanking included) are output. The number of clocks can be stored in register MAXADDSYNC. In order to take into account possible resolution changes when a new frame starts, the state machine always resets the counter to update MAXADDSYNC.

FIGS. 13A-13H show non-limiting examples related to a method for performing the de-mosaic task according to at least some embodiments of the present disclosure, involving constructing a complete set of color data from the incomplete color samples obtained previously. This module uses moving windows to perform its task and is equipped with a buffer module to coordinate signals used to identify the formula to apply on pixel under test. In particular the cases incurred are:

R pixels: G and B values will be calculated;
G pixels at rows containing R pixels: R and B values will be calculated;
G pixels at rows containing B pixels: R and B values will be calculated;
B pixels: G and R values will be calculated.

The operation of the de-mosaic module (described below), but briefly a set of formulas are given below. FIGS. 13A and B show masks on which the algorithm is performed, including in FIG. 13A G values at R(B) place or B(R) values at R(B) place; and in FIG. 13B, R(B) at G places. B(R) values in R(B) sites, FIG. 13A:

$$B_d/R_d = G_d + \frac{1}{4}(2\_2 + 2\_4 + 4\_2 + 4\_4) - \frac{1}{4}(2\_3 + 4\_3) - \frac{1}{4}(3\_2 + 3\_4)$$

G values in R(B) sites, FIG. 13A:

$$G_d = \frac{1}{2}\text{TEST} + \frac{1}{4}(2\_3 + 4\_3) + \frac{1}{4}(3\_2 + 3\_4) - \frac{1}{8}(1\_3 + 5\_3) - \frac{1}{8}(3\_1 + 3\_5)$$

R(B) in RG(BG) rows at G sites, FIG. 13B:

$$R_{d\_rg}/B_{d\_bg} = \frac{1}{2}\text{TEST} + \frac{1}{2}(3\_2 + 3\_4) - \frac{1}{8}(2\_2 + 2\_4 + 4\_2 + 4\_4) + -\frac{1}{8}(3\_1 + 3\_5) + \frac{1}{4}\text{TEST}$$

Figure 13C:
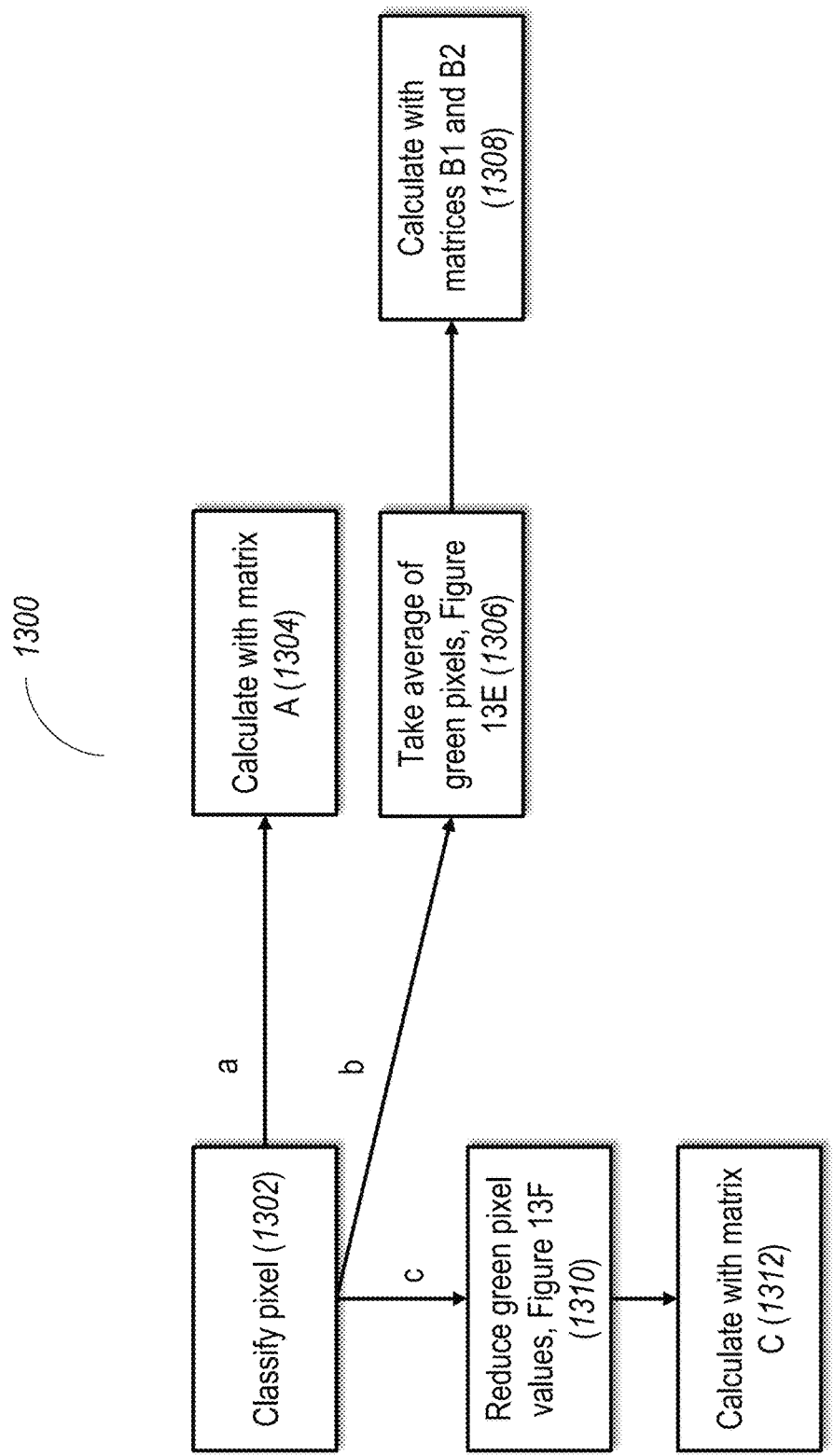
Figure 13E:
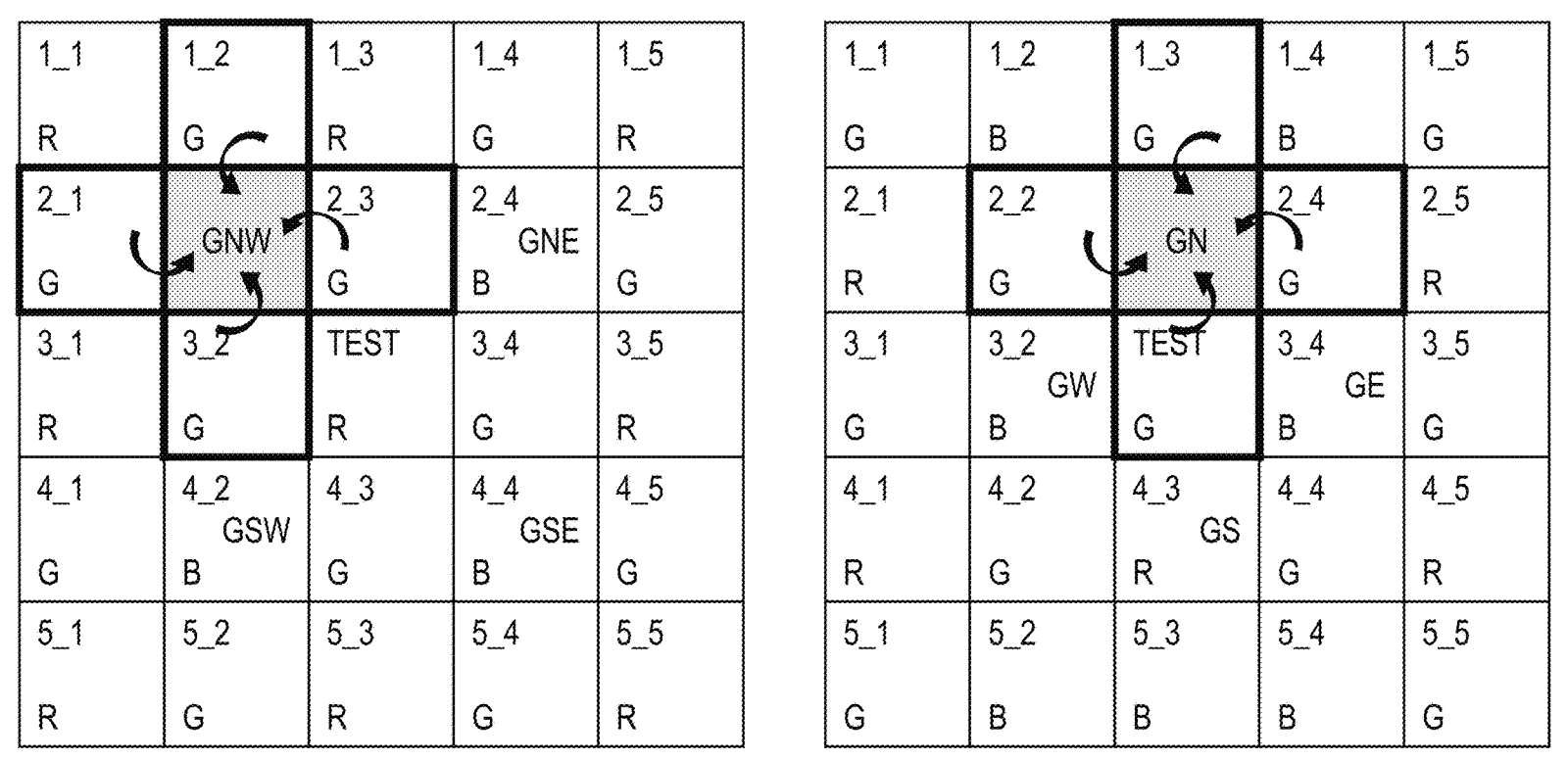

FIG. 13C shows the de-mosaic algorithm in an exemplary implementation, in more detail, to determine the missing green values. This implementation simplifies multiplications and division by reducing them to only shift operations. A de-mosaic process 1300 starts with classifying a pixel 1302. For the value of G (green) at R (red) and B (blue) sites (classification a), matrix A is used in 1304. All matrices are shown in FIG. 13D. The convolution matrices shown as matrices B1 and B2 are used for classification b, for R(B) at B-G(R-G) sites (matrix B1) and for R(B) at R-G(B-G) sites (matrix B2), to take the average of the green pixels surrounding the red and blue sites in 1306 and to apply the convolution matrices B1 and B2 in 1308. The method as performed on the pixels is shown in FIG. 13E.

Figure 13F:
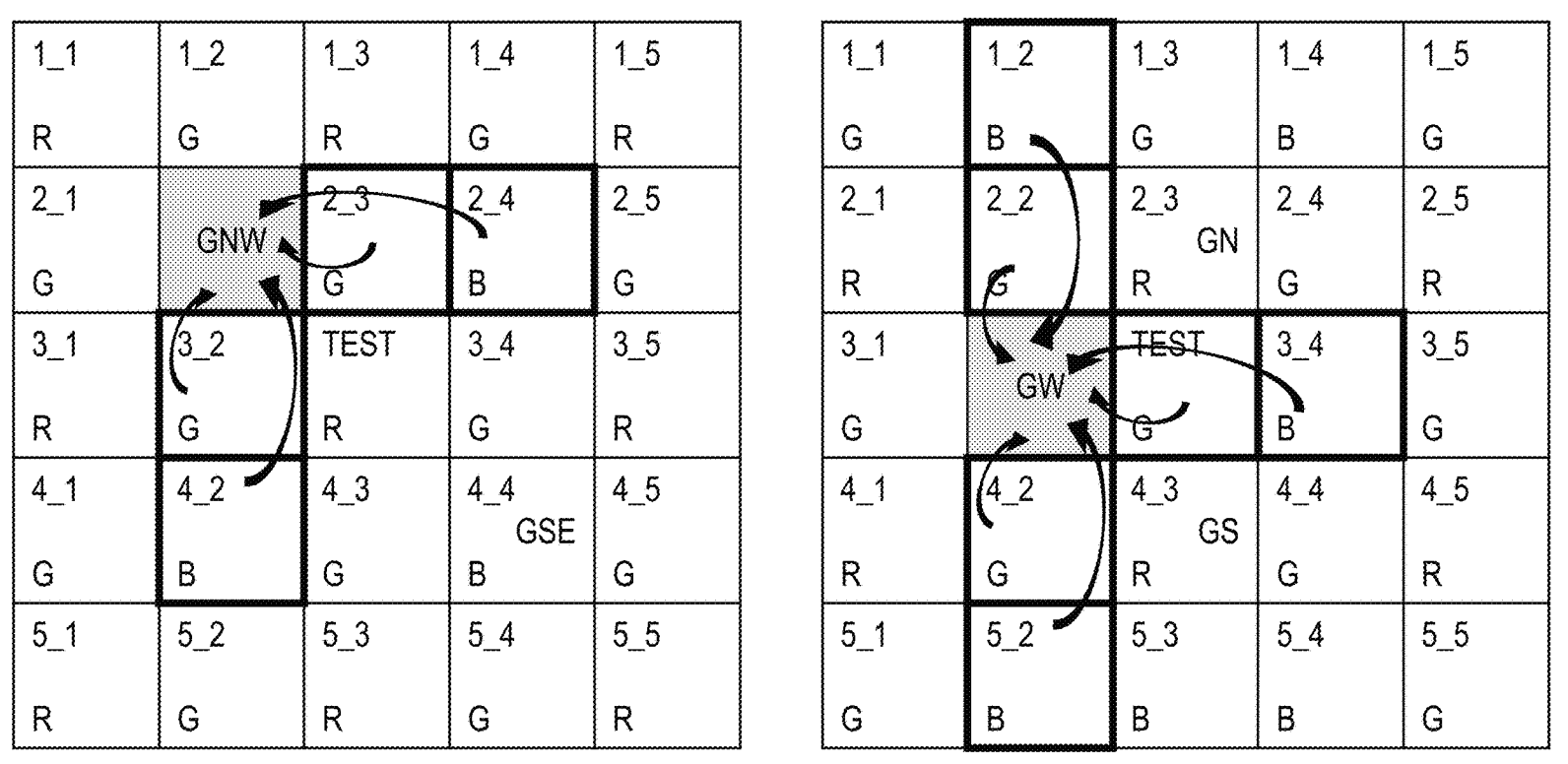

The remaining classification is classification c, in which the number of green pixel values is reduced to fit in a 5×5 window in 1310, and matrix C is applied as the convolution matrix in 1312. This classification is applied for R(B) at B(R) sites, which are the remaining cases. The method as performed on the pixels is shown in FIG. 13F.

Figure 13G:
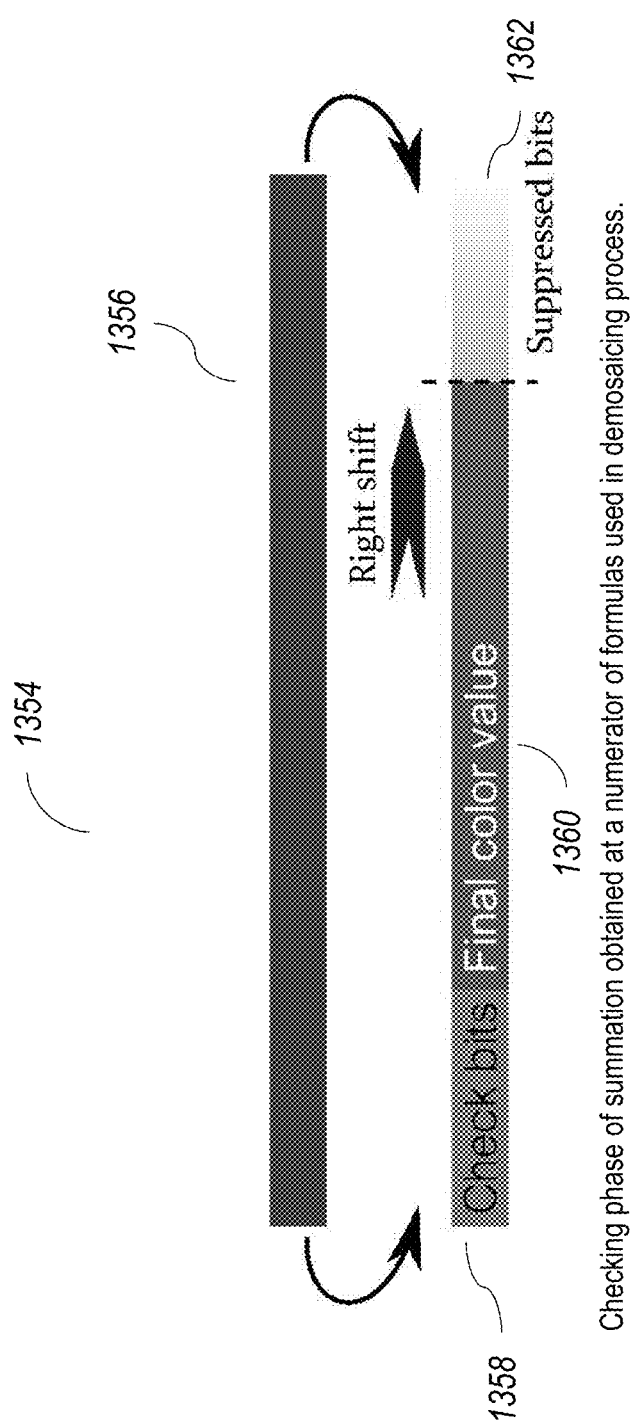

FIG. 13G shows the checking phase of summation obtained at a numerator of formulas used in a de-mosaicing process, for handling truncation, according to some embodiments. When maximum pixel width is adopted (12 bits) pixel, values can range from 0 up to 4095. In order to avoid premature truncation during partial calculations steps, each term can be carefully sized as to contain signed summations. Nevertheless, under certain conditions, overflow or underflow may occur in final result, hence a truncation mechanism can be required.

Process 1354 features a truncation mechanism, in the last calculation phase: a vector 1356 containing the summation resulting from operation performed on numerator of one of the above equations for de-mosaicing, which is right shifted. The control may be performed on the most left bits 1358 just before final color value begins. First, it is determined whether the bits are all equal to zero, so as to ensure that the result is on the correct range. As 2's complement convention is used for negative number representation, if first bit is 1 the final value will be set to 0 (as a negative color value does not make sense). On the other hand, if first bit is null, but the others bits preceding final result interval are not all zero, then result incurred in overflow. In this case, the final result will be truncated to 4095 (if 12 bits format is used). The final color value is shown in 1360, while suppressed bits are shown in 1362.

Figure 13H:
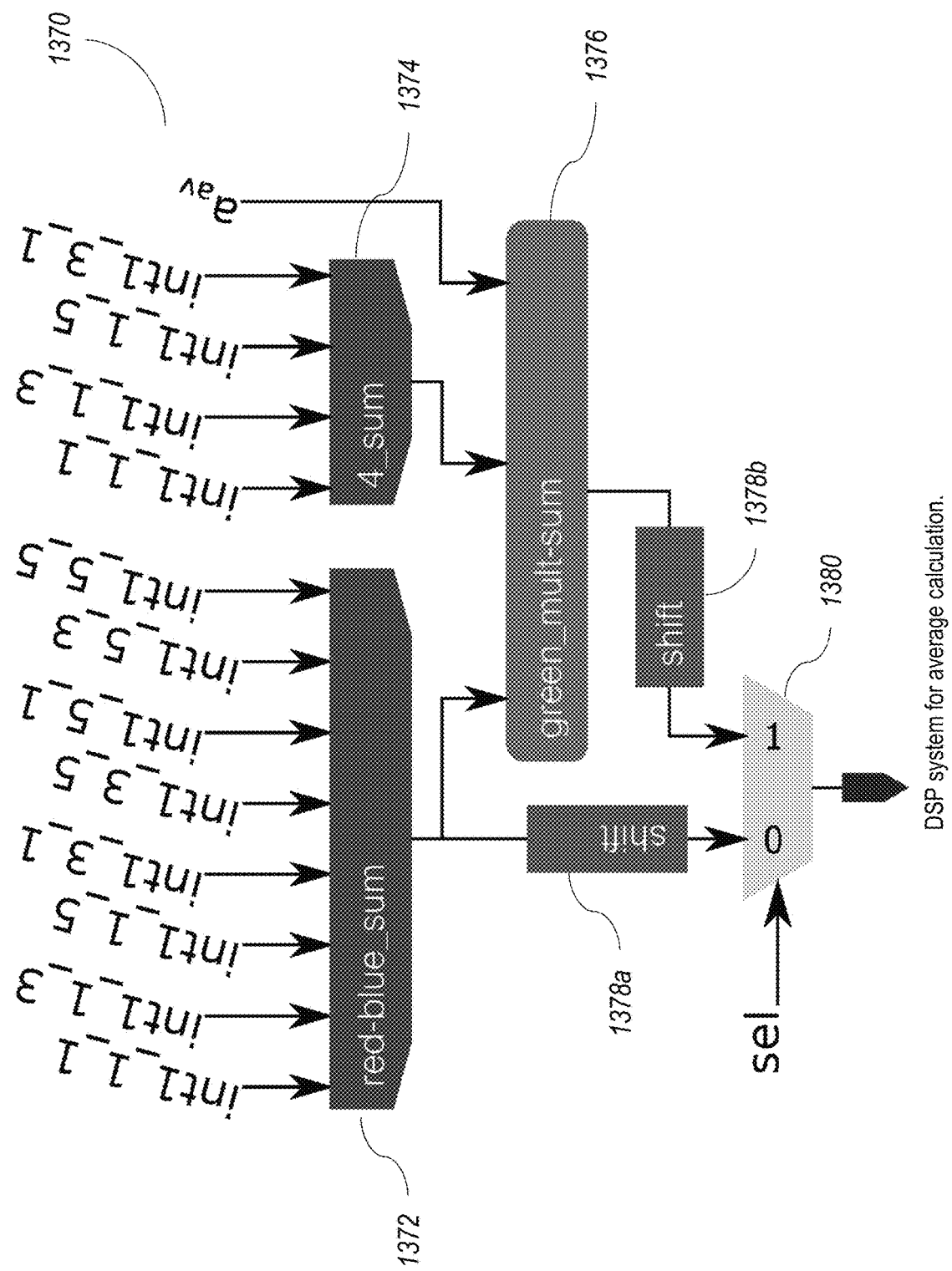

FIG. 13H shows a non-limiting example of a DSP configuration for RGB processing as described above according to at least some embodiments of the present disclosure. Accordingly, a configuration 1370 features DSP modules red-blue_sum 1372 and 4_sum 1374 which are optimized adders accepting 8 and 4 terms respectively. A trivial shift by 8 (1378a) allows to obtain the average at R and B pixel sites. On the other hand, average of G sites is obtained through green_mult-sum 1376 which sums the results of the two adders and multiplies their result by aav; a shift (1378b) finalizes the calculation. Depending on the color of the investigated pixel, sel signal 1380 assumes high or low logic state to select the right average to compare it with. The average in G sites requires more process stage cycles than for R/B ones. Hence in order to obtain both results at same time, the latter average is delayed using register sequence, controlled by 1380.

Figure 14:
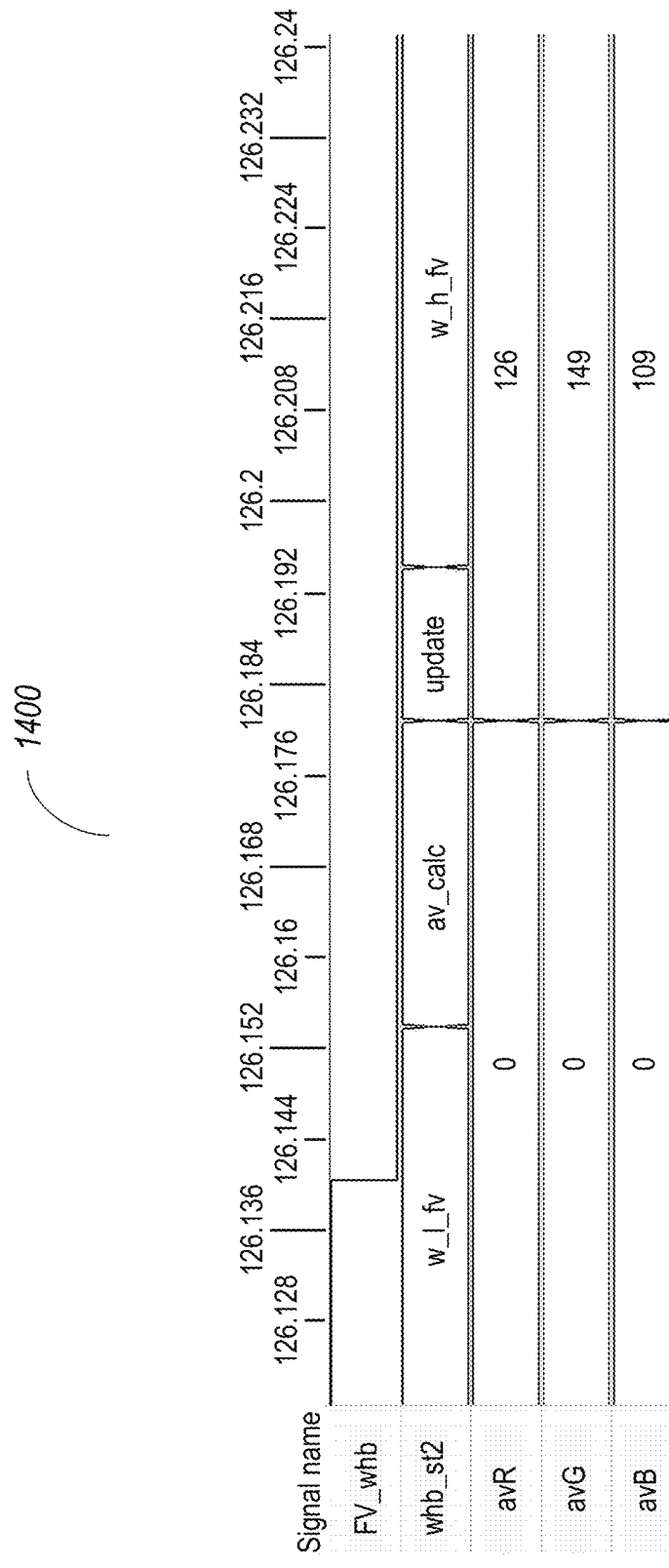
FIG. 14 shows a non-limiting example of a method for white balance correction according to at least some embodiments of the present disclosure.

FIG. 14 shows a non-limiting of a method for white balance correction according to at least some embodiments of the present disclosure, showing a state machine time diagram for coefficient updating in the white balance module. To this end, a white balance algorithm, e.g., the GW (gray world) algorithm, assumes that in a normal well color balanced photo, the average of all the colors is a neutral gray. Therefore, the illuminant color cast can be estimated by looking at the average color and comparing it to gray (see https://web.stanford/edu/~sujason/ColorBalancing/gray-world.html for a detailed explanation and implementation). However, while the computational simplicity associated therewith is attractive, the present inventors found that the GW algorithm did not provide sufficiently robust results, in particular, proving to be unstable under certain circumstances. Instead, a smoothed GW algorithm was chosen to implement the white balance module.

The smoothed GW algorithm was implemented according to the following equations:

$$\begin{cases} corr_{R,i} = corr_{R,i-1} \\ corr_{B,i} = corr_{B,i-1} \end{cases} \text{if } |d_{RG}| = |d_{BG}| = 0$$

-continued $$\begin{cases} corr_{R,i} = corr_{R,i-1} \\ corr_{B,i} = corr_{B,i-1} + \mu \times \text{sign}(-d_{BG}) \end{cases} \text{ if } |d_{BG}| \geq |d_{RG}|$$

$$\begin{cases} corr_{R,i} = corr_{R,i-1} + \mu \times \text{sign}(-d_{RG}) \\ corr_{B,i} = corr_{B,i-1} \end{cases} \text{ if } |d_{BG}| < |d_{RG}|$$

Where $d_{RG} = \overline{R} - \overline{G}$ and $d_{BG} = \overline{B} - \overline{G}$.

Per channel frame average can be obtained by using a DSP adder in self-accumulation configuration (as shown), which can be activated only when both synchronization signals (FV_whb and LV_whb) are in high logic state, so that only valid pixel values are added. Obtained summation can then be divided by total number of pixels composing a frame. Co-efficients nav and aav are chosen by running a function in Scilab called nAvMinErr( ), which need the number of bits to represent a pixel and the resolution of used camera. Averages are calculated on corrected channels, in order to have a feedback on the effect of last values assumed by coefficients. Each coefficient is initialized to 1 in order to directly estimate real image situation. A state machine can be implemented as to adjust multiplying coefficients during vertical blanking time intervals (FV_whb at logic '0'), its associated time diagram being depicted in FIG. 14.

The adjustment of coefficients, according to which the R and B channels are multiplied, requires few clock cycles, and it is performed at the end of a frame, right after FV_whb goes to logic '0'. Here two states follow one another: AV_CALC causes finalization of the calculation of averages, UPDATE allows the update of both coefficients. Comparison of averages B and R toward G can be done in parallel. During remaining time, state machine stays in W_L_FV or W_H_FV states in order to catch the end and the beginning of a frame.

Multiplication of R and B channels can be performed converting to fixed point convention (multiplication by 2nres, with nres number of fractional digits) followed by integer part selection, by taking off fractional digits (right shift). The minimum possible step increment may be 0.001, preferably up to and including 0.01). The closest resolution obtainable is 0.000977 using nres=10. To ensure a good range, the integer part is fixed to two bits (3 is the maximum integer part can be represented). Moreover, as the adjustment can be both an increment or a decrease, an additional bit for 2's complement representation is needed. Hence ampl_step input is 10 bits wide.

Figure 15:
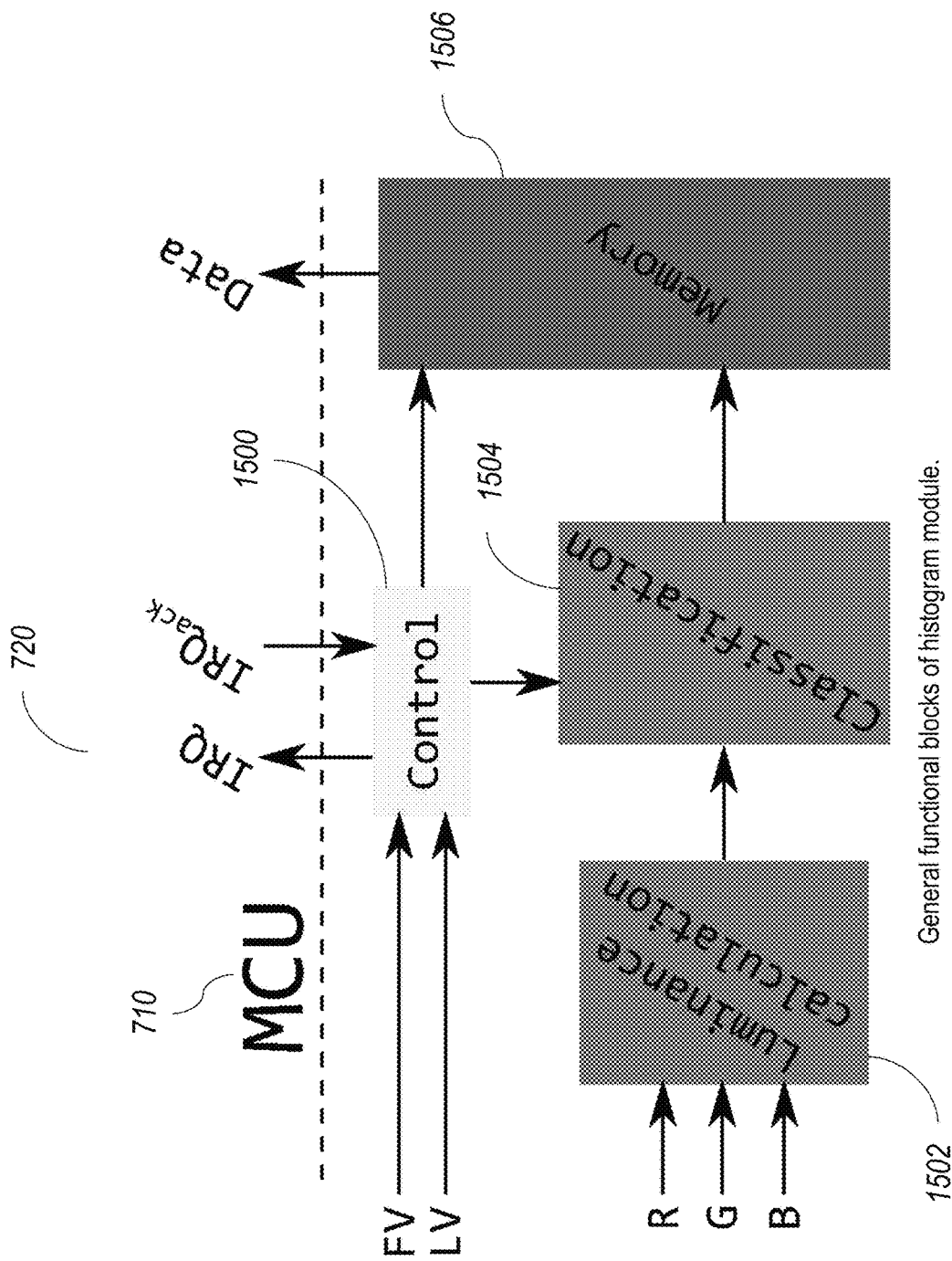
FIG. 15 shows a non-limiting example of a method for performing the histogram adjustment according to at least some embodiments of the present disclosure.

FIG. 15 shows a non-limiting example of a method for performing the histogram adjustment according to at least some embodiments of the present disclosure. The functions are shown as being performed on MCU 710, while the histogram functionality may, for example, be provided for histogram 720. As shown, the process can be controlled by a control 1500. Luminance can be calculated by a luminance calculation module 1502 as previously described.

A classification module 1504 classifies each pixel according to a different range of luminances, as the histogram is configured to show a set of ranges of such luminances. The histogram application therefore involves the classification of each pixel according to its relevant luminance range. The classified pixel may then be stored in a memory 1506, from which the data may be retrieved for use in other procedures. To permit both the FPGA (not shown) and MCU 710 to access the luminance data, a pseudo dual port RAM may be used to updates the luminance data (not shown).

Figure 16:
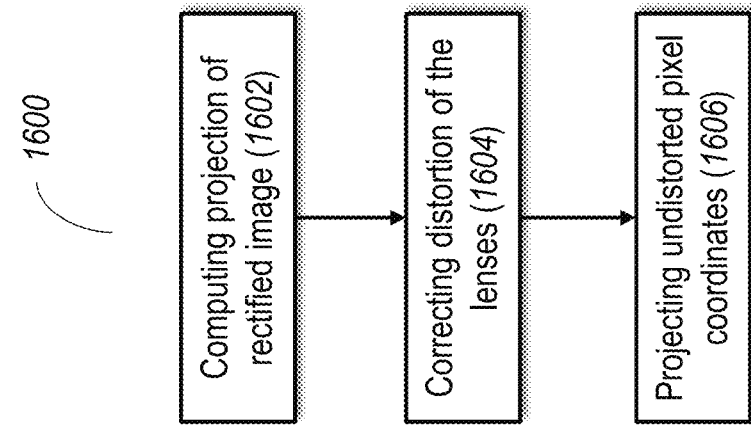
FIG. 16 shows an illustrative, exemplary, non-limiting process for stereo rectification according to at least some embodiments of the present disclosure.

FIG. 16 shows an illustrative, exemplary, non-limiting process for stereo rectification according to at least some embodiments of the present disclosure. The method is optionally implemented as an inverse mapping algorithm that computes for each pixel coordinates in the rectified image the corresponding pixels coordinates in the raw, unrectified and distorted image. Let r and c be the pixel coordinates in the rectified image.

As shown, a method 1600 begins in stage 1602 with computing the projection of the rectified image on the aligned camera reference frame through the new camera matrix computed with the intrinsic parameters (focal length and principal point) and the extrinsic parameters (rotation matrix and translation vector).

Let Pose be a matrix resulting from the computation of a matrix composed of the intrinsic camera parameters and of a matrix composed from the rotation and the translation matrixes between the 2 cameras. So the projection is:

$$\begin{pmatrix} ray\,1 \\ ray\,2 \\ ray\,3 \end{pmatrix} = Pose \cdot \begin{pmatrix} c \\ r \\ 1 \end{pmatrix}$$

From this point, the pixels coordinates of the projection of the r and c pixel coordinates on the new coordinates system become:

$$r_{new} = \frac{ray\,2}{ray\,3}$$

$$c_{new} = \frac{ray\,1}{ray\,3}$$

Stage 1604 includes correcting the distortion of the lenses of the cameras with their distortion parameters.

With $q^2 = r_{new}^2 + c_{new}^2$, the radial distortion is taken in account in this way:

$$\begin{pmatrix} r_r \\ c_r \end{pmatrix} = \frac{(1 + k_1 \cdot q^2 + k_2 \cdot q^4 + k_3 \cdot q^6)}{(1 + k_4 \cdot q^2 + k_5 \cdot q^4 + k_6 \cdot q^6)} \cdot \begin{pmatrix} r_{new} \\ c_{new} \end{pmatrix}$$

The tangential distortion is taken in account in this way:

$$\begin{pmatrix} r_t \\ c_t \end{pmatrix} = \begin{pmatrix} p_2 \cdot (q^2 + 2 \cdot r_{new}^2) + 2 \cdot p_1 \cdot c_{new} \cdot r_{new} \\ 2 \cdot p_2 \cdot c_{new} \cdot r_{new} + p_1 \cdot (q^2 + 2 \cdot c_{new}^2) \end{pmatrix}$$

Finally, the undistorted pixel coordinates are the sum of the radial and the tangential distortion computations:

$$\begin{pmatrix} r_{undist} \\ c_{undist} \end{pmatrix} = \begin{pmatrix} r_r + r_t \\ c_r + c_t \end{pmatrix}$$

Stage 1606 includes projecting the undistorted pixel coordinates on the real camera reference frame using the KK camera matrix. This matrix is defined as follows:

$$KK = \begin{pmatrix} f_x & 0 & c_x \\ 0 & f_y & c_y \\ 0 & 0 & 1 \end{pmatrix}$$

So the final pixel coordinates are:

$$\begin{pmatrix} r_p \\ c_p \end{pmatrix} = KK \cdot \begin{pmatrix} r_{undist} \\ c_{undist} \end{pmatrix}$$

Figure 17A:
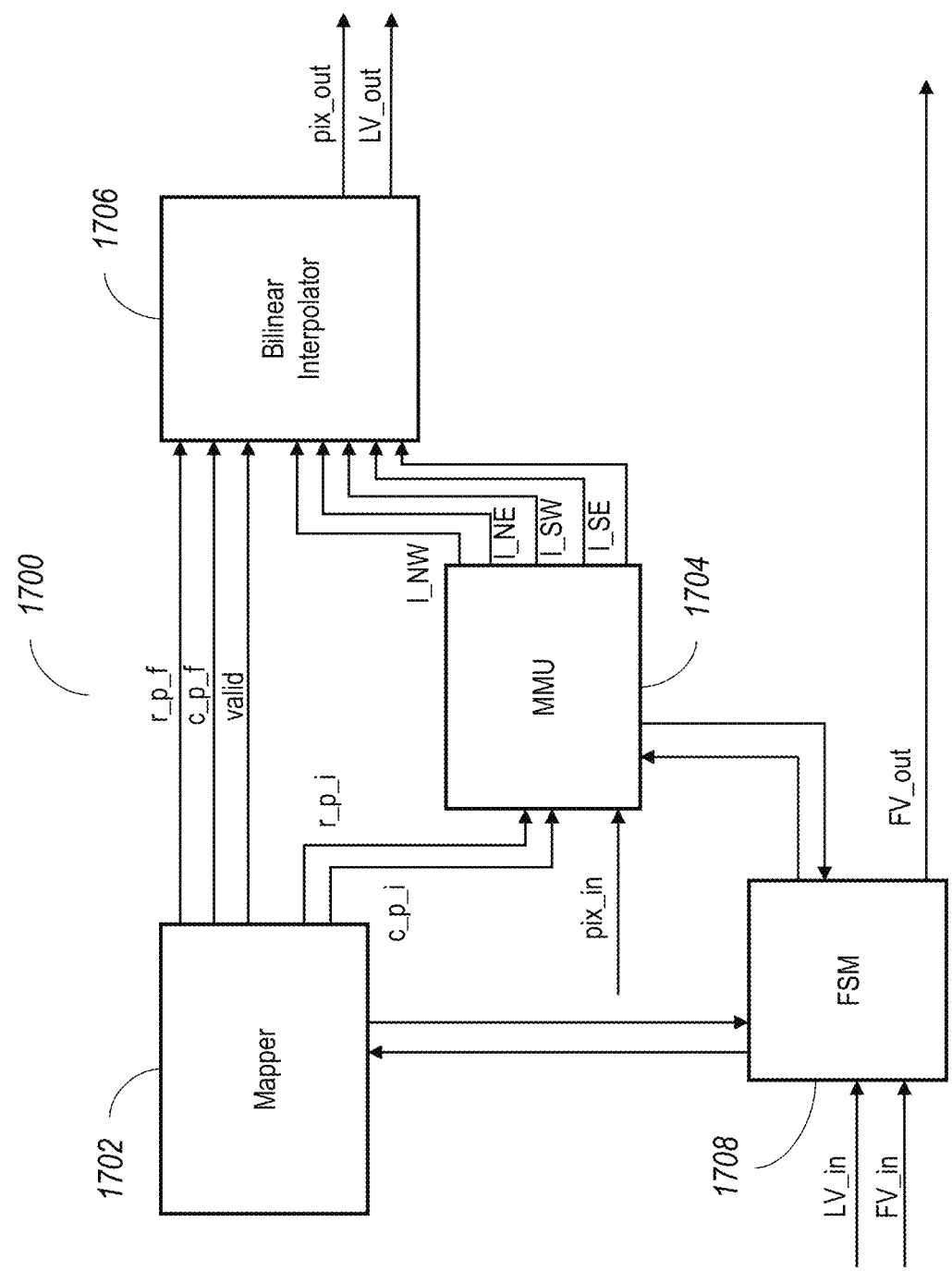
FIG. 17A shows an illustrative, exemplary, non-limiting system for stereo rectification according to at least some embodiments of the present disclosure.

FIG. 17A shows an illustrative, exemplary, non-limiting system for stereo rectification according to at least some embodiments of the present disclosure. A system 1700 features a mapper 1702, a memory management unit 1704, a bilinear interpolator 1706 and a finite state machine 1708.

Mapper 1702 is in charge of executing the rectification algorithm and generating the rectified pixel coordinates. The operation of mapper 1702 is described in more detail in FIG. 17B.

The purpose of the Memory Management Unit 1704, in some embodiments, is to first store the incoming raw pixels, and second, to output the pixels corresponding to the rectified pixels coordinates given by the Mapper 1702. The operation of Memory Management Unit 1704 is described in more detail in FIG. 17C.

The Bilinear Interpolator 1706 may be used to compute the bilinear interpolation of 4 pixels. The rectified pixels coordinates aim at 4 pixels as they are non-integer. A strategy to retrieve a value for the rectified pixel could be to choose one pixel among these 4 but to be as accurate as possible, a better strategy is to compute the bilinear interpolation of these 4 pixel values according the relative position of the rectified pixel among these 4 pixels. The following equation describes this operation:

$$1\_pix\_out = (1 - c\_p\_f \ r\_p\_f) \cdot \begin{pmatrix} I_{NW} & I_{NE} \\ I_{SW} & I_{SE} \end{pmatrix} \cdot \begin{pmatrix} 1 - r\_p\_f \\ c\_p\_f \end{pmatrix}$$

Hence, this block takes as inputs the 4 four pixels values pointing by the rectified coordinates as well as the fractional parts of these rectified coordinates and outputs the pixel value out the rectified pixel as their bilinear interpolation.

A Finite-State Machine 1708 may be used to control the block(s) according to, for example, an imposed 1280*720p @ 60 fps protocol (the Line Valid and Frame Valid signals define this protocol). For example, at the beginning of a sequence, the state machine is in a WAITING state and waits for a new frame to arrive, i.e. for a rise of the Frame Valid and Line Valid signals. When this happens, the state machine proceed to a MMU FILLING state. In this state, a Writing Controller can be enabled and can fill the first buffer with the incoming pixels at the input Live Valid signal rate. When this buffer is full, a control signal may be raised to the state machine to proceed into a COMPUTING state to enable the Mapper, for initiating computation of the rectified pixels coordinates. When the first rectified pixels coordinates are computed, the state machine proceeds to a RECTIFYING state and a reading process starts with the Coord2memAddr_converter being enabled. There may be two (2) additional states, LV_DELAYING and FV_DELAYING, which may be used to make sure that the outputted frame will follow the same protocol as the input frame.

Figure 17B:
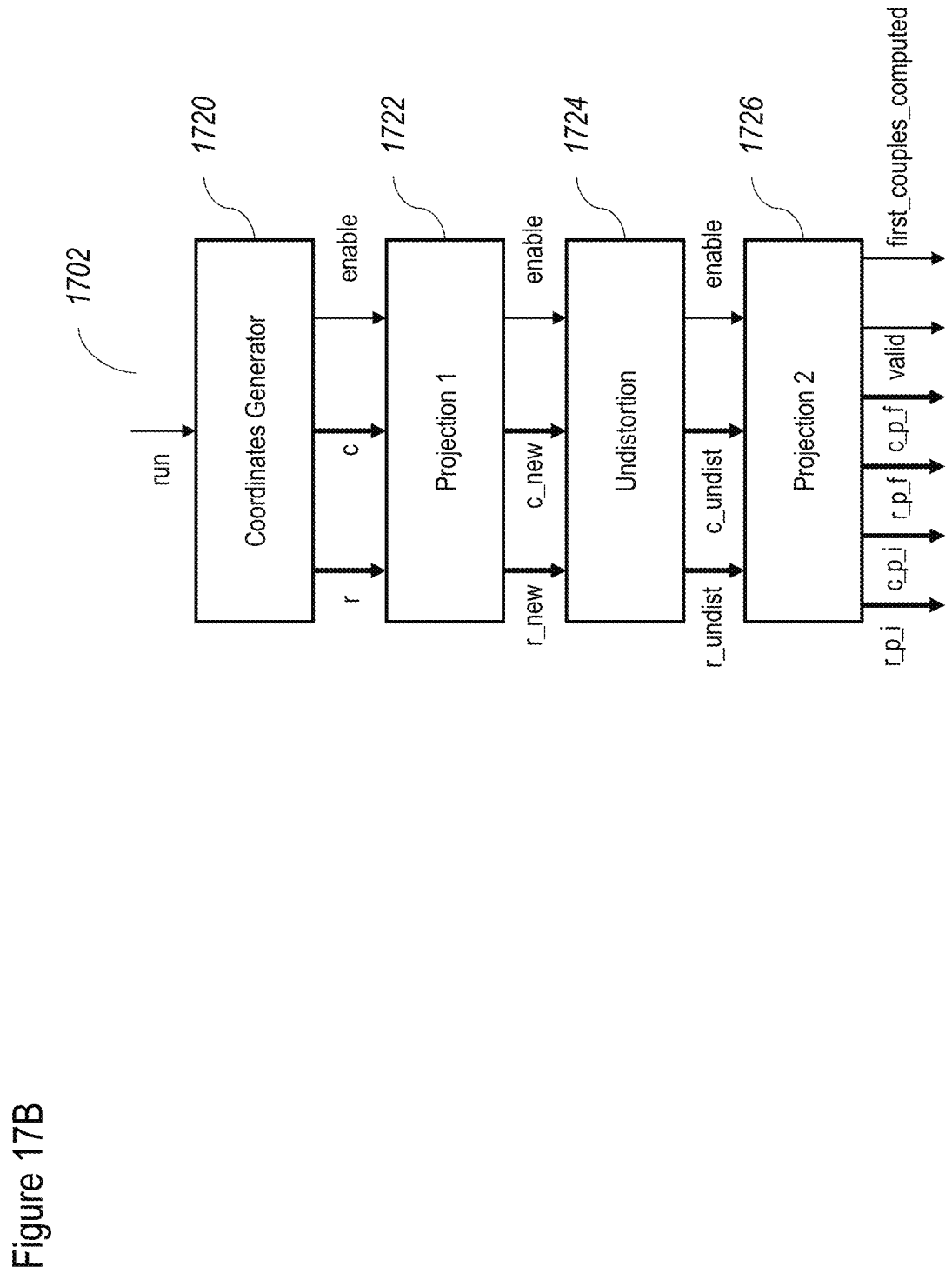
FIG. 17B shows an illustrative, exemplary, non-limiting mapper module for use with the system of FIG. 17A according to at least some embodiments of the present disclosure.
Figure 17C:
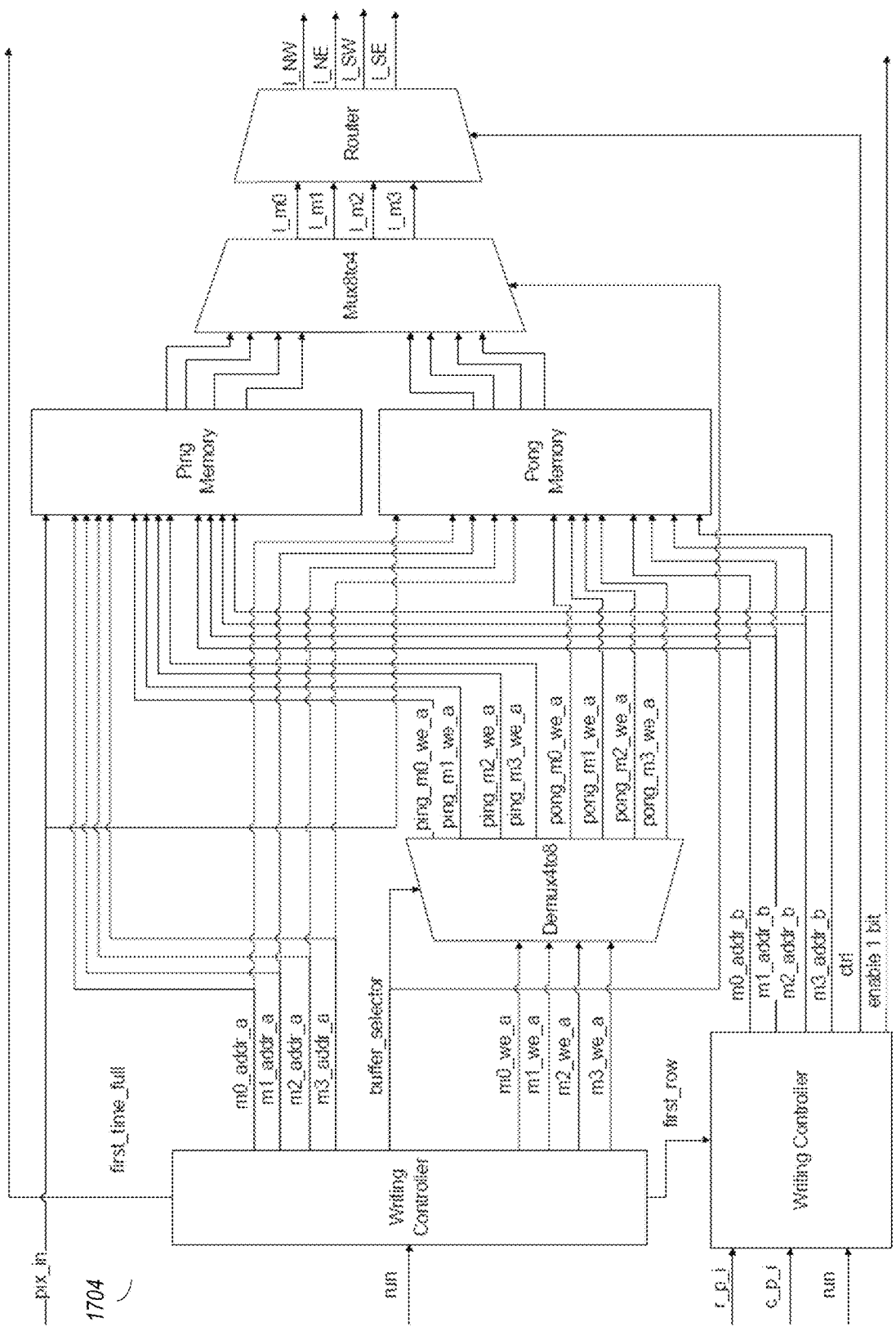
FIG. 17C shows an illustrative, exemplary, non-limiting memory management for use with the system of FIG. 17A according to at least some embodiments of the present disclosure.
Figure 17D:
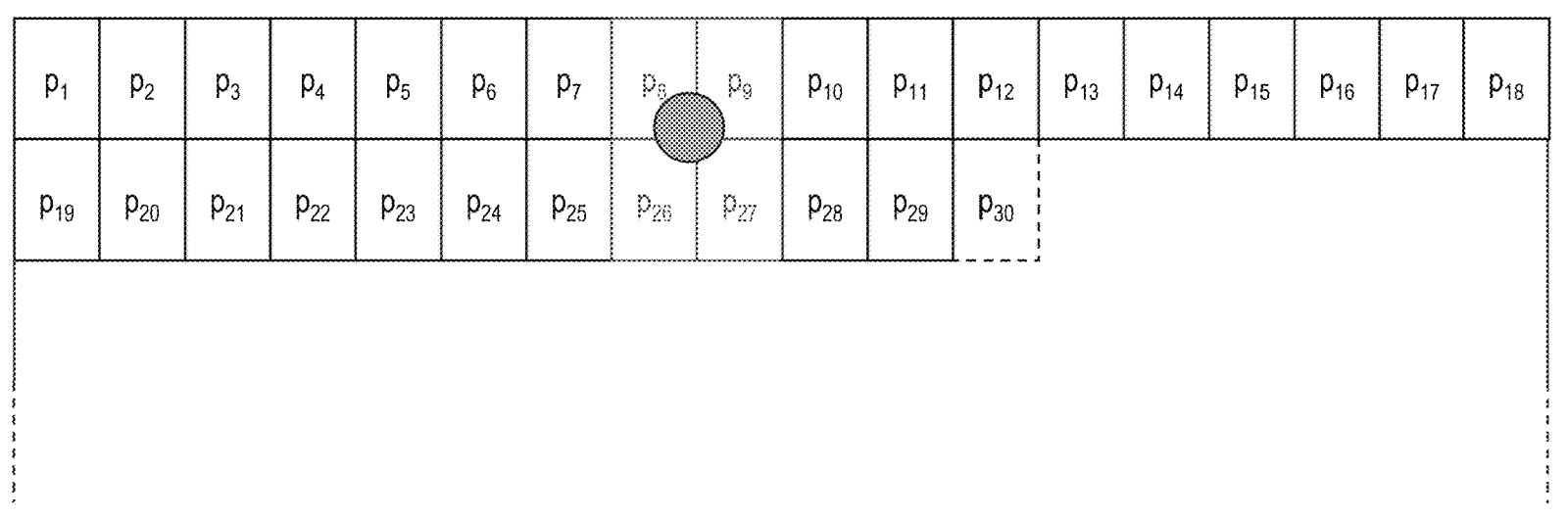
Figure 17F:
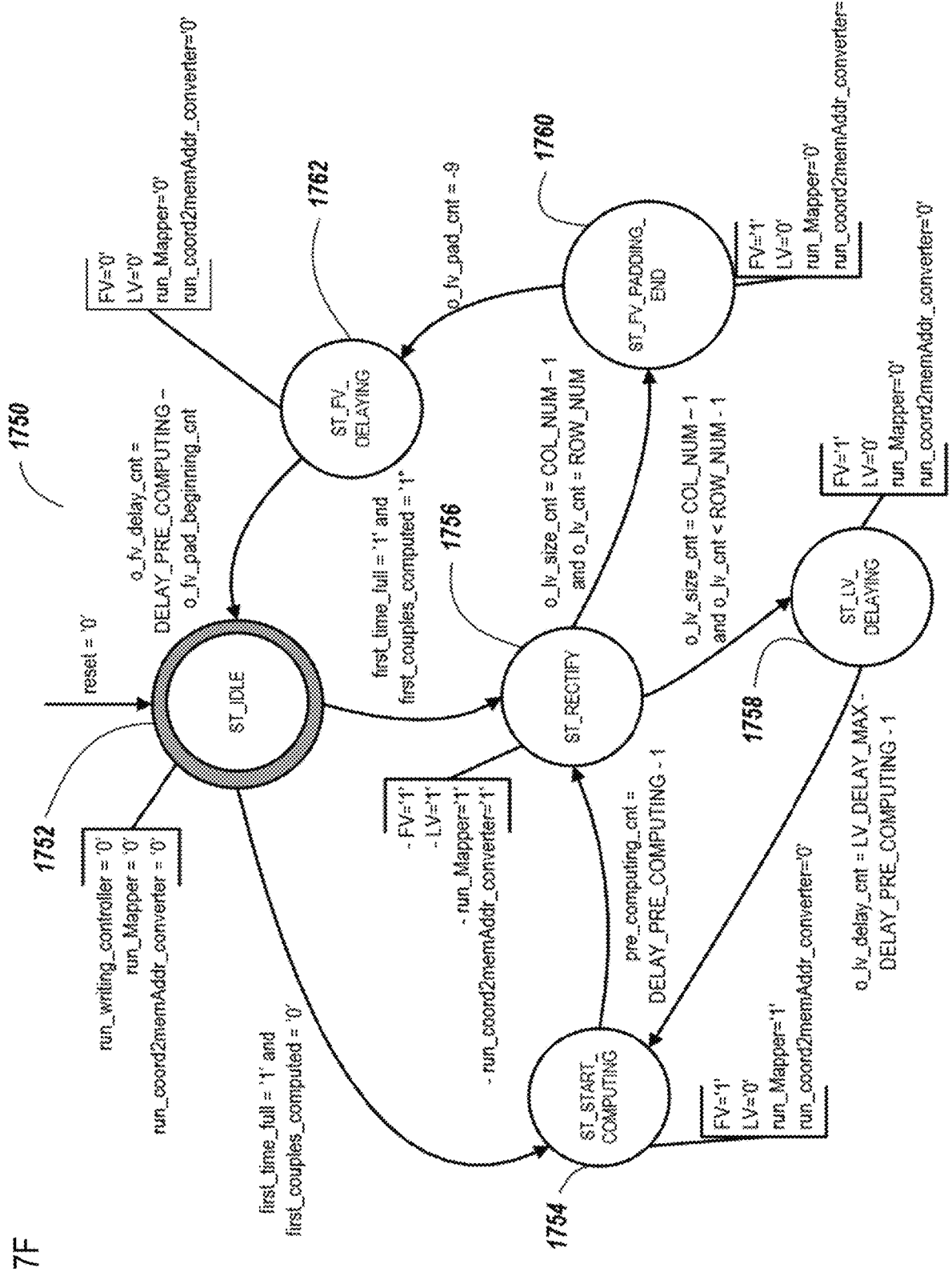
FIG. 17F shows a non-limiting, exemplary finite state machine for use with the system of FIG. 17A according to at least some embodiments of the present disclosure.

FIG. 17B shows an illustrative, exemplary, non-limiting mapper module for use with the system of FIG. 17A according to at least some embodiments of the present disclosure, and FIG. 17F shows a non-limiting, exemplary finite state machine for use with the system of FIG. 17A according to at least some embodiments of the present disclosure.

With respect to FIG. 17B, mapper 1702 may feature four blocks: a coordinates generator 1720, a projection 1 (shown as 1722), an undistortion module 1724 and a projection 2 (shown as 1726). The first block, the Coordinates Generator 1720, corresponds to the generation of all possible pixels coordinates in row order from (1,1) (top-left of the image) to (720,1280) (bottom-right of the image) at the pixel clock rate (i.e., it can be considered a counter). Then, these coordinates will be the inputs of the 3 remaining blocks that correspond to the 3 steps of the rectification algorithm of FIG. 16. This block therefore may be used to output rectified pixels coordinates, and according to all the calculus the rectification algorithm requires, the rectified pixels coordinates are non-integer. Hence, and in order to facilitate both the work of the Bilinear Interpolator and the work of the Coord2memAddr_converter, the Mapper separates the integer (r_p_i and c_p_i) and the fractional (r_p_f and c_p_f) parts of the rectified pixels coordinates.

FIG. 17C shows an illustrative, exemplary, non-limiting memory management for use with the system of FIG. 17A according to at least some embodiments of the present disclosure. As shown, memory management unit 1704 can perform two processes (and at least one), including storing the incoming pixels of the image at the pixel clock rate and being able to make these stored pixels available at any time for the bilinear interpolator. Hence, these 2 processes can be seen as a writing process and a reading process.

In order to avoid data corruption, the buffering process can use a "ping-pong" scheme so that while data is being written in one buffer, and data can be read into the other buffer. A change of buffer can occur every time the writing process reach the end of a buffer. With this scheme, the architecture starts filling one buffer as soon as it receives the first pixels of an image (indicated by the FV and LV signals) and waits for this buffer to be full before starting to rectify the first pixels coordinates and allow the reading process to read in this buffer. A small delay may be therefore added at the launching of the architecture, but then the latter may be able to output pixels at the requested frame rate.

As the rectified pixels coordinates are non-integer, and as four pixels from the unrectified image are needed at the same time to interpolate the intensity of one rectified pixel, four dual-port memories can be used in each buffer so that four pixels at the same clock cycle may be output when requested. To insure that the 4 adjacent pixels targeted by the non-integer pixel coordinates are situated in different dual-port memories, pixels may be simply cyclically stored in the 4 memories following the row order.

An illustrative example of how this operates is shown in FIGS. 17D and 17E. FIG. 17D shows a non-limiting example of an image. FIG. 17E shows the memory filling scheme for this image.

If the pixel coordinates couple requested by the Mapper is the green point on the image (shown in FIGS. 17D and 17E as a non-limiting example), then the four pixels that need to be interpolated are the pixels p8, p9, p26 and p27. This can be done at the same clock cycle since they are all in different memory: p8 is in m3, p9 is in m0, p26 is in m1 and p27 is in m2. This process of filling the memories, in some embodiments, works upon the width of the image being a multiple of 6 and not multiple of 4. Since 1280 is multiple of 4, a padding process may be used to "fake" an image width of 1290. This way, the adjacent pixels may always be located in different memories and the process remains simple for the reading process.

The writing process may be managed by the Writing Controller which can generates the writing addresses of the four memories and cyclically activates their write enable signals while skipping the addresses that need to be to fit with the padding process. A demultiplexer may then be used to redirect the write enable signals to the right buffer (the one that is currently in the writing process).

The reading process is managed by the Coord2memAddr_converter, which may be used to turn pixel coordinates couples coming from the Mapper into reading memory addresses for the Bilinear Interpolator (BI)—the four pixels values required to compute the rectified pixel value. The BI is facilitated by cyclically storing the pixels because, from a pixel coordinates couple, the BI need merely compute the linear address, and then divide it by 4 (for example). This calculus is described below:

$$NW_{addr} = \left\lfloor \frac{(r\_p\_i - 1) * ImageWidth + (c\_p\_i - 1)}{4} \right\rfloor$$

$$NE_{addr} = \left\lfloor \frac{(r\_p\_i - 1) * ImageWidth + (c\_p\_i - 1) + 1}{4} \right\rfloor$$

$$SW_{addr} = \left\lfloor \frac{(r\_p\_i - 1) * ImageWidth + (c\_p\_i - 1) + ImageWidth}{4} \right\rfloor$$

$$SE_{addr} = \left\lfloor \frac{(r\_p\_i - 1) * ImageWidth + (c\_p\_i - 1) + ImageWidth + 1}{4} \right\rfloor$$

Based upon FIGS. 17D and 17E, the calculation would be performed as follows:

$$NW_{addr} = \left\lfloor \frac{0 * 18 + 7}{4} \right\rfloor = 1$$

$$NE_{addr} = \left\lfloor \frac{0 * 18 + 7 + 1}{4} \right\rfloor = 2$$

$$SW_{addr} = \left\lfloor \frac{1 * 18 + 7}{4} \right\rfloor = 6$$

$$SE_{addr} = \left\lfloor \frac{1 * 18 + 7 + 1}{4} \right\rfloor = 6$$

As shown, p8 that is in m3 is at the linear address 1, p9 in m0 is at linear address 2, and p26 and p27 both are at linear address 6 in m1 and m2 respectively. In this architecture, using the padding process, ImageWidth is replaced by the width of the padded image, 1290 in the present case, so that the memory addresses skipped by the Writing Controller during the writing process may the never be achieved.

Also, in order to know which memory corresponds to which linear address, a modulo 4 operation may be computed on the column number (c_p_i). This information may also benefit the Router block that match the incoming pixels value from m0, m1, m2 and m3, with their position in the image (which may be important for the bilinear interpolation).

The linear addresses computed with the above equations may comprise absolute addresses (according to some embodiments). Indeed, in some embodiments, the processes work for buffer size being the same as an entire image. However, since the buffer size may comprise several lines, the Coord2memAddr_converter requires the identification of the line which is currently stored at the beginning of the buffer, so that the linear absolute addresses may be processed into relative addresses. Such information may be provided by the Writing Controller through a first row signal. Thus, the process, in some embodiments, should take this into account by, for example, subtracting the numerator by this signal.

Figure 18A:
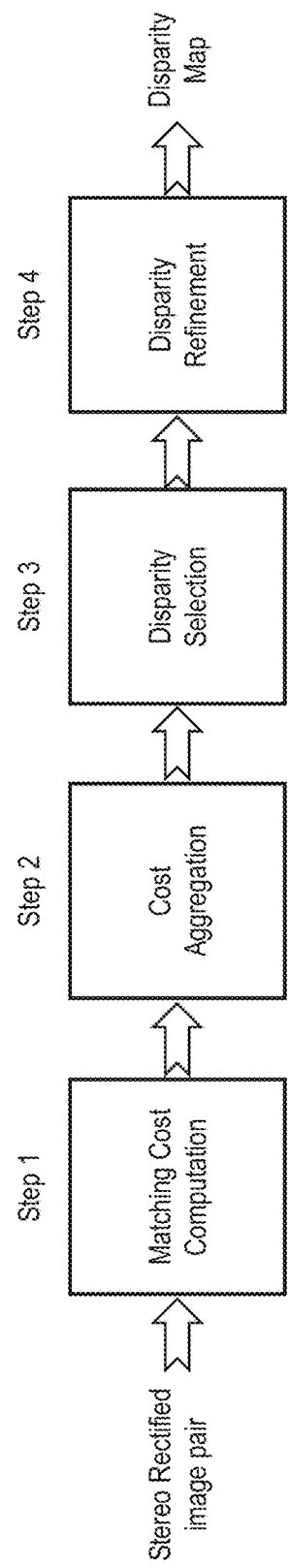
FIG. 18A shows an illustrative, exemplary, non-limiting disparity map method according to at least some embodiments of the present disclosure.

FIG. 18A shows an illustrative, exemplary, non-limiting disparity map method according to at least some embodiments of the present disclosure. Once the stereo images are rectified, matching becomes a one-dimensional issue and the disparity map can be computed. Accordingly, the following is a non-limiting exemplary process for producing a disparity map.

Step 1: Matching Cost Computation. In this step, the similarity of pixels in left and right image are measured by producing a cost. Various non-limiting, exemplary algorithms are described below.

Absolute Differences (AD)

$$AD(x,y,d) = |L(x,y) - R(x-d,y)|$$

This algorithm can be used to compute the absolute difference of a pixel in the left image and a pixel in the right image on the same row, and with an offset in the column index (corresponding to the disparity). It has a low complexity due to its simplicity but does not produce smooth disparity map for highly textured images.

Squared Differences (SD)

$$SD(x,y,d) = (L(x,y) - R(x-d,y))^2$$

This algorithm is very similar to the Absolute Differences by its definition and by its results in term of speed and accuracy. It also can be used to compute the difference of the intensity of a pixel in the left image and a pixel in the right image and then elevates it to the power of 2. AD and SD produce almost the same disparity maps.

Sum of Absolute Differences (SAD)

$$SAD(x, y, d) = \sum_{(i,j) \in \omega} |L(i, j) - R(i - d, j)|$$

This algorithm gathers data as in step 1 and step 2 of the taxonomy (above), in one step. Indeed, this algorithm is the same as the AD, it operates on a square window around the pixel of interest. Therefore, it has a bigger computational time than the AD, but it smooths the disparity map produced due to the window-based method which acts like a filter and it decreases the error rate of the disparity map produced by better finding some occluded disparities.

Sum of Squared Differences (SSD)

$$SSD(x, y, d) = \sum_{(i,j) \in \omega} (L(i, j) - R(i - d, j))^2$$

The SSD is to the SD, as the SAD is to the AD. Again, the SAD and the SSD are very similar and produce almost the same disparity maps.

Normalized Cross Correlation (NCC)

$$NCC(x, y, d) = \frac{\sum_{(i,j)\in\omega} L(i,j) \cdot R(i-d,j)}{\sqrt{\sum_{(i,j)\in\omega} L(i,j)^2 \cdot R(i-d,j)^2}}$$

If an algorithm that computes the disparity based on the intensity of the pixels in the images is used with images that come from cameras that do not have the same gain and/or bias, the produced disparity map can be incorrect. Thus, to compensate for differences in gain and/or bias, the normalized cross correlation algorithm can be applied. It normalizes the intensity of the pixels from the left and the right images so that a difference in gain and/or bias does not come into account anymore. Accordingly, this algorithm may be required if the cameras do not have the same gain/bias, but it can blur regions of discontinuity and also requires considerable computational resources to obtain a high-accuracy disparity map.

Census Transform (CT)

$CT(x,y,d) = \text{Hamming}(\text{Census}_L(x,y), \text{Census}_R(x-d,y))$

With:

$\text{Census}(x,y) = \text{bitrstring}_{(i,j)\in\sigma}(I(i,j) \geq I(x,y))$

This algorithm is based the Census transform and it computes a bitstring based on a square window centered on the pixel of interest and where each bit of this bitstring is the result of the comparison between the intensity of a pixel inside the window and the intensity of the pixel of interest. The Hamming distance between the Census transform computed in the left image and the Census transform computed in the right image is performed and considered, but may be at a cost. This algorithm is robust to disparity discontinuities and it can show very high matching quality at object borders. However, in some embodiments, it may produce incorrect matching in regions with repetitive structures.

Mini-Census Transform (miniCT)

Figure 18B:
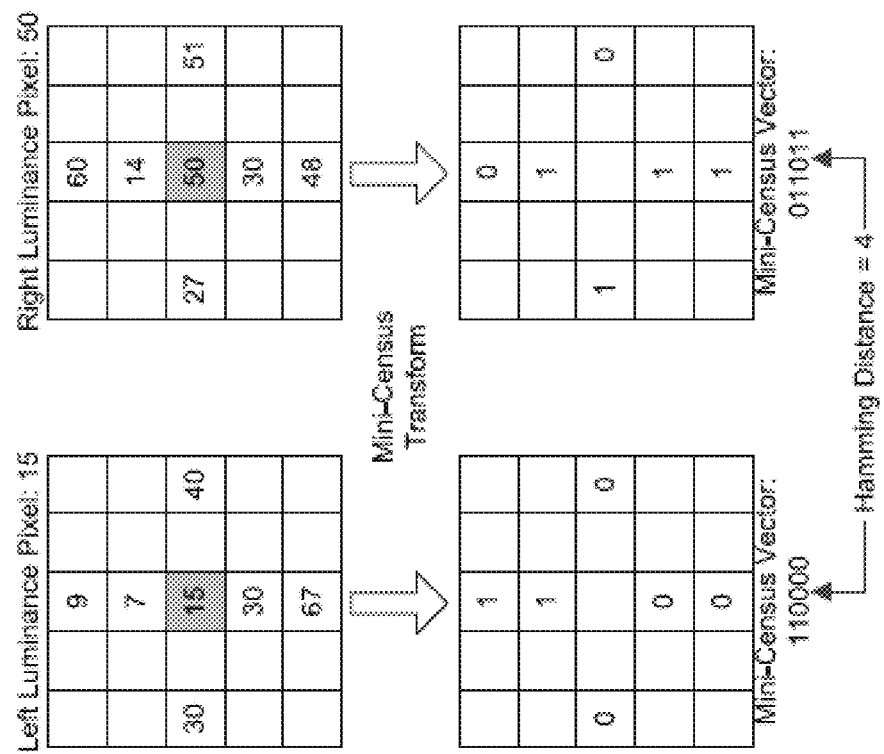
FIG. 18B shows an illustrative, exemplary, non-limiting method for calculating a cost for the disparity map method according to at least some embodiments of the present disclosure.

This algorithm is the same as the Census transform, though the a different window on which the algorithm operates. In the mini-Census transform, the bitstring is not computed on a square window, but rather, on a cross centered on the pixel of interest. The resulting bitstring is 6-bit long (2 bits up and 2 bits down the pixel of interest and 1 pixel left with an offset of 1 and 1 pixel right with an offset of 1). This cross with an example of the application of the algorithm is shown in FIG. 18B, which shows an illustrative, exemplary, non-limiting method for calculating a cost for the disparity map method according to at least some embodiments of the present disclosure.

Step 2: Cost Aggregation

From step 1, a 3-D costs map is produced. Indeed, for each pixel in the image, a cost is computed for each disparity (shift between the 2 images). But these costs can be considered as raw (except for some algorithms) since they are computed with local information. In order to minimize the matching uncertainties, the step 2 aggregates the raw costs according to several possible schemes.

Furthermore, only local methods will be described here as global methods often skip this step. Local methods are window based methods and the disparity of each pixel depends only on the intensity values of the surroundings pixels within the predefined window. Hence, as this method takes in account only local information, it has a low computational complexity and a short run time so that architectures implementing it can be real-time (sometimes using additional hardware). Finally, local methods use all 4 steps of the process.

Global methods are, in contrast, methods that generate a disparity map that optimizes a global energy function. This global energy function contains mainly 2 terms. One penalizes disparity variations and the other measures the pixel similarity. Global methods has a high computational complexity and a longer run time than local methods. By the way, software-based global methods are almost impossible to be implemented in a real-time architecture so additional hardware would be needed to address this constraint. Another difference with local methods is that global methods usually skip step 2 of the 4-step process.

Turning back to cost aggregation, these methods aggregate the matching cost by summing them over a support region which is usually a square window centered on the current pixel of interest. The simplest aggregation method is to apply a low-pass filter in the square support window. This window can be fixed-size (FW) but the error rate increases when the size of this window becomes too big and the parameters must fit the particular input dataset. Or this window can also be adaptive (AW), in terms of size, or in terms of weight: adaptive support weight (ASW), or there can be multiple windows (MW). The MW technique shows weaknesses at objects boundaries but the AW technique reduced the errors caused by boundary problems. AW can achieve high quality results near depth discontinuities and in homogenous regions. The ASW technique first computes for each pixel an adaptive cross based on its intensity similarity to its consecutive neighbours in the four directions. Then the adaptive support weight window on which the raw costs will be sum over is created by merging the horizontal arms of the cross of its vertical neighbours.

This technique is said to produce quality results of the generated disparity map but may be time consuming than the fixed-size (FW) technique for instance.

Step 3: Disparity Selection

Now that the costs are aggregated and that the matching uncertainties have been addressed, it is time to go from this 3-D aggregated costs map to a 2-D disparity map. In other words, it is time to find for each pixel the correct disparity among all the disparities that were used to build this 3-D costs map.

As local and global methods exist for this step, both will be described briefly.

For the local methods, the most used disparity selection method is a Winner Takes All (WTA) strategy so that the disparity d(x,y) for each pixel corresponds to the minimum aggregated cost in the range of the aggregated cost obtained after step 2 (or step 1 if step 2 skipped) over all allowed disparities (D):

$$d(x, y) = d \mid C = \min_{d \in \beta} \text{Cost}(x, y, d)$$

Where D=[min_disp, max_disp] is the range of shift used in step 1 and 2.

This method works for the algorithms described in step 1, except for the normalized cross correlation (NCC) where the Winner Takes All method consists of choosing the disparity that corresponds to the maximum aggregated cost.

For global methods, a global energy function may be used:

$$E(d) = E_{data}(d) + \beta \cdot E_{amount}(d)$$

Where $E_{data}(d(x,y))$ is the matching cost of pixel (x,y). $\beta$ is a weighting factor and $E_{amount}(d(x,y))$ penalizes the disparity variation.

Some algorithms that perform this disparity selection as global methods are:
 belief propagation (BP)
 graph cut (GC)
 dynamic programming (DP)

As previously noted, the local method can be retained for this step also.

Step 4: Disparity Refinement

In this step, the goal is to reduce noise generated through the previous steps and to refine the final disparity map. Among known techniques to do so include:
  Gaussian convolution: reduces noise in the disparity map and can also reduce the amount of fine detail. Disparity is estimated using the one of neighboring pixels in compliance with weights of a Gaussian distribution
  Median filter: removes small and isolated mismatches in disparity. Low computational complexity
  Anisotropic diffusion: Applies smoothing without crossing any edges, unlike Gaussian convolution These techniques are quite similar in their concept. Another way of improving the quality of the produced disparity map, according to some embodiments, is by doing a consistency check. In some embodiments, 2 disparity maps can be computed from the same stereo image pair. One by looking for matching pixels of the left image in the right image, and another by looking for the matching pixels of the right image in the left image. Due to at least occlusions, these 2 disparity maps of a same stereo image pair will not be the same. But with these 2 disparity maps, a left to right consistency check (LRC) can be performed in order to detect outliers and then several strategies exist to try to refine them.

This left to right consistency check consists of checking all the pixels in the left disparity map if the disparities correspond to the disparities in the right disparity map. For instance, let k be the disparity in the left disparity map at pixel (x,y): DL(x,y)=k. This means that pixel (x,y) in left original image best corresponds to pixel (x−k,y) in right original image when the disparity map is computed for the left image. On the other hand, it can be expected that pixel (x−k,y) in right original image best corresponds to pixel (x,y) in left original image when the disparity map is computed for the right image. Which can be expressed as: DR(x−k,y)=k. Thus, if DL(x,y)=k and DR(x−k,y)=k then disparity at pixel (x,y) in left disparity map can be considered as correct. Otherwise disparity at pixel (x,y) in left disparity map is considered as an outlier.

This LRC permits to detect occlusion problems or simple mismatches and several strategies to address the problems/mismatches are highlighted. For example, the non-trusted disparity may be interpolated with the neighbor disparities if such is considered as correct and if the neighboring pixels have a similar intensity to the pixel corresponding to this non-trusted disparity in the original image. Outliers can also be dealt with by using the information of another technique to determine the depth of a scene like using the data coming from a Time-of-Flight sensor for instance.

Various of these algorithms and methods have been tested. In certain instances, it has been found that for step 3, the Winner-Take-All method provided the best results, including with regard to simplicity. For step 1, the two best algorithms were found to be the AD algorithm and the SAD algorithm. In some embodiments, the AD algorithm was enhanced. In step 1, the matching cost computation, instead of computing the absolute differences of only one pixel in the left image and one pixel in the right image, in this improved version, the absolute differences of 2 consecutive pixels are computed. Then, knowing that the disparity that produces the smallest cost will be selected as the good one in step 3, a check is carried out on the value of the 2 cost resulting from the 2 absolute differences computation, and if both of them are smaller than a certain threshold, then the retained cost, which is the sum of these 2, is reduced. Otherwise, if one of them or the 2 of them are bigger than this threshold, the final cost is increased.

This change improves the function of step 3 and improves the quality of the produced disparity map while keeping a low computational cost compared to the SAD algorithm.

Figure 19A:
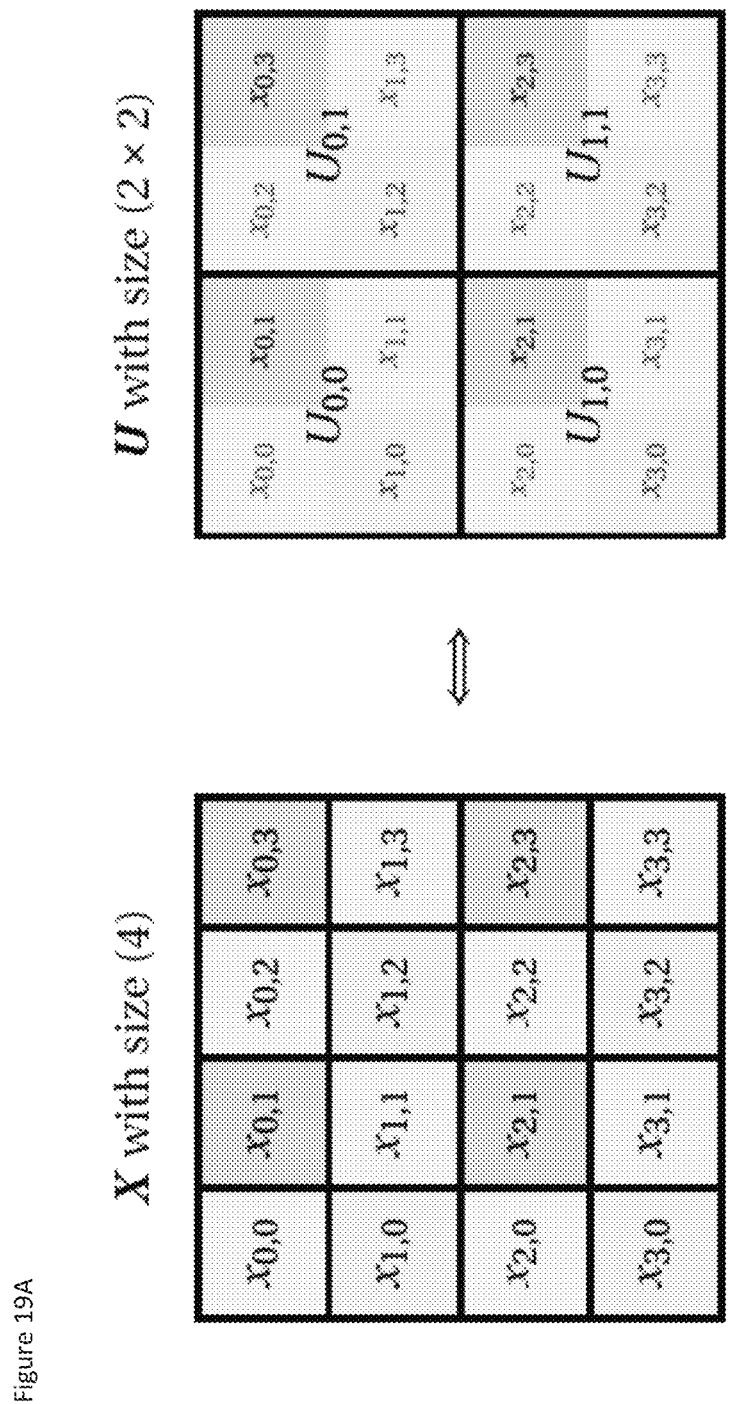
FIG. 19A shows an example of image representation for "W-means" algorithm.
Figure 19B:
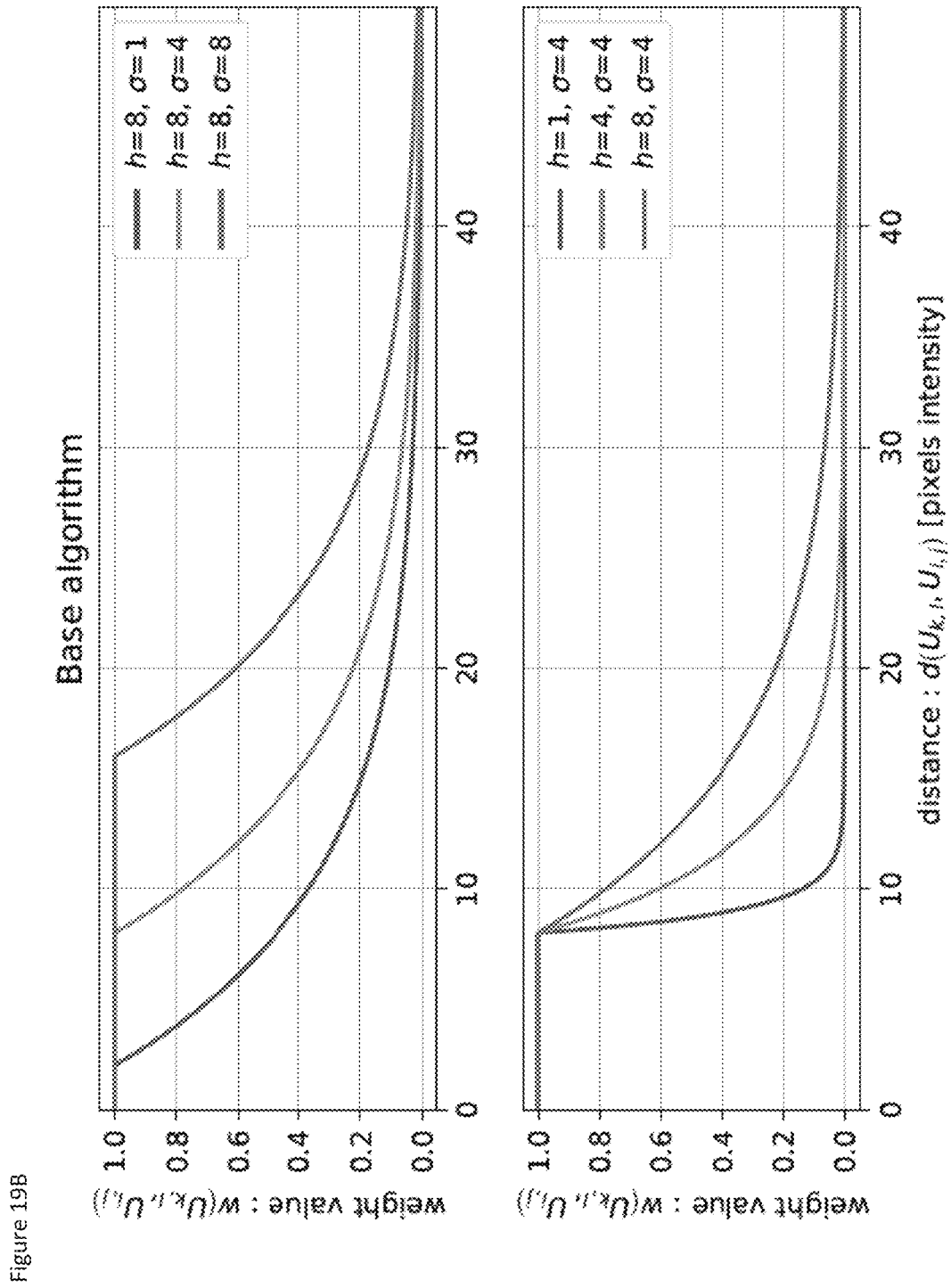
FIG. 19B shows the effects of parameters on "W-means" weight.
Figure 19C:
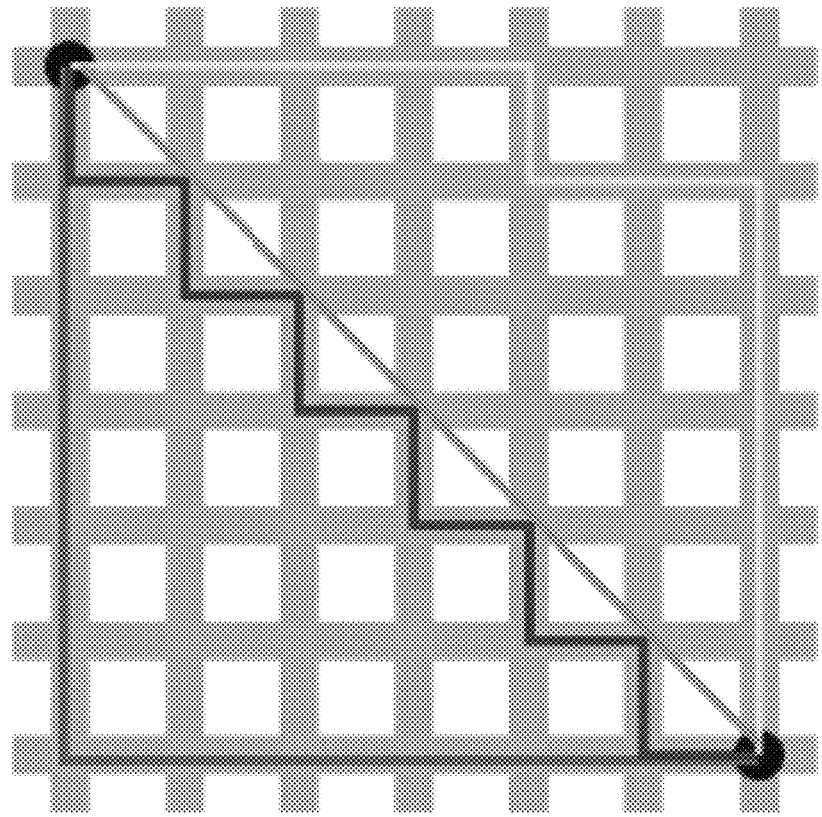
FIG. 19C shows taxicab geometry versus Euclidean distance: In taxicab geometry, the red, yellow, and blue paths vall have the shortest length of |6|+|6|=12. In Euclidean geometry, the green line has length, and is the unique shortest path.
Figure 20:
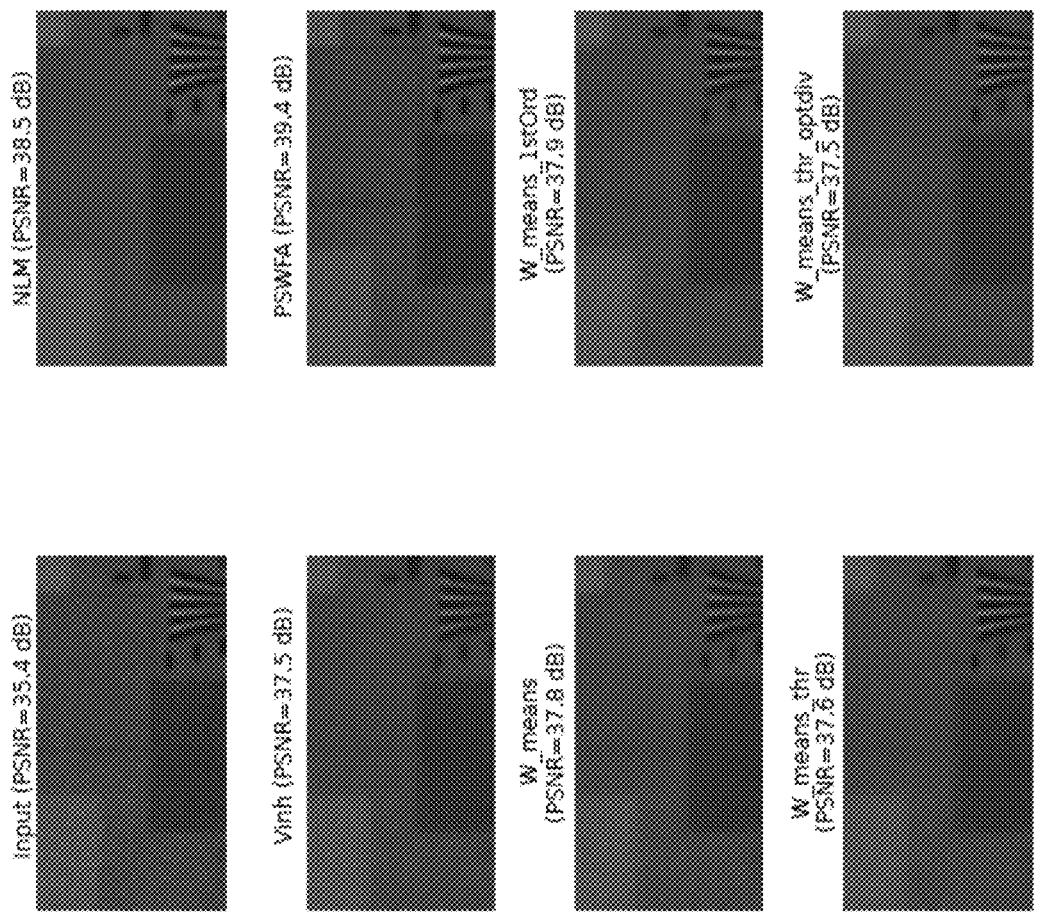
FIG. 20 shows the results of state of the art and "W-means" algorithms, after application of the debayer. Image size (150×80) (zoom). Algorithm parameters are: NLM(h=6, f=3, r=10), Vinh(p=8), PSWFA(n=5), W_means (h=16, σ=4), W_means_1stOrd(h=32, σ=2), W_means_thr (σ=12), W_means_thr_optdiv(σ=12)

FIGS. 19-20 relate to a de-noising algorithm for a CFA (color filter array) image, termed herein a "W-means" for "Weighted means". FIG. 19D shows a non-limiting example of such an algorithm. The algorithm groups the 4 CFA colors to make a so-called "4-color pixel". Each one of these 4-color pixels in the input image is compared to its neighbors. A weight is attributed to each neighbor depending on its difference with the center pixel. Then, for each color separately, the weighted mean is computed to generate the output 4-color pixel.

First, consider the following CFA image X with size (w×h) and a (2×2) color pattern size (the colors shows an example for the Bayer pattern "Green1-Blue-Red-Green2 (GBRG)"):

$$X = \begin{bmatrix} x_{0,0} & x_{0,1} & x_{0,2} & \cdots & x_{0,w-1} \\ x_{1,0} & x_{1,1} & x_{1,2} & \cdots & x_{1,w-1} \\ x_{2,0} & x_{2,1} & x_{2,2} & \cdots & x_{2,w-1} \\ \vdots & \vdots & \vdots & \ddots & \vdots \\ x_{h-1,0} & x_{h-1,1} & x_{h-1,2} & \cdots & x_{h-1,w-1} \end{bmatrix},$$

where xi,j are pixels intensity values.

The same image can be represented as a four color image U with size $$(m \times n) = \left(\frac{w}{2} \times \frac{h}{2}\right)$$

$$U = \begin{bmatrix} U_{0,0} & U_{0,1} & \cdots & U_{0,m-1} \\ U_{1,0} & U_{1,1} & \cdots & U_{1,m-1} \\ \vdots & \vdots & \ddots & \vdots \\ U_{n-1,0} & U_{n-1,1} & \cdots & U_{n-1,m-1} \end{bmatrix}$$

Where Where Ui,j=$[x_{2I,2j}, x_{2I+1,2j}, x_{2I,2j+1}, x_{2I+1,2j+1}]$.

FIG. 19A shows a simple example of this alternative representation.

The filtered image V with size m×n (same format as U), is given by the equations below.

$$V_{i,j} = \frac{1}{C_{i,j}} \sum_{U_{k,l} \in B(i,j,f)} U_{k,l} \cdot w(U_{k,l}, U_{i,j}),$$

-continued
$$C_{i,j} = \sum_{U_{k,l} \in B(i,j,f)} w(U_{k,l}, U_{i,j}),$$

$$w(U_{k,l}, U_{i,j}) = e^{-\frac{\max(d(U_{k,l},U_{i,j})-2\sigma,0)}{h}},$$

$$d(U_{k,l}, U_{i,j}) = \sqrt{\frac{1}{4}\sum_{q \in U_{k,l}, x \in U_{i,j}} (q-x)^2},$$

where B (i, j, f) is the square neighborhood centered at Ui,j with size (2f+1)×(2f+1) from U image, σ and h are constant parameters. The weight w∈[0, 1] depends on the color distance d (there are 4 colors so this is a 4-dimensional distance). This allows application of a bigger weight on similar pixels.

The σ parameter can work as a threshold to ignore noise effect on distances, when its value equals the standard deviation of the noise. Distances smaller than 2σ have their weights set to 1, while larger distances decrease at on exponential rate. The h parameter controls the strength of this exponential function, thus the weights of non-similar pixels. The effect of parameters on the weights relative to the distance can be seen in FIG. 19B.

The main difference with the NLM (Non-Local Means) algorithm (see Antoni Buades, Bartomeu Coll, and Jean-Michel Morel. "Non-Local Means Denoising". In: Image Processing On Line 1 (2011), pp. 208-212. DOI: 10.5201/ipol.2011.bcm_nlm), which makes "W-means" algorithm a lot less iterative, is the computing of the distance d (last equation above). Instead of computing the distance with all Uk,l and Ui,j neighbors, this algorithm only cares about Uk,l and Ui,j colors. The advantage of having 4 colors is to be more accurate than with only 3 colors.

Various adjustments can then be performed to decrease the computational resources necessary to perform the W-means algorithm for noise reduction. The Euclidean distance in the third of three equations above, where the square factor requires a multiplier for each recursive step (for each color of each neighbor) and a square root for each neighbor, the following optimization was performed. The Euclidean distance can be replaced by the Manhattan (Taxicab) distance. Compared to the Euclidean distance, it is computed by removing the square root and computing an absolute value instead of the square, which improves the resource consumption a lot. A simple 2D visualization of these distances can be seen in FIG. 19C.

The Euclidean distance gives the best estimation for the difference between 2 pixels. But, being compared to other differences, this algorithm only requires to have comparable difference values. The Manhattan distance also quantifies the difference between 2 pixels, thus it can also be used for this application.

With this optimization, the last of the above three equations becomes the below equation:

$$d(U_{k,l}, U_{i,j}) = \frac{1}{4}\sum_{q \in U_{k,l}, x \in U_{i,j}} |q-x|$$

The division by the parameter h in the second of the three above equations may optionally be handled by restricting h values to powers of 2. This way, only multiplexers and/or shifters are required. However, it is preferred to divide by a constant, from 1 to 8, even if that requires more logic elements. The exponential in the second of the three above equations may optionally be handled with threshold based binary weights. Binary weights may optionally be used generally to optimize the above equations.

FIG. 20 demonstrates the effectiveness of the W-means method, which also consumes fewer resources than the art-known methods. For further optimization, optionally a parameter is set so that the denoising increases as the analog amplifier increases its activity. The analog amplifier increases its amplification as the amount of light decreases. In low light conditions, noise can increase significantly. Therefore, increasing denoising as amplification increases can offset this problem, without adding blur in the image.

FIGS. 21-31 relate to an exemplary, optional implementation system, and flow, according to some embodiments, that is interoperative with the previously described systems. This system and flow can allow correction according to the W-means method described above, as well as bad pixel correction, described below.

The corrections will be implemented on raw CFA images, just before the debayer process. The input pixel stream consists in the following standard signals:
Pixel clock 1-bit: clock for following signals.
Pixel Data 12-bit: pixel intensity value.
Frame valid 1-bit: used to synchronize the start and the end of the frame.
Line valid 1-bit: means that the pixel data is valid, otherwise it is blanking data. This signal takes the value '1' continuously for the entire row with.

Figure 21A:
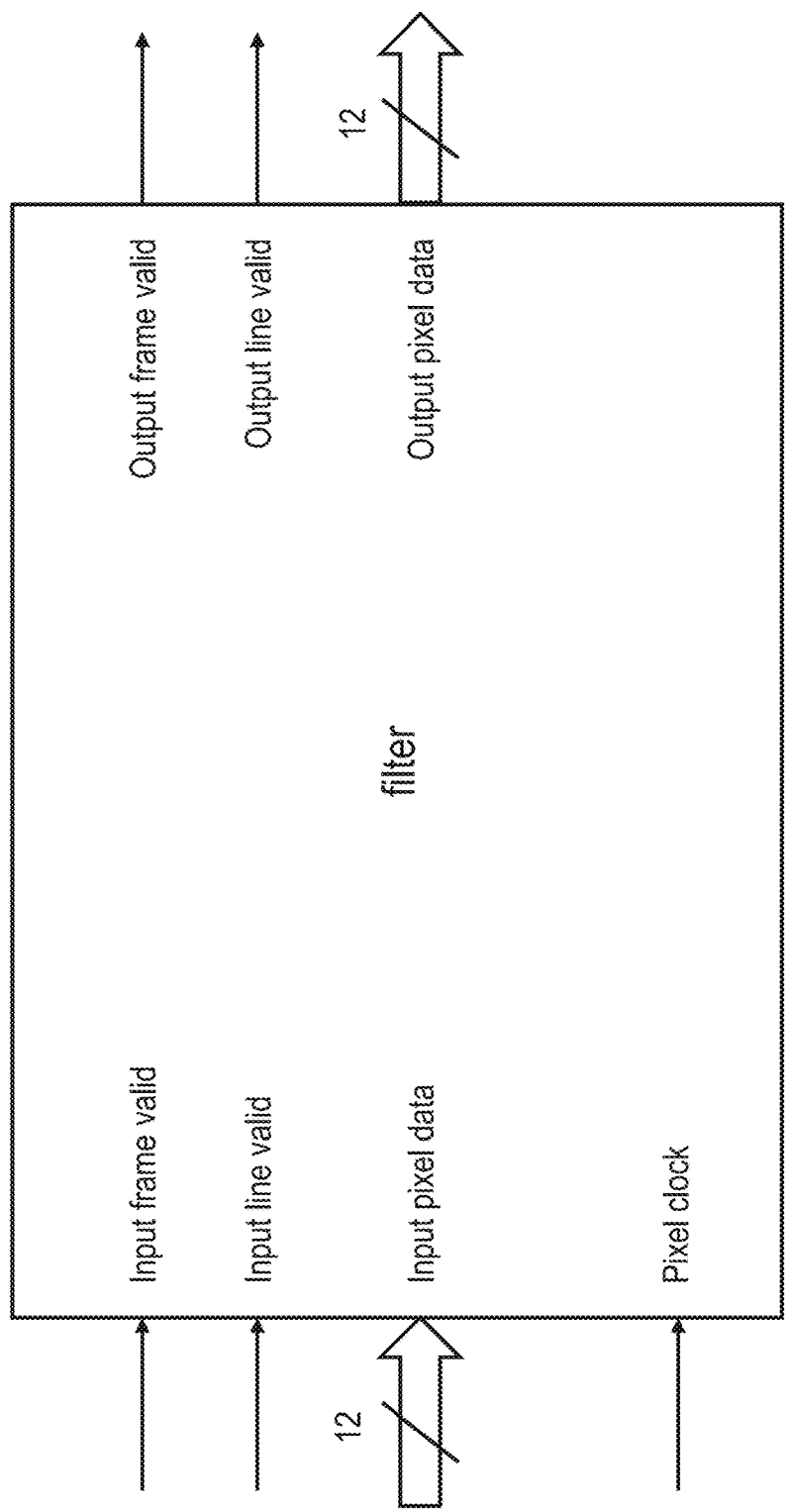
Figure 21B:
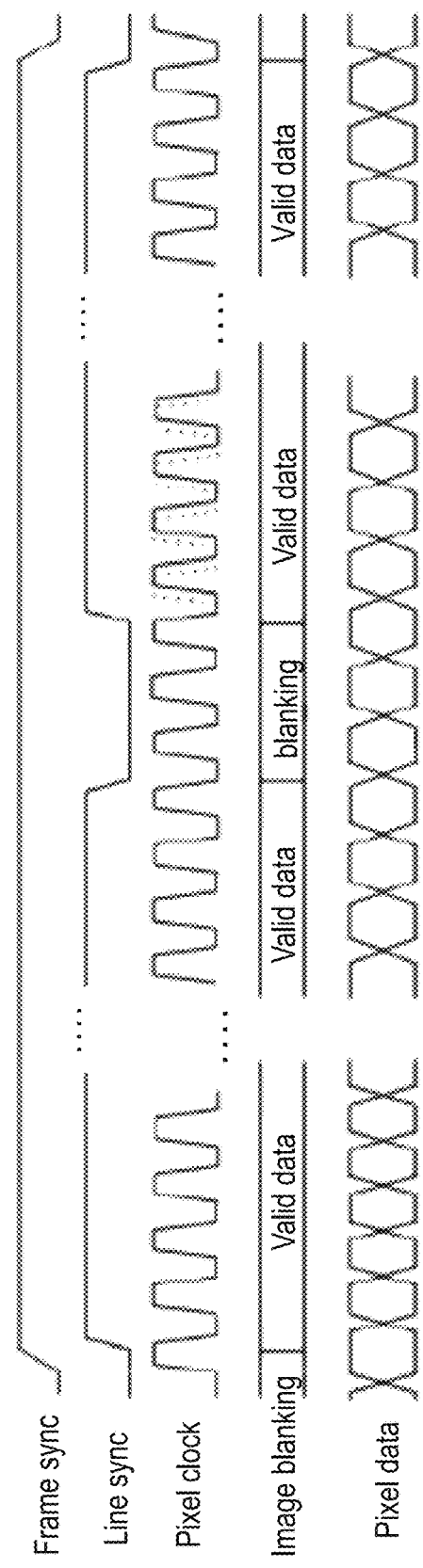
FIG. 21B shows a pixel stream interface chronogram.

The process units can have, at least, the interfaces shown in FIG. 21A. The chronogram in FIG. 21B shows an example of data transfer.

The method used for defective pixel detection and correction is an adaptation of the algorithm proposed by Bailey and Jimmy (Single shell version; D. Bailey and J. S. Jimmy. "FPGA based multi-shell filter for hot pixel removal within colour filter array demosaicing". In: 2016 International Conference on Image and Vision Computing New Zealand (IVCNZ). November 2016, pp. 1-6. DOI: 10.1109/IVCNZ.2016.7804450) is low resource consuming and produced good results during the tests. It is a spatial filter especially made for CFA images. A schematic of the method is shown in FIG. 22A.

Figure 22A:
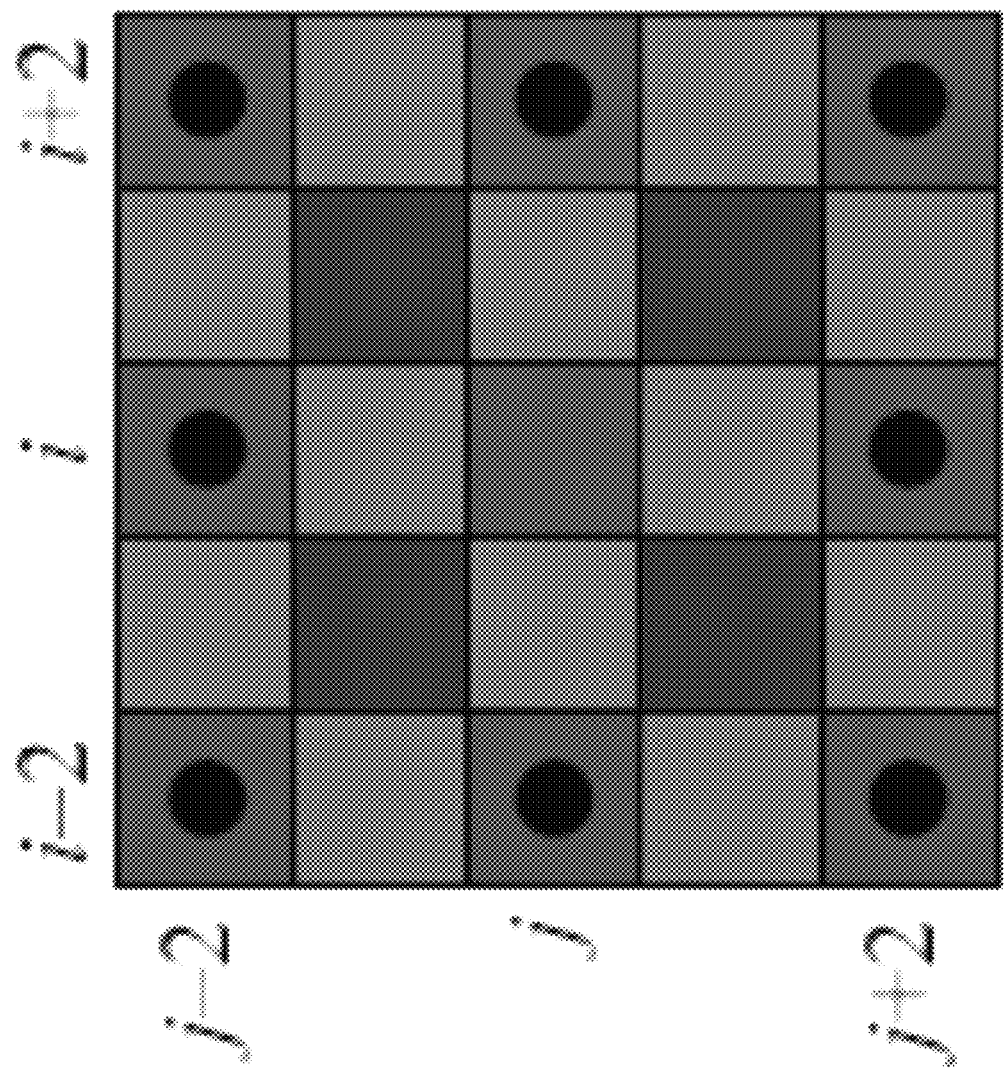
Figure 22B:
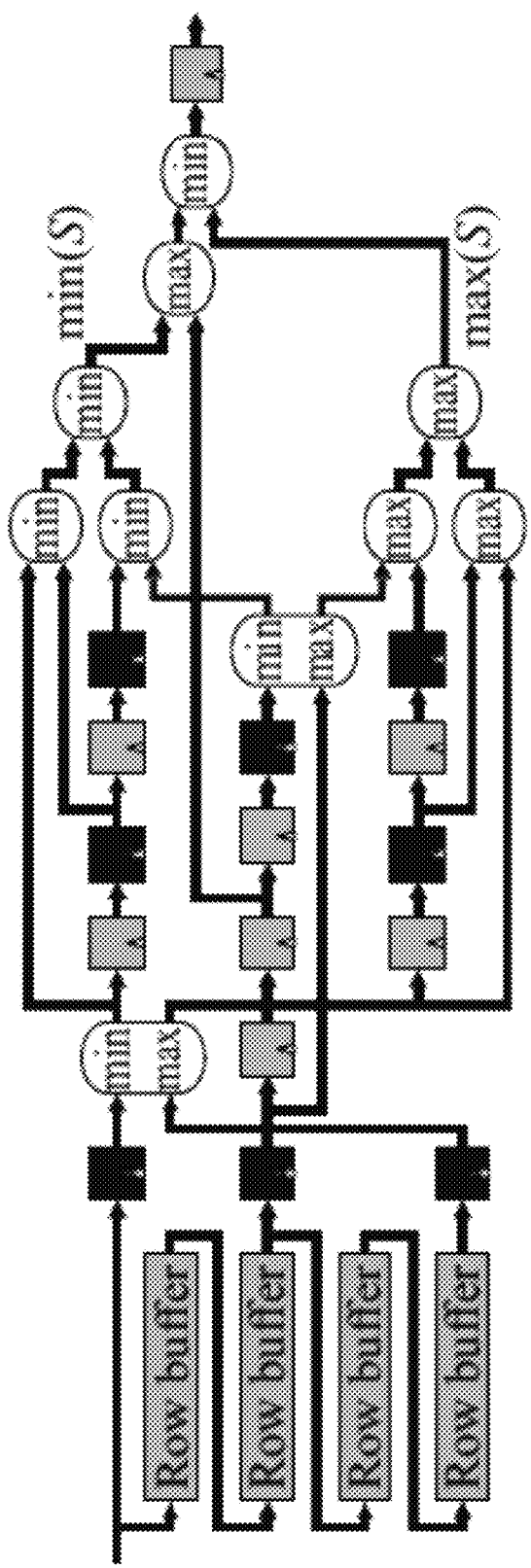
FIG. 22B shows an exemplary implementation thereof.

Algorithms could be described by the below equation which is applied for all pixels in the image. The proposed implementation diagram is shown in FIG. 22B. In the equation:

$$y_{i,j} = med(\min(S_{CFA}), x_{i,j}, \max(S_{CFA})),$$

where yi,j is the output pixel that depends on the input pixel xi,j and neighbors of same color $S_{CFA}$ represented by black dots in FIG. 22A.

The filter can remove defective pixels that do not belong in a defective pixel cluster (two or more defective neighbors). The sensor data sheet specifies that there are no clusters of defective pixels. Pixels in borders that cannot be processed (two rows on top and two on the bottom, and two columns on each side) are copied from the input to the output.

Figure 23:
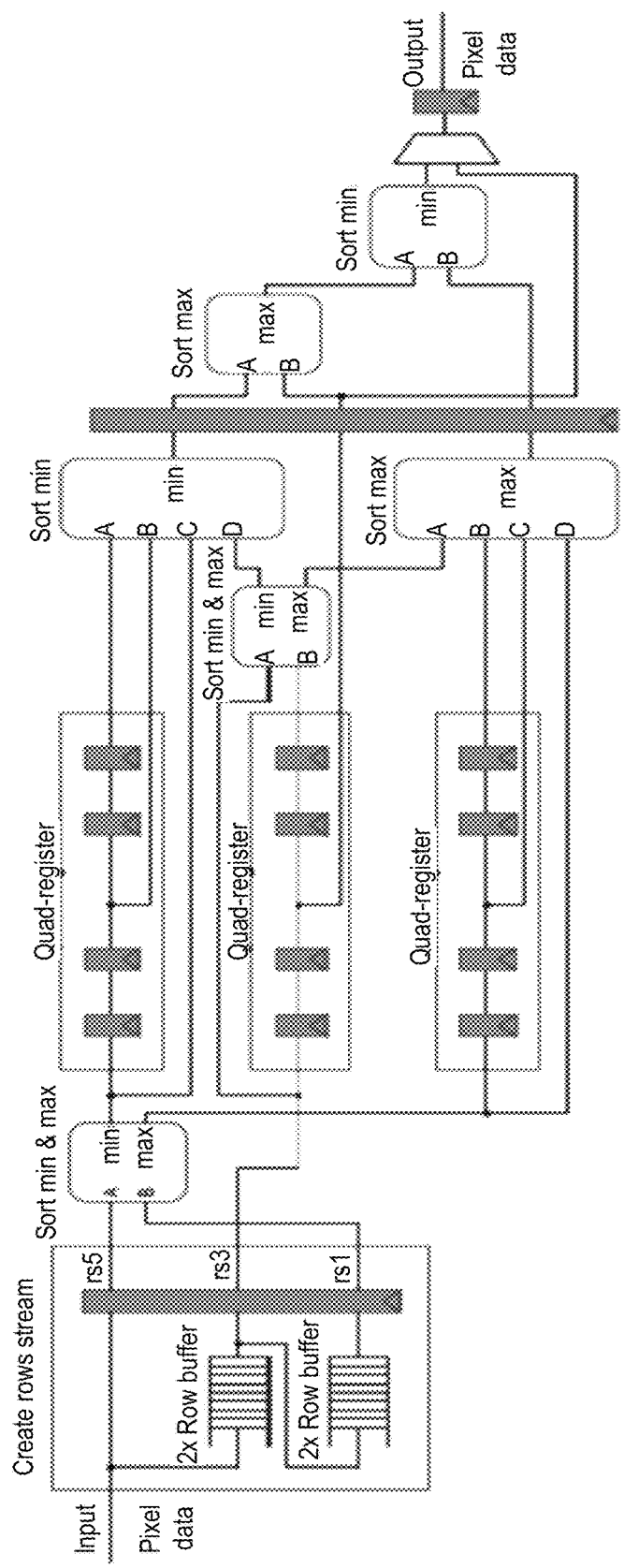
FIG. 23 shows an exemplary bad pixel removal method FPGA implementation diagram, in which each yellow unit is a VHDL component.

The diagram of the exemplary, illustrative FPGA implementation is shown in FIG. 23, features various adaptations of the published method. Compared to proposed implementation diagram by the authors, the second to last register was added to solve timings issues. A multiplexer has been added to copy the input pixel right to the output when the pixel belongs to the image border.

The Create rows stream component allows to turn the single row stream into a three color-neighbors rows streams called rs1, rs3, and rs5. Due to the CFA image, the filter must process one in two rows. To do this the "2×rows buffer" stores 2 lines instead of one. Then, the Quad-register component can be used to extract the kernel, as in FIG. 22A. Other components include Sort min/max combinatorial units, to perform the process shown in above equation.

Control signals: the pixel data is delayed by approximately two rows, so control signals (frame valid and line valid) must also have this delay. To do that, two more components were created: frame valid delay, that simply runs a counter on each frame valid input transition (when the counter reaches the required delay value, the output is inverted), and a line valid generator that is also based on a counter. When the counter starts, the valid signal is set. Then, when it reaches the image width, the valid signal is cleared.

Based on row and column counters, the line valid generator can be enabled on the second row of the input image and disabled two rows after the end. The copy signal is enabled when the output pixel corresponds to a border in the output image. Pixels residing in the image border are: 1st and 2nd row; 1st and 2nd column; 2nd last and last column; and 2nd last and last row.

Figure 24:
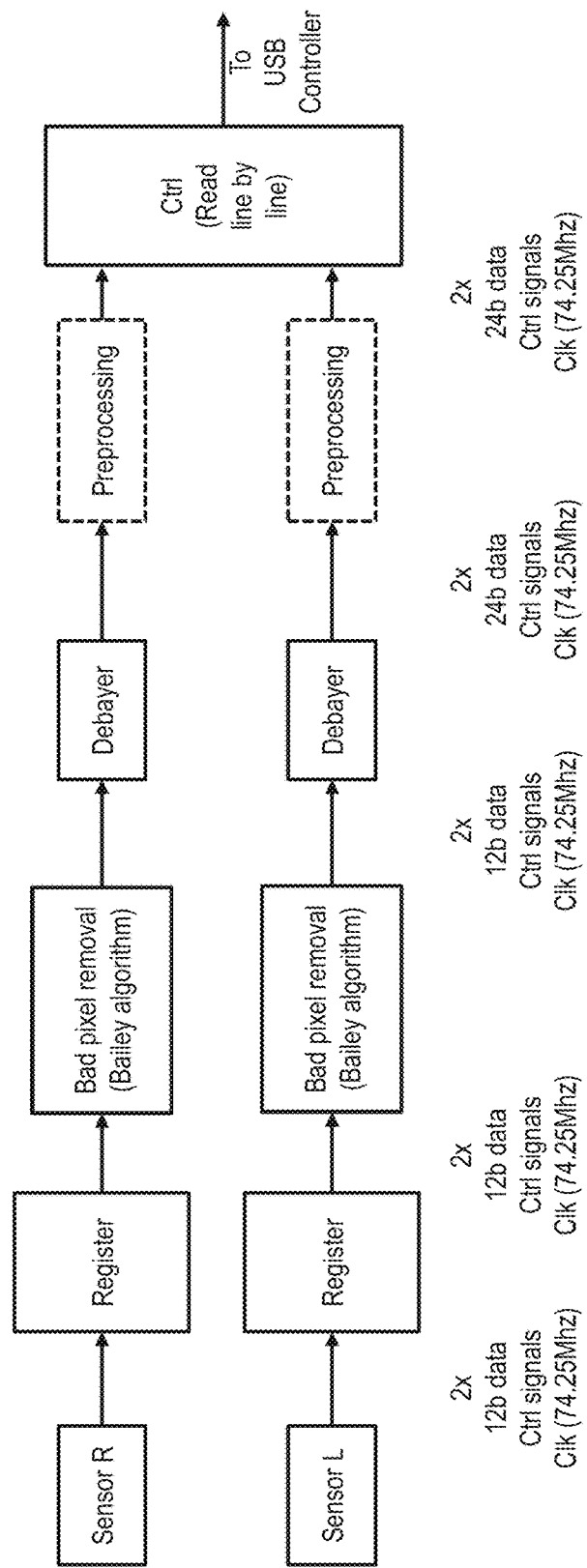
FIG. 24 shows an exemplary, illustrative non-limiting data flow for bad pixel removal.

The exemplary implementation of the bad pixel removal method in a camera system as described herein is shown in FIG. 24. Because of the stereo camera pipeline, the method can be instantiated twice, one for each pixel stream. However, the memory is preferably allocated in such a way to avoid employing double the amount of memory.

Figure 25:
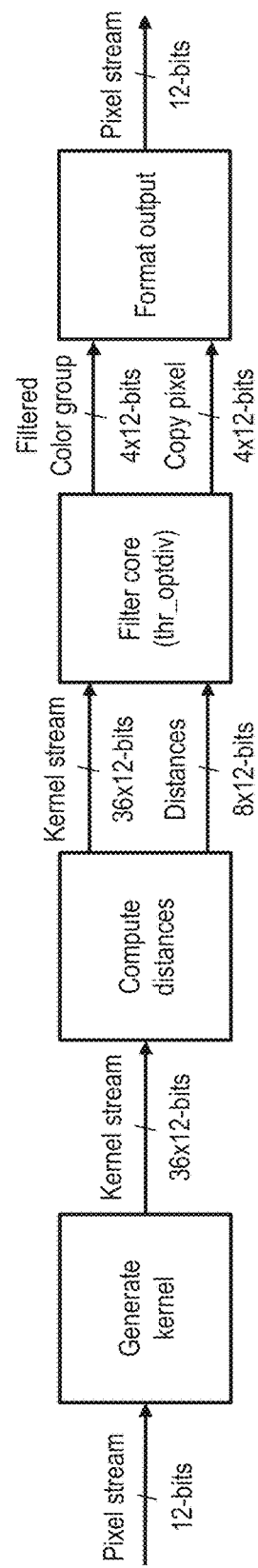
FIG. 25 shows an exemplary, illustrative non-limiting diagram for "W-means" unit FPGA implementation.

Turning now to the architecture of the W-means method, shown in FIG. 25, the design was made to be reusable. Indeed, if in the future the resource optimization level does not produce sufficient denoising accuracy, some parts of the algorithm can easily be changed to a more resource intensive version. The control signals are generated as the previous implementation. They are based on row and column counters.

The four components shown in FIG. 25 include a generate kernel module, a compute distances module, a filter core module and a format output module.

Figure 26:
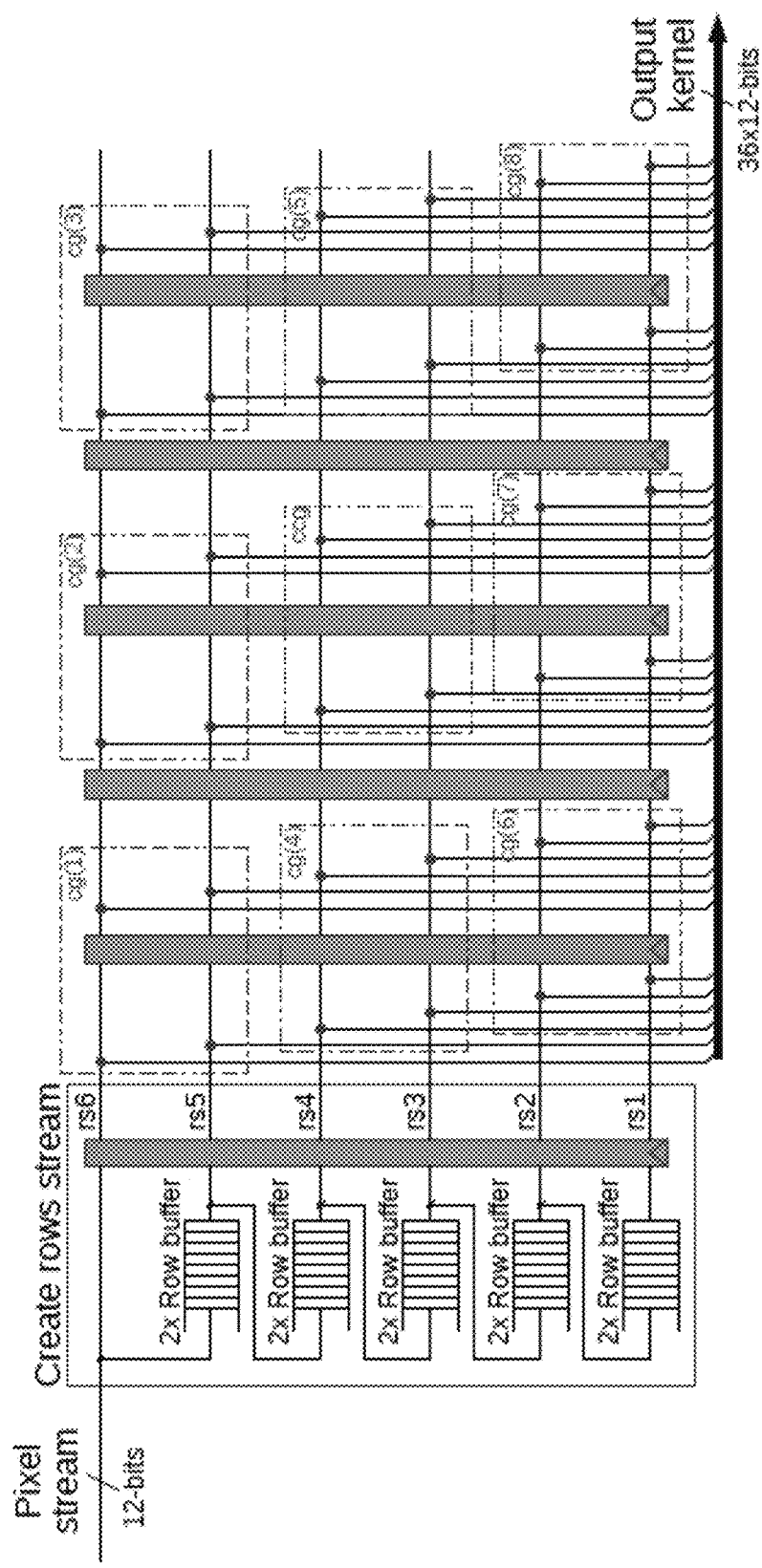
FIG. 26 shows an exemplary, illustrative non-limiting generate kernel component diagram for "W-means" algorithm, where the red annotations are color groups.

Generate kernel—this component permits to extract the image kernel to be processed. FIG. 26 shows an exemplary diagram. The "Create row stream" component follows the same principle as the previous implementation of the bad pixel method. The kernel contains a 3×3 color group zone, which corresponds to a 6×6 pixel zone.

Figure 27:
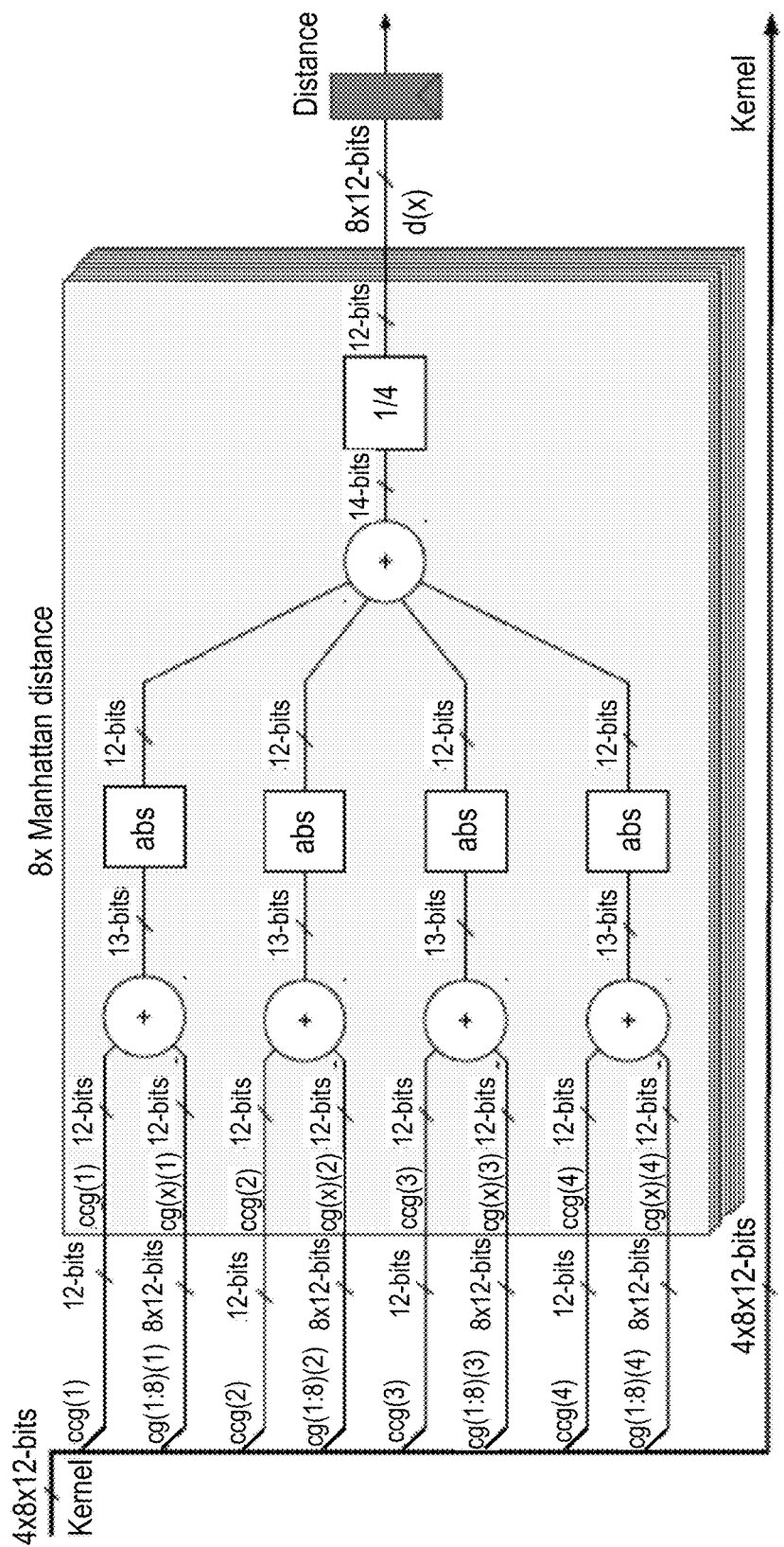
FIG. 27 shows an exemplary, illustrative non-limiting distance computation component diagram for "W-means" algorithm, in which "ccg(i)" is the center color group with color number i, "cg(xxi)" is the neighbor number x with color number i and "d(x)" is the result distance for the neighbor number x. i∈[1, 4], x∈[1, 8]

Distance computation—the distance is computed following the Manhattan distance described in the previous equation. FIG. 27 shows an exemplary hardware implementation. The Manhattan distance is computed between each color group neighbor and the center color group.

Figure 28:
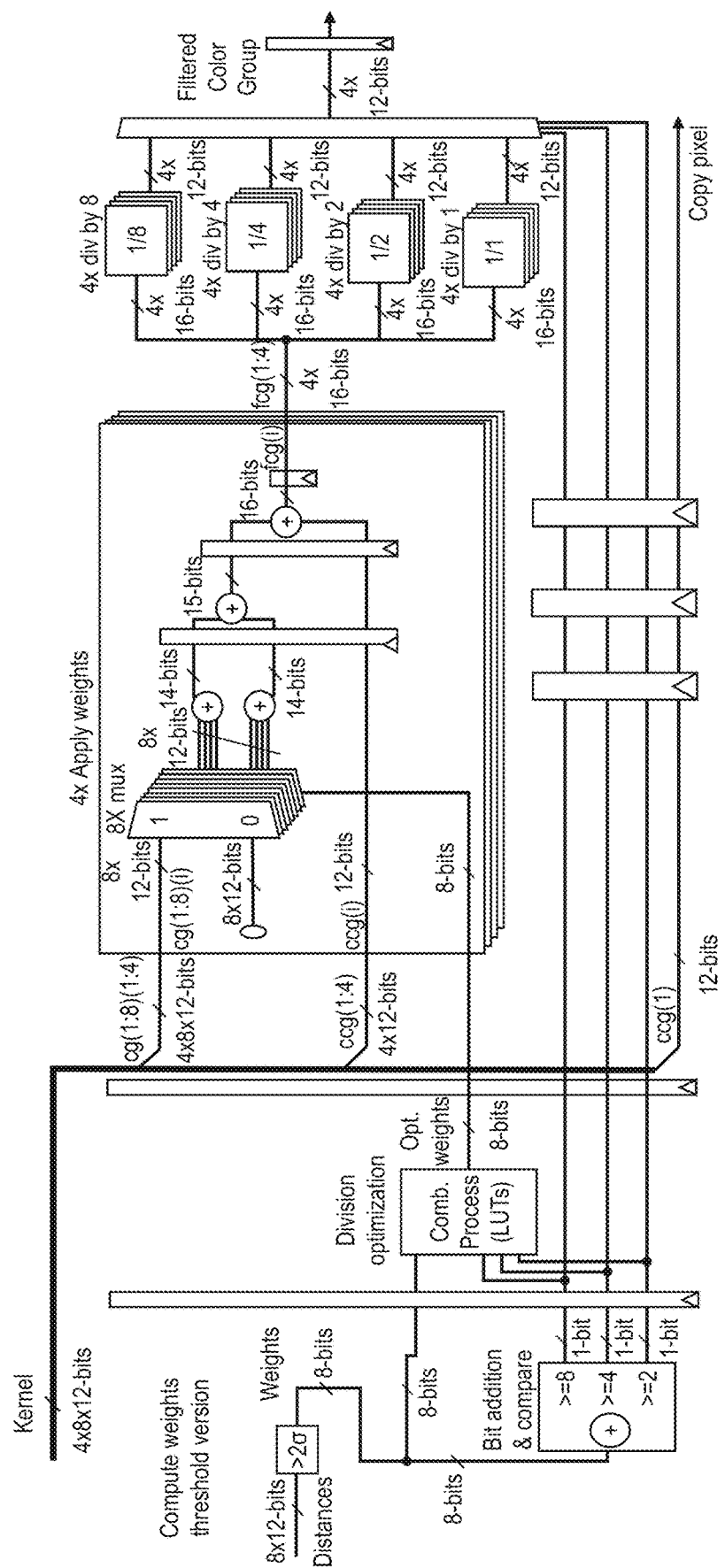
FIG. 28 shows an exemplary, illustrative non-limiting filter core "thr_optdiv" component diagram for "W-means" algorithm, in which "ccg(i)" is the center color group with color number i, "cg(xxi)" is the neighbor number x with color number i, and "fcg(i)" is the center color group with color number i. i∈[1, 4], x∈[1, 8]

Filter core "thr_optdiv"—a non-limiting, exemplary diagram of the main component of the filter is shown in FIG. 28. The implementation features a number of components. Compute weights (threshold version), where the binary weights are computed. Bit addition and compare, which permits the addition of weights and prepares control signals for the division optimization. It sums bits in the weights vector and compares the sum with all possible power of 2 values (except 1).

Division optimization: This process applies a division optimization, if the sum of weights is equal to a power of 2, the weight does not change. Else, all weights that overflow after the power of 2 are forced to 0.

Apply weights: Applying weights is simply done by a multiplexer. If the weight equal to 1 the associated pixel value is outputted, else it is 0. Then all multiplexers outputs are summed. Division—here the power of 2 divisions are made, where each divisor unit is only wiring.

Format output—the denoised color group stream needs to be formatted to a pixel stream. This component permits the algorithm to choose the valid color group to be outputted as a pixel stream. FIG. 29B shows an example of valid and not valid color groups. A color group is valid when its top left color is the same as the first color of the image (1st row, 1st column).

Figure 29A:
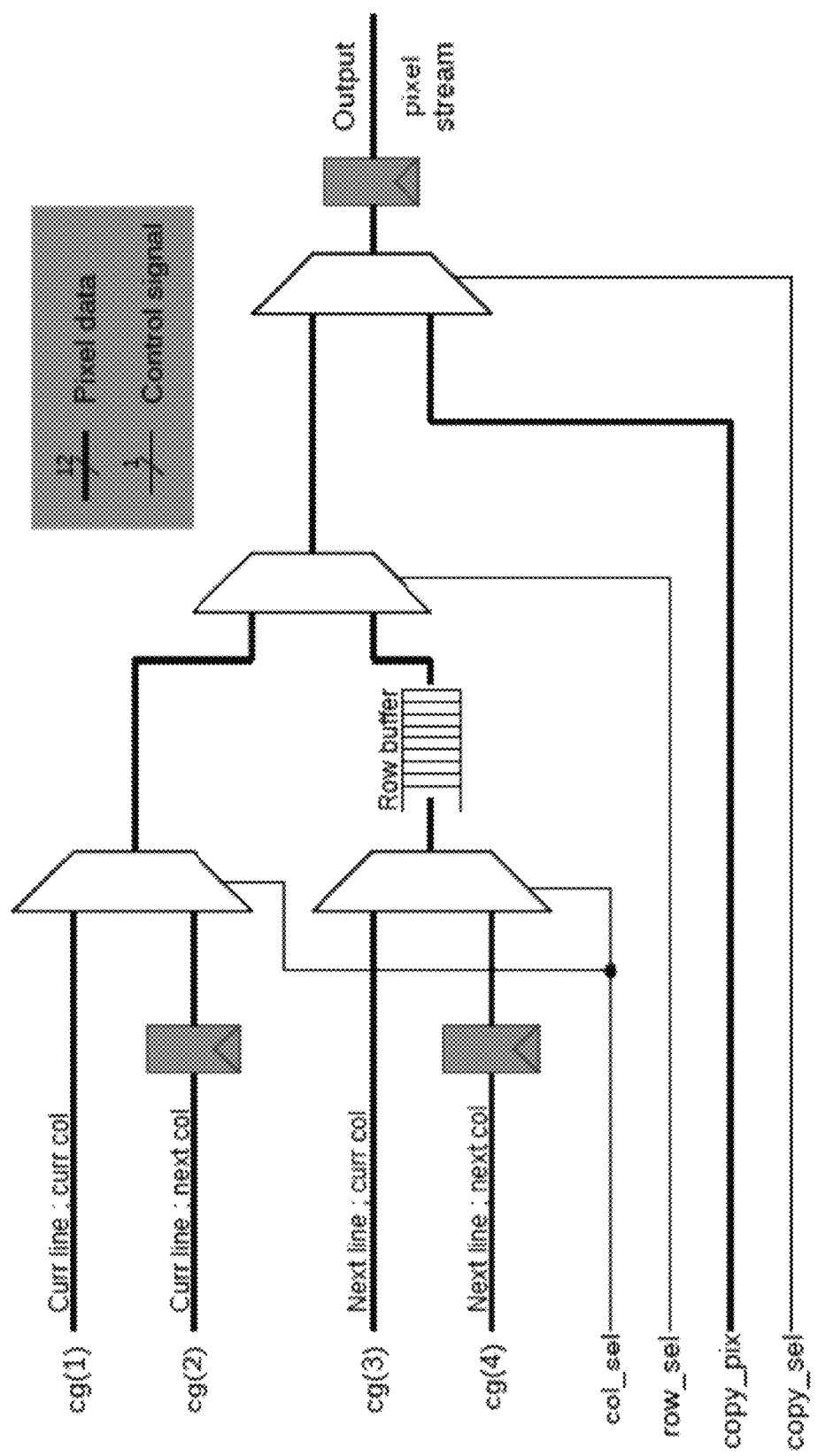
Figure 29B:
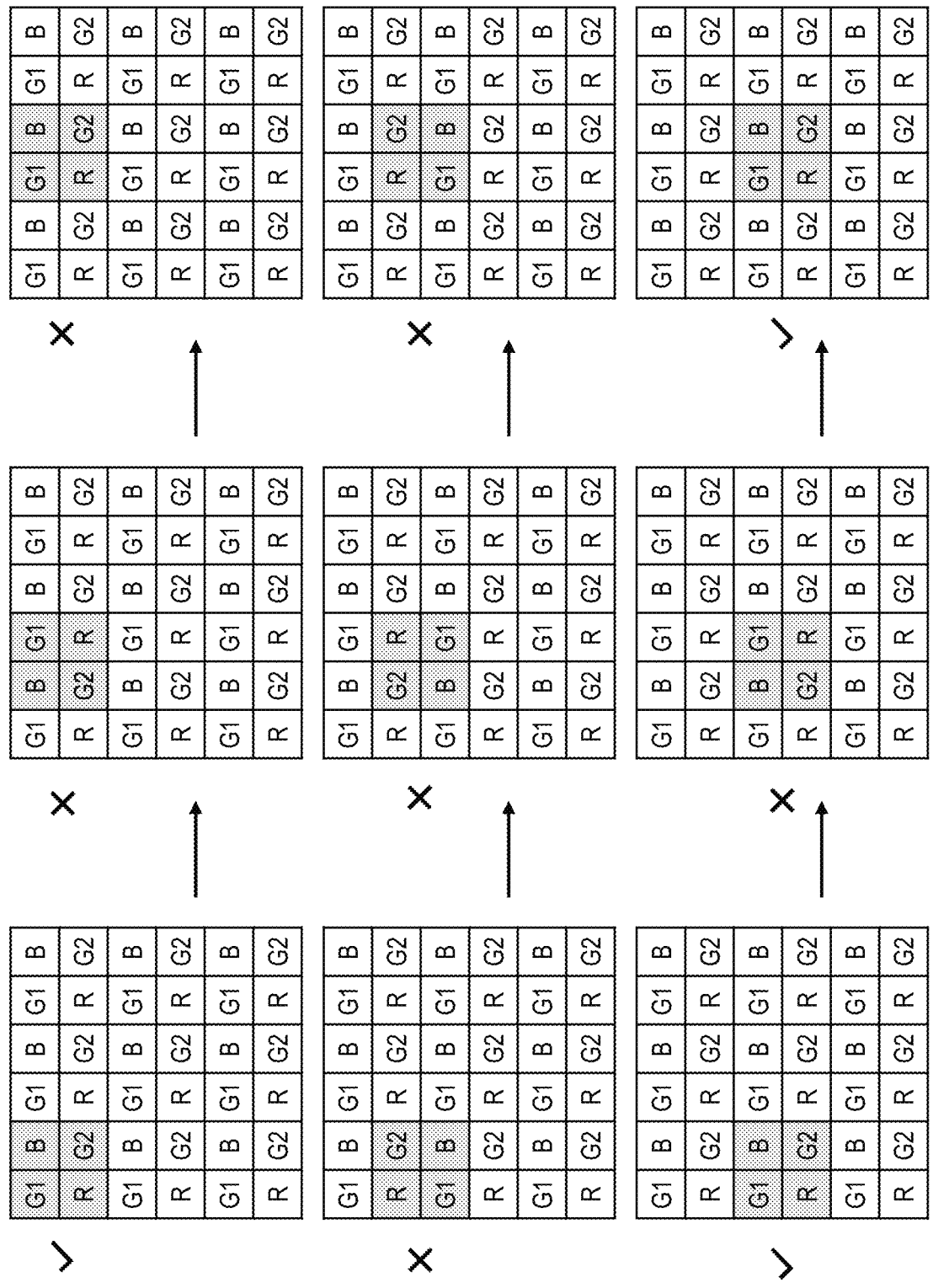
FIG. 29B shows an exemplary, illustrative valid output color group for "W-means" algorithm in a CFA (color filter array) image. In this example the CFA colors are "GBRG" (first image row start with green then blue and the second row starts with red then green)

FIG. 29A shows an exemplary, illustrative, non-limiting diagram for this process. Control signals are generated from column and rows counters. Row and column selection are simply least significant bits (LSBs) of these counters. As a color group belongs to two rows. it is required to use a row buffer to delay the second row of the color group. The copy_pix signal is the copied pixel value from the input image. It is used to copy image borders.

Figure 30:
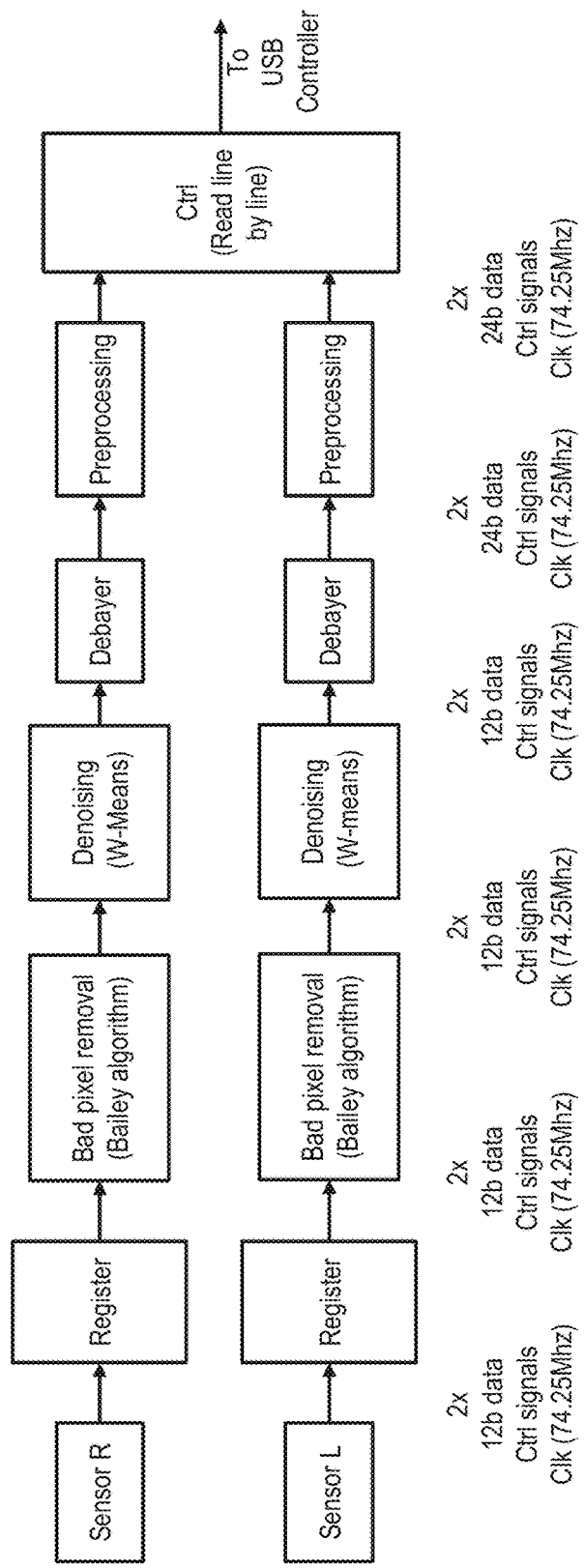
FIG. 30 shows an exemplary, illustrative non-limiting data flow for bad pixel removal and denoising.
Figure 31B:
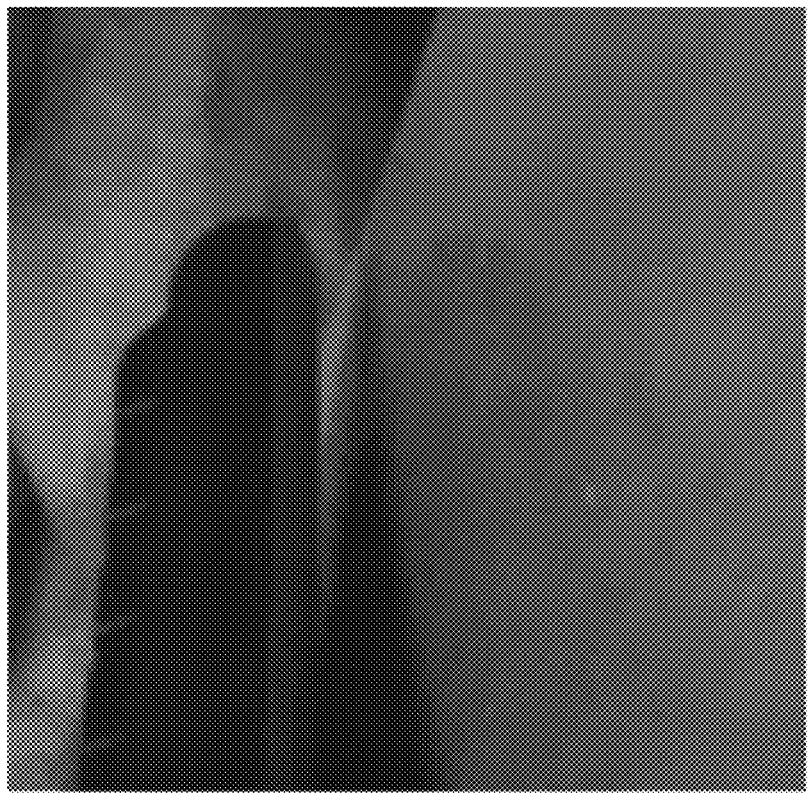
FIGS. 31A and 31B show final test results on the camera module for both the bad pixel and "W-means" algorithms. Image size (150×150) (zoom)
Figure 31A:
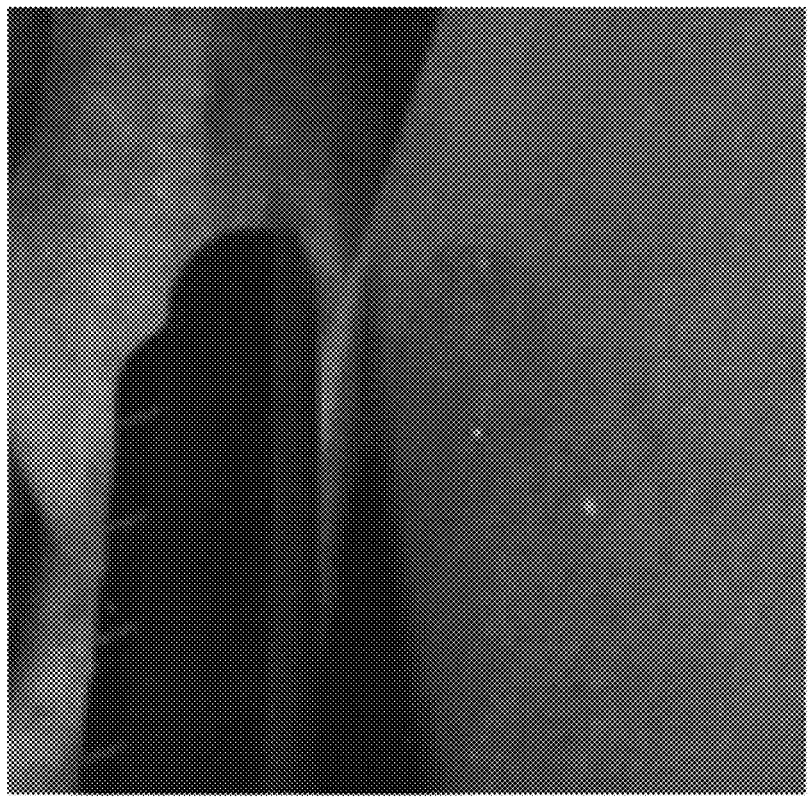

An exemplary implementation of the "W-means" algorithm in the stereoscopic pixel stream can be added while keeping the bad pixel removal algorithm in a camera system as described herein is shown in FIG. 30. The visual result, similar to previous tests, is shown in FIGS. 31A (pre) and 31B (post).

As tested on a Cyclone V FPGA, the system consumes only 5% of combinatorial logic and 7% of the memory. The FPGA tested was the Altera Cyclone V SOC (5CSTFD6D5F31I7N) FPGA). Optionally, the debayer method and the "W-means" algorithm could be combined or interwoven, to decrease resource usage. For every 4 clock cycles the "W-means" implementation only needs 1 to output 4 denoised pixels (only when color groups are valid). This means that during 3 clock cycles the algorithm does not need to filter the image. To improve resource consumption, instead of using a separate unit per pixel stream, both streams can be used in the same computing pipeline.

Figure 32:
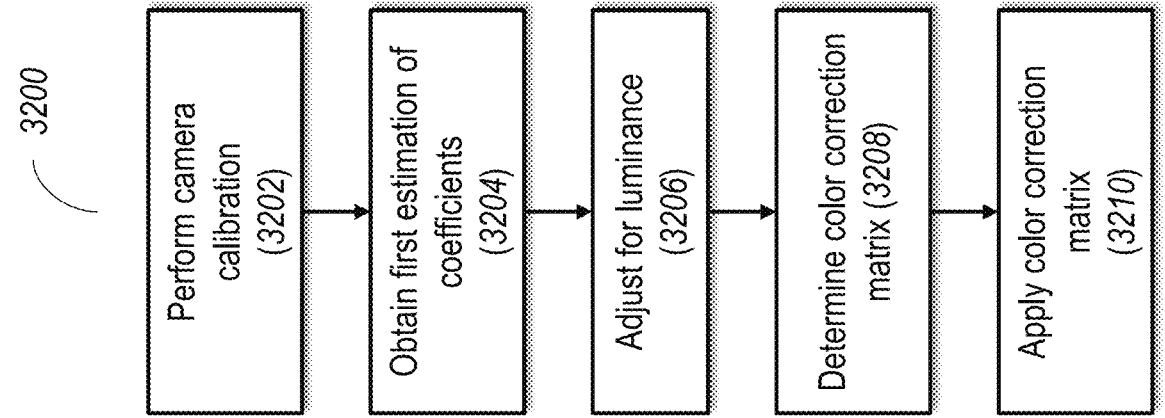
FIG. 32 shows a non-limiting exemplary method for color correction according to at least some embodiments.

FIG. 32 shows a non-limiting exemplary method for color correction according to at least some embodiments. Selectivity of filters, by which CFA (color filter array) can be applied as described above, is not narrow; moreover tails of each R G B spectra response usually overlap each other. These problems can lead to the wrong colors in output frame. A matrix of coefficients multiplied by each color channel tends to mitigate such effect. Each coefficient is obtained by a calibration camera process, which can be performed once, and resulting matrix is called Color Correction Matrix (CCM).

CMOS image sensors are sometimes characterized by quantum efficiency response. Hence, such sensors are monochromic by nature. In order to obtain a color image, a CFA is applied to the sensor output. Depending on the quantum efficiency of the filter, each pixel stores a single color information point. The particular selection of materials, used to realize the CFA, are usually not faithful to natural colors. The problem is typically due to an imperfect frequency range selectivity as well as cross color effect. In particular, each curve does not have a tight Gaussian shape (low selectivity), moreover the tails of each curve overlap each other (cross color effect). In order to correct the color appearance, each channel of the de-mosaiced image has to be multiplied by certain coefficients:

$$\begin{bmatrix} R_{corr} \\ G_{corr} \\ B_{corr} \end{bmatrix} = \begin{bmatrix} r1 & g1 & b1 \\ r2 & g2 & b2 \\ r3 & g3 & b3 \end{bmatrix} \times \begin{bmatrix} R_{cam} \\ G_{cam} \\ B_{cam} \end{bmatrix}$$

Where Xcam are R, G, B data coming from camera and Xcorr are R, G, B channel corrected values. The terms rj, gj, bj (with j assuming values 1, 2, 3) compose the color correction matrix.

Turning now to FIG. 32, a method 3200 is performed for color correction (according to some embodiments). In stage 3202, the camera calibration to retrieve color correction matrix coefficients is performed by processing a frame portraying a color checker board. The regions of the frame belonging to the color checker may be manually selected. For each region, the median is performed to evaluate the R, G, B camera channels' response. An example of the reference colors information characterizing color checker board may be found for example in ColorChecker classic for image reproduction|x-rite.

A first estimation of the coefficients is obtained in stage 3204, for example by computing the minimum norm least square solution satisfying system in Tsung-Huang Chen and Shao-Yi Chien (Cost effective color filter array de-mosaicking with chrominance variance weighted interpolation. In IEEE International Symposium on Circuits and Systems, 2007. ISCAS 2007, pages 1277-1280); where Xref terms are R, G, and B reference colors values in checker board, while $X_{cam}$ terms are R, G, and B camera colors values sent by camera. Applying these coefficients to the image causes the response of each channel to better adhere to the ideal characteristics of the image. Nevertheless test output images featured large saturated regions (data not shown).

$$\begin{bmatrix} R_{ref} \\ G_{ref} \\ B_{ref} \end{bmatrix} = \begin{bmatrix} r1 & g1 & b1 \\ r2 & g2 & b3 \\ r3 & g2 & b3 \end{bmatrix} \times \begin{bmatrix} R_{cam} \\ G_{cam} \\ B_{cam} \end{bmatrix}$$

This is due a lack of compensation of the luminance component, defined, according to ITU-R recommendation BT.709, as:

$$Y' = [0.2126 \quad 0.7152 \quad 0.0722] \times \begin{bmatrix} R \\ G \\ B \end{bmatrix}$$

When a direct correction is performed, the resulting luminance is higher than in original frame. In order to maintain an unaltered luminance component the following calculation is performed in stage 3206:

Consider x as pixels from original frame, y as pixels from directly corrected frame and y* as pixels from luminance corrected frame. These pixels are related one to the other by the two below equations, where A and C are 3×3 matrices.

$$y = Ax$$

$$y^* = Cz$$

These matrices are linked by the relation:

$$A = \alpha C$$

then $$y = \alpha y^*$$

$$\alpha = \frac{lum(Ax)}{lum(y^*)}$$

Where lum( ) is a function defined to calculate luminance component of input pixels. Because we are looking for $\alpha$ such that the luminance components of the original and final frames are equal, lum(y*)=lum(x), then $\alpha$ is:

$$\alpha = \frac{lum(Ax)}{lum(x)}$$

The color correction matrix is then established in stage 3208. Multiplying the frame by the obtained C color correction matrix, a natural color frame image is obtained in stage 3210. Moreover, the image sensor response is more similar to an ideal one adjusted with original luminance.

Figure 33A:
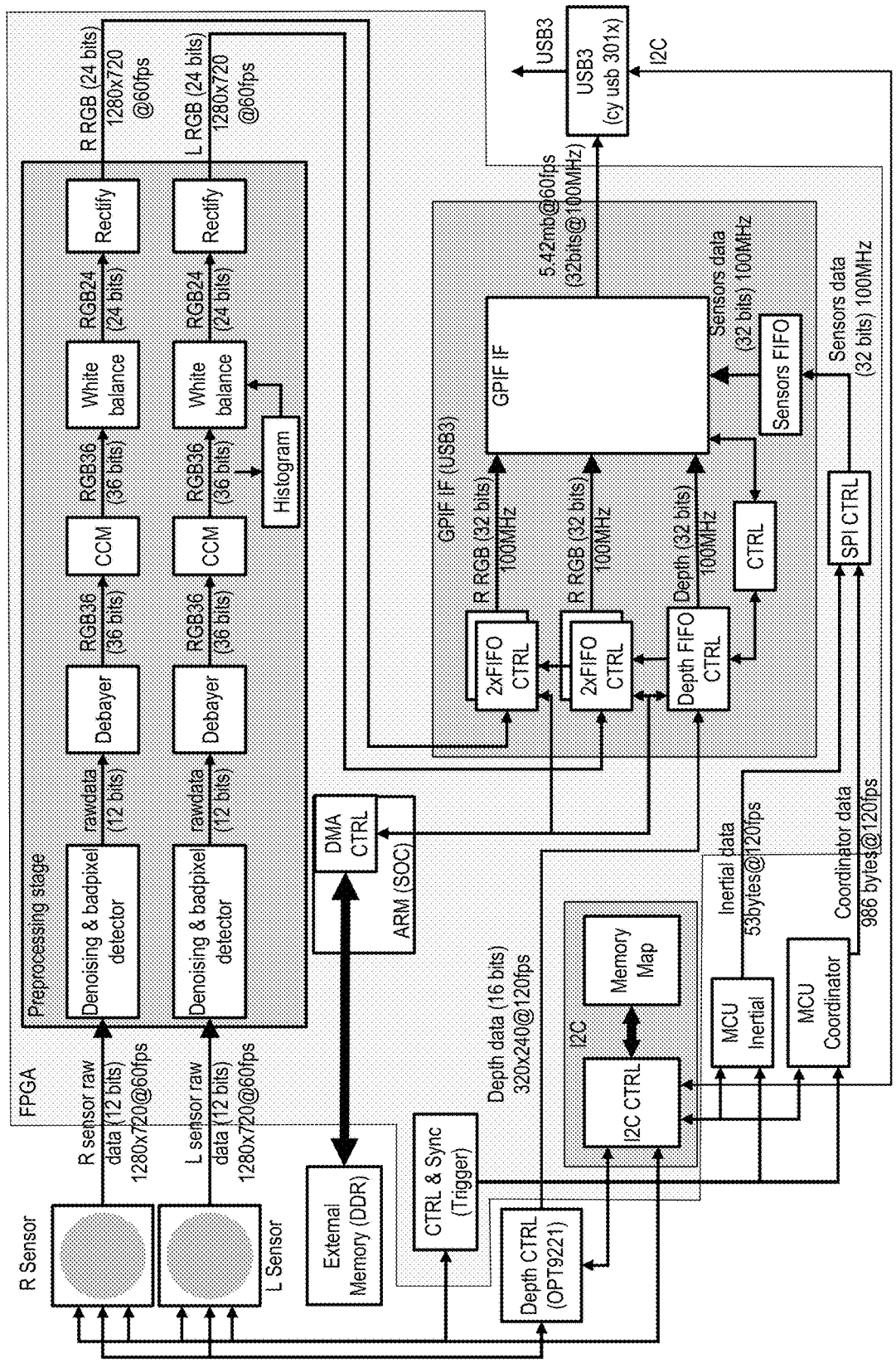
FIGS. 33A-33D show a non-limiting exemplary FPGA configuration according to at least some embodiments.
Figure 33B:
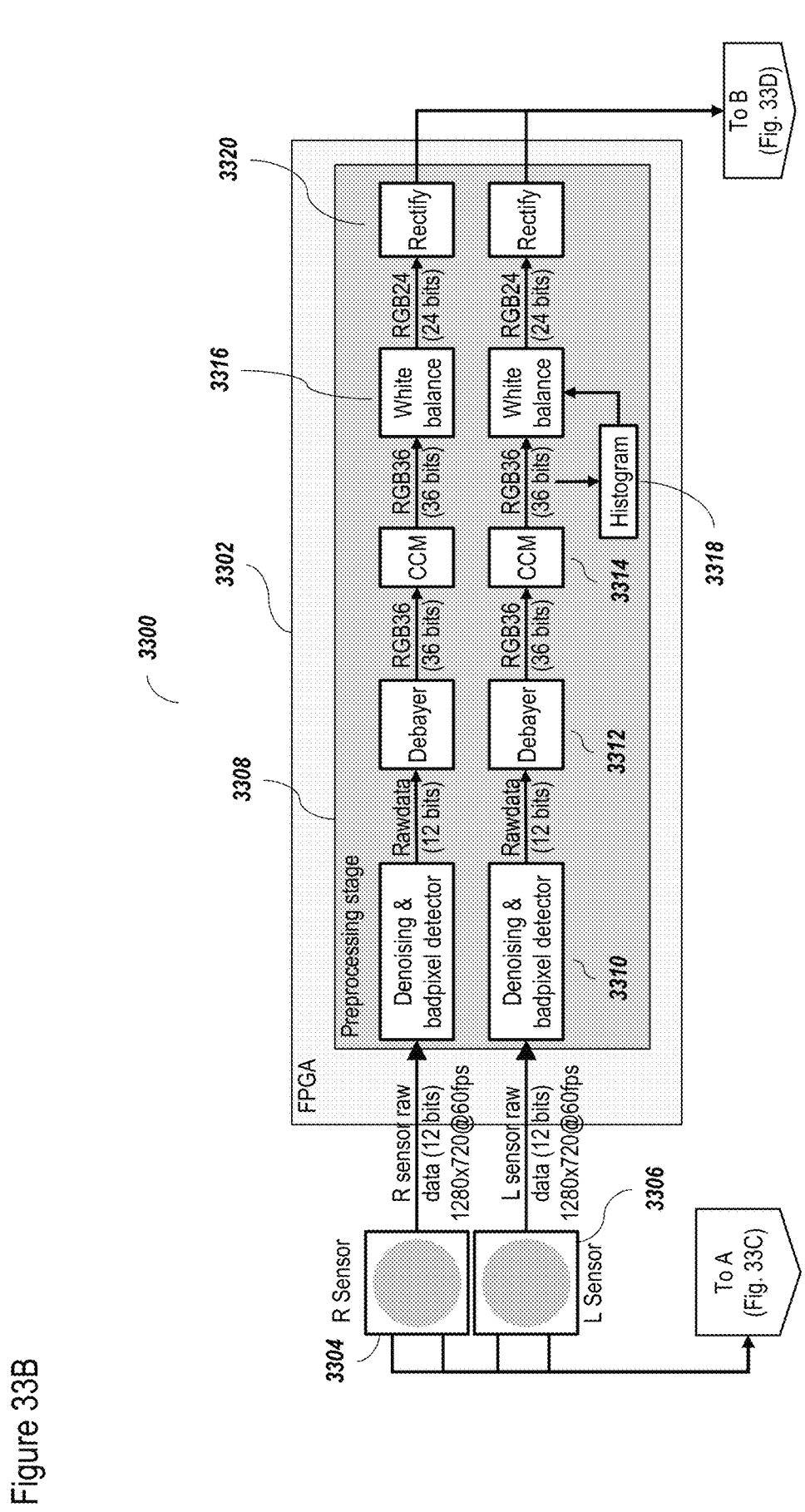
Figure 33C:
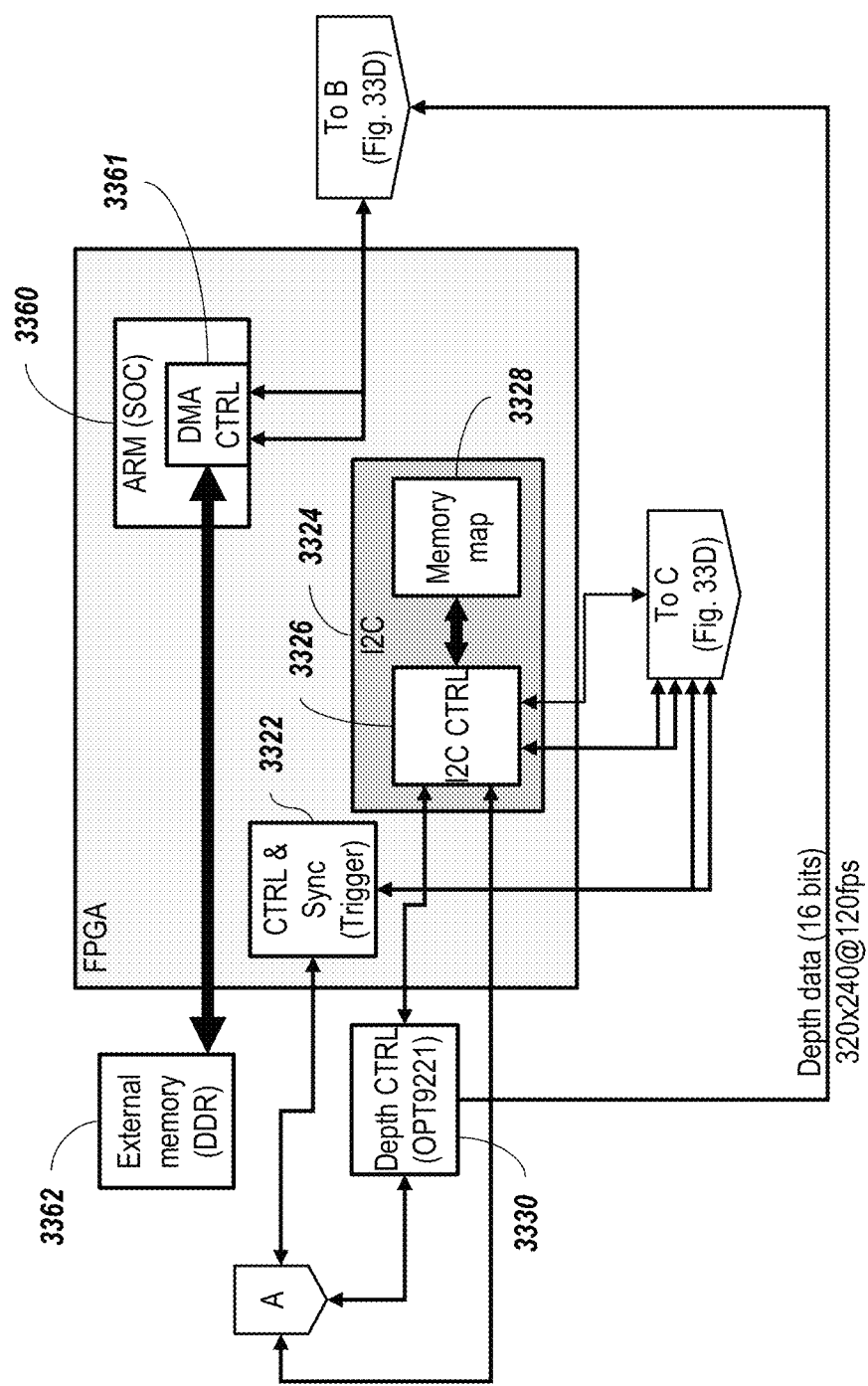
Figure 33D:
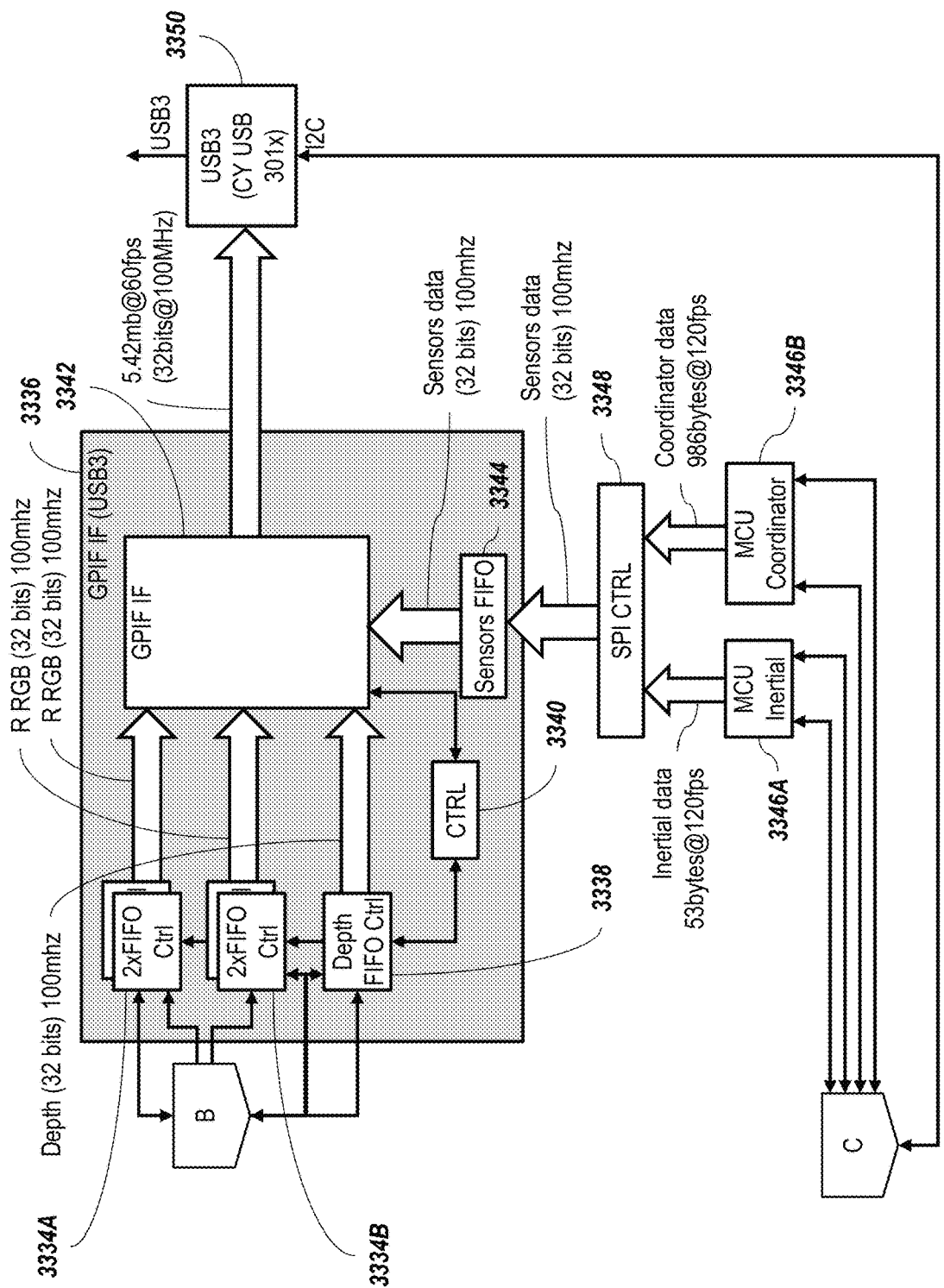

FIGS. 33A-33D show a non-limiting exemplary FPGA configuration according to at least some embodiments. FIG. 33A shows an FPGA 3300 system, while FIG. 33B shows the top of FPGA system 3300 in more detail, and FIGS. 33C and 33D show the left and right sides, respectively, of the bottom of FPGA system 3300 in more detail. Reference is made to all of FIGS. 33A-33D in the below discussion.

FPGA system 3300 features an FPGA 3302, receiving input from a right sensor 3304 and a left sensor 3306. Data from each sensor 3304 and 3306 is fed to a preprocessing stage 3308, which runs preprocessing for data from each sensor separately as shown. For each sensor, preprocessing stage 3308 begins with denoising and bad pixel detection 3310, performed as previously described. Next the previously described debayer process 3312 is performed.

The results of the debayer process 3312 are then fed to the previously described color correction matrix (CCM) process 3314. The data from CCM process 3314 is used to determine the histogram 3318. The histogram then feeds to the previously described white balance correction process 3316. After that a rectify process 3320 is performed for stereo rectification as previously described.

FPGA system 3300 is shown with three branches, in FIGS. 33B-33D. There are two links shown between the top and bottom branches, labeled as "to A" and "to B". There are two links shown between the left and right bottom branches, labeled as "to B" and "to C".

Turning to the first branch, "to A" (in FIG. 33B) and "A" (in FIG. 33C), sensors 3304 and 3306 have a bi-directional flow with a trigger 3322 for controlling and syncing between the inputs from both sensors 3304 and 3306, so that timing is synchronized between the frames. In addition, sensors 3304 and 3306 have a bi-directional flow with an I2C (Inter Integrated Circuit) 3324. I2C 3324 includes an I2C controller 3326 and a memory map 3328. I2C controller 3326 in this example is a master microcontroller (slave microcontrollers and other slave components may also be featured; not shown). Memory map 3328 is a map of the memory registers in the various slave components which allow the one or more controllers to write to the registers of the slave devices. Memory map 3328 is a register for controlling the values for the variables for FPGA system 3300.

I2C controller 3326 is also in communication with a depth controller 3330 for synchronizing the timing of the depth sensor data. Optionally all sensor data passes through I2C controller 3326, including but not limited to sensors 3304 and 3306, and sensors 3346.

In the second branch, "to B" (in FIG. 33B or 33C) or "B" (in FIG. 33D), preprocessing stage 3308 transmits preprocessed RGB sensor data to two FIFO buffers 3334A and 3334B on a GPIF (General Programmable Interface) IF (interface) module 3336. GPIF IF module 3336 implements a 32 bit bus interface, which is used to communicate with the USB3 chip 3350. FIFO buffers 3334A and 3334B operate as previously described. Depth data from depth controller 3330 is fed to a depth FIFO buffer 3338. GPIF IF module 3336 also has a controller 3340 and a GPIF IF 3342. GPIF IF 3342 is the interface for the bus.

GPIF IF 3342 also receives additional sensor data from an additional sensors FIFO buffer 3344, which in turn optionally receives sensor data from multiple sensors 3346, of which two examples are shown for the purpose of illustration and without any intention of being limiting. Non-limiting examples that are shown include a MCU inertial sensor 3346A and a MCU coordinator 3346B. This data is optionally fed through a controller 3348, which may be an SPI (serial peripheral bus) controller for example.

Processed information is then output from GPIF IF 3342 to the USB chip 3350 for example.

The actions of GPIF IF 3342 may be assisted by computations performed by SOC (system on chip) 3360, optionally with an external memory 3362. SOC 3360, using external memory 3362, is able to increase the speed of performance of GPIF IF 3342 by performing computations more quickly. SOC 3360 acts as embedded processor with a DMA (direct memory access) module 3361. For example, SOC 3360 can perform calculations related to stereo data (including depth and RGB data) through sensor FIFOs 3334A, 3334B and 3338.

Turning now to the third branch, labeled "to C" in FIG. 33C and "C" in FIG. 33D, trigger 3322 may control the action(s) of sensors 3346 as shown, to trigger their activation for data collection for example. Trigger 3322 may, alternatively or additionally, synchronize the various sensors 3346 with a timestamp. I2C 3324 receives data from the various sensors, including sensors 3346, and sensors 3304 and 3306, as previously described.

FIGS. 34-46 describes various non-limiting examples of methods for tracking a user. These methods may, for example and without limitation, be performed by the FPGA as shown in FIG. 5 or 6, and/or the CPU of FIG. 6. As a non-limiting example, these methods may be an example of a feature that may be provided to the user application of FIG. 5 and that may be calculated by the fusion kernels of FIG. 5.

These methods may be used for tracking at least a portion of a body by fitting data points received from a depth sensor and/or other sensors and/or "markers" as described herein to a body model. For example, in some embodiments, certain of such data points are identified as "super points," and apportioned greater weight as compared to other points. Such super points can be obtained from objects attached to the body, including, but not limited to, active markers that provide a detectable signal, or a passive object, including, without limitation, headgear or a mask (for example for VR (virtual reality)), or a smart watch. Such objects are described for example with regard to FIG. 2B. Such super points may also be obtained from specific data points that are matched to the model, such as data points that are matched to vertices that correspond to joints in the model.

Figure 34:
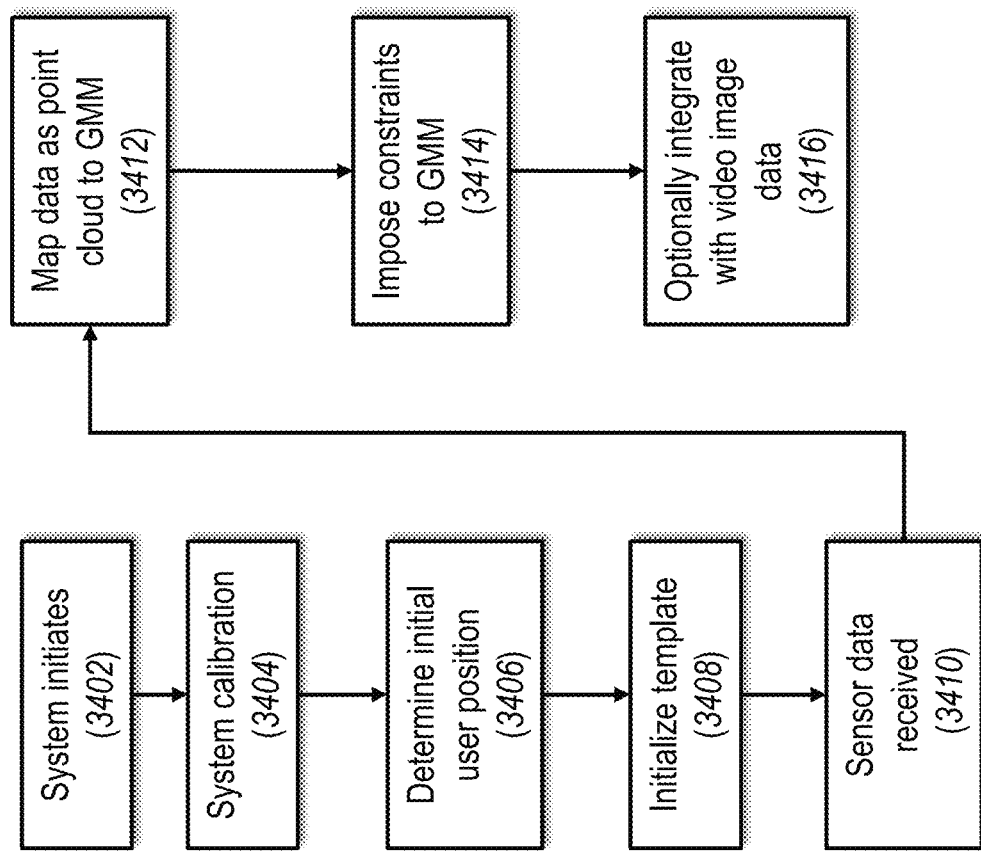
FIG. 34 shows a non-limiting example of a method for tracking the user, optionally performed with the system of FIG. 1 or 2, according to at least some embodiments of the present disclosure.

FIG. 34 shows an exemplary, illustrative non-limiting method for tracking the user, optionally performed with the system of FIG. 1 or 2, according to at least some embodiments of the present disclosure.

As shown, at 3402, the system initiates activity, for example, by being powered up (i.e., turned on). The system can be implemented as described in FIG. 1 but may also optionally be implemented in other ways. At 3404, the system performs system calibration, which can include determining license and/or privacy features. System calibration may also optionally include calibration of one or more functions of a sensor.

At 3406, an initial user position is determined, which (in some embodiments), is the location and orientation of the user relative to the sensors (optionally at least with respect to the camera and depth sensors). For example, the user may be asked to or be placed such that the user is in front of the camera and depth sensors. Optionally, the user may be asked to perform a specific pose, such as the "T" pose for example, in which the user stands straight with arms outstretched, facing the camera. The term "pose" relates to position and orientation of the body of the user.

At 3408 the template is initialized. As described in greater detail below, the template features a model of a human body, configured as only a plurality of parameters and features, such as a skeleton, joints and so forth, which are used to assist in tracking of the user's movements. At 3410, sensor data is received, such as for example, one or more of depth sensor data and/or camera data. At 3412 and 3414, the sensor data is analyzed to track the user, for example, with regard to the user's movements. Optionally, the sensor data can be mapped onto a body model, e.g., the body model features an articulated structure of joints and a skin defined by a mesh of vertices that are soft-assigned to the joints of the model with blending weights. In this way, the skin can deform accordingly with the body pose to simulate a realistic human shape.

Optionally, the sensor data is analyzed by mapping onto a GMM (Gaussian mixture model) as described herein. As described in greater detail below, optionally, a classifier can be used. Because the user's pose is not likely to change significantly between frames, optionally, the process at 3412, 3414, while performed iteratively, can only be performed with regard to a limited number of iterations. For example, the present inventors have found that, surprisingly, as few as 3-10 iterations may be used to map the data. If a GMM is used, each vertex of the skin defines an isotropic Gaussian, whose mean location in the 3D space is a function of the rotation parameters of the joints to which the vertex is attached (rotating the left wrist won't affect the position of the vertices on the right hand skin).

The body model preferably features a sparse-skin representation. Having a sparse-skin representation is convenient to handle occlusions. Both self-occlusions or occlusions of body parts due to clutter or because the user exits the camera frame. One dynamically enables or disables the Gaussians that are considered to be occluded at a given frame, so that those disabled won't influence the optimization.

In a different direction, it is also straightforward to model amputee users by suppressing the corresponding Gaussians. This can be done online during a calibration process or having a therapist manually configuring the body model. In 3412, if a GMM is used, the sensor data is mapped as a point cloud to the GMM. The GMM and mapping are optionally implemented as described with regard to "Real-time Simultaneous Pose and Shape Estimation for Articulated Objects Using a Single Depth Camera" by Mao Ye and Ruigang Yang, IEEE Transactions on Pattern Analysis & Machine Intelligence 2016 vol. 38 Issue No. 08. In this paper, an energy function is described, which is minimized according to the mapping process.

Optionally, only the depth sensor data is used, but alternatively, both the depth sensor and the camera data are used. For example, the calculations may be performed as follows. Given a set of N points x∈X it is desired to fit a GMM with M components (vm).

$$p(x_n) = (1-u)\sum_{m=1}^{M} p(v_m)p(x_n \mid v_m) + u\frac{1}{N} \quad (1)$$

At 3414, one or more constraints are imposed on the GMM as described in greater detail below. For example, optionally the model is constrained so that the body parts of the user are constrained in terms of the possible angles that they may assume. At 3416, the mapped data is optionally integrated with video data.

Figure 35:
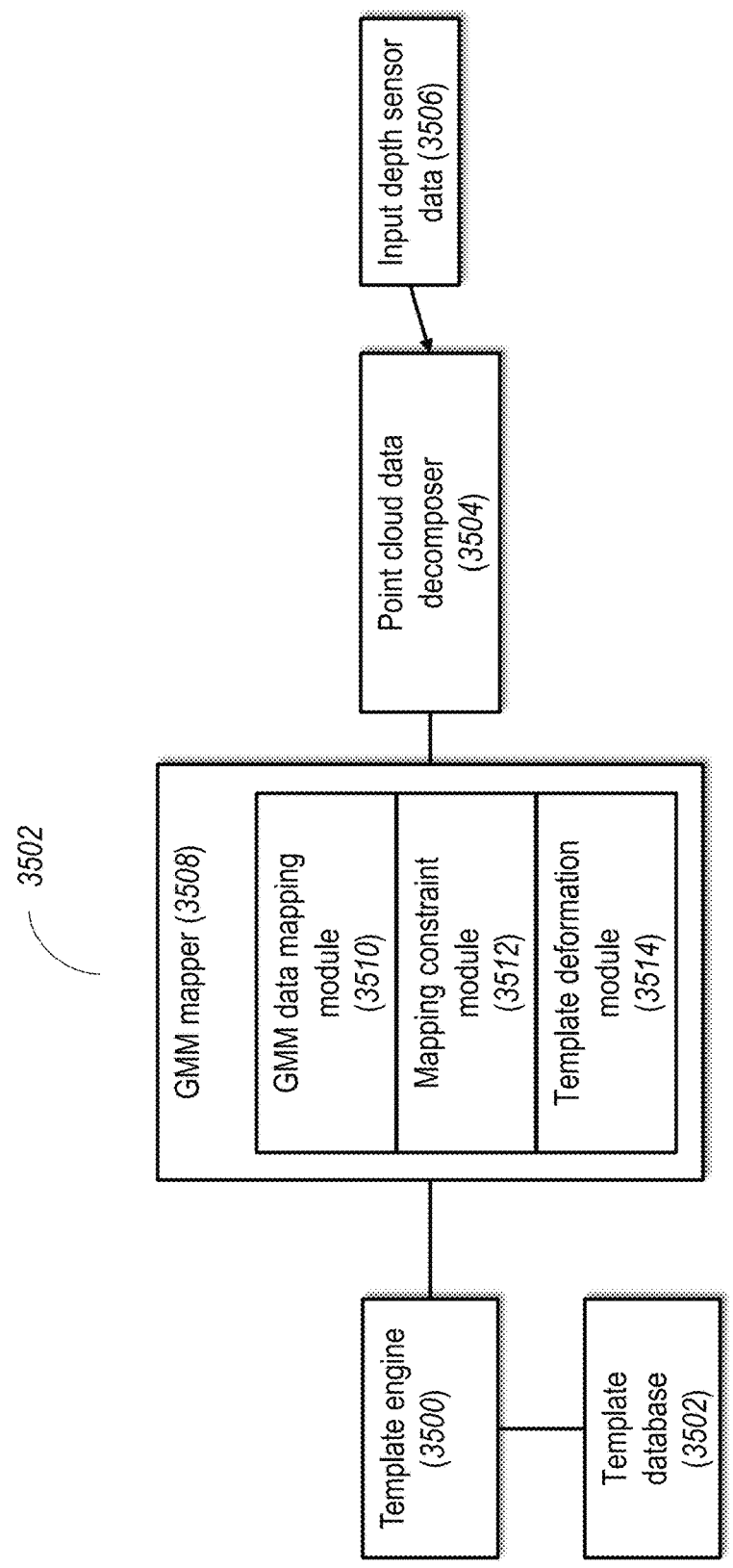
FIG. 35 shows a non-limiting example of a tracking engine, optionally for use with the system of FIG. 1 or 2, or the method of FIG. 34, according to at least some embodiments of the present disclosure.

FIG. 35 shows an exemplary, illustrative non-limiting tracking engine, optionally for use with the system of FIG. 1 or 2, or the method of FIG. 34, according to at least some embodiments of the present invention. For this embodiment of the tracking engine, the data is assumed to be mapped to a GMM, but as described herein, optionally a classifier is used instead. As shown, the tracking engine features a template engine 3500, which reads a template from a template database 3502, and then feeds the template to a GMM mapper 3508. GMM mapper 3508 also receives point cloud information from a point cloud decomposer 3504, which receives the depth sensor data as an input in 3506. Optionally color camera data could also be provided to point cloud decomposer 3504. For example, stereo RGB could be used to assist with the assignment of points to body parts and/or to improve the depth sensor data. Solutions to the problem of configuring depth sensor data to a point cloud is well known in the art and could optionally be performed according to any suitable method. One non-limiting example of a suitable method is provided in "Alignment of Continuous Video onto 3D Point Clouds" by Zhao et al, available at https://pdfs.semanticscholar.org/124c/ 0ee6a3730a9266dae59d94a90124760f1a5c.pdf.

To increase the speed of processing, the depth sensor data may be configured as follows. To do so a KD-tree of the scene is built for each frame, so that when computing correspondences from vertices to cloud one only uses the K nearest neighbors and assume a zero-posterior for the rest. As a consequence, the algorithm runs several orders of magnitude faster. The gating of correspondences allows sparsification of both the distance and the posterior matrix with huge gains on computation speed.

As compared to "Real-time Simultaneous Pose and Shape Estimation for Articulated Objects Using a Single Depth Camera" by Mao Ye and Ruigang Yang, IEEE Transactions on Pattern Analysis & Machine Intelligence 2016 vol. 38 Issue No. 08, which reached real time performance with a GPU (graphics processing unit), the presently described algorithm, according to some embodiments, can reach real-time performance (100+ fps in a i7 processor) with CPU (central processing unit) only, which is a significant computational advantage.

GMM mapper 3508 features a GMM data mapping module 3510, a mapping constraint module 3512 and a template deformation module 3514. GMM data mapping module 3510 receives the point cloud data from point cloud decomposer 3504 and maps this data onto the GMM, as adjusted by the input template from template engine 3500. Next one or more constraints from mapping constraint module 3512, for example in regard to the angle range that body parts of the user can assume, are applied to the mapped data on the GMM by mapping constraint module 3512. Optionally, such information is augmented by deforming the template according to information from template deformation module 3514; alternatively, such deformations are applied on the fly by GMM data mapping module 3510 and mapping constraint module 3512. In this case, template deformation module 3514 is either absent or alternatively may be used to apply one or more heuristics, for example according to pose recovery as described in greater detail below.

Figure 36:
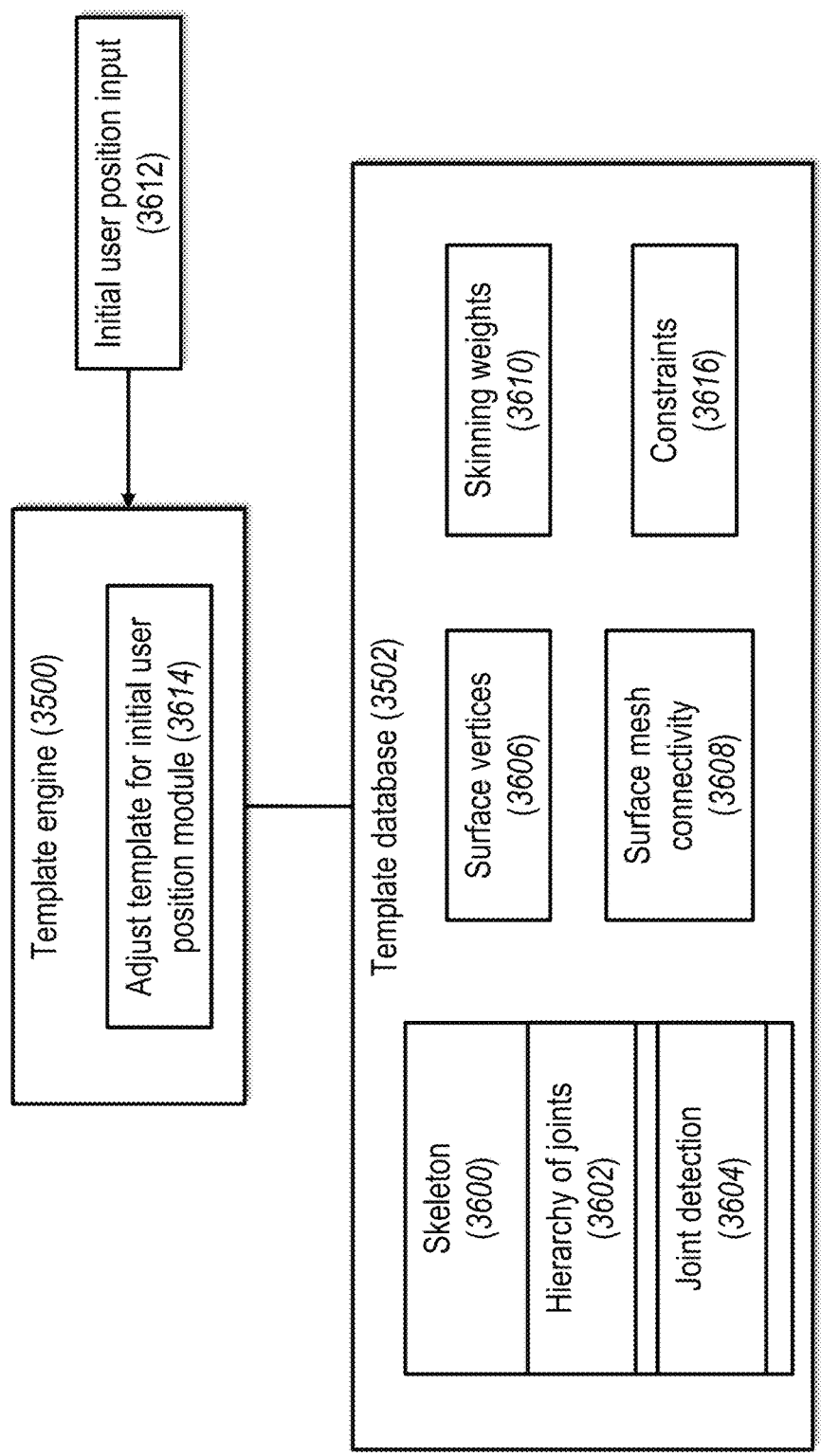
FIG. 36 shows templates and a template engine, according to at least some embodiments of the present disclosure.

FIG. 36 shows templates and the template engine in more detail, according to at least some embodiments of the present disclosure. Template engine 3500, according to some embodiments, features an adjust template for initial user position module 3614, which receives information regarding the initial position of the user from an initial user position input 3612. For example, if the template is constructed with a standing user, but the user is lying down or sitting, then the template is preferably adjusted according to the actual position of the user. Even if the user's position is the same as that intended by the template, such as standing in a T pose, the template can be adjusted according to the actual user, such as the actual dimensions of the user.

Template database 3502 can contain a variety of different types of information in each template. For example, each template preferably includes a skeleton 3600, a hierarchy of joints 3602 and a joint detection 3604. Skeleton 3600 defines the virtual skeleton of the user, as determinable from the point cloud data. Each skeleton 3600 includes a hierarchy of joints 3602, which is (as known) representation of a virtual skeleton with its virtual parts. A hierarchy of joints 3602 enables each joint of the user's body to be located and for the location to be determined in context to the location of other joints. Joint detection 3604 can relate to information for detecting the joints of the user as specific points, or groups of points, from the point cloud as described in greater detail below.

Each template can also feature surface vertices 3606, surface mesh connectivity 3608, skinning weights 3610 and constraints 3616. Surface vertices 3606 relate to the vertices on the external body of the user (as opposed to the internal representation of the user's body structure by the virtual skeleton), while surface mesh connectivity 3608 defines the external body surface of the user according to a mesh. Skinning weights 3610 determine the weights for how the skinning is performed, for example in terms of determining the correct external surface of the user.

Constraints 3616 can be used to determine which body positions are not allowed, for example, according to the possible angle ranges of different body part positions. For example, and without limitation, constraints may include one or more of self-intersection, angle and pose prior. These constraints can be weighted differently. Weighting is preferred, rather than setting the constraints as an absolute bar, as the inventors have determined that surprisingly, the GMM model does not operate efficiently if the search space is too restricted. Therefore, weighting allows the importance of the constraints to be captured without excessively restricting the search space. The constraints can be applied to the previously described energy function.

The self-intersection constraint is optional and may not be applied, as the angle constraints may effectively account for self-intersection according to how they are applied. If applied, the self-intersection constraint may be calculated as follows:

$$E_{self} = \frac{1}{|P|} \sum_{(s,t) \in P} \max(0, h_{st}(\Theta^{t-1} + \Delta\Theta)) \quad (2)$$

$$h_{st}(\theta) = (r_s + r_t)^2 - \|v_r(\theta) - v_t(\theta)\|^2 \quad (3)$$

$$v_m(\Theta^{t-1} + \Delta\Theta) = v_m + I_m\Delta\xi_\beta + \sum_{k=1}^{K} \beta_{mk}\hat{\xi}'_k v_m\Delta\theta_k \quad (4)$$

$$h_{st}(\theta) = (r_s + r_t)^2 - \left\|v_s + \sum_{k=1}^{K} \beta_{sk}\hat{\xi}'_k v_s\Delta\theta_k - v_t - \sum_{k=1}^{K} \beta_{tk}\hat{\xi}'_k v_t\Delta\theta_k\right\|^2 \quad (5)$$

where rs, rt represent the radius of the intersecting Gaussians. The set P defines the set of pairs of Gaussians that should be forbidden to intersect.

In some embodiments, the angle constraints are important for correct operation of the model and are heavily weighted. Constraints are currently applied per angle, but could optionally be applied for all angles jointly. The angle constraints relate to the ranges of angles that various body parts are allowed to achieve.

For a given joint, the angle constraints are preferably determined according to a rotational model, such that for example optionally 1, 2 or 3 degrees of freedom are determined. For example the elbow may be determined to have 1 degree of freedom and the shoulder may be determined to have 3 degrees of freedom. For each degree of freedom, a minimum and maximum angle is determined. As another example of the ranges, the Appendix provides notation in regard to the angles, such that limit_rotation_x relates to the minimum and maximum angle for a first degree of freedom, limit_rotation_y relates to the minimum and maximum angle for a second degree of freedom, and limit_rotation_z relates to the minimum and maximum angle for a third degree of freedom. If the values are set to zero for a limit rotation, then that degree of freedom is not available to the joint and those angles would not change at all. If no specific limit rotations are set, then the joint or bone achieves the rotation of the entire body.

The angle constraints are optionally imposed with a max/mean operator. This operator is non-linear and involves gradient based optimizing. Such angle constraints can be imposed as rotation limits, that are applied using a non-linear term. Non-limiting examples of such terms are described in equations 11, 12 of this paper: "Efficient and Precise Interactive Hand Tracking Through Joint, Continuous Optimization of Pose and Correspondences" by Taylor et al, 2016, available from http://www.samehkhamis.com/taylor-siggraph2016.pdf. One example of a non-limiting method to calculate angle constraints is as follows:

$$E_{limit} = \frac{1}{K} \sum_{i=1}^{K} v(\theta_i^{min}, \theta, \theta_i^{max})^2 \quad (6)$$

where v(a, x, b)=max(0, a−x)+max(x−b, 0). Since it is desired to optimize with respect to Δθ, the following equations should be used:

$$E_{limit} = \frac{1}{K} \sum_{i=1}^{K} \max(0, \theta_i^{min} - (\theta_i^{t-1} + \Delta\theta_i)) + \max((\theta_i^{t-1} + \Delta\theta_i) - \theta_i^{max}, 0) \quad (7)$$

Applying subgradient, and assuming Δθ is very small:

$$\frac{\partial v}{\partial \Delta\theta} = \begin{cases} 0 \text{ if } \theta^{t-1} \geq \theta^{min} \wedge \theta^{t-1} \leq \theta^{max} \\ 2(\theta - \theta^{max}) \text{ if } \theta^{t-1} \geq \theta^{min} \wedge \theta^{t-1} > \theta^{max} \\ -2(\theta_{min} - \theta) \text{ if } \theta^{t-1} < \theta^{min} \wedge \theta^{t-1} \leq \theta^{max} \\ 0 \text{ otherwise} \end{cases} \quad (8)$$

The pose prior constraints are optionally applied to avoid problems caused by depth sensor noise, like not correctly detecting dark hair or dark clothing. One example of a pose prior constraint is keeping the pelvic bone more or less straight. If the user is sitting at a table or lying down, the lower body can be more or less hidden by the furniture and, as a consequence, the pelvic bone may try to fit outlier points, usually located in the region of the furniture, and the pelvic bone rotates towards the furniture, which is not correct. Another pose prior constraint is to keep the head more or less straight. This is applied to solve noisy rotations of the head that happen if the hair points are not showing due to depth-sensor issues. These pose prior constraints may be applied a priori and/or added to the energy function on the fly.

Both pose prior and angle limit constraints, in some embodiments, are implemented with a weighted sum of components in the energy function. The angle limit energy component preferably has a larger weight relative to the pose prior. Data from inertial sensors can also be used for one or more constraints. For example, and without limitation, the orientation of the inertial sensor may be applied as a prior on the orientation of the bones (preferably the hands). Alternatively, the orientation data could be used in the optimization, not as a prior but as an additional specific term.

The inertial data can be introduced as a "super point" as described herein, additionally or alternatively to the above uses. The use as a super point increases the accuracy of the absolute position data, even without the orientation data. However the orientation data is helpful for determining the position orientation of the hands.

Different templates can be created for different user positions, such as sitting, standing, lying down and so forth. Different templates may also optionally be created according to gender or other demographic information, and/or according to body dimensions (such as for various ranges of height, girth and so forth).

Template engine 3500 can be updated as to an initial position of the user, such as sitting, standing, lying down or so forth, as well as about other user characteristics which would enable a particular template to be selected and/or adjusted, such as demographic information for example. Template engine 3500 can then select a particular template from template database 3502 according to this information. The Adjust template for initial user position module 3614 then adjusts the template according to the initial detected user position, which can also relate to initialization of the template for that particular user from the first set of input data.

Figure 37:
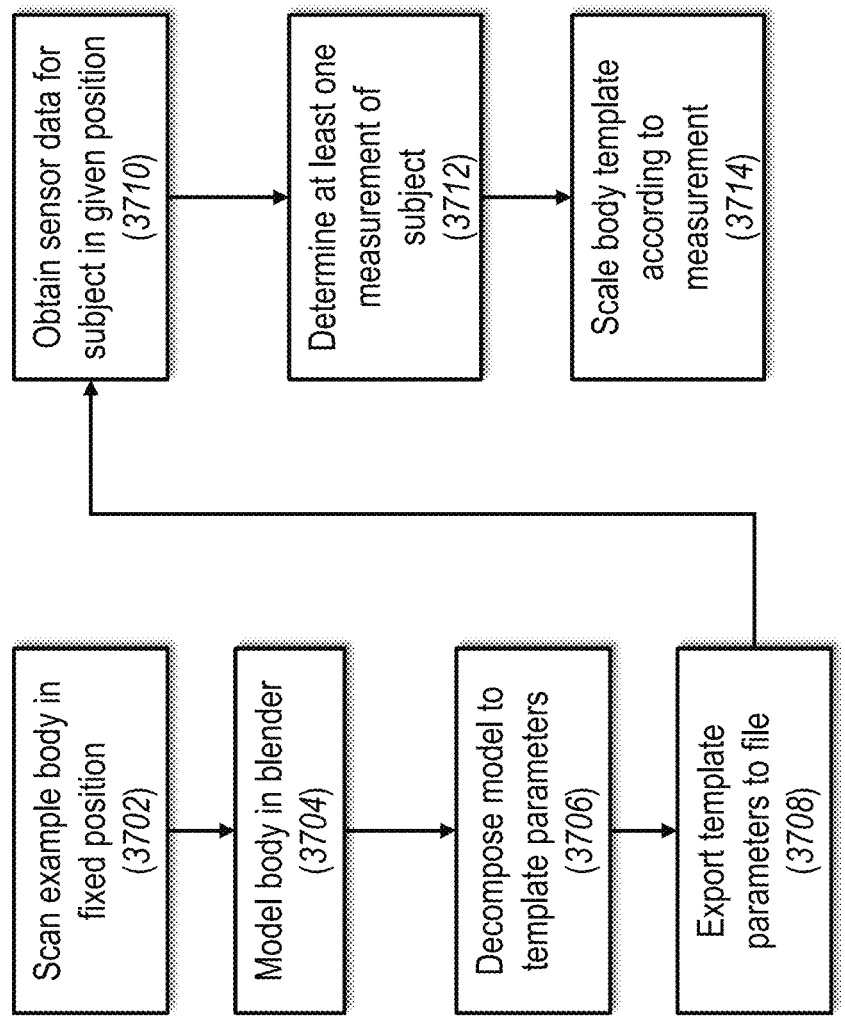
FIG. 37 shows a non-limiting example of a method for creating and using templates, according to at least some embodiments of the present disclosure.

FIG. 37 shows a non-limiting example of a method for creating and using templates, according to at least some embodiments of the present disclosure. As shown, an example user's entire body (or optionally a portion thereof) is scanned in a fixed position at 3702, to form a standard body. At 3704, the body of the user is modeled in 3D modeling software, for example, according to the Blender software as a non-limiting example (created by the Blender Foundation). A mesh is created which represents the human body. Each vertex of the mesh, which is each vertex of the skin, is incorporated. Certain vertices can be assigned to "joints" and/or "bones". For example, the vertices of the left forearm would be associated with the left elbow, so that when the left elbow rotates, the vertices of the left forearm also rotate. The model, according to some embodiments, imposes a type of constraint on the possible positions of the vertices, as well as repositioning the skin vertices in terms of joint positions. In 3706, the modeled body is corresponded to the template parameters, according to the operation of the specific 3D modeling software. The template parameters in terms of what is included (according to some embodiments) are described with regard to FIG. 36.

At 3708, the template parameters can be exported to a file, a portion of a non-limiting example of which is given in the Appendix. The example in the Appendix shows a portion of a standard male body in a T pose. The features are generally self-explanatory, but a few examples are described here for completeness. The global scale parameter indicates the global scaling in terms of the "overall size" of the body. Next a list of bones is provided, with their respective names, their initial locations (provided as "head" and "tail" parameters). The rotations can be as previously described. Each bone can be a parent to another bone, such that "sacrum" is the parent to bones such as "1. thigh" or left thigh for example. The skinning_weights provide the blending weights, or weights to be assigned for skinning; each data point represents a vertex in the model, with the one or more bone(s) that are influencing the vertex plus the weight(s) for that influence.

At 3710, sensor data is obtained for the subject in a given position, which is preferably manually communicated to the template engine as described herein. At 3712, at least one measurement of the subject is determined as described herein, for example, with regard to bone length. Such information can be determined from the point cloud. Optionally, as described with regard to FIG. 38 below, different types of point cloud data are used. For example, and without limitation, optical markers can provide "super point" data, as their locations are known according to the different colors of the LED lights featured in the markers. Other non-limiting examples of super point data include points associated with a VR headset, a smart-watch or some other appliance.

Such "super point" data may also optionally be performed with joint detection as described in greater detail below, such as for example with regard to FIG. 42, or alternatively as described in "Random Tree Walk toward Instantaneous 3D Human Pose Estimation" by Jung et al, June 2015 CVPR conference (available from https://www.researchgate.net/publications/275771971_Random_Tree_Walk_toward_Instantenou s_3D_Human_Pose_Estimation) and/or according to the description provided in "Efficient Human Pose Estimation from Single Depth Images" by Shotton et al, 2011 (available from https://people/eecs.berkely.edu/~rbg/papers/pose-from-depth-pami.pdf).

Alternatively the point cloud data can be used, alone or in combination with one or more types of "super point" data. The measurement that is obtained from the subject is used to initialize the tracking calculations, to adjust the template according to the specific parameters of the user.

At 3714, the template is scaled or otherwise adjusted according to the specific parameters of the user, for example, and without limitation, according to one or more of user position, demographic data, size data, particular measurements within the body of the user such as bone length, and the like. Preferably, the dimensions of the user are scaled, not the constraint angles. To adjust the template for scaling, preferably the cost function can be adjusted for the parameter space of bone scales, rather than joint constraints.

Figure 38A:
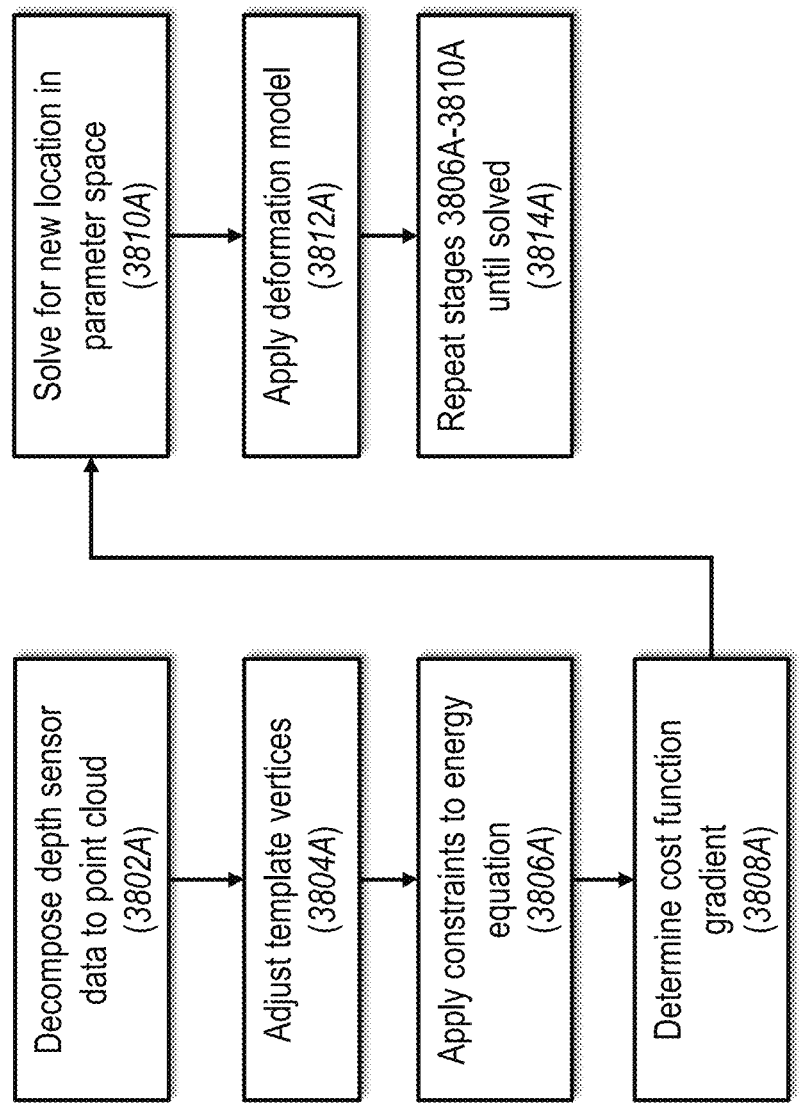
FIGS. 38A to 38E show non-limiting examples of methods for mapping data to track a user, according to at least some embodiments of the present disclosure.

FIGS. 38A to 38E relate to different exemplary, illustrative non-limiting methods for mapping data to track the user, according to at least some embodiments of the present invention. FIG. 38A shows such an exemplary method which uses the point cloud data without weighting any particular points and/or without a priori knowledge regarding these points, to map to a GMM model. At 3802A, the sensor data from the depth sensor is decomposed to form point cloud data. At 3804A, the template vertices are adjusted, which also includes estimating an initial pose of the user. The adjustment can include adjusting the template according to the user position and scale, and optionally according to other parameters. If the process is being performed on a series of video frames and has already been performed on at least one frame, then optionally such an estimate may take into account a previous pose of the user, as the pose of the user is unlikely to change dramatically between frames. The adjustment of the template vertices preferably also includes the inclusion of the previously described constraints, which can then be applied later on to increase the probability of correct minima being obtained.

At 3806A, the cost function gradient can be determined. The cost function gradient can be calculated as described with regard to "Real-time Simultaneous Pose and Shape Estimation for Articulated Objects Using a Single Depth Camera" by Mao Ye and Ruigang Yang, IEEE Transactions on Pattern Analysis & Machine Intelligence 2016 vol. 38 Issue No. 08. In this paper, an energy function is described, which is minimized according to the mapping process. The distance needs to be calculated for each point in the point cloud to each vertex for the cost function gradient.

At 3808A, one or more constraints can be applied to the energy equation, as previously described, although this process can be performed concurrently at 3806A. At 3810A, a new location in the parameter space is solved for with regard to probability density, to determine a most likely location, according to the EM algorithm, which provides an iterative solution. At 3812A, the deformation model can be applied, for example, as described with regard to FIG. 39, according to the iterative solution from the EM algorithm. At 3814, steps 3806A, 3808A, 3810A and 3812A can be repeated until the problem is solved.

Figure 38B:
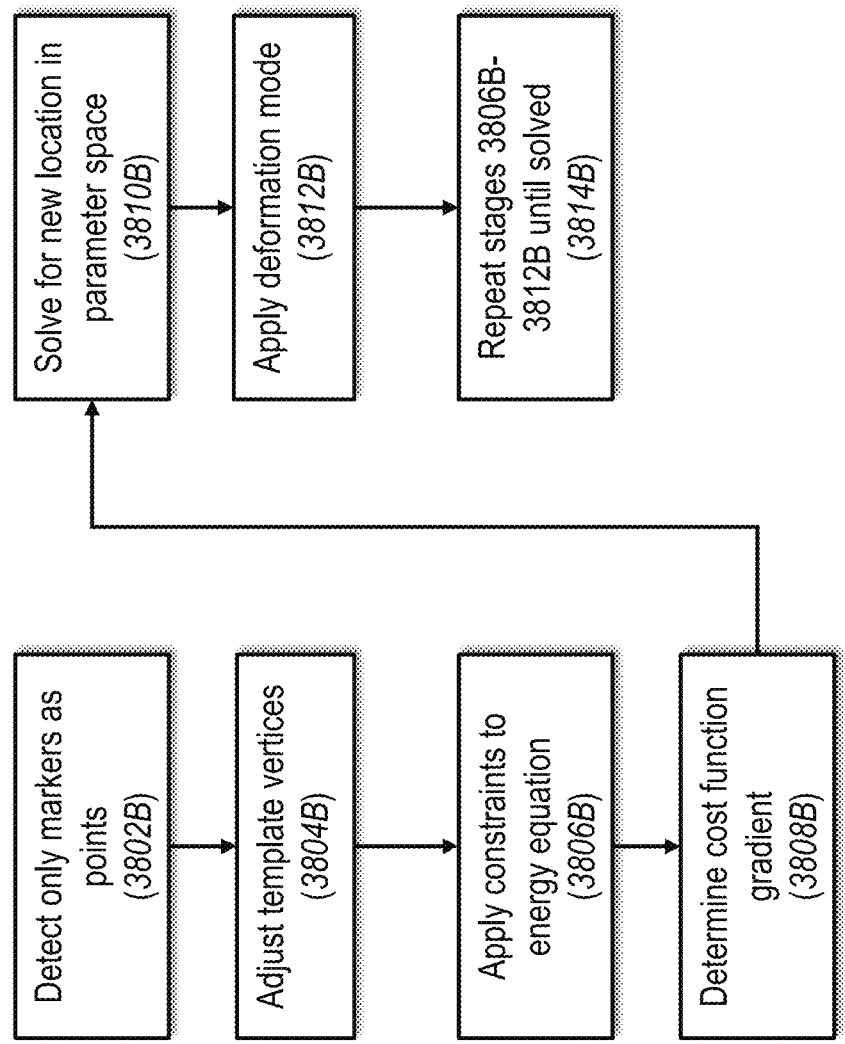

FIG. 38B shows such an exemplary method which uses only optical marker point data, to map to a GMM model. In 3802B, only the optical marker data is detected from the point cloud data. The optical marker point data are an example of super points, in that their location on the body can be detected and tracked accurately, because specific colors of LED lights are associated with specific locations. Apart from only using the optical marker point data, the method proceeds as described with regard to FIG. 38A, except that, optionally, the distance from each point to each vertex does not need to be calculated, which in some embodiments, is due to the possibility to identify each marker with a specific location on the body with a very high degree of likelihood, so that it is know which marker is related to which location on the body.

Figure 38C:
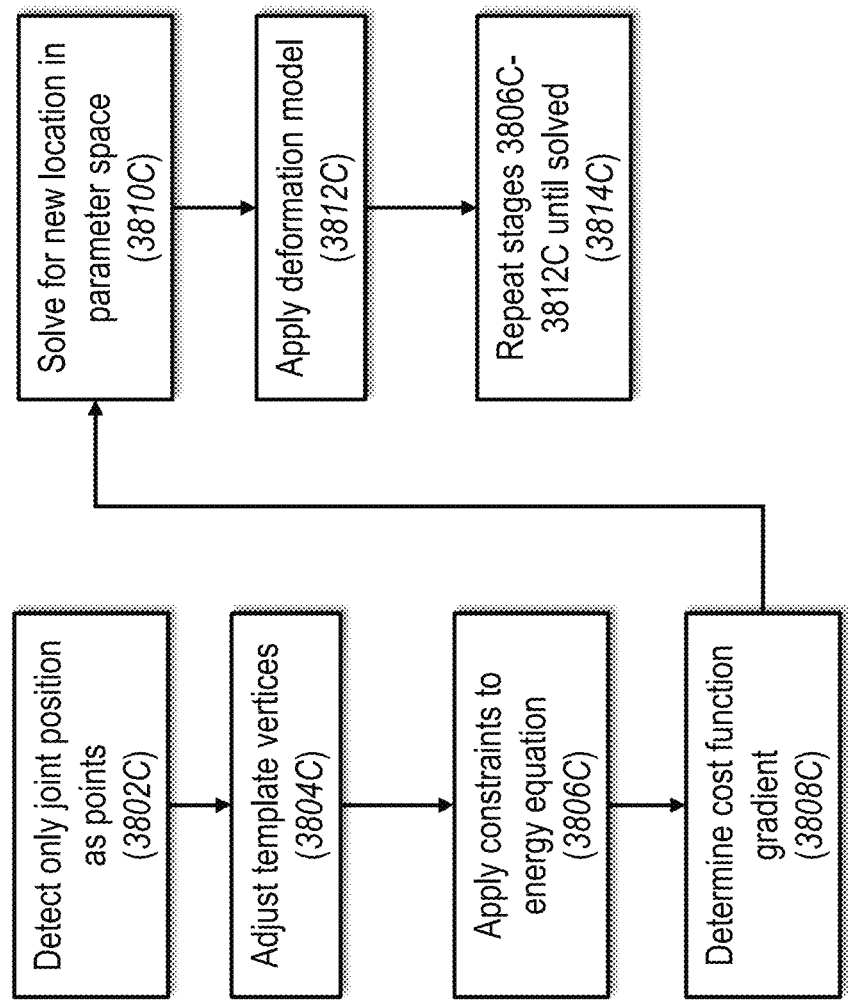

FIG. 38C shows such an exemplary method which uses only joint detection point data, to map to a GMM model. For 3802C, only the joint data is detected from the point cloud data. The joint point data are an example of super points, in that their location on the body can be detected and tracked accurately, because of the special joint detection method that can be used as described herein. For example, the joint detection method can be performed according to a classifier as described herein. The joint detection algorithm can permit joints to be detected which can be difficult to label with optical markers (e.g., the jaw or neck). Apart from only using the optical marker point data, the method proceeds as described with regard to FIG. 38B.

Figure 38D:
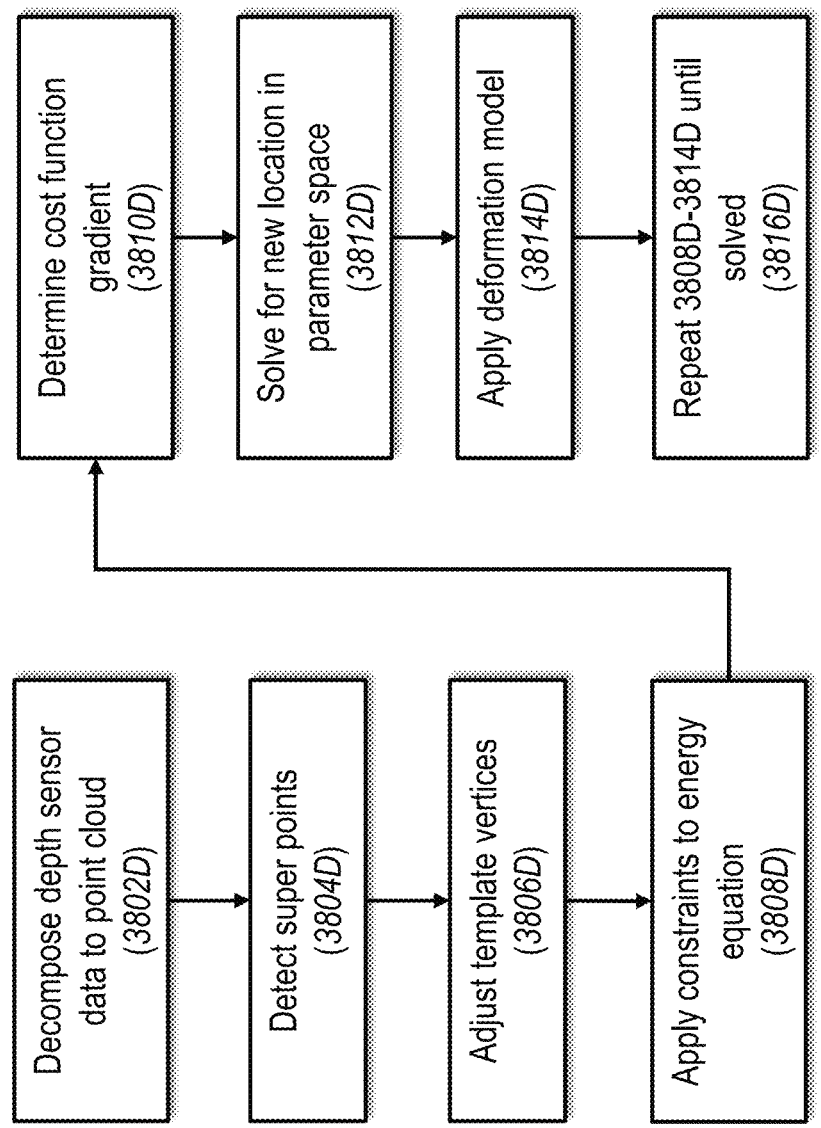

FIG. 38D shows such an exemplary method which uses a combination of super points, with higher weighting, in combination with the remainder of the point cloud data, to map to a GMM model. For 3802D, the sensor data is decomposed to a point cloud as described with regard to 3802A of FIG. 38A. At 3804D, one or more super points are detected and are given higher weighting. The super points may be detected according to the previously described optical markers and/or according to joint detection. The position of the super points may not be reliable but the correspondences to various vertices are known with a high degree of probability, even if the data relating to the position of the super points is noisy. Steps 3806D, 3808D, 3810D, 3812D, 3814D and 3816D can be performed as described with regard to steps 3804A, 3806A, 3808A, 3810A, 3812A and 3814A of FIG. 38A, except that the super points are given a higher weighting for the various calculations performed, over that of regular point cloud data.

Figure 38E:
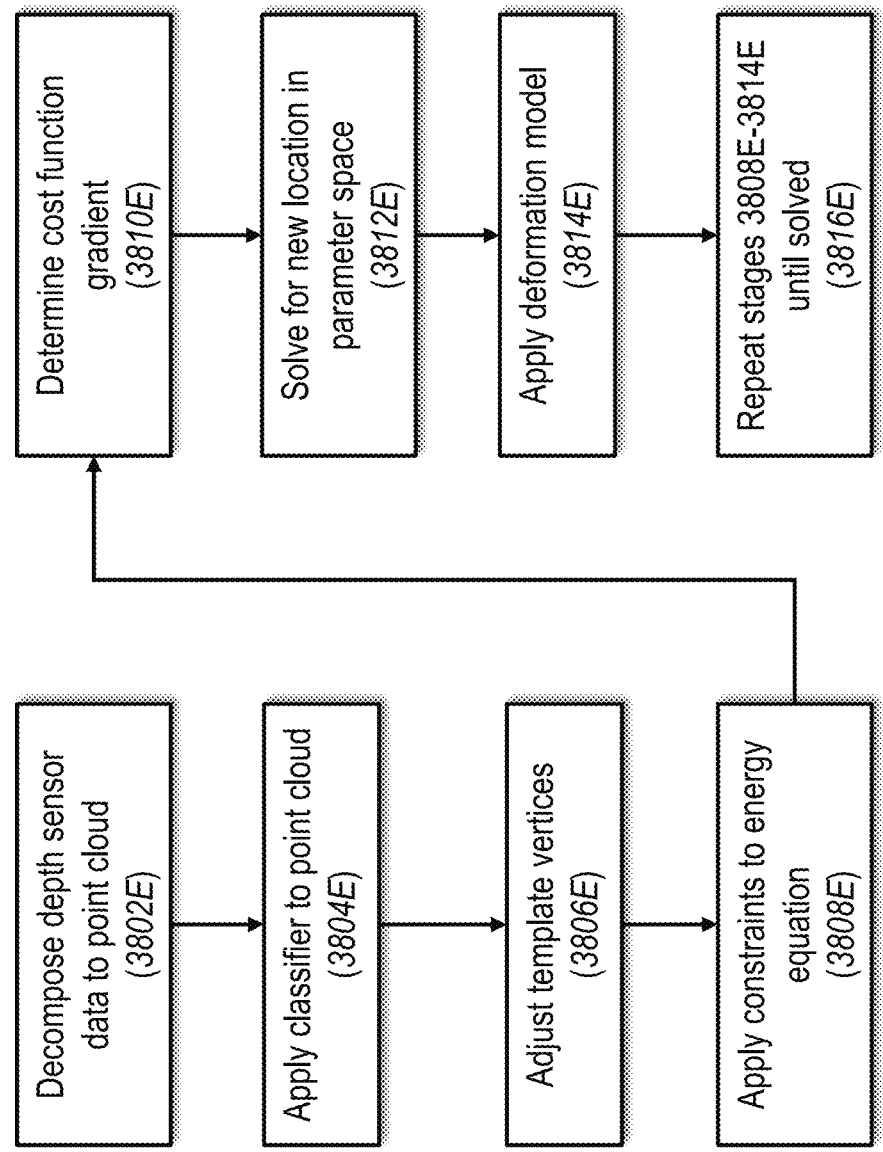

FIG. 38E shows an exemplary method which uses a classifier. At 3802E is optionally performed as described with regard to FIG. 38A. At 3804E, a trained classifier is applied to the point cloud. The trained classifier preferably features some type of body part classification model, such as described for example in "Efficient Human Pose Estimation from Single Depth Images" by Shotton et al, 2011 (available from https://people.eecs.berkeley.edu/~rbg/papers/pose-from-depth-pami.pdf). The described method operates as follows. Body part classification (BPC) first predicts a body part label at each pixel, and then uses these inferred labels to localize the body joints. The number and location of body parts are selected to provide the most information for determining the joints while at the same time, not overwhelming the trained classifier with data requirements. The trained classifier may be constructed and trained according to any known method, such as for example the random trees method of classification. The location of the joints may then be fed into the previously described generative model of "Real-time Simultaneous Pose and Shape Estimation for Articulated Objects Using a Single Depth Camera" by Mao Ye and Ruigang Yang, IEEE Transactions on Pattern Analysis & Machine Intelligence 2016 vol. 38 Issue No. 08. Such a classification would create a plurality of super points from regular point cloud data, by significantly increasing the probability of a correct assignment to a particular vertex. Therefore, optionally, the remainder of the process would continue only with the super points or alternatively, the super points are implemented with higher weights than other points. The process then continues as for FIG. 38B with the classified points acting as super points, such that steps 3806E, 3808E, 3810E, 3812E, 3814E and 3816E of FIG. 38E correspond to steps 3804B-3814B of FIG. 38B.

Figure 39:
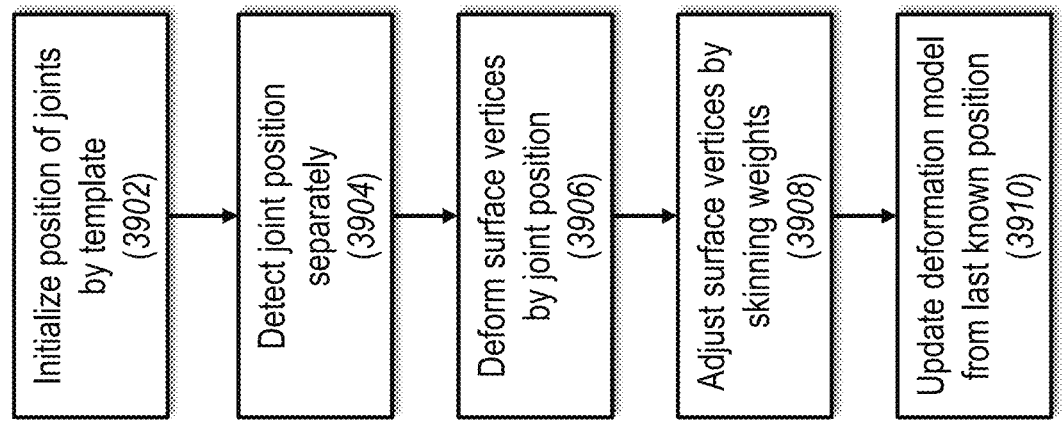
FIG. 39 shows a non-limiting example of a method for applying a deformation model, according to at least some embodiments of the present disclosure.

FIG. 39 shows a non-limiting example of a method for applying the deformation model, according to at least some embodiments of the present disclosure. At 3902, the position of the joints is initialized according to the template. At 3904, the position of each joint is detected separately. At 3906, the surface vertices are deformed according to the joint position. At 3908, the surface vertices are adjusted by skinning weights, to smooth the skin over a plurality of bones and joints. The skinning weights are blending weights as previously described, to determine how much each bone or joint determines an input to the skin surface vectors. An exemplary implementation is described in Real-time Simultaneous Pose and Shape Estimation for Articulated Objects Using a Single Depth Camera" by Mao Ye and Ruigang Yang, IEEE Transactions on Pattern Analysis & Machine Intelligence 2016 vol. 38 Issue No. 08. In 3910, the deformation model is updated from the last known position.

With regard to the modeling of the data as described herein, a specific case relates to modeling of the shoulder joint. Ball-joints are a way of improving the present modeling of 3-DOF (3 degrees of freedom) joints (shoulders) that suffer from several issues due to the representation of rotations. The shoulder joint may be modeled by applying three rotations sequentially, for each DOF. This presents problems mainly related to gimbal lock and that such parameter space is not very well suited for optimization.

An optional implementation uses twists that jointly encode angle, axis, and axis location. It is necessary to decouple the axis location in order to leave the axis vector free, as described for example in Pons-Moll and Rosenhahn, "Ball Joints for Marker-less Human Motion Capture", WACV 2009 (available from https://ps.is.tuebingen.mpg.de/uploads_file/attachment/attachment/140/PonsWACV2010.pdf). One exemplary way to do so is to subtract the axis location from the points rotating wrt to the ball joint, and assume in the twist that the axis is in (0, 0, 0).

This adjustment may be applied to any suitable method to model the shoulder joint. For example it can be used to adjust the deformation model of "Real-time Simultaneous Pose and Shape Estimation for Articulated Objects Using a Single Depth Camera" by Mao Ye and Ruigang Yang, IEEE Transactions on Pattern Analysis & Machine Intelligence 2016 vol. 38 Issue No. 08 as follows. In this paper, the basic deformation model is given by:

$$v_m^{t+1} \approx v_m^t + I_m^t \Delta \xi_g^t + \sum_{k=1}^{K} \beta_{mk} \hat{\xi}_k'' v_m^t \Delta \theta_k^t$$

In the above equation, vm is a vertex of the previously described model.

$\{\Delta \theta_h^t\}$ relates to the joint angles.

$\Delta \xi_g^t$ relates to the global transformation.

To accommodate the improved modeling of the shoulder, the previously described ball-joint information is plugged in and the constraint of ω having unit length is dropped, such that it is possible to represent jointly the rotation axis and the angle as the norm of ω:

$$v_m^{t+1} = v_m^t + I_m^t \Delta \xi_g^t + \sum_{k=1}^{K} \beta_{mk} \hat{\xi}_k' v_m^t \Delta \theta_k^t + \sum_{l=1}^{L} (\beta_{ml}(v_m^t - q_l)\hat{\Delta \omega'} + q_l)$$

It is therefore possible to make a distinction between the indices k which represent degrees of freedom of 1D and 2D joints, and the indices l which represent whole ball-joints. The optimization parameters are transformed from three scalar angles $\Delta\theta$ to a 3-dim vector $\Delta\omega'\theta$ that represents both angle and axis orientation. The vector ql refers to the location of the axis of joint l. Note that the twist is primed, so to recover the original coordinate transform needs to be undone:

$$\Delta\omega_l\theta_l = ((T_l)^{-1}\Delta\omega'_l\theta_l)^T T_l$$

Figure 40:
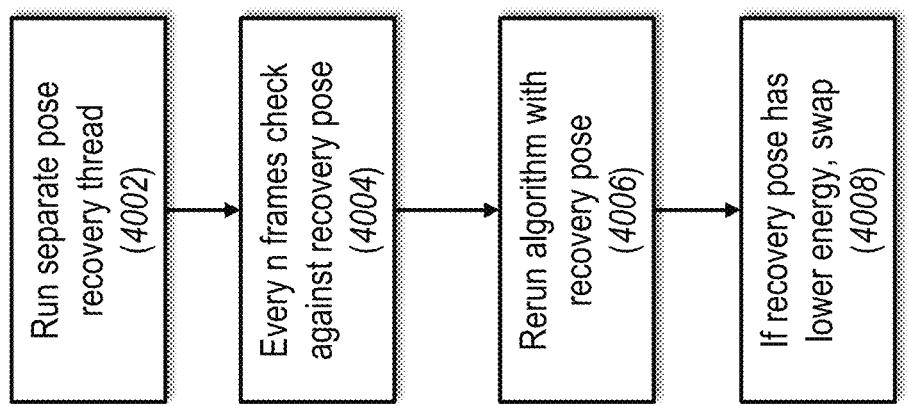
FIG. 40 shows a non-limiting example of a method for pose recovery, according to at least some embodiments of the present disclosure.

FIG. 40 shows a non-limiting example of a method for pose recovery, according to at least some embodiments of the present disclosure. At 4002, a separate pose recovery thread is operated, which is separate from the main thread which is tracking the user and performing the above described pose calculations. To avoid overwhelming available computational resources, the pose recovery process is preferably operated intermittently rather than continuously. At 4004, for every n frames, the recovery pose is calculated from the point cloud data to determine the energy level of that pose. The number n can be any plurality of frames, such as from 2 to 10 frames, but is preferably from 3 to 5 frames. The initialization is applied with the previous frame's pose as the seed point but rerun to fit the data according to the GMM. The algorithm is then rerun with the recovery pose in 4006. At 4008, the current calculated pose of the user is compared to the recovery pose; if the recovery pose has lower energy in terms of the calculation of the point cloud, then the current calculated pose is replaced with the recovery pose. The recovery pose can be a resting pose of the user, for example.

Figure 41:
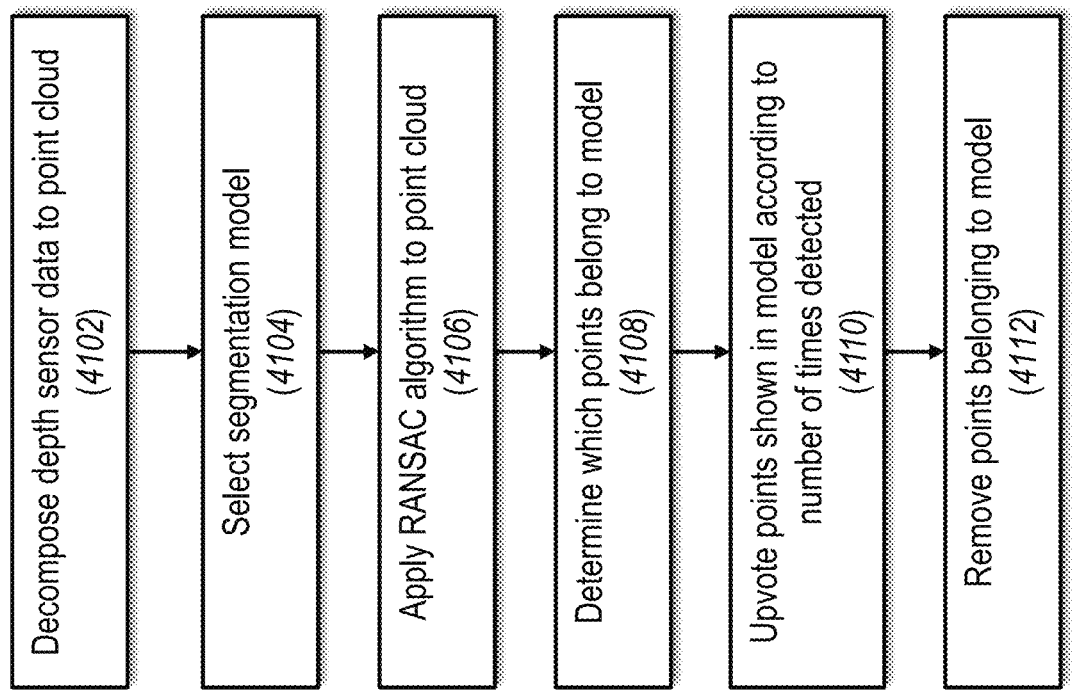
FIG. 41 shows a non-limiting example of a method for segmentation of a background object, according to at least some embodiments of the present disclosure.

FIG. 41 shows a non-limiting example of a method for segmentation of a background object, according to at least some embodiments of the present disclosure. Here, the background object can be an inanimate object (which should not be confused with the user), such as a table, chair, bed or other piece of furniture. At 4102, the point cloud is generated from the sensor data as previously described, followed by 4104, where a segmentation model is selected. For example, the segmentation model can be a simple model, such as a planar model, for certain types of background objects such as a table for example.

At 4106, the RANSAC (random sample consensus) algorithm is applied to the point cloud data according to the selected segmentation model. This algorithm is probabilistic and iterative, and is used to detect (and remove) outliers from a point cloud data, in order to fit this data to the segmentation model. A non-limiting example of the application of the RANSAC model to segmentation according to a planar model is described in "RANSAC algorithm and elements of graph theory for automatic plane detection in 3D point clouds", by Martyna Poreba and Frangois Goulette, Symposium de PTFiT (Polish Society for Photogrammetry and Remote Sensing), September 2012, Poland. 24, pp. 301-310, 2012.

At 4108, the group of points that are most likely to belong to the selected segmentation model are located, and optionally, at 4110, if the method described herein has been performed more than once, then points which were previously detected as belonging to the model are up-voted. Because the object being segmented is a background, inanimate object, its position is not likely to change during the tracking process. Therefore, once a point has been determined to belong to the background object, it is likely to continue to be correctly associated with that object. At 4112, points that have been determined to belong to the model are removed, as such points could interfere with the correct tracking of the user.

Figure 42:
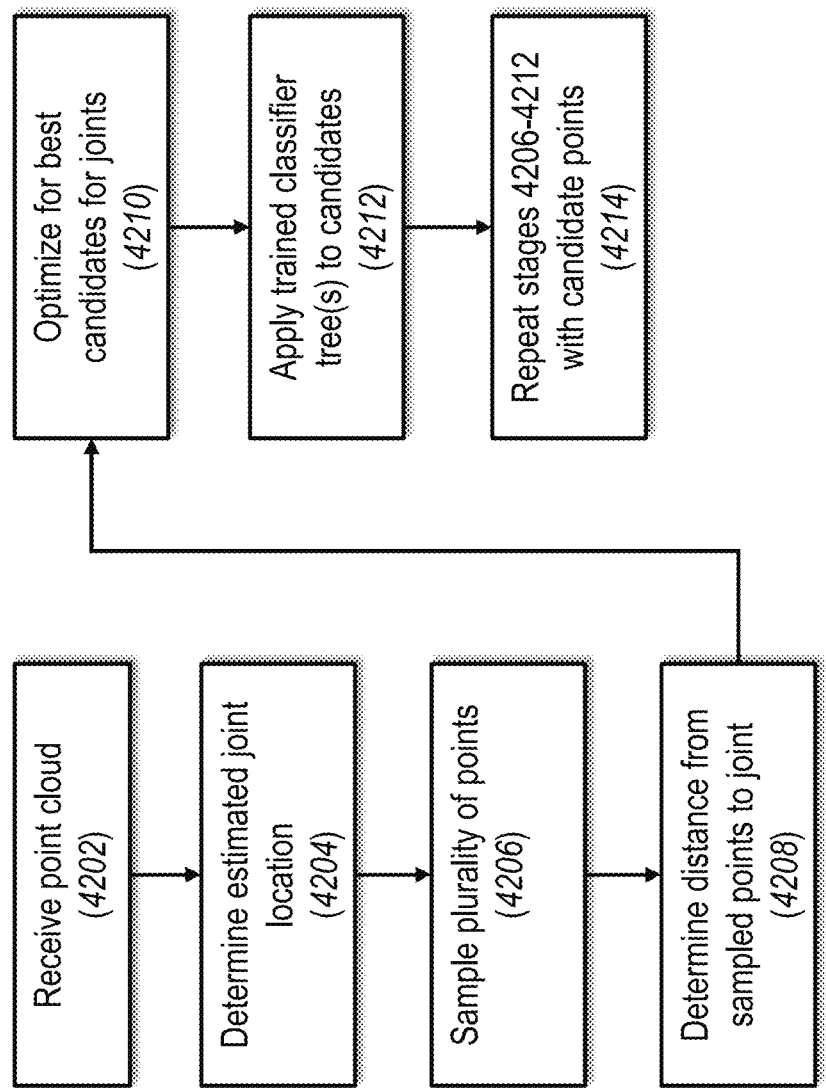
FIG. 42 shows a non-limiting example of a method for joint detection, according to at least some embodiments of the present disclosure.

FIG. 42 describes a non-limiting example of a method for joint detection, according to at least some embodiments of the present disclosure. As shown, the point cloud is received as input at 4202; the point cloud could optionally be generated as previously described. At 4204, an estimated location is determined for each joint. Preferably each joint is determined as a point in the point cloud, such that the estimated location relates to the location of the point that would correspond to that joint. For clarity, the joint locations are determined as vertices in the skeletal model, such that each joint is mapped as a discrete point (vertex) in the skeletal model. For the first frame, a mean position may be used from the training data determined from training the trees (as described in greater detail below), or from the template data. For subsequent frames, it is possible to use the position from the previous frame as an estimate. At 4206, a plurality of points close to the estimated location of the point corresponding to the joint is sampled. For example, the points can be sampled within a sphere having a particular radius from that point, such as 0.5 meter for example. Other distances are also possible, including any distance within a range from 0.005 meter to 2 meters for example. The radius could optionally be different for each joint.

In terms of the mathematical representation of the sampled points, every candidate that is considered $c_{i,j}$ has a position $p_{i,j} \in R^3$ that can be generated in a number of different ways. For a given joint j, candidate 3D positions can be generated for example as follows. Given training data of likely 3D poses of the skeleton, a multivariate 3D normal distribution of positions for every joint is estimated. A position can be generated by simply sampling a point from that distribution. This is optionally and preferably refined according to data from previous frames.

With regard to subsequent processes, assume the joints are indexed by integers $j \in J$, with J representing the set of all joints. It is also assumed that two trained trees are trained as classifiers or regressors in advance, described in greater detail below with regard to 2412. These two trees include a tree Tdist,j that can estimate the distance |x−y|, as well as a tree Toffset,j that can directly estimate the offset y−x to the joint. The training of these trees seeks to minimize a least-squares objective function. The trees can be trained as described with regard to "Random Tree Walk toward Instantaneous 3D Human Pose Estimation" by Jung et al, June 2015 CVPR conference (available from https://www.researchgate.net/publication/275771071_Random_Tree_Walk_toward_Instantaneou s_3D_ Human_Pose_Estimation).

At every leaf node of the tree Tdist,j, there is a set of distances. Once the distance tree has been traversed, a leaf node is reached where one takes the median distance at the leaf node to be the estimated distance. For the tree Toffset,j, clusters are computed at every leaf node. Once at a leaf node of that tree, one takes the mean position of a randomly selected cluster, with the probability of choosing a cluster being proportional to the number of samples in the cluster. At 4208, the distance from each of the sampled points to the estimated location is determined. Preferably, the distance is calculated by using a tree as follows. There are several candidate positions for each joint whose position is to be estimated.

One assumes there are Nj joints $j \in J$ with $J=\{1, \ldots, Nj\}$. For every joint, one generates Nc candidates indexed by $C=\{1, \ldots, Nc\}$. Every candidate $c_{i,j}=(p_{i,j}, d_{i,j})$, with $i \in C$ consists of a position $p_{j,i} \in R^3$ of the proposed position for a joint in the camera coordinate system, and a distance $d_{i,j} \in R$ in meters which is an estimate of how far away the position $p_{i,j}$ is from the actual, unknown joint position. A distance of $d_{i,j}=0$ would mean that the candidate is a very good estimate of the true unknown 3d position. In other words, it is a estimated measure of how faithfully $p_{i,j}$ approximates the true unknown location.

Let $r \in R$ be a randomly generated number from a set of random numbers R. Let $f \in F$ represent an input depth frame from a set of frames F, consisting of pixels with a depth value associated with every pixel. One lets $Sdirdist,j: R^3 \times F \times R \to R^3$ represent the process of given a position $x \in R^3$ using the tree Tdir,j at that position to compute a direction q, and the tree Tdist,j at that position to compute a distance d, one obtains a new position $y=x+dq$. In other words one can estimate the joint position y given some position x by first computing the direction towards the new position, then scaling that direction by an estimated distance, and finally adding it to the current position. So if one has a position x, one obtains the estimated position y as y=Sdirdist,j (x, f, r) for a given frame f and random number r. The random number r is used to randomly select the cluster at the leaf node of the tree Tdir,j.

It is possible to also define Soffset,j: $R^3 \times F \times R \to R^3$ to represent the process of given a position x, estimating the offset $p \in R^3$ using the tree Toffset,j, and then computing the estimated joint position $y \in R^3$ as $y=x+p$. For every candidate position $p_{i,j} \in R^3$, one estimates the distance $d_{i,j}$ to the true position by evaluating the tree Tdist,j at that candidate position.

The optimization problem for determining the true location of the joint, and for selecting a candidate point, is then preferably performed at 4210. Optimization can be performed with regard to relative length constraints between each pair of joints and/or according to constraints on the angles. Step 4210 can be performed according to dynamic optimization, with relative length constraints between each pair of joints, as follows. The skeletal model determines the range of lengths that are possible. The dynamic optimization algorithm then can solve the location of the candidate point representing a joint for each pair of joints, according to the relative lengths that are possible between each pair of joints, after which the algorithm determines a global solution. It is not necessary to consider all possible assignments, but only assignments for every pair of connected joints. To perform this calculation, templates for modeling the human skeletal structure are used. These templates can optionally be the previously described templates or alternatively may be obtained from http://h-anim.org/Specifications/H-Anim1.1/appendices.html#appendixa. The below described objective function is used, which takes an edge (distance between each pair of joints) and information from the template, and returns the distance between two joints in the template.

Specifically, the objective function may be defined as follows. One assumes that the joints are vertices of a tree-structured graph, connected by a set of edges $E \subseteq J \times J$. Furthermore, one considers Nt templates indexed by $t \in T$ with $T=\{1, \ldots, Nt\}$ and introduce a function D: $E \times T \to R$ which provides the length in meters of an edge in the skeleton template. The solution of the optimization problem is a vector $I \in J^{Nc}$ which is the index of the candidate associated with every joint, with ij representing the candidate index associated with joint j: $I=(i1, i2, \ldots, iNj)$.

$$\underset{I \in \mathcal{J}^{N_c}, i \in \mathcal{T}}{\text{Minimize}} \underbrace{\sum_{j=1}^{N_j} d_{j,i}}_{\text{Data term}} + \alpha \underbrace{\sum_{(m,n) \in \varepsilon} \left| \underbrace{D((m,n),t)}_{\text{Template edge length}} - \underbrace{|p_{i_m,m} - p_{i_n,n}|}_{\text{Actual edge length}} \right|}_{\text{Edge length violation}}$$

Regularization

The parameters that are to be optimized are the skeleton template index t and the vector I of candidate assignments for all joints. The left sum of the objective function is the data term of the optimization problem: For a candidate ij and a joint j, that estimated distance is $d_{ij,j}$. The right sum of the objective function is the regularization term of the optimization problem: Given a template t, for every edge (m, n) of the tree-structured skeleton, where m and n refer to joints, by how much the template distance D((m, n), t) is violated by the two positions pim,m and pin,n of the candidates. All solutions of the above optimization problem can be enumerated and the number of possible solutions is $N_c^{N_j} \cdot N_t$.

The alpha parameter is heuristically determined and has been found to have useful values particularly between 0.4 and 1. Alpha is set higher for noisy data, and lower for clean data. The alpha term is at least 0.001 for clean data. To solve the optimization problem in a computationally efficient manner, because of the tree-structure of the skeleton, it is possible to use the dynamic optimization approach to compute the global optimum in a reasonable amount of time, as noted above. One non-limiting example of a suitable dynamic optimization method that could be applied to this problem is described in Felzenszwalb, Pedro F., and Ramin Zabih. "Dynamic programming and graph algorithms in computer vision." IEEE transactions on pattern analysis and machine intelligence 33.4 (2011): 721-740 (available at http.//www.cs.cornell.edu./~rdz/Papers/FZ-survey.pdf).

At 4212, optionally at least one trained classifier tree is used to assess the appropriateness of each candidate point as representing the location of the joint. Preferably, the trees are trained to determine a direction from a point to a joint and also to estimate the distances from a given 3D position to a particular joint location. The trees can be used to determine, for each candidate position, how good the candidate is for explaining the actual location of the joint. Two different sets of trees, in some embodiments, can be used as previously described. Since direction alone doesn't determine how close a candidate is to a particular location, in some embodiments, distance trees are also used. Optionally, the trees can be trained such that, given a particular data point, how close is that point to a particular joint. With respect to the notation used herein, the assignment is further refined by applying either Sdirdist,j or Soffset,j to that position, or preferably both, in order to obtain a position which could be closer to the true joint position.

Optionally, at 4214, the candidate points can be used as features to a second process for refinement, to better localize the joints. Optionally, steps 4206-4212 of the algorithm can be repeated but with these candidate points as the initial estimates (according to some embodiments). The process can optionally be repeated more than once, optionally with additional, different features.

Also optionally, the initial training process for training the previously described trees could be improved from the method described in "Random Tree Walk toward Instantaneous 3D Human Pose Estimation" by Jung et al, June 2015 CVPR conference (available from https://www.researchgate.net/publications/27577971_Random_Tree_Walk_toward_Instantaneou s_3D_Human_Pose_

Estimation). In that paper, the feature used for partitioning the training samples was determined as shown in equation 6:

$$f_\theta(F, x) = d_F\left(x + \frac{t_1}{d_F(x)}\right) - d_F\left(x + \frac{t_2}{d_F(x)}\right)$$

where F is the current frame, $x \in \mathbb{R}^3$ is the 3d position where we evaluate the feature, $d_F(x)$ is the image depth at x and $t_1 \in \mathbb{R}^3$ and $t_2 \mathbb{R}^3$ are the two offsets.

A new feature $f_\theta^1$, can be added, for example, as follows, assuming that the current position has components x1, x2 and x3, that is x=(x1, x2, x3), thereby comparing the depth of the current point with the depth at some random nearby point:

$$f_\theta^1(F, x) = d_F\left(x + \frac{t_1}{d_F(x)}\right) - x_3$$

where $t_1 \in \mathbb{R}^3$ is a random offset.

A further refinement could optionally feature training a new set of trees that also include previous estimates. This would include a feature:

$$f_{u,j}^2(x) = u \cdot (x - p^*_j)$$

where $u \in \mathbb{R}3$ with $|u|=1$ is a randomly chosen unit vector, j is the joint index, $x \in \mathbb{R}3$ is the position where one evaluates the feature and the symbol "·" represents the dot product of two vectors. In other words, this feature computes the offset with a given point $x \in \mathbb{R}3$ and a previous estimate $p^*j$ of that point to obtain a feature which takes previous knowledge into account. This can be used to train trees as before using both this new feature for different joints j and random unit vectors u, in addition to (or in place of) the features provided in the previously described paper.

For a given frame, first position $p^*j$ is detected using the trees that were trained. Then the algorithm is rerun, but using the second set of trees that were trained, which in addition to image data also uses the detections $p^*j$ for the second feature. This refined position can be used as a new input feature and then obtain for every joint an even better refinement $p^*j^3$. It is possible to repeat this process as many times as desired. If one performs this process n times, for every joint j there will be a position $p^*j^n$.

Without wishing to be limited by a single hypothesis, the method of FIG. 42 has a number of advantages over "Random Tree Walk toward Instantaneous 3D Human Pose Estimation" by Jung et al, June 2015 CVPR conference (available from https://www.researchgate.net/publication/275771971_Random_Tree_Walk_toward_Instantaneous_3 D_Human_Pose_Estimation) and/or according to the description provided in "Efficient Human Pose Estimation from Single Depth Images" by Shotton et al, 2011 (available from https://people.eecs.berkeley.edu/~rbg/papers/pose-from-depth-pami.pdf. The method described in the Jung et al paper suffers from a number of disadvantages, including with regard to the core random walk algorithm, which tends to diverge significantly from the actual desired fitted model. The method described in the Shotton et al. paper requires each pixel to vote on a particular location, first to determine background as opposed to the subject, and then to determine the location of each joint within the subject, as the points are determined as offset from the joints; this method is computationally very expensive.

Optionally, at least some of the method embodiments disclosed herein may be combined with SLAM (simultaneous location and mapping), as described in, for example, "SYSTEMS, METHODS, DEVICE AND APPARATUSES FOR PERFORMING SIMULTANEOUS LOCALIZATION AND MAPPING", owned in common with the present application and having at least one inventor in common with the present application, filed on Jan. 19, 2018 as PCT Application No. PCT/US18/14508, the entire disclosure of which is hereby incorporated by reference as if fully set forth herein.

For example and without limitation, a SLAM system as described therein is provided for a wearable device, including without limitation, a head-mounted wearable device that optionally includes a display screen. Such systems, methods and apparatuses can be configured to accurately (and in some embodiments, quickly) localize a wearable device within a dynamically constructed map, e.g., through computations performed with a computational device. A non-limiting example of such a computational device is a smart cellular phone or other mobile computational device. To this end, according to at least some embodiments, SLAM systems, methods and apparatuses can support a VR (virtual reality) application, an AR (augmented reality) application, and/or the like.

Also optionally, at least some of the method and system embodiments as described herein may be combined with a facemask, as described for example in any of "SYSTEM, METHOD, DEVICES AND APPARATUSES FOR DETECTING FACIAL EXPRESSION IN A VIRTUAL REALITY SYSTEM", filed on Jan. 19, 2018 as U.S. patent application Ser. No. 15/875,306; "SYSTEM, METHOD AND APPARATUS FOR DETECTING FACIAL EXPRESSION IN AN AUGMENTED REALITY SYSTEM", filed on Jan. 19, 2018 as U.S. patent application Ser. No. 15/875, 382; and/or "SYSTEMS, METHODS, DEVICES AND APPARATUSES FOR DETECTING FACIAL EXPRESSION", filed on Jan. 19, 2018 as U.S. patent application Ser. No. 15/875,227; each of which is owned in common with the present application and having at least one inventor in common with the present application, and each of which is hereby incorporated by reference as if fully set forth herein.

For example and without limitation, such a facemask may be provided as apparatuses, methods, and systems which facilitate a rapid, efficient mechanism for facial expression detection according to electromyography (EMG) signals. In some implementations, such apparatuses, methods and system can detect facial expressions according to EMG signals that can operate without significant latency on mobile devices (including but not limited to tablets, smartphones, and/or the like).

Accordingly, such a facemask may be used for example for VR (virtual reality) or AR (augmented reality) applications, in which the face of the user may be partially or completely obscured by headgear or other equipment for facilitating the VR or AR experience. The facemask may then be used for detecting an emotional state of the user.

FIGS. 43-46 relate to combined methods which may combine various of the previously described methods and which may be implemented with any of the above described systems.

Figure 43:
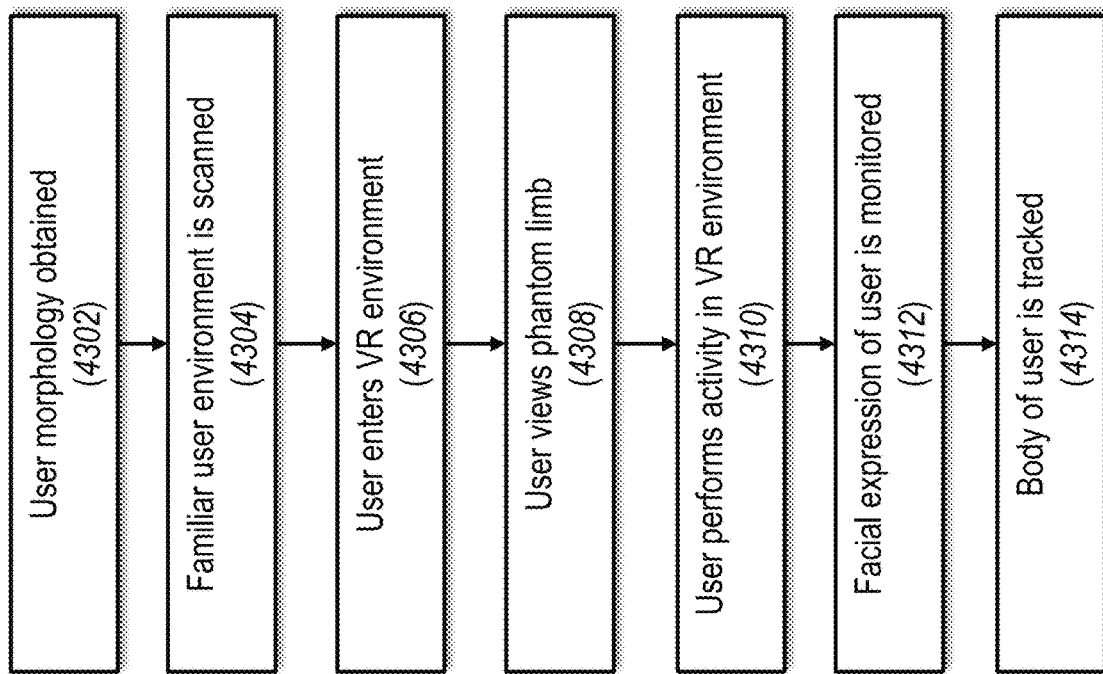
FIGS. 43 and 44 show two non-limiting example methods for applying VR to medical therapeutics according to at least some embodiments of the present disclosure.
Figure 44:
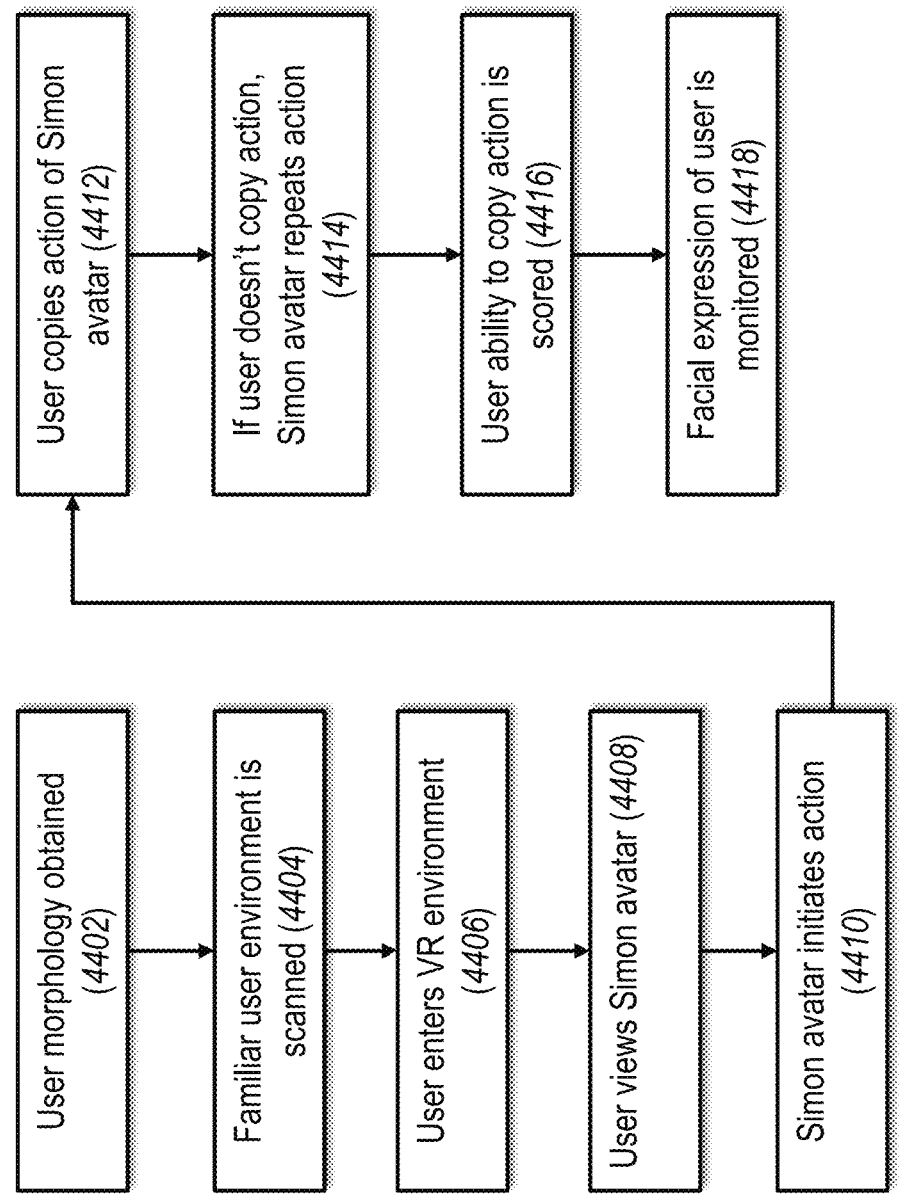

FIGS. 43 and 44 show non-limiting examples of methods for applying VR (via, for example a VR application) to medical therapeutics according to at least some embodiments of the present disclosure, which also feature tracking of the user's body and SLAM for localizing the user within the surrounding environment. FIG. 43 shows an example of a method for applying VR to medical therapeutics—e.g., assisting an amputee to overcome phantom limb syndrome. The method includes, at 4302, the morphology of the body of the user (e.g., an amputee) or a portion thereof, such as the torso and/or a particular limb, may be determined, through scanning (for example). Such scanning may be performed in order to create a more realistic avatar for the user to view in the VR environment, enabling the user when "looking down" in the VR environment, to see body parts that realistically appear to "belong" to the user's own body.

At 4304, optionally, a familiar environment for the user is scanned, where such scanning may be performed to create a more realistic version of the environment for the user in the VR environment. The user may then look around the VR environment and see virtual objects that correspond in appearance to real objects with which the user is familiar.

The user enters the VR environment (at 4306), for example, by donning a wearable device (as described herein) and/or otherwise initiating the VR application. For this non-limiting method, optionally, a tracking sensor may be provided to track one or more physical actions of the user, such as one or more movements of one or more parts of the user's body. A non-limiting example of such a tracking sensor is the Kinect of Microsoft, or the Leap Motion sensor, as previously described, but preferably as any of the tracking implementations described herein. Also as described herein, any of the tracking implementations described herein may be adjusted or calibrated for the absence of the missing limb, in order to provide accurate tracking of the user's body.

At 4308, the user "views" the phantom limb—that is, the limb that was amputated—as still being attached to the body of the user. For example, if the amputated limb was the user's left arm, then the user then sees his/her left arm as still attached to his/her body as a functional limb, within the VR environment. Optionally, in order to enable the amputated limb to be actively used, the user's functioning right arm can be used to create a "mirror" left arm. In this example, when the user moved his/her right arm, the mirrored left arm appears to move and may be viewed as moving in the VR environment. If a familiar environment for the user was previously scanned, then the VR environment can be rendered to appear as that familiar environment, which can lead to powerful therapeutic effects for the user, for example, as described below in regard to reducing phantom limb pain. At 2510, the ability to view the phantom limb is optionally and preferably incorporated into one or more therapeutic activities performed in the VR environment.

The facial expression of the user may be monitored while performing these activities, for example to determine whether the user is showing fatigue or distress (4312). Optionally, the user's activities and facial expression can be monitored remotely by a therapist ready to intervene to assist the user through the VR environment, for example, by communicating with the user (or being an avatar within the VR environment).

At 4314, the body of the user is tracked, so that the location of one or more body parts of the user may be determined over time. Such tracking may be used for example to increase the realistic view of the user's avatar body and phantom limb, as well as to more realistically render the interactions of the user's avatar with the environment. Optionally SLAM is also included, again to more realistically locate the user within the environment. The combination of SLAM and tracking may for example be used to evaluate the movements of the user more effectively, for example to determine the range and/or quality of motion of the user, and the like.

One of skill in the art will appreciate that the above described method may be used to reduce phantom limb pain (where an amputee feels strong pain that is associated with the missing limb). Such pain has been successfully treated with mirror therapy, in which the amputee views the non-amputated limb in a mirror (see, for example, the article by Kim and Kim, "Mirror Therapy for Phantom Limb Pain", Korean J Pain. 2012 October; 25(4): 272-274). The VR environment described herein can provide a more realistic and powerful way for the user to view and manipulate the non-amputated limb, and hence to reduce phantom limb pain.

FIG. 44 shows another non-limiting example method for applying VR to medical therapeutics according to at least some embodiments of the present disclosure, which can provide a therapeutic environment to a subject who has suffered a stroke, for example (e.g., brain injury). In this non-limiting example, the subject is encouraged to play the game of "Simon says" in order to treat hemispatial neglect. In the game of "Simon says", one player (which in this example may be a VR avatar) performs an action which the other players are to copy—but only if the "Simon" player says "Simon says (perform the action)". Of course, this requirement may be dropped for this non-limiting example, which is described only in terms of viewing and copying actions by the user. 4402-4406 may be similar to 4302-4306 of FIG. 43.

At 4408, the user views a Simon avatar, which is optionally another player (such as a therapist) or alternatively is a non-player character (NPC) generated by the VR system. Preferably the user perceives the Simon avatar as standing in front of him or her, and as facing the user. The user optionally has his or her own user avatar, which represents those parts of the user's body that is normally be visible to the user according to the position of the user's head and body. This avatar is referred to in this non-limiting example as the user's avatar.

At 2610, the Simon avatar can initiate an action, which the user is to mimic with the user's own body. The action includes movement of at least one body part and optionally includes a facial expression as well. At 2612, the user copies—or at least attempts to copy—the action of the Simon avatar. The user can see the Simon avatar, as well as those parts of the user's avatar that are expected to be visible according to the position of the user's head and body. Optionally, for 2610 and 2612, the user's avatar can also be placed in front of the user, for example, next to the Simon avatar. The user can then see both the Simon avatar, whose visual action(s) the user would need to copy, and how the user's body is actually performing those actions with the user's avatar. The motions of the user may be tracked as described herein, in order to increase the realism of the rendering of the user's avatar and the corresponding movements displayed by that avatar. SLAM may also be used, alone or in combination with tracking, as previously described, to increase the realism of the environment and the actions of the user within that environment, also optionally in regard to movements of the avatar.

At 2614, if the user fails to accurately/correctly copy the action of the Simon avatar, that avatar preferably repeats the action. This process may continue for a predetermined period of rounds or until the user achieves at least one therapeutic goal. At 2616, the ability of the user to perform such actions may be optionally scored, such scoring may include separate scores for body actions and facial expressions. Such scoring may be augmented or performed with the assistance of tracking that is performed as described herein, in order to more accurately assess the actions of the user. SLAM may also be combined to further increase the accuracy of the assessment. At 2618, the facial expressions of the user while performing the actions can be monitored, even if the actions do not include a specific facial expression, so as to assess the emotions of the user while performing these actions.

Figure 45:
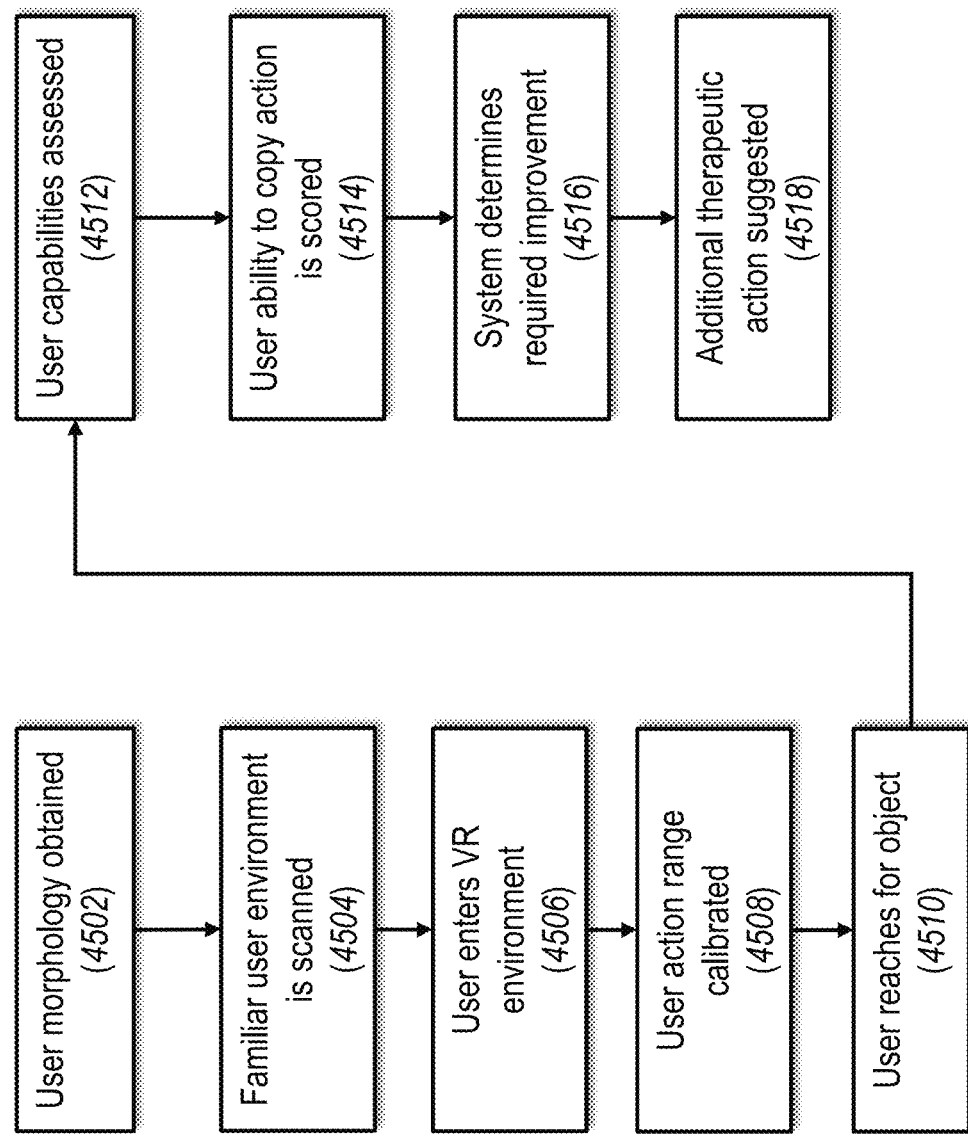
FIG. 45 shows a non-limiting example method for applying VR to increase a user's ability to perform ADL (activities of daily living) according to at least some embodiments.

FIG. 45 shows a non-limiting example method for applying VR to increase a user's ability to perform ADL (activities of daily living) according to at least some embodiments. 4502-4506 may be similar to 4302-4306 of FIG. 43.

In 4508, the user's action range is optionally calibrated as previously described, in order to determine the user's range of motion for a particular action or set of actions, such as for example for a particular gesture or set of gestures. For example, and without limitation, if the user is not capable of a normal action range, then the system may be adjusted according to the range of action of which the user is capable. In 4510, the user reaches for a virtual object in the VR environment, as a non-limiting example of an activity to be performed in the VR environment, for example as a therapeutic activity.

In 4512, the user's capabilities are assessed, for example in terms of being able to reach for and grasp the virtual object, or in terms of being able to perform the therapeutic task in the VR environment. Optionally, in 4514, the user is asked to copy an action, for example being shown by a system or "Simon" avatar. Such an action may be used to further determine the user's capabilities. The performance of such an evaluation may be performed with the assistance of tracking that is performed as described herein, in order to more accurately assess the actions of the user. SLAM may also be combined to further increase the accuracy of the assessment.

The system may then determine which action(s) need to be improved in 4516, for example in order to improve an activity of daily living. For example, and without limitation, the user may need to improve a grasping action in order to be able to manipulate objects as part of ADL. One or more additional therapeutic activities may then be suggested in 4518. The process may be repeated, with the user being assessed in his/her ability to perform ADL actions and also in terms of any improvement thereof.

Figure 46:
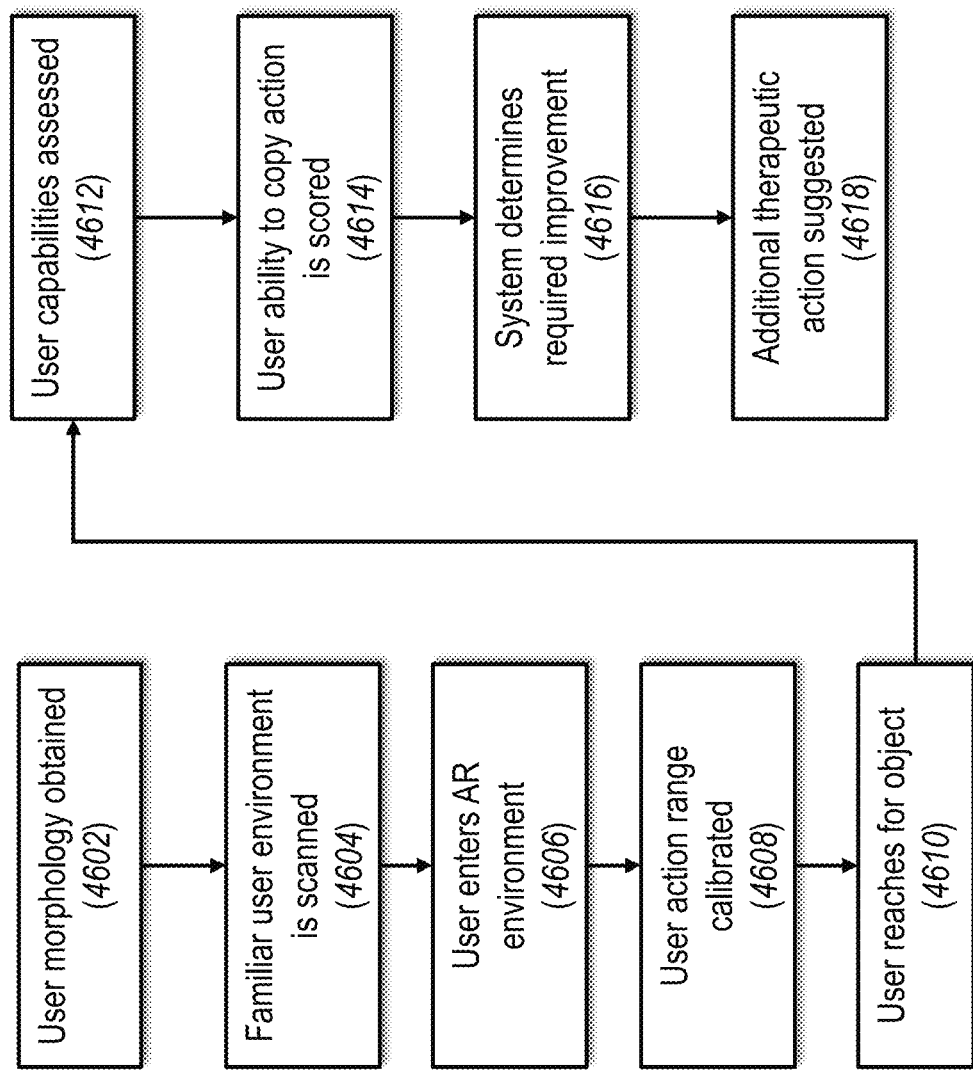
FIG. 46 shows a non-limiting example method for applying AR to increase a user's ability to perform ADL (activities of daily living) according to at least some embodiments.

FIG. 46 shows a non-limiting example method for applying AR to increase a user's ability to perform ADL (activities of daily living) according to at least some embodiments. Steps 4602-4606 may be similar to 4302-4306 of FIG. 25.

In 4608, the user's action range is optionally calibrated as previously described, in order to determine the user's range of motion for a particular action or set of actions, such as for example for a particular gesture or set of gestures. For example, and without limitation, if the user is not capable of a normal action range, then the system may be adjusted according to the range of action of which the user is capable. In 4610, the user reaches for an actual object or a virtual object in the AR environment, as a non-limiting example of an activity to be performed in the AR environment, for example as a therapeutic activity. However, optionally the user reaches at least once for a virtual object and at least once for an actual object, in order to determine the capabilities of the user in terms of interacting with actual objects. Furthermore, by doing both, the user's abilities can be assessed in both the real and the virtual environments. Optionally, in some embodiments, the AR environment is used for diagnosis and testing, while the VR environment is used for training and other therapeutic activities.

In 4612, the user's capabilities are assessed, for example in terms of being able to reach for and grasp the virtual and/or real object, or in terms of being able to perform the therapeutic task in the AR environment. Optionally, in 4614, the user is asked to copy an action, for example being shown by a system or "Simon" avatar. Such an action may be used to further determine the user's capabilities. The performance of such an evaluation may be performed with the assistance of tracking that is performed as described herein, in order to more accurately assess the actions of the user. SLAM may also be combined to further increase the accuracy of the assessment. Tracking and/or SLAM may also be used to assess the actions of the user between the VR and AR environments, for example to determine whether the assessment in the VR environment is being performed accurately.

The system may then determine which action(s) need to be improved in 4616, for example in order to improve an activity of daily living. For example, and without limitation, the user may need to improve a grasping action in order to be able to manipulate objects as part of ADL. One or more additional therapeutic activities may then be suggested in 4618. The process may be repeated, with the user being assessed in his/her ability to perform ADL actions and also in terms of any improvement thereof.

APPENDIX (partial description of a skeleton)

```
# Everything is expressed in world coordinate
ArticulatedModel =
{
  global_scale = 0.80;
  dense_mesh = true;
  bones = (
  {
    name = "sacrum";
    head = [-0.03382374346256256,-0.907242476940155,
-0.39482375979423523];
    tail = [-0.03382374346256256,-1.063200831413269,
-0.40458834171295166];
    x_axis = [0.999997615814209,
-0.00013603654224425554,0.0021727425046265125];
    y_axis = [-2.764863893389702e-10,
-0.9980457425117493,-0.06248803436756134];
    z_axis =
[0.0021769972518086433,0.062487829476594925,-0.9980433583259583];
    parent = "None";
    ndof = 3;
    initial_theta = [0.0,0.0,0.0];
    offset = [0.0,0.0,0.0];
    active = True;
  },
  {
    name = "l_thigh";
    head = [0.07265270501375198,-0.9023483991622925,
-0.3843427300453186];
    tail = [0.11466878652572632,-0.49611833691596985,
-0.41821298003196716];
    x_axis = [0.9938485026359558,-0.10558056086301804,
-0.03343289718031883];
    y_axis = [0.10252843052148819,0.9912905097007751,
-0.08265086263418198];
    z_axis =
[0.04186808317899704,0.07871462404727936,0.996017575263977];
    limit_rotation_x =
[-1.5707963705062866,0.7853981852531433];
    limit_rotation_y =
[-0.7853981852531433,0.7853981852531433];
    limit_rotation_z =
[-0.7853981852531433,0.7853981852531433];
    parent = "sacrum";
    ndof = 3;
```

APPENDIX-continued (partial description of a skeleton)

```
   initial_theta = [0.0,0.0,0.0];
   offset =
     [0.10647644847631454,0.16085243225097656,0.020245611667633057];
   active = False;
},
```

FIG. 47 relates to another non-limiting example of a denoising method, using a bilateral filter with Gaussian blur filtering in relation to the amplitude of the amplitude. Denoising according to the amplitude provides a better result as it is a good indicator of noise, plus it allows for dynamic denoising (for example, to handle the problem of flying pixels, hot/cold pixel values and so forth). As shown, in a method 4700, the process begins with determining the correct sigma value in 4702, preferably in such a way that the standard deviation is reduced. For example, the following formula may be used:

$$\sigma_f = (\sigma_x/(\sigma_r)) \times (\tfrac{1}{2} \times \sqrt{\pi})$$

The following variables are employed:
Gaussian filter standard deviation $\sigma_f$
Input standard deviation $\sigma_x$
Reduced standard deviation $\sigma_r$ In 4704, preferably different values of the reduced standard deviation are tested, to further determine a final sigma value that is appropriate. For example, the reduced standard deviation may be 0.0025, or any other value that results in a calculated sigma value of at least 1.5.

In 4706, the final sigma value is selected by fitting the following equation:

$$(c_0/(c_3 \times (t \times t) + c_2 \times t + c_4)) + c_1$$

Figure 48A:
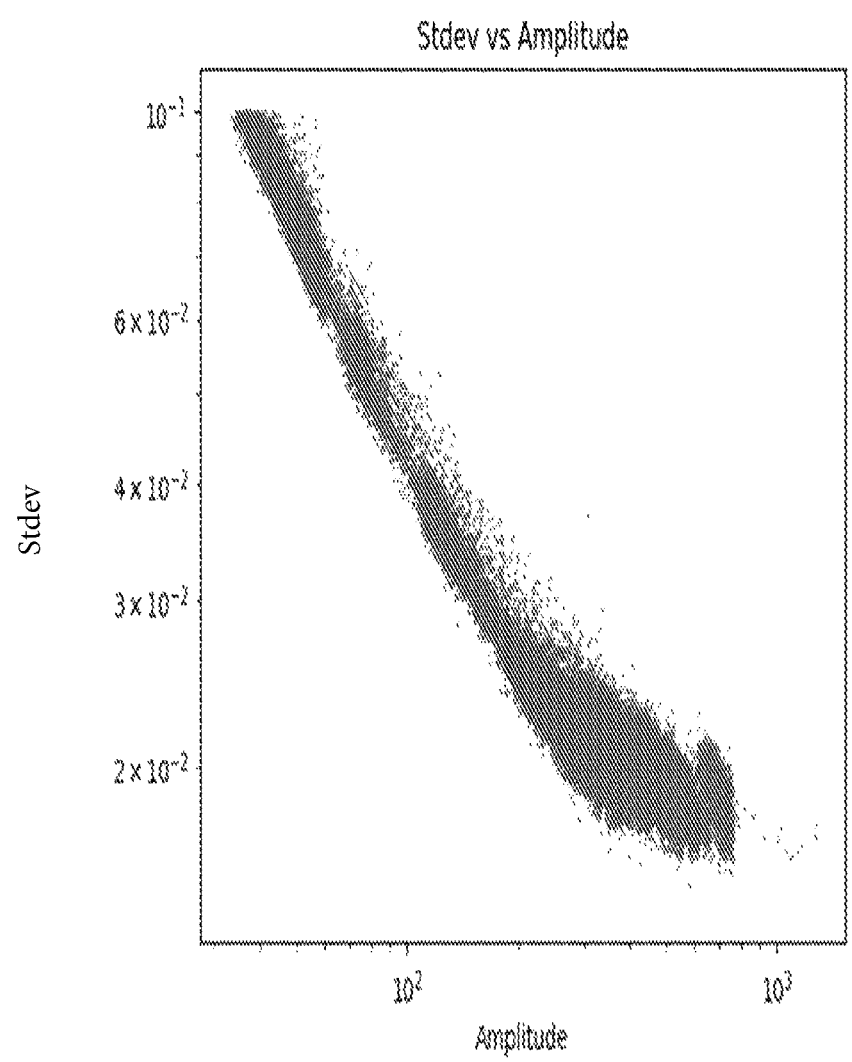
FIGS. 48A-48C relate to non-limiting exemplary data for fitting the sigma.
Figure 48B:
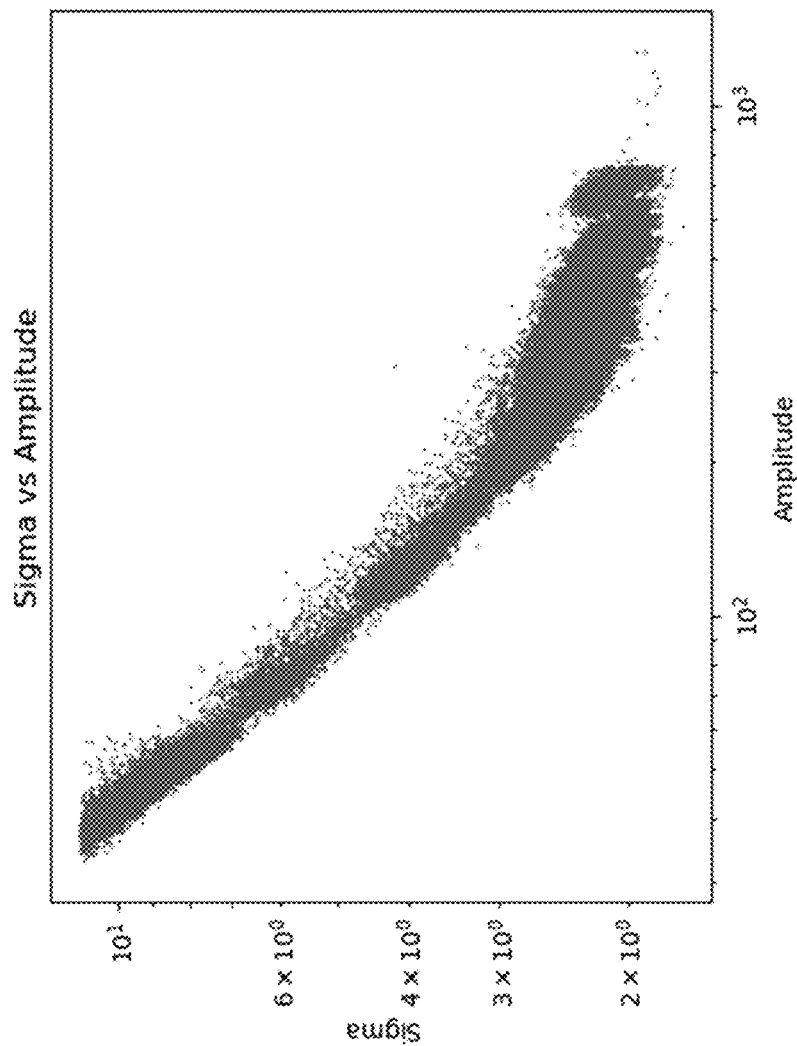
Figure 48C:
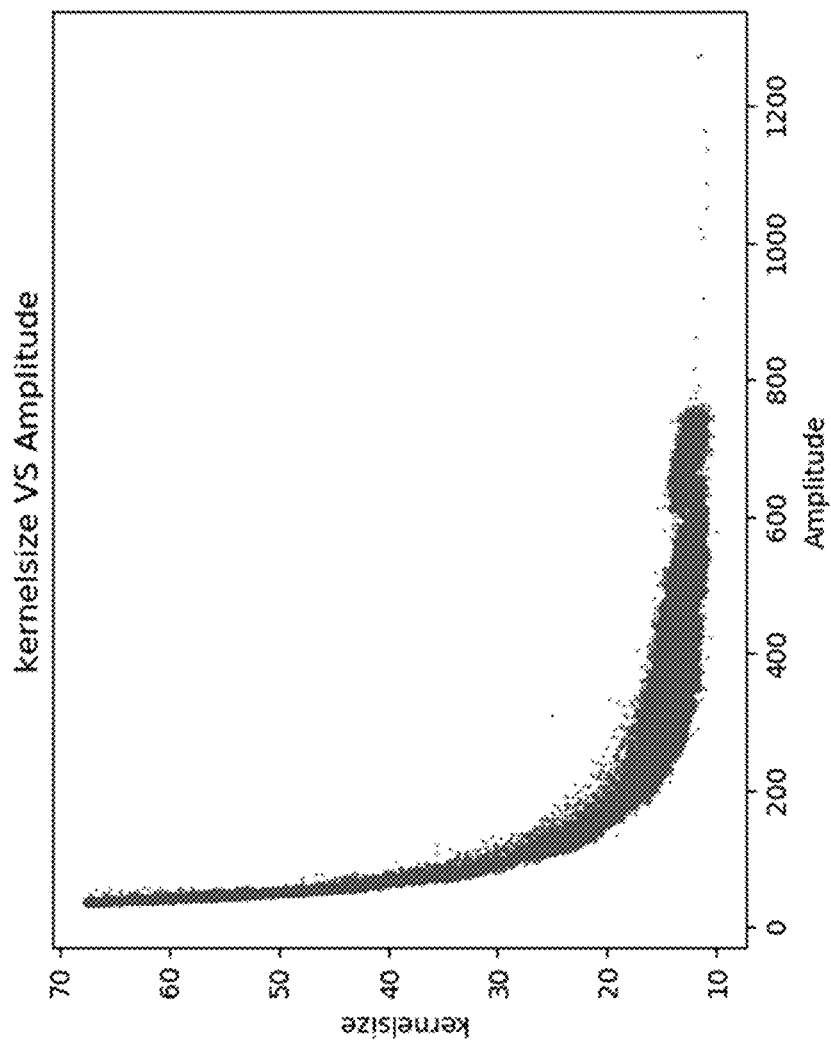

Non-limiting exemplary data for fitting the sigma is shown with regard to FIGS. 48A-C. FIG. 48A relates to fitting standard deviation vs amplitude. FIG. 48B shows fitting the sigma vs amplitude. FIG. 48C relates to fitting the kernel size vs amplitude.

For the tests that were run, the final $c_1$ parameters are: −1.83787823e+03, 9.71384089e−01, −5.77131050e+00, −6.04764725e−02, −1.09138843e+02 for constant 2

Again in relation to the tests that were run, the final $c_1$ parameters are: −2.66281131e+04, 1.94272395e+00, −4.18206727e+01, −4.38012424e−01, −7.90253741e+02 for constant 3

Optionally the sigma value may be found according to the following equation:

$$10^{\wedge}(c0 \ast \log(t) + c1)$$

Parameters are the same as those fitted above.

Next the kernel is determined according to the maximum sigma size, as multiplied by a constant, in 4708. Preferably, the kernel is calculated according to the sigma value, multiplied by a constant is selected from 3 or 6.

Optionally, to save calculation time, the bilateral filter may be implemented with a LUT (look-up table) that is precalculated.

The following equation shows an exemplary implementation of the Gaussian:

$$G(x) = \frac{1}{2\pi\sigma^2} e^{-\left(\frac{x}{\sigma}\right)^2}$$

Preferably the above Gaussian is calculated in two stages as described below.

Figure 49:
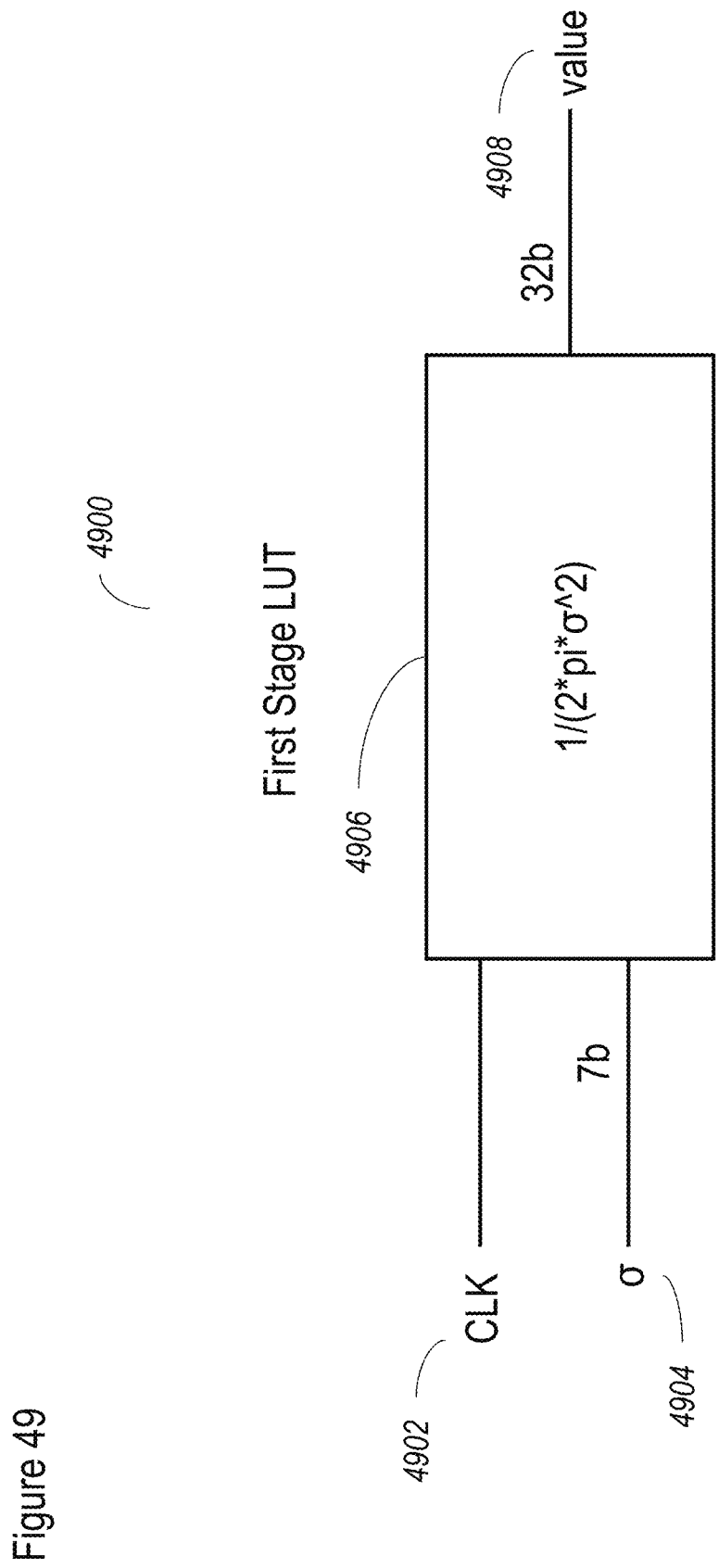
FIG. 49 shows a non-limiting, exemplary implementation of the LUT in hardware or firmware, which is preferably used for the first stage.

FIG. 49 shows a non-limiting, exemplary implementation of the LUT in hardware or firmware, which is preferably used for the first stage. Taking into account the equation of the relationship between the size of the "kernel" and the sigma value, kernel=[3,6]*sigma, and the maximum "kernel" being set at 7×7 for this non-limiting example, the highest value that sigma can have is 16.33.

The error difference has been tested using sigma values with fractional or integer values. Since the difference for the final value is negligible, the architecture has been designed in such a way that the adaptive function only emits whole sigma values, with 17 being the highest value and 1 being the lowest. Since the range of values is small, a LUT with pre-calculated values has been implemented to obtain the value of the operation $1/(2 \ast pi \ast sigma^2)$, achieving considerable savings in cycles and DSPs.

Turning now to FIG. 49, a LUT is shown embodied in a hardware implementation. A schematic implementation of a LUT 4900 is shown, featuring a clock input 4902 and a sigma input 4904. Calculations are performed at 4906 with the previously described equation ($1/(2 \ast pi \ast sigma^2)$), and then an output value 4908 is provided.

FIGS. 50A and 50B show schematic hardware implementations for performing the second part of the Gaussian function. This module has two variants, one for calculating the weight as a function of distance (which provides the Gaussian filter) and another for calculating the range as a function of distance (provided by the Bilateral filter).

Figure 50:
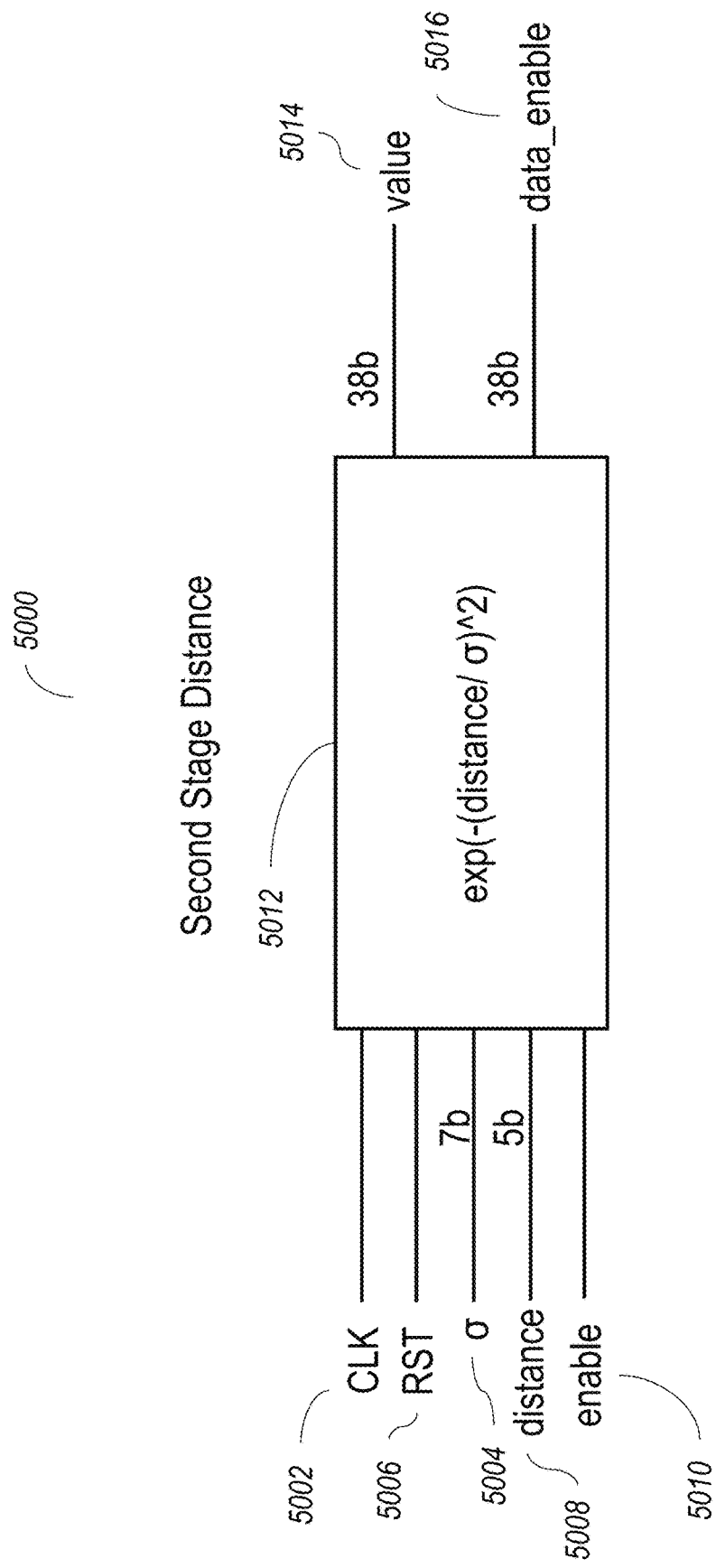
FIGS. 50-53 show non-limiting schematic implementations of pixel processing for hardware or firmware.

FIG. 50 shows the implementation for calculating the weight as a function of distance. As shown in a hardware implementation 5000, a clock input 5002 and sigma 5004 are provided. The distance 5008 is also provided. In addition, a RST (reset) 5006 and an enable signal 5010 are provided.

Calculations are performed at 5012 for the equation: exp(−(distance/sigma)^2). The output is a calculated weight value 5014 and a data_enable signal 5016. The enable signal 5010 allows for continuous input monitoring, which is then output as data_enable signal 5016.

Figure 51:
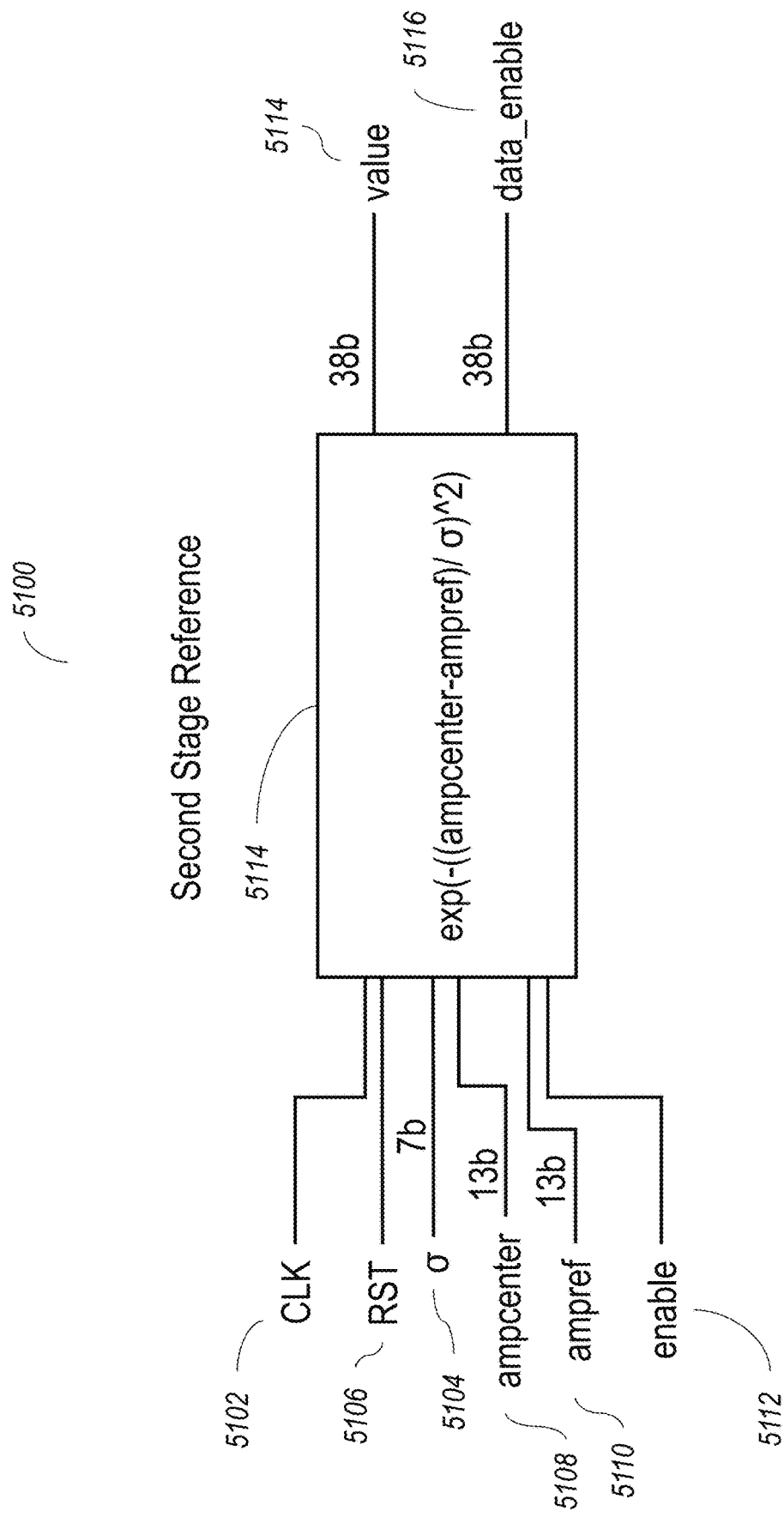

FIG. 51 shows the implementation for calculating the range as a function of distance. As shown in a hardware implementation 5100, a clock input 5102, sigma 5104, RST 5106 and an enable signal 5112 are provided. In addition, ampcenter 5108 (amplitude signal) and ampref 5110 (reference signal) are provided. The amplitude relates to the amount of energy that reaches each pixel.

Calculations are performed at 5114 for the equation: exp(−((ampcenter−ampref)/sigma)^2). The output is a calculated distance value 5116 and a data_enable signal 5118.

Figure 52:
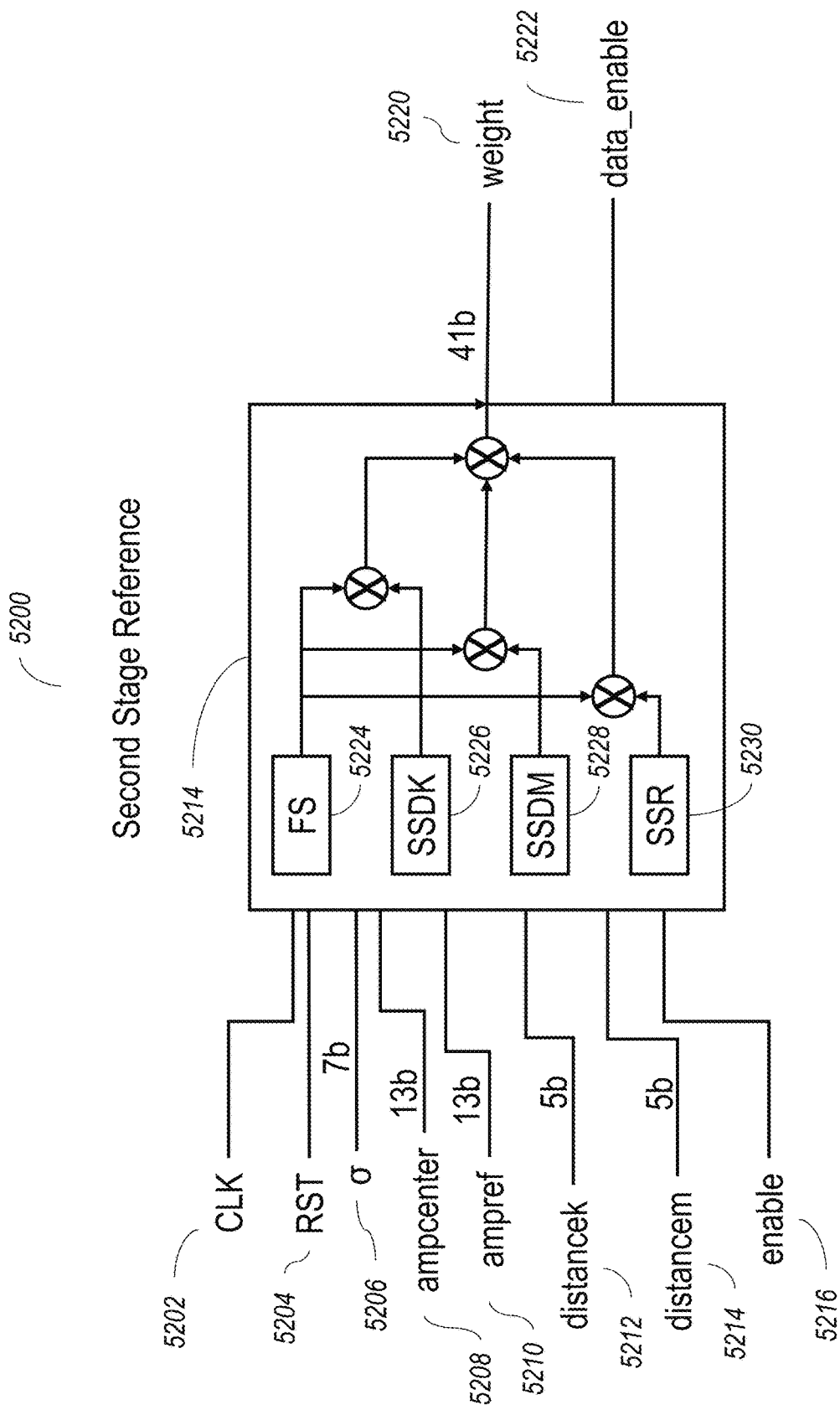

FIG. 52 shows an optional implementation for encapsulating the components of FIGS. 50 and 51, in a component that calculates the weight of a pixel inside the window. Components shown in FIGS. 50 and 51 have the same or similar function. In a system 5200, a clock 5202, RST 5204 and sigma 5206 perform identical or similar functions as previously described. An ampcenter 5208 and an ampref 5210 also perform identical or similar functions as previously described. Distance related inputs include a distancek 5212 and a distancem 5214, for the previously described calculations of weight and range as a function of distance. An enable input signal 5216 performs a substantially similar function as previously described.

These inputs are fed to a calculation module 5218, which produces outputs, including a weight 5220 and a data_enable output 5222.

Calculation module 5218 preferably includes an FS (first stage LUT (Look-Up Table) 5224, an SSDK 5226, an SSDM 5228 and an SSR (second stage reference) 5230. SSDK 5226 is the Second Stage Distance taking as input the distancek. SSDM 5228 is the Second Stage Distance taking as input the distancem.

Once the pixel weight is obtained, it is necessary to accumulate the output of the Weight Pixel component during as many iterations as the number of components in the window. The component responsible for this operation is a Final Stage, which also performs the final calculation of the value of the filtered pixel. The Phase input must be connected to a shift register with the same number of cells that the Weight Pixel component takes.

Figure 53:
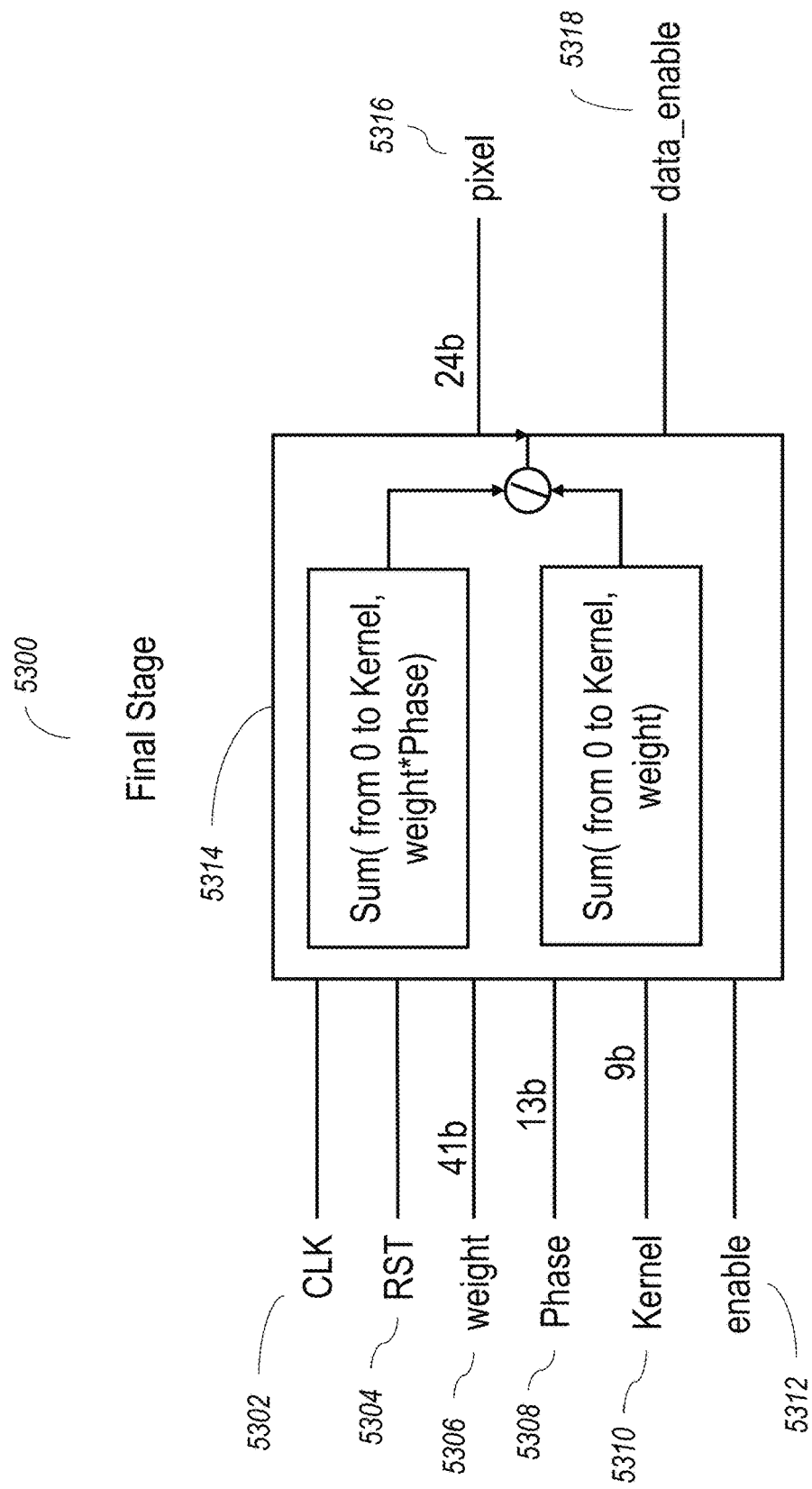

FIG. 53 shows an exemplary, schematic final stage implementation. As shown, a final stage module 5300 receives a clock input 5302 and a RST input 5304 as previously described. A weight output 5306 from the calculations performed as described in FIG. 52 is provided as an input. A phase 5308 and a kernel 5310 are calculated as previously described. An enable signal 5312 is also provided.

A calculation module 5314 performs two calculations: the sum from 0 to kernel of the weight times the phase; and the sum from 0 to kernel of the weight. The final value of the filtered pixel is output at 5316, along with a data_enable signal 5318 as previously described.

These components may be combined to form a single component that includes the final stage and the weight pixel signals (not shown). Furthermore, an adaptive function may also be included, which receives a clock input signal and the previously described amplitude, and outputs the kernel and sigma values, calculated as previously described (not shown).

Figure 54:
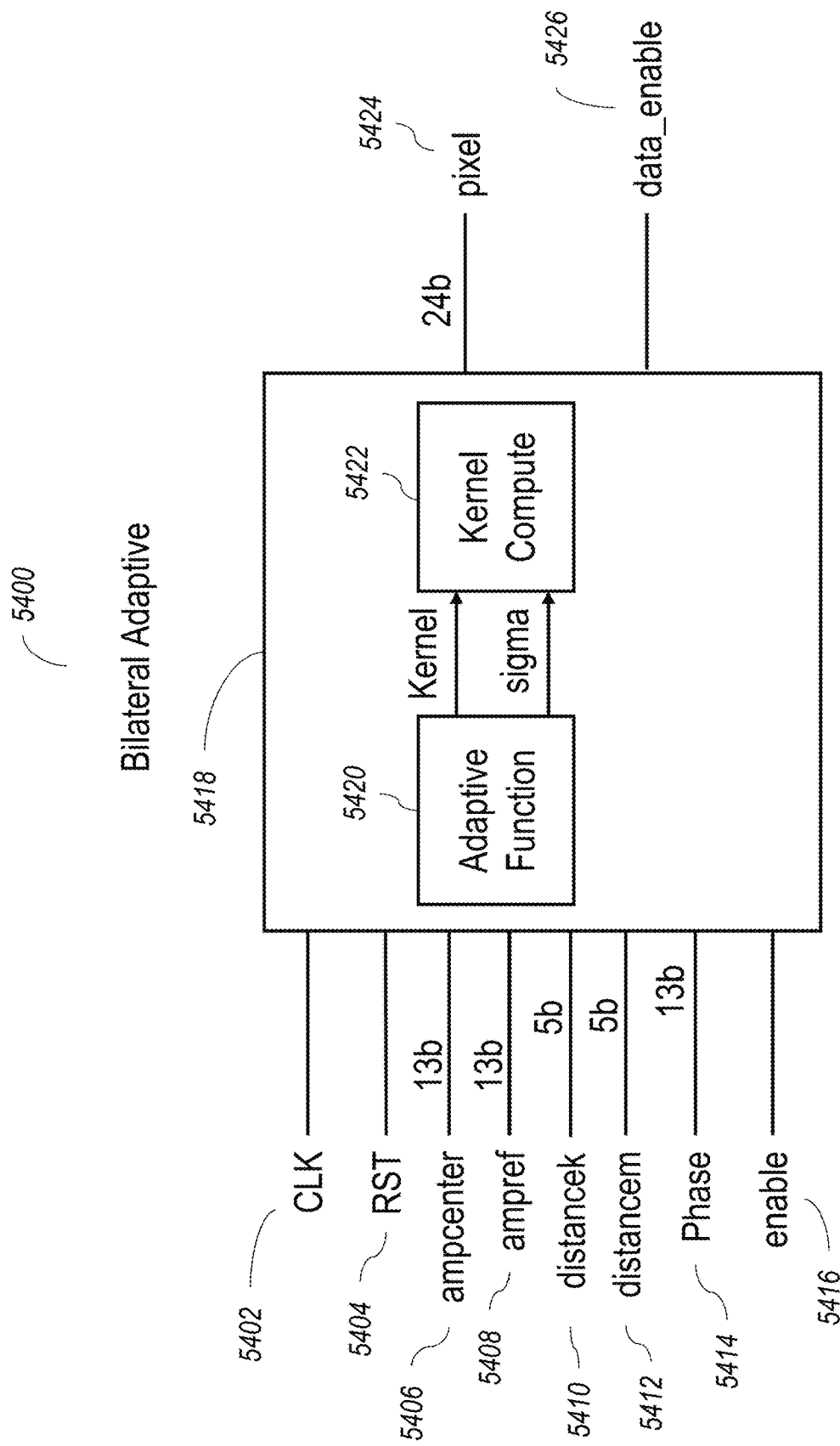
FIG. 54 shows an exemplary, schematic combined bilateral filter implementation.

FIG. 54A shows an exemplary, schematic combined bilateral filter implementation. A bilateral adaptive filter 5400 is shown, featuring the following previously described inputs: a clock 5402, a RST 5404, an ampcenter 5406, an ampref 5408, a distancek 5410, a distancem 5412, a phase 5414, and an enable signal 5416. These are then combined in a calculation module 5418, according to the previously described adaptive function 5420 and kernel compute 5422. The final value for the pixel is output at 5424, along with the data_enable signal 5426.

Figure 55:
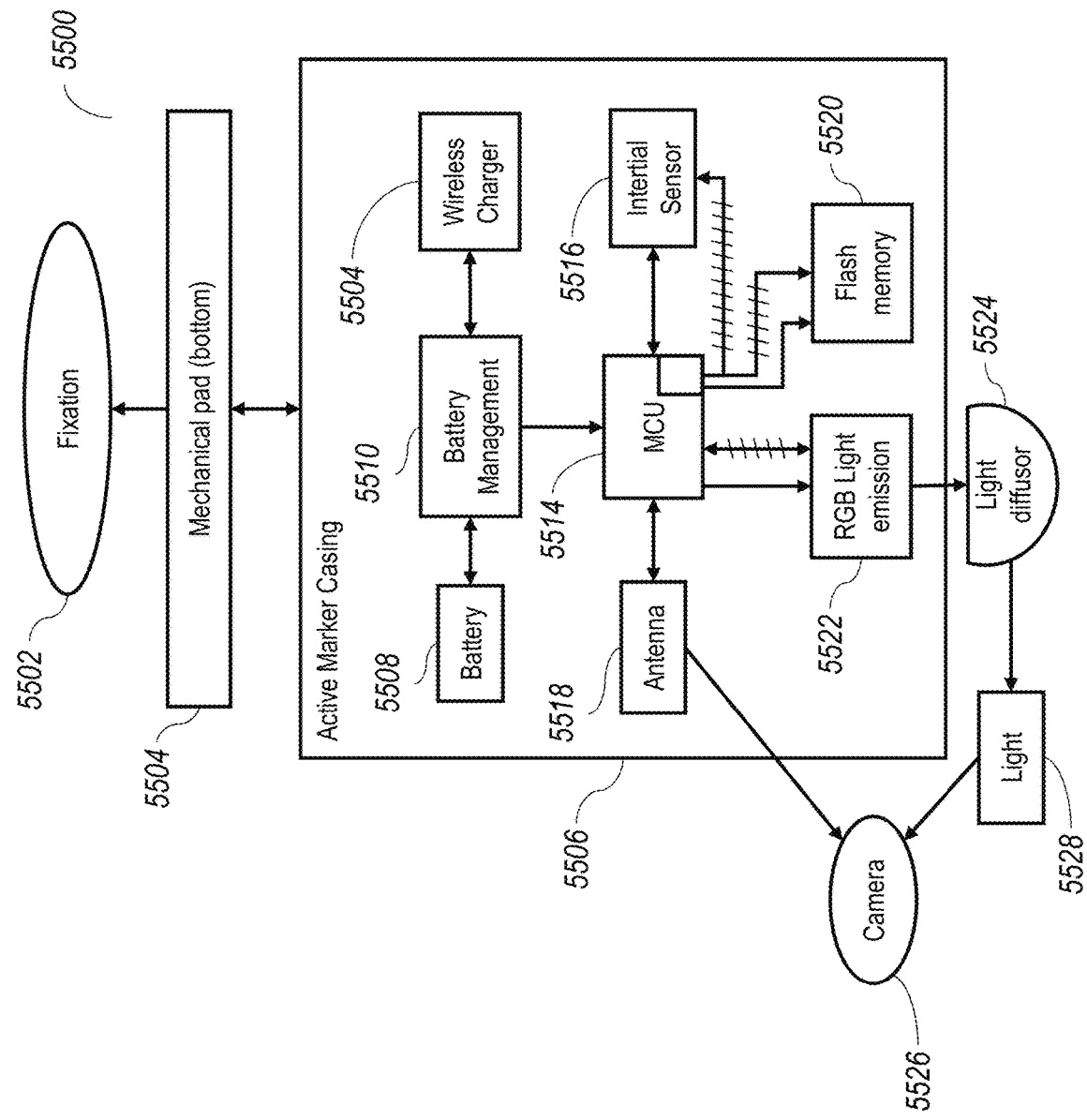
FIG. 55 shows a non-limiting exemplary system for layout for active markers.

FIG. 55 shows a non-limiting exemplary system for layout for active markers. As shown in the system 5500, there is provided a fixation 5502 for attaching system 5500, for example, to a hand, arm, leg, or other body part of the user or to another object. A mechanical pad 5504 provides mechanical support for the system 5500 and an active marker casing 5506, which is attached to mechanical pad 5504, and which in turn attaches to fixation 5502. Active marker casing 5506 features a battery 5508, which is managed by a battery management module 5510, and which receives power from a wireless charger 5512. Power is then supplied through battery management 5510 to an MCU 5514 to an antenna 5518 to an inertial sensor 5516 and to other components within active marker casing 5506, and also to light emission, RGB light emission 5522 and flash memory 5520.

MCU 5514 controls operations of the active marker in terms of electrical operations. MCU 5514 receives information from inertial sensor 5516 in terms of, for example, a gyroscope accelerometer and the like. MCU 5514 also has an antenna 5518, which allows it to communicate with a camera 5526 outside of active marker casing 5506, and also to receive instructions from camera 5526.

MCU 5514 receives this information from 5518 and also directs antenna 5518 to broadcast to camera 5526. MCU 5514 controls emission of light through RGB light emission module 5522, and also receives instructions from and may also optionally write information to flash memory 5520. Light from RGB light emission 5522 is emitted through a light diffuser 5524, which is located outside of active marker casing 5506. Light 5528 is then also received by camera 5526 through light diffuser 5524.

Figure 56A:
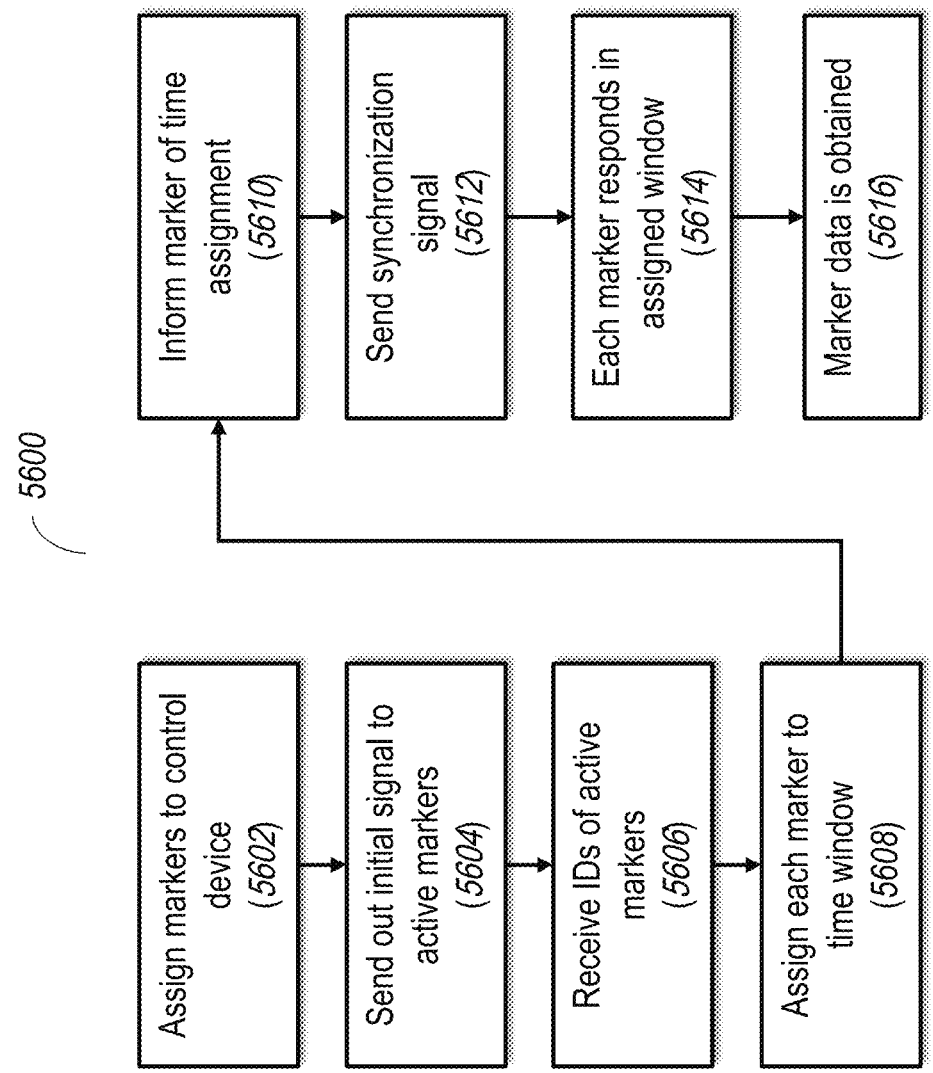
FIG. 56A shows a non-limiting exemplary wireless marker operational method.

FIG. 56A shows a non-limiting exemplary wireless marker operational method 5600. In the method 5600, at stage 5602, the markers are assigned to particular control device. In the case of the markers of the camera, for example, a particular set of markers would preferably be assigned to or would coordinate with a particular camera as the control device.

The control device then sends out an initial signal to activate the markers in 5604 to let them know that it is time to start collecting and broadcasting information. The control device, such as the camera, then receives the IDs of the active markers that are available in 5606 and assigns each available marker to a time window in 5608. The control device, such as the camera, then informs each marker of the time assignment in 5610, so that the markers know that they are to transmit their data only during a particular time window. The control device then sends a synchronization signal in 5612. Each marker responds in the assigned window in 5614, and the marker data is obtained in 5616. Optionally, the method may loop between stages 5612, 5614, and 5616.

Figure 56B:
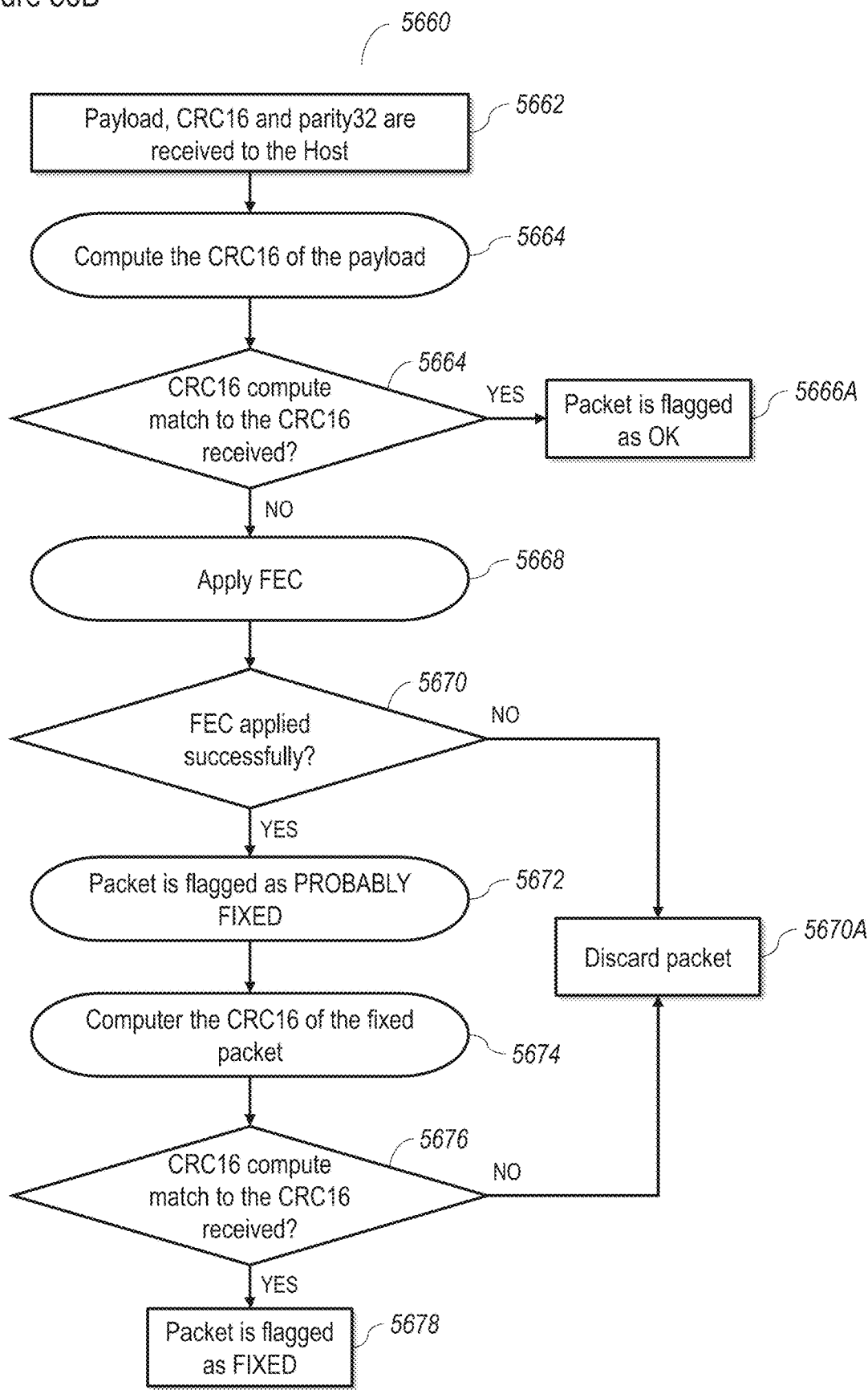
FIG. 56B shows a non-limiting exemplary wireless marker communication method.

In FIG. 56B, there is shown an exemplary method 5660 for communication between the active markers and the host or control device through the wireless communication. In 5662, the payload CRC16 and priority 302 are received by the host. This would be, for example, in the form of one or more packets. In 5664, the host computes the CRC16 of the payload. In 5666, it is determined whether the CRC16 computation matches to the CRC16 as received. This is a packet check to make certain that the packets are correct. If in fact the two match, then the packet is flagged as okay in 5666A. Otherwise, it is determined that the packet is not acceptable, and an FEC (forward error correction) is applied in 5668.

If the FEC is applied successfully, the method will continue in 5672, and the packet is flagged as probably fixed. However, if the FEC is not applied successfully in 5670, then in 5670A the packet is discarded. Assuming that 5672 the packet is flagged as probably fixed, the CRC16 of the fixed packet is computed in 5674. Again, it is checked to see whether the two CRC16 results match in 5676. If not, the method goes to 5670, and the packet is finally discarded. Otherwise, the packet is flagged as fixed in 5678 and may proceed to be processed by the control or host device.

FIG. 56C1 relates to an exemplary wireless marker packet structure. As shown in a packet structure 5620, a plurality of fields are provided. These are the memory element accessors of the sample packet. For example, there is a field which is last sequence, which is the sequence of the last packet. The last packet would in this case be the second packet if one packet had already been received. If a packet had not yet been received, then this would be blank. Next to the number of samples in terms of the amount of data is written in the number of samples field. The time offset is of course the offset when the time and data was collected according to the beacon, according to when it be sent. This is followed by the quaternion, the velocity, again the time offset, the quaternion, and the velocity. This would be repeated for a second optional sample. Each sample has its own time offset, and if two or more are present, then each has its own quaternion and its own velocity, which is the information which is sent to the host for further calculations.

Turning now to FIG. 56C2, there is shown an exemplary wireless marker protocol for acquisition. In a flow 5622, during the acquisition phase, there are three optional priority flows. The lowest priority flow is 5624. The second is shown as 5650, and the last and the highest priority is shown as 5652. With regard to the highest priority in 5652, the radio load deadline ISR is determined. It is based on hardware timer. The packet is copied to the radio. It's loaded up for delivery through the antenna, and then the marker enters low power behavior.

With regard to the lowest priority flow 5624, upon receiving inertial data from the inertial sensor, it will save the data in the buffer with a timestamp, and perform a memory write. For 5624, the MPU ISR (interrupt service routine) is invoked in 5626, such that the interrupt is received from the inertial sensor. The hardware timestamp at the time of the interrupt is saved in 5628. The global sequence number is incremented in 5630 to determine the global sequence of the packets. Then the next buffer for storing the samples is obtained in order to write the sample data from the inertial sensor in 5632. Next, the writing process begins from the inertial sensor to the sample data buffer in 5634. In 5636, it is determined whether the load deadline is reached for the time to transmit the data, according to the received beacon, whether the data will be transmitted according to the current beacon or for the next time that the beacon is received. If for the current beacon, then the last beacon hardware timestamp is subtracted, and the time offset is written. If for the next beacon, then the next beacon hardware timestamp is estimated, and then the next beacon hardware timestamp is subtracted.

Figure 56D:
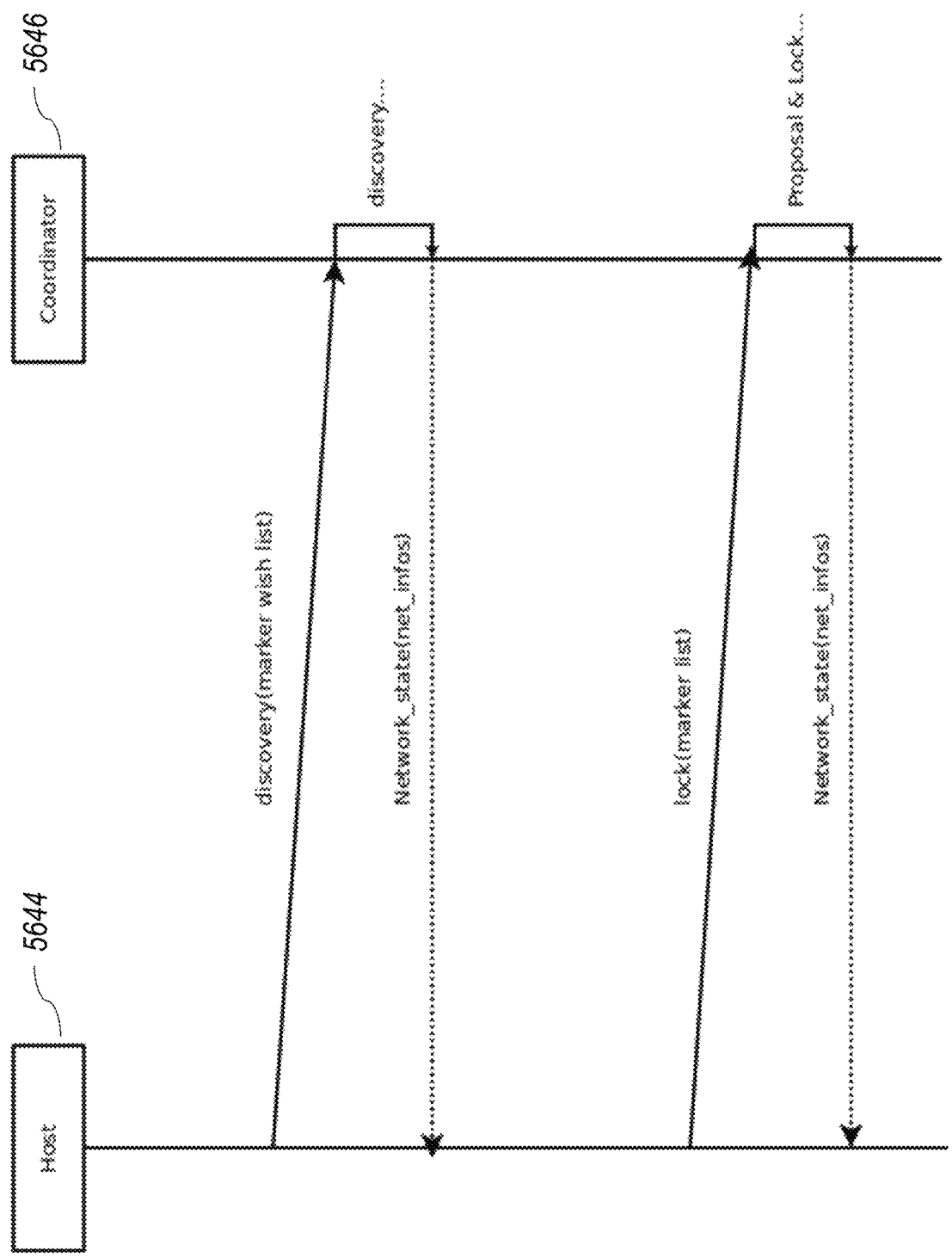
FIG. 56D shows a non-limiting exemplary process between a host 5644 and the coordinator 5646.

FIG. 56D shows a non-limiting exemplary process between a host 5654 and the coordinator 5656. First the host sends out the discovery marker wish list. These are the markers that host 5654 had registered as being assigned to host 5654. It includes a set of a plurality of markers. The coordinator in 5656 then handles the discovery to determine which markers are present. Optionally, a coordinator on each marker may transmit information back to the host, or alternatively there might be a separate coordinator, which receives the information from the markers and then transmits it back to the host 5654. The network state information is sent after discovery to host 5654. Host 5654 then locks each marker which has answered in the marker list, again through 5656. Each one then responds that it is locked. It is now only available to that specific host and cannot answer another host. This is to avoid crosstalk or confusion between sets of markers in a case where markers may be physically adjacent or at least sufficiently adjacent that a host would be able to access radio signals from more than one marker.

Figure 56E:
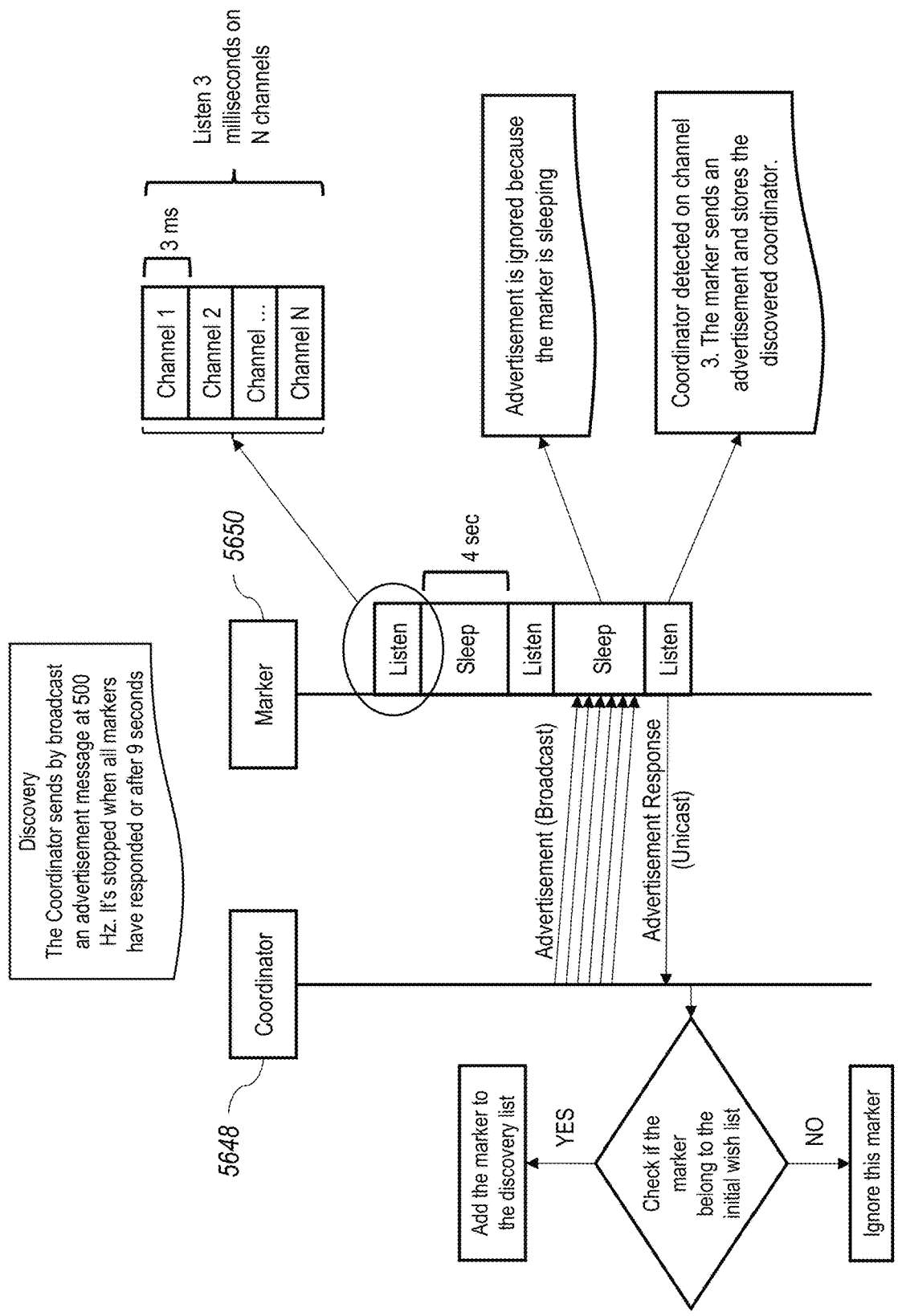
FIG. 56E shows again coordinator 5648 and marker 5650 to show the correspondence between the two of them as the coordinator locates the different markers.

FIG. 56E shows again coordinator 5658 and marker 5650 to show the correspondence between the two of them as the coordinator locates the different markers. This figure also assumes that the coordinator is a separate function from each marker and is not hosted on the marker. The coordinator 5658 sends a broadcast and advertisement message, for example at 500 Hz, to each marker 5650. It stops when all of the markers have responded or after certain period of time has elapsed, just for example, nine seconds. The initial advertisement broadcasts as shown. The marker 5650 listens to the broadcast from 5658 on different channels. It tries channel one, channel two, so forth until it has run through all the channels. It then sleeps, listens again, and sleeps.

During the sleep period, the advertisement is ignored because the marker is sleeping. Once, however, the coordinator has been detected on a particular channel, the marker sends an advertisement and stores the discovered coordinator. The advertisement response is unicast. The coordinator then checks if the marker belongs on the initial wish list. If so, it is added to the marker discovery list if yes. If not, then the marker is ignored.

Figure 56F:
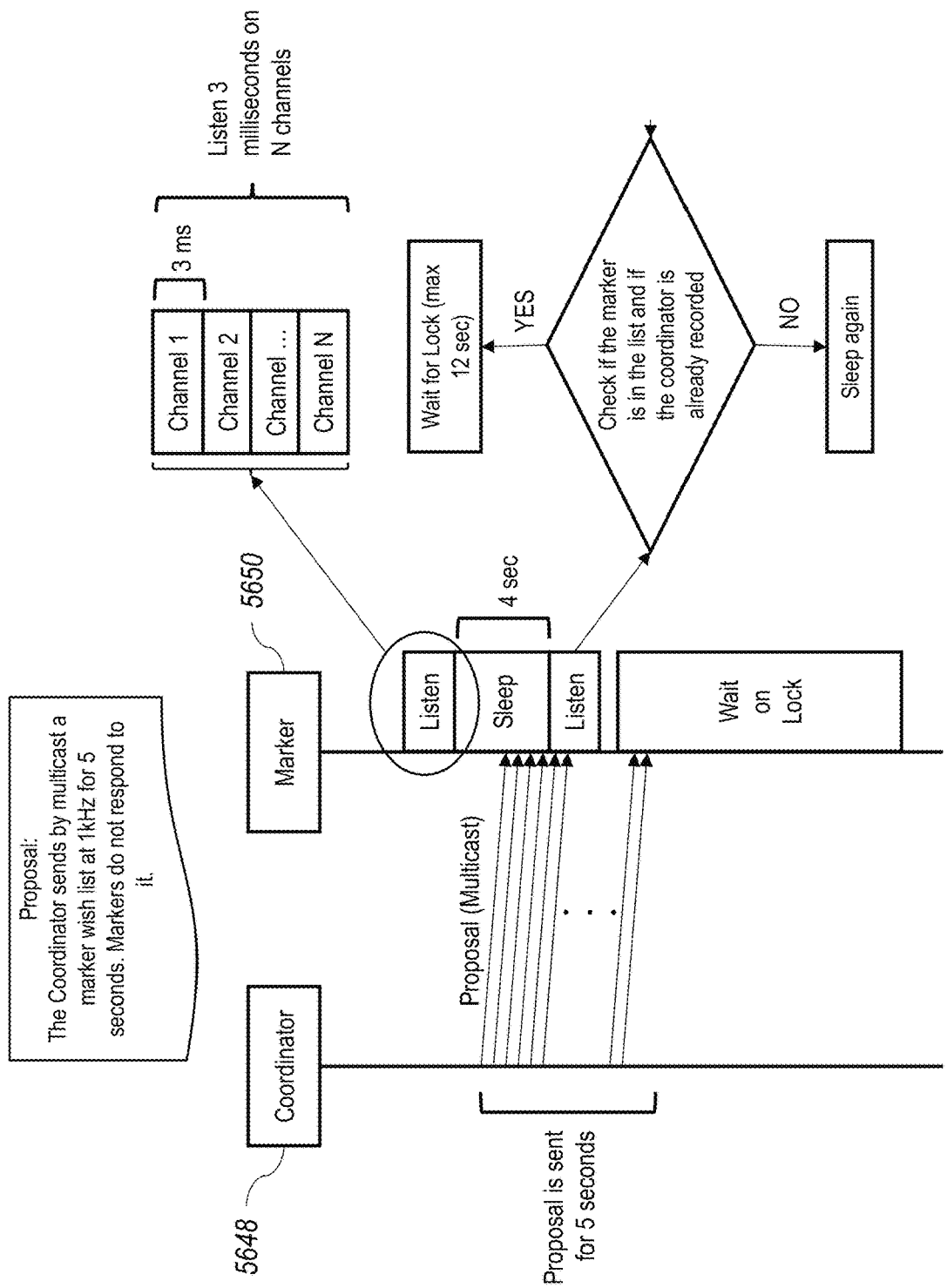
FIG. 56F shows the next phase of communication for the markers.

Next, in the next phase, shown in FIG. 56F, coordinator 5658 and marker 5650 are again communicating. The coordinator 5658 sends a proposal by multicast to the marker wish list during, least a certain period of time, at least five seconds, for example, at one kHz. If the marker is in the list and the coordinator is already recorded, then the marker waits for the lock. In other words, if it has already acknowledged and has sent another multicast from the coordinator, then it's waiting for the lock to occur. If not, if the marker is not on the list that is being requested, and if the coordinator has not been recorded as being the correct coordinator, then the marker goes back to sleep. This proposal continues during this time the marker waits for the lock if in fact it is to be addressed.

Figure 57:
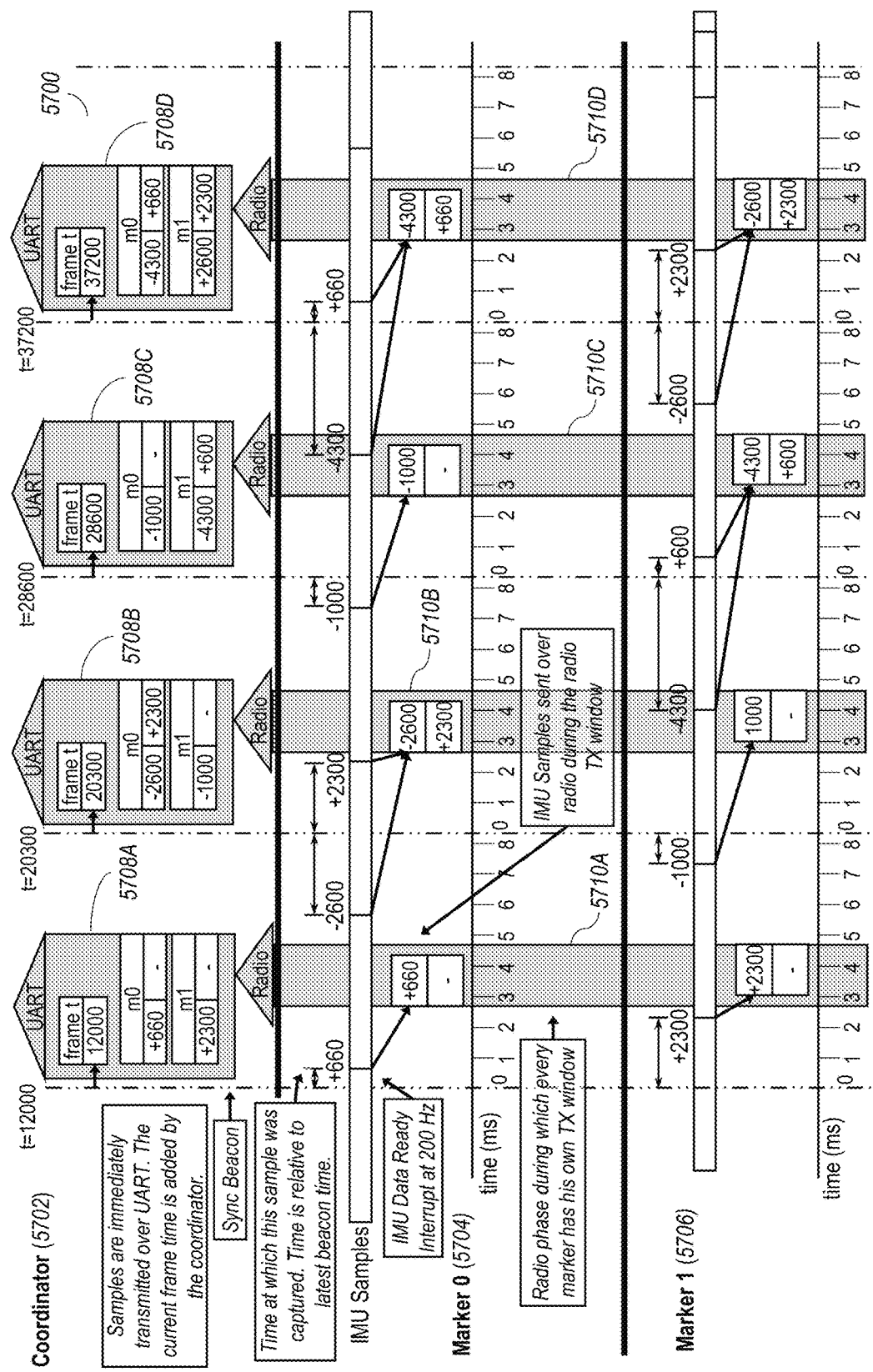
FIG. 57 shows a non-limiting exemplary timeline for the protocol.

FIG. 57 shows a non-limiting exemplary timeline for the protocol. In a protocol process 5700, there is a coordinator 5702, marker 0 5704, and marker 1 5706. 5708A, 5708B, 5708C, and 5708D all indicate synchronization signals, which are sent to indicate the start of the period during which data is delivered. 5710A, B, C, and D show different windows during which marker zero and marker one may transmit. To avoid overlap as it is shown, each marker has its own window during which time it may answer. It may not answer during a window available only for another marker. These would have been determined previously when the coordinator was sending out its multicast. It would assign windows and let the markers know which window they would have to answer in, and that would be determined as a time offset off the synchronization signal.

While various inventive embodiments have been described and illustrated herein, those of ordinary skill in the art will readily envision a variety of other means, structures, steps, and/or functionality for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, structure, functionality, steps, processes, and configurations described herein are meant to be exemplary and that the actual parameters, dimensions, materials, structure, functionality, steps, processes, and configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the embodiments disclosed herein are presented by way of example only and that, such embodiments (and any embodiments supported by the present disclosure either expressly, implicitly or inherently) may be practiced otherwise than as specifically described and claimed. Some embodiments of the present disclosure are directed to each individual feature, system, function, article, material, instructions, step, kit, and/or method described herein, and any combination of two or more such features, systems, functions, articles, materials, kits, steps, and/or methods, if such features, systems, functions, articles, materials, kits, steps and/or methods are not mutually inconsistent, is included within the inventive scope of the present disclosure. Additionally, some embodiments of the present disclosure are inventive over the prior art by specifically lacking one and/or another feature/functionality disclosed in such prior art (i.e., claims to such embodiments can include negative limitations to distinguish over such prior art).

Also, various inventive concepts may be embodied as one or more steps/methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Any and all references to publications or other documents, including but not limited to, patents, patent applications, articles, webpages, books, etc., presented in the present application, are herein incorporated by reference in their entirety.

All definitions, as defined and used herein, should be understood to control over dictionary definitions, definitions in documents incorporated by reference, and/or ordinary meanings of the defined terms.

What is claimed is:

1. A stereo vision procurement apparatus for obtaining stereo visual data, comprising: a stereo RGB camera;
   a depth sensor; and
   an RGB-D fusion module,
   a processor; and
   a plurality of tracking devices to track movement of a subject,
   wherein:
      the processor is configured to process data from the tracking devices to form a plurality of sub-features,
      each of said stereo RGB camera and said depth sensor are configured to provide pixel data corresponding to a plurality of pixels,
      said RGB-D fusion module is configured to combine RGB pixel data from said stereo RGB camera and depth information pixel data from said depth sensor to form stereo visual pixel data (SVPD), and
      said RGB-D fusion module is implemented in an FPGA (field-programmable gate array) and wherein said sub-features are combined by said FPGA to form a feature to track movements of the subject;
   further comprising: a memory; and
   wherein said processor is configured to perform a defined set of operations in response to receiving a corresponding instruction selected from an instruction set of codes, and said instruction set of codes include:
      a first set of codes for operating said RGB-D fusion module to synchronize RGB pixel data and depth pixel data, and for creating a disparity map; and
      a second set of codes for creating a point cloud from said disparity map and said depth pixel data;
   wherein said disparity map is generated by executing a plurality of instructions, wherein said instructions comprise performing a matching cost computation by measuring a similarity of pixels in left and right images by producing a cost; aggregating said costs to form a 3-D costs map; performing disparity selection to generate a 2-D disparity map; and refining said 2-D disparity map to generate said disparity map.

2. The apparatus of claim 1, further comprising a demosaicing module configured to perform a method comprising:
   averaging the RGB pixel data associated with a plurality of green pixels surrounding red and blue sites for R(B) at B-G(R-G) sites or R(B) at R-G(B-G) sites, and
   reducing a number of green pixel values from the RGB pixel data to fit a predetermined pixel array for R(B) at B(R) sites.

3. The apparatus of claim 2, wherein:
   said stereo RGB camera comprises a first camera and a second camera,
   each of said first and second cameras being associated with a clock on said FPGA, and said FPGA including a double clock sampler for synchronizing said clocks of said first and second cameras.

4. The apparatus of claim 3, further comprising:
   a histogram module comprising a luminance calculator for determining a luminance level of at least said RGB pixel data; and
   a classifier for classifying said RGB pixel data according to said luminance level, wherein said luminance level is transmitted to said stereo RGB camera as feedback.

5. The apparatus of claim 4, further comprising a white balance module configured to apply a smoothed GW (gray world) algorithm to said RGB pixel data.

6. The system of claim 2, wherein said predetermined pixel array comprises a 5×5 window.

7. The apparatus of claim 1, further comprising:
   a biological sensor configured to provide biological data, wherein:
      said biological sensor is selected from the group consisting of: an EEG sensor, a heartrate sensor, an oxygen saturation sensor, an EKG sensor, or EMG sensor, and a combination thereof,
      the processor is configured to process the biological data to form a plurality of sub-features, and
      said sub-features are combined by the FPGA to form a feature.

8. The apparatus of claim 1, wherein said FPGA is implemented as a field-programmable gate array (FPGA) comprising a system on a chip (SoC), including an operating system as a SOM (system on module).

9. The apparatus of claim 8, further comprising a CPU SOM for performing overflow operations from said FPGA.

10. The apparatus of claim 1, wherein said tracking devices comprise a plurality of wearable sensors.

11. The apparatus of claim 10, further comprising:
    a multi-modal interaction device in communication with a subject, said multi-modal interaction device comprising said plurality of tracking devices and at least one haptic feedback device,
    wherein:
       the processor is configured to process data from the tracking devices to form a plurality of tracking sub-features, and
       said sub-features are combined by said FPGA to form a feature to track movements of the subject and to provide feedback through said at least one haptic feedback device.

12. The apparatus of claim 1, wherein said point cloud comprises a colorized point cloud.

13. The apparatus of claim 1,
    wherein said processor is configured to perform a defined set of operations for performing any of the functionality recited in claim 1 in response to receiving a corresponding instruction selected from an instruction set of codes, wherein said codes are stored in said memory.

14. The apparatus of claim 13, wherein said processor is configured to operate according to a set of codes selected from the instruction set for a de-noising process for a CFA (color filter array) image according to a W-means process.

15. The apparatus of claim 14, wherein said computational device comprises a second set of codes selected from the instruction set for operating a bad pixel removal process.

16. A system comprising the apparatus of claim 1, further comprising a display for displaying stereo visual data.

17. A method for processing image information comprising:
  receiving SVPD from the stereo camera of the apparatus of claim 1;
  performing RGB preprocessing on the input pixel data to produce preprocessed RGB image pixel data;
  using the RGB preprocessed image pixel data in the operation of the stereo camera with respect to at least one of an autogain and an autoexposure algorithm;
  rectifying the SVPD so as to control artifacts caused by the lens of the camera; and
  calibrating the SVPD so as to prevent distortion of the stereo pixel input data by the lens of the stereo camera.

18. The method of claim 17, further comprising colorizing the preprocessed RGB image pixel data, and creating a disparity map based on the colorized, preprocessed RGB image pixel data.

19. The method of claim 18, wherein calibration comprises matching the RGB pixel image data with depth pixel data.

20. The method of claim 19, wherein the disparity map is created by:
  obtaining depth pixel data from at least one of the stereo pixel input data, the preprocessed RGB image pixel data, and depth pixel data from a depth sensor, and checking differences between stereo images.

21. The method of claim 20, wherein said disparity map, plus depth pixel data from the depth sensor in the form of a calibrated depth map, is combined for the point cloud computation.

22. The method of claim 17, wherein the system further comprises a frame synchronizer, the method further comprising: receiving first data flow of at least one image from a first RGB camera and second data flow of at least one image from a second RGB camera; sending the first and second data flows to a frame synchronizer; sampling the first and second data flows such that each of the first and second data flows are synchronized with a single clock; detecting which data flow is advanced of the other; directing the advanced data flow to a buffer, such that the data from the advanced flow is retained by the frame synchronizer until the other data flow reaches the frame synchronizer; and synchronizing, using the frame synchronizer, a first image frame from the first data flow and a second image frame from the second data flow.

23. The system of claim 1, further comprising a plurality of fusion kernels, for receiving data from a plurality of sensors of said apparatus, and for reporting missing data.

* * * * *